US012602184B2

(12) United States Patent
Gilchrist et al.

(10) Patent No.: US 12,602,184 B2
(45) Date of Patent: Apr. 14, 2026

(54) SYSTEMS AND METHODS FOR SOURCE CHAIN MANAGEMENT WITH IDENTITY-BASED TOKENS AND ENHANCED SECURITY

(71) Applicant: Vannadium, Inc., Arlington, VA (US)

(72) Inventors: Richard Gilchrist, Great Falls, VA (US); Randy Krebs, Carmel, IN (US); Jonathan Boyd Scott, Boerne, TX (US)

(73) Assignee: Vannadium, Inc., Arlington, VA (US)

( * ) Notice: Subject to any disclaimer, the term of this patent is extended or adjusted under 35 U.S.C. 154(b) by 0 days.

(21) Appl. No.: 19/079,946

(22) Filed: Mar. 14, 2025

(65) Prior Publication Data

US 2025/0292249 A1 Sep. 18, 2025

Related U.S. Application Data

(60) Provisional application No. 63/566,231, filed on Mar. 16, 2024.

(51) Int. Cl.
*G06Q 20/38* (2012.01)
*G06F 3/06* (2006.01)
(Continued)

(52) U.S. Cl.
CPC .......... *G06F 3/0655* (2013.01); *G06F 3/0604* (2013.01); *G06F 3/0671* (2013.01);
(Continued)

(58) Field of Classification Search
CPC .... G06F 3/0655; G06F 3/0604; G06F 3/0671; G06F 21/602; G06F 21/6218;
(Continued)

(56) References Cited

U.S. PATENT DOCUMENTS

2023/0224309 A1* 7/2023 Puri ........................ G06F 21/33
726/21
2023/0319039 A1* 10/2023 Murdoch ............ H04L 63/0884
726/9
(Continued)

*Primary Examiner* — Zeshan Qayyum
(74) *Attorney, Agent, or Firm* — The Marbury Law Group, PLLC

(57) ABSTRACT

Systems and methods for source chain management with identity-based tokens and enhanced security are disclosed. A processing system receives input that includes a decentralized identifier (DID) uniquely associated with an entity. The processing system invokes a smart contract deployed on a distributed ledger to mint a non-transferable identity-based token permanently linked to the DID. Metadata generated for the token includes cryptographic references to a hierarchical source chain structure stored in a decentralized data storage system, along with cryptographic verification data. Events associated with the DID are memorialized by appending granular event details, including timestamps, data changes, and origin identifiers, into the hierarchical source chain. Authorized access to event details and tokens is provided via an authenticated interface that securely retrieves and reconstructs encrypted data shards distributed across decentralized nodes, enhancing data security, immutability, and verifiability in decentralized environments.

20 Claims, 33 Drawing Sheets

(51) Int. Cl.

| | |
|---|---|
| *G06F 21/60* | (2013.01) |
| *G06F 21/62* | (2013.01) |
| *G06Q 20/40* | (2012.01) |
| *H04L 9/08* | (2006.01) |
| *H04L 9/32* | (2006.01) |

(52) U.S. Cl.

CPC ........ *G06F 21/602* (2013.01); *G06F 21/6218* (2013.01); *G06Q 20/3825* (2013.01); *G06Q 20/3827* (2013.01); *G06Q 20/3829* (2013.01); *G06Q 20/389* (2013.01); *G06Q 20/401* (2013.01); *H04L 9/0825* (2013.01); *H04L 9/0866* (2013.01); *H04L 9/0894* (2013.01); *H04L 9/32* (2013.01); *H04L 9/3213* (2013.01); *H04L 9/3236* (2013.01); *H04L 9/3247* (2013.01); *H04L 9/3297* (2013.01); *G06F 2221/2141* (2013.01); *G06Q 2220/00* (2013.01)

(58) Field of Classification Search

CPC ........ G06F 2221/2141; G06Q 20/3825; G06Q 20/3827; G06Q 20/3829; G06Q 20/389; G06Q 20/401; G06Q 2220/00; H04L 9/0825; H04L 9/0866; H04L 9/0894; H04L 9/32; H04L 9/3213; H04L 9/3236; H04L 9/3247; H04L 9/3297; H04L 2209/56; H04L 9/3239; H04L 9/50

USPC ........................................................ 705/69

See application file for complete search history.

(56) References Cited

U.S. PATENT DOCUMENTS

| | | | | |
|---|---|---|---|---|
| 2024/0112177 A1* | 4/2024 | Maier | .................... | G06Q 40/00 |
| 2024/0354753 A1* | 10/2024 | Ness | .................. | G06Q 20/3827 |

* cited by examiner

700
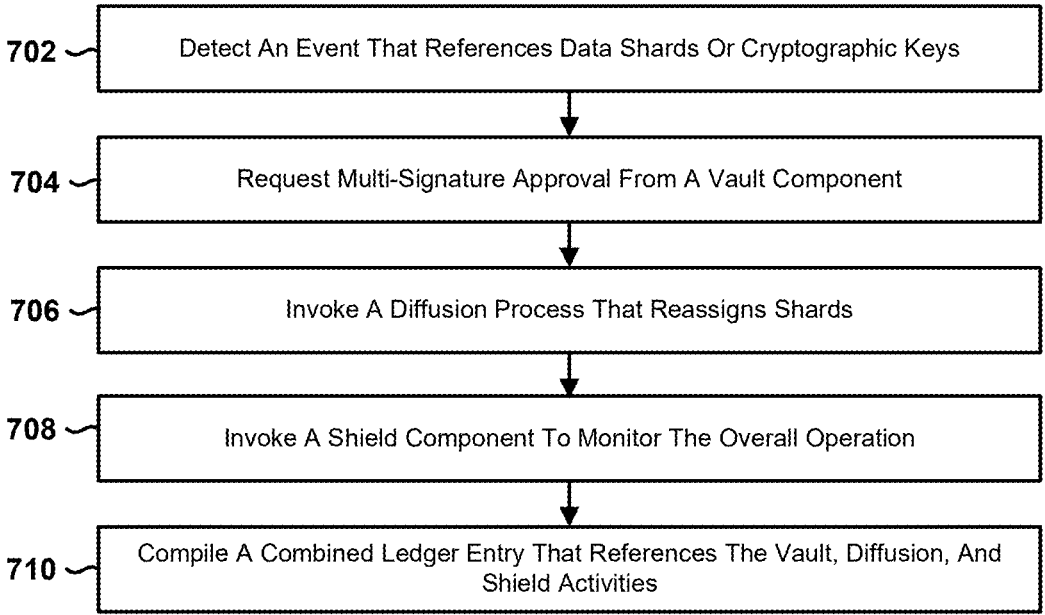
702 — Detect An Event That References Data Shards Or Cryptographic Keys
704 — Request Multi-Signature Approval From A Vault Component
706 — Invoke A Diffusion Process That Reassigns Shards
708 — Invoke A Shield Component To Monitor The Overall Operation
710 — Compile A Combined Ledger Entry That References The Vault, Diffusion, And Shield Activities
FIG. 7A

750

752 — Receive A Dataset For Storage

754 — Partition The Dataset Into A Plurality Of Data Shards That Are Each Associated With A Unique Shard Identifier And Each Include A Portion Of The Dataset 756 — Encrypt Each Data Shard Using A Unique Cryptographic Key 758 — Distribute The Plurality Of Data Shards Across A Plurality Of Storage Nodes In The Decentralized Node Network, Each Storage Node Being Selected Based On Network Performance Metrics (e.g., Latency, Storage Utilization, And Reliability).

760 — Record Metadata Associated With Each Data Shard In A Tamper-Evident Distributed Ledger, The Metadata Including The Unique Shard Identifier, The Cryptographic Key Reference, And The Storage Node Location.

762 — Receive A Retrieval Request Specifying The Dataset.

764 — Query The Tamper-Evident Distributed Ledger To Determine The Storage Node Locations Of The Data Shards Associated With The Dataset.

766 — Retrieve The Data Shards From The Identified Storage Nodes In Parallel.

768 — Validate The Integrity Of Each Retrieved Data Shard By Comparing Metadata Stored In The Tamper-Evident Distributed Ledger With Metadata Retrieved From The Storage Nodes.

770 — Decrypt Each Validated Data Shard Using The Unique Cryptographic Key Associated With The Data Shard.

772 — Reconstruct The Dataset From The Validated And Decrypted Data Shards Based On Their Shard Identifiers.

FIG. 7B

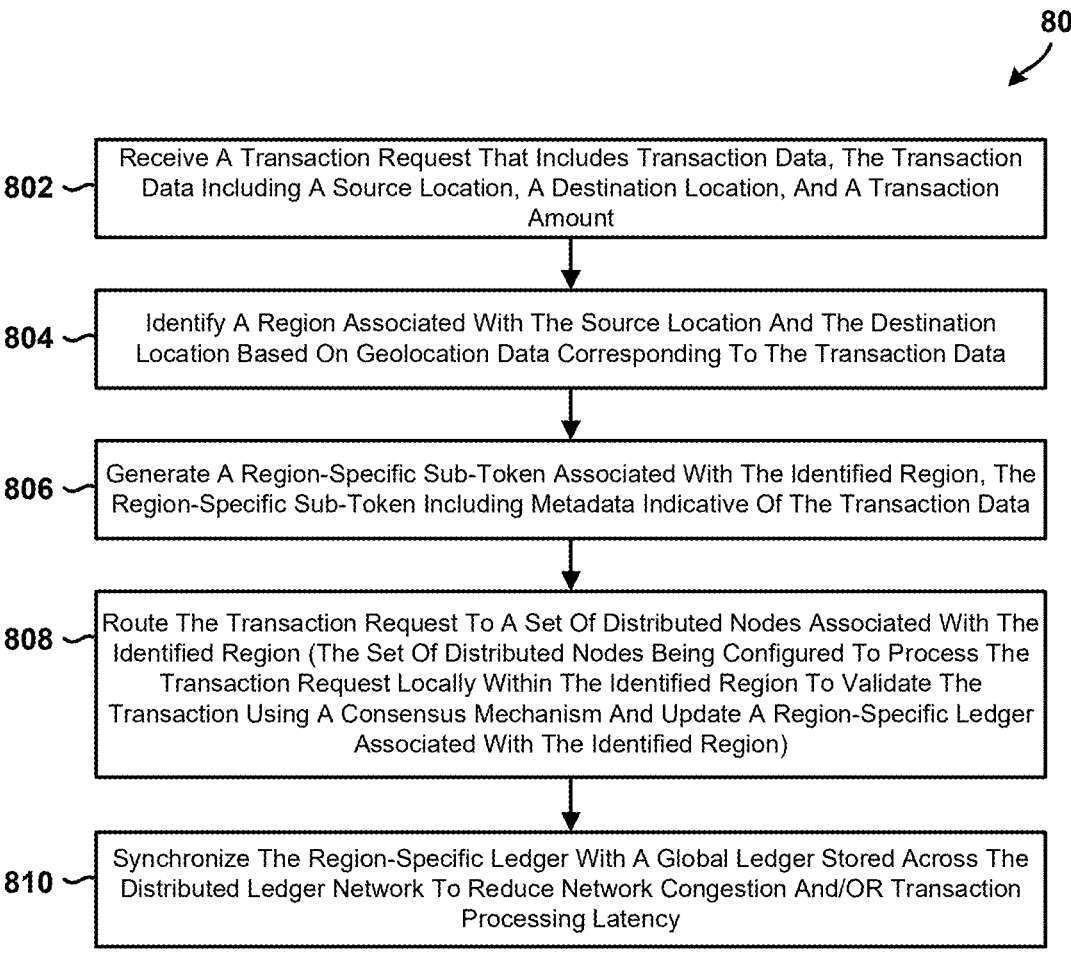

802 — Receive A Transaction Request That Includes Transaction Data, The Transaction Data Including A Source Location, A Destination Location, And A Transaction Amount 804 — Identify A Region Associated With The Source Location And The Destination Location Based On Geolocation Data Corresponding To The Transaction Data 806 — Generate A Region-Specific Sub-Token Associated With The Identified Region, The Region-Specific Sub-Token Including Metadata Indicative Of The Transaction Data 808 — Route The Transaction Request To A Set Of Distributed Nodes Associated With The Identified Region (The Set Of Distributed Nodes Being Configured To Process The Transaction Request Locally Within The Identified Region To Validate The Transaction Using A Consensus Mechanism And Update A Region-Specific Ledger Associated With The Identified Region)

810 — Synchronize The Region-Specific Ledger With A Global Ledger Stored Across The Distributed Ledger Network To Reduce Network Congestion And/OR Transaction Processing Latency

FIG. 8

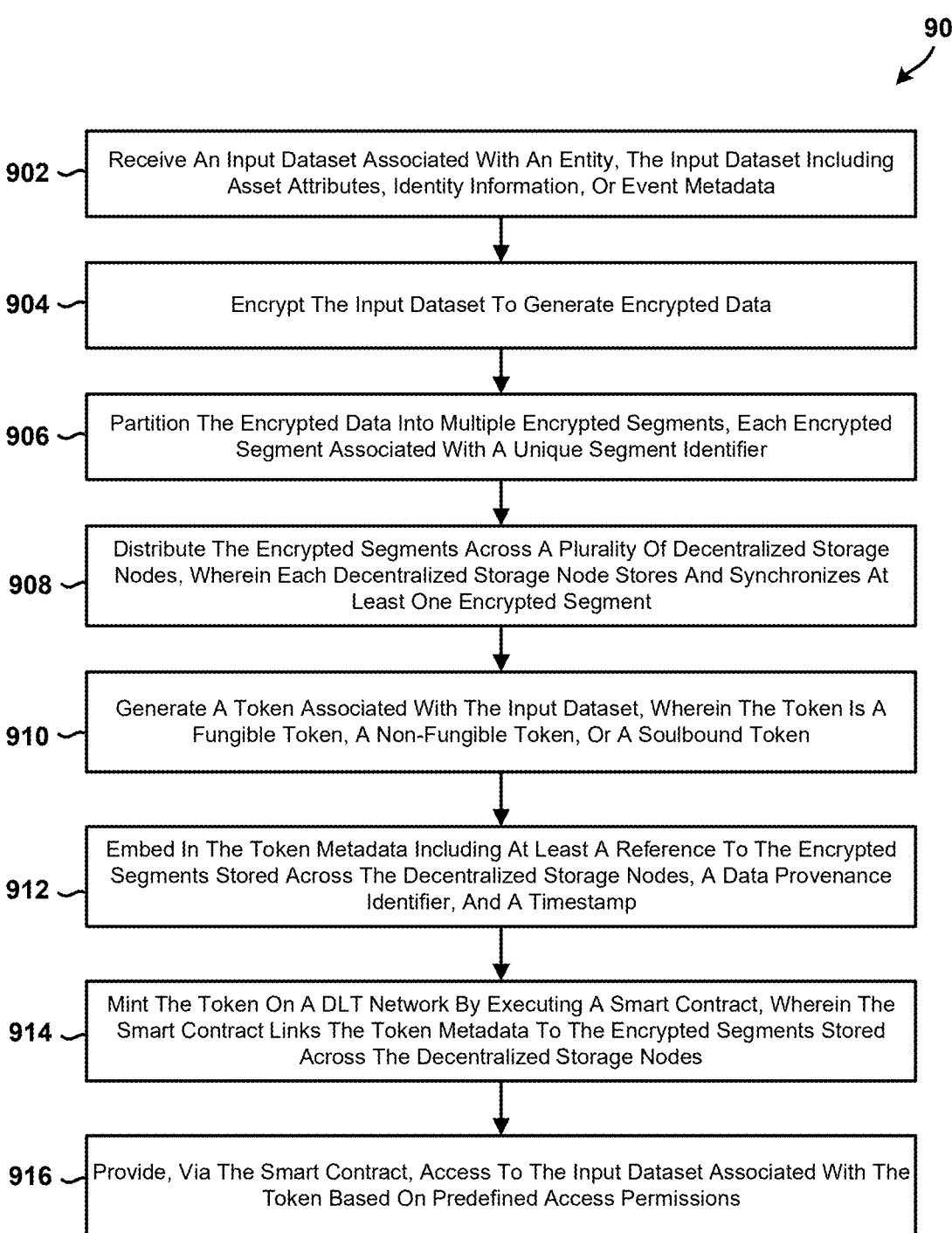

900

902 — Receive An Input Dataset Associated With An Entity, The Input Dataset Including Asset Attributes, Identity Information, Or Event Metadata 904 — Encrypt The Input Dataset To Generate Encrypted Data 906 — Partition The Encrypted Data Into Multiple Encrypted Segments, Each Encrypted Segment Associated With A Unique Segment Identifier 908 — Distribute The Encrypted Segments Across A Plurality Of Decentralized Storage Nodes, Wherein Each Decentralized Storage Node Stores And Synchronizes At Least One Encrypted Segment 910 — Generate A Token Associated With The Input Dataset, Wherein The Token Is A Fungible Token, A Non-Fungible Token, Or A Soulbound Token 912 — Embed In The Token Metadata Including At Least A Reference To The Encrypted Segments Stored Across The Decentralized Storage Nodes, A Data Provenance Identifier, And A Timestamp 914 — Mint The Token On A DLT Network By Executing A Smart Contract, Wherein The Smart Contract Links The Token Metadata To The Encrypted Segments Stored Across The Decentralized Storage Nodes 916 — Provide, Via The Smart Contract, Access To The Input Dataset Associated With The Token Based On Predefined Access Permissions

FIG. 9

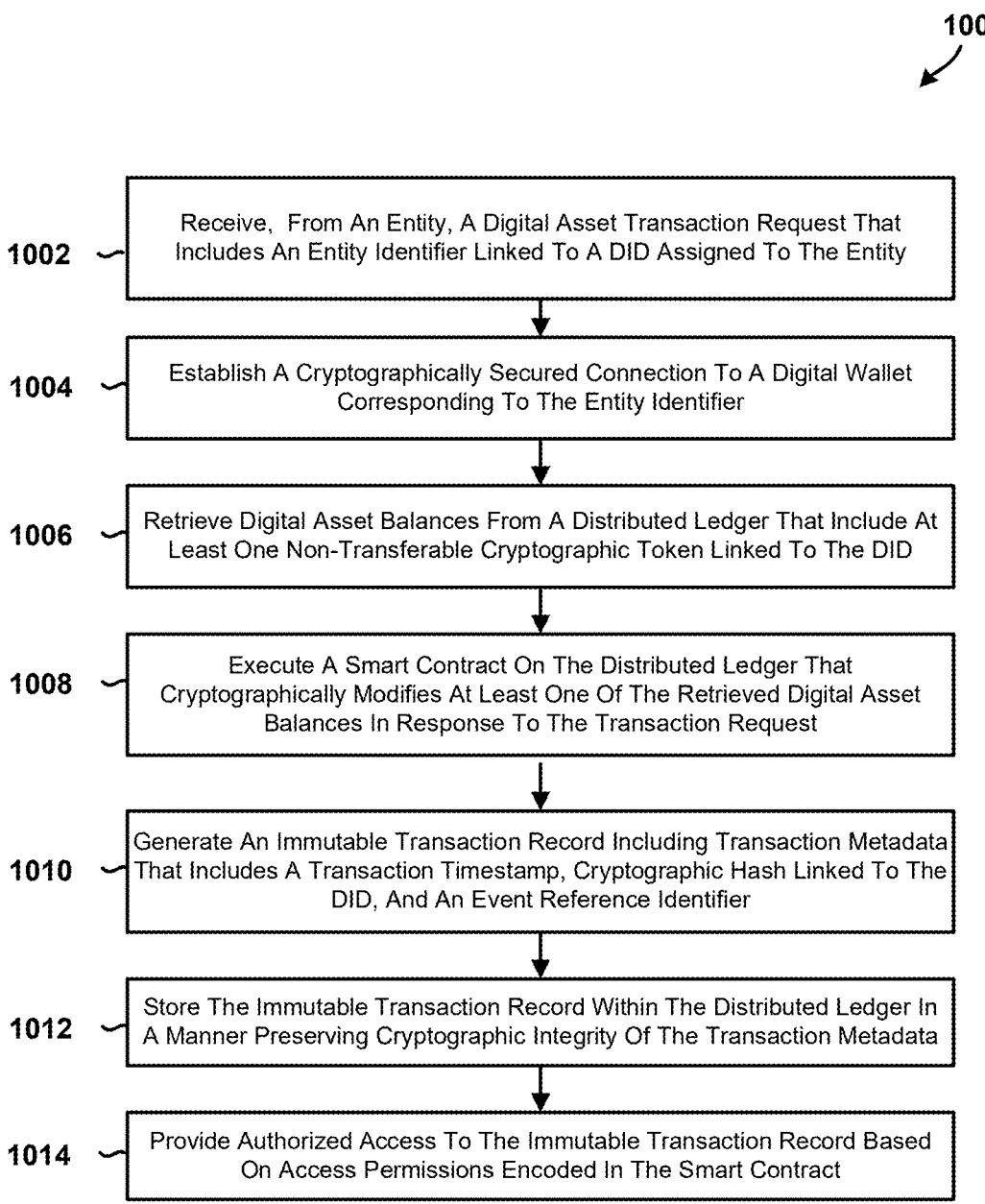

1000

1002 — Receive, From An Entity, A Digital Asset Transaction Request That Includes An Entity Identifier Linked To A DID Assigned To The Entity 1004 — Establish A Cryptographically Secured Connection To A Digital Wallet Corresponding To The Entity Identifier 1006 — Retrieve Digital Asset Balances From A Distributed Ledger That Include At Least One Non-Transferable Cryptographic Token Linked To The DID 1008 — Execute A Smart Contract On The Distributed Ledger That Cryptographically Modifies At Least One Of The Retrieved Digital Asset Balances In Response To The Transaction Request 1010 — Generate An Immutable Transaction Record Including Transaction Metadata That Includes A Transaction Timestamp, Cryptographic Hash Linked To The DID, And An Event Reference Identifier 1012 — Store The Immutable Transaction Record Within The Distributed Ledger In A Manner Preserving Cryptographic Integrity Of The Transaction Metadata 1014 — Provide Authorized Access To The Immutable Transaction Record Based On Access Permissions Encoded In The Smart Contract

1102 — Receive A Document Uploaded By The User

1104 — Encrypt The Document Using A Cryptographic Key Associated With The User

1106 — Store The Encrypted Document In A Decentralized Storage System

1108 — Generate An Access Link To The Encrypted Document

1110 — Provide Access/control To The Encrypted Document Via A Multi-Signature Authentication Process

1150

1152 — Receive A Private Key Loss Request From An Entity

1154 — Begin The Recovery Protocol Through A Vault Component

1156 — Confirm Whether The Request Is Valid

1158 — Reconstruct A New Cryptographic Key

1160 — Link The Recovered Key To The Entity's Tokens Or Shard Encryption Processes

1200

1202 — Receive A Token Swap Request Specifying A First Digital Asset And A Second Digital Asset 1204 — Validate The Token Swap Request 1206 — Execute The Token Swap Using A Decentralized Exchange Protocol 1208 — Record The Token Swap In The Distributed Ledger 1210 — Provide User Access/control Of Data Sharing Settings 1212 — Compensate The User With A Digital Token For Sharing The User's Data.

1300

1302 — Select A Decentralized Application
(e.g., Based On User Input)

1304 — Establish A Secure Connection Between The Digital
Wallet And The Selected Decentralized Application 1306 — Transmit Transaction Data To The Decentralized
Application 1308 — Receive Transaction Status Updates From The
Decentralized Application

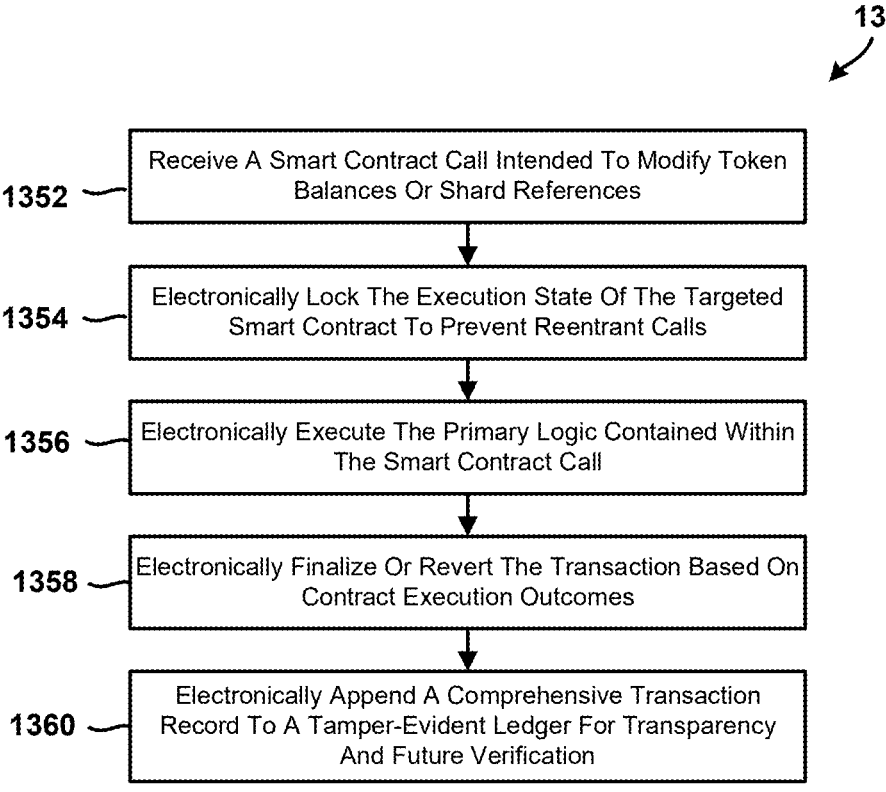

1350

1352 — Receive A Smart Contract Call Intended To Modify Token Balances Or Shard References 1354 — Electronically Lock The Execution State Of The Targeted Smart Contract To Prevent Reentrant Calls 1356 — Electronically Execute The Primary Logic Contained Within The Smart Contract Call 1358 — Electronically Finalize Or Revert The Transaction Based On Contract Execution Outcomes 1360 — Electronically Append A Comprehensive Transaction Record To A Tamper-Evident Ledger For Transparency And Future Verification

1402 — Receive A Request (From A User) To Participate As A Storage Node

1404 — Allocate Storage Resources On A User Device For Storing DLT Transaction Data 1406 — Monitor The User Device Uptime And Data Availability 1408 — Calculate A Participation Reward Based On The Monitored Uptime And Storage Allocation 1410 — Distribute A Digital Token As Compensation For Storage Participation

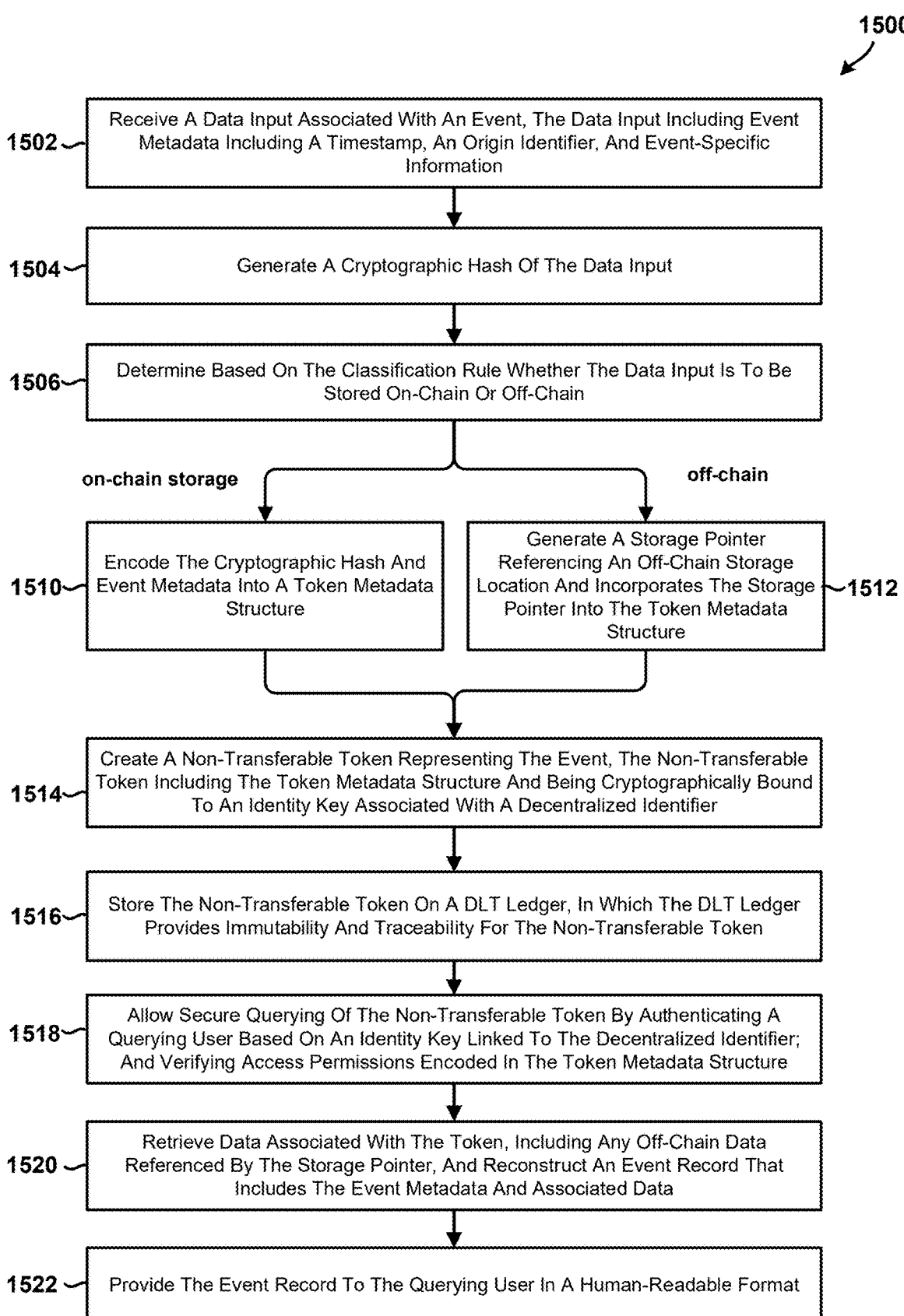

1500

1502 — Receive A Data Input Associated With An Event, The Data Input Including Event Metadata Including A Timestamp, An Origin Identifier, And Event-Specific Information 1504 — Generate A Cryptographic Hash Of The Data Input 1506 — Determine Based On The Classification Rule Whether The Data Input Is To Be Stored On-Chain Or Off-Chain on-chain storage                                          off-chain 1510 — Encode The Cryptographic Hash And Event Metadata Into A Token Metadata Structure Generate A Storage Pointer Referencing An Off-Chain Storage Location And Incorporates The Storage Pointer Into The Token Metadata Structure — 1512

1514 — Create A Non-Transferable Token Representing The Event, The Non-Transferable Token Including The Token Metadata Structure And Being Cryptographically Bound To An Identity Key Associated With A Decentralized Identifier 1516 — Store The Non-Transferable Token On A DLT Ledger, In Which The DLT Ledger Provides Immutability And Traceability For The Non-Transferable Token 1518 — Allow Secure Querying Of The Non-Transferable Token By Authenticating A Querying User Based On An Identity Key Linked To The Decentralized Identifier; And Verifying Access Permissions Encoded In The Token Metadata Structure 1520 — Retrieve Data Associated With The Token, Including Any Off-Chain Data Referenced By The Storage Pointer, And Reconstruct An Event Record That Includes The Event Metadata And Associated Data 1522 — Provide The Event Record To The Querying User In A Human-Readable Format

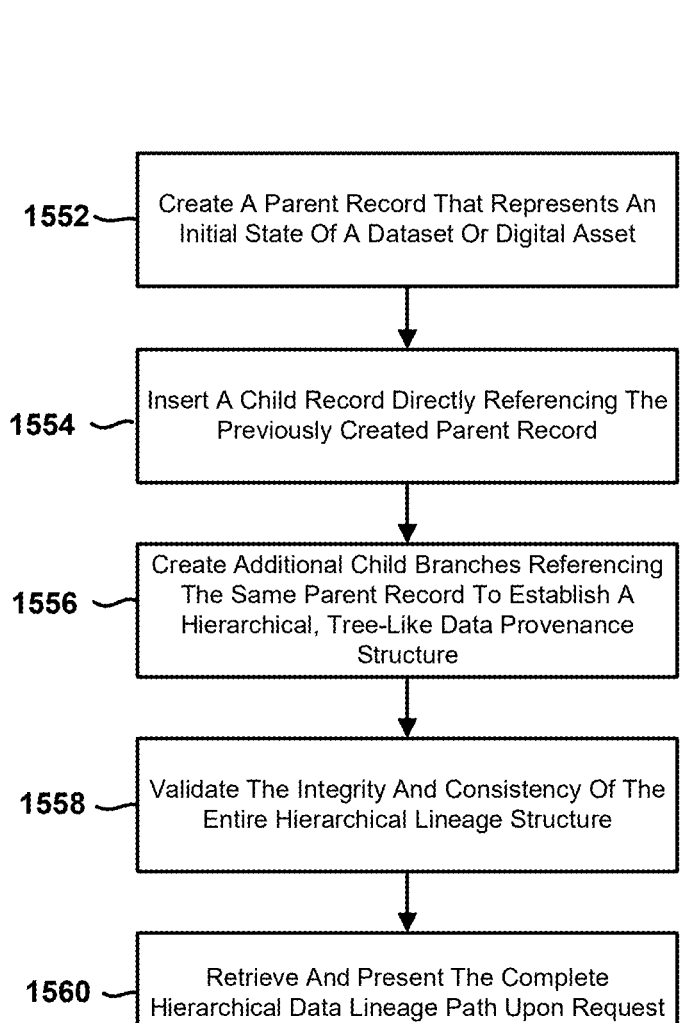

1552 — Create A Parent Record That Represents An Initial State Of A Dataset Or Digital Asset 1554 — Insert A Child Record Directly Referencing The Previously Created Parent Record 1556 — Create Additional Child Branches Referencing The Same Parent Record To Establish A Hierarchical, Tree-Like Data Provenance Structure 1558 — Validate The Integrity And Consistency Of The Entire Hierarchical Lineage Structure 1560 — Retrieve And Present The Complete Hierarchical Data Lineage Path Upon Request

FIG. 15B

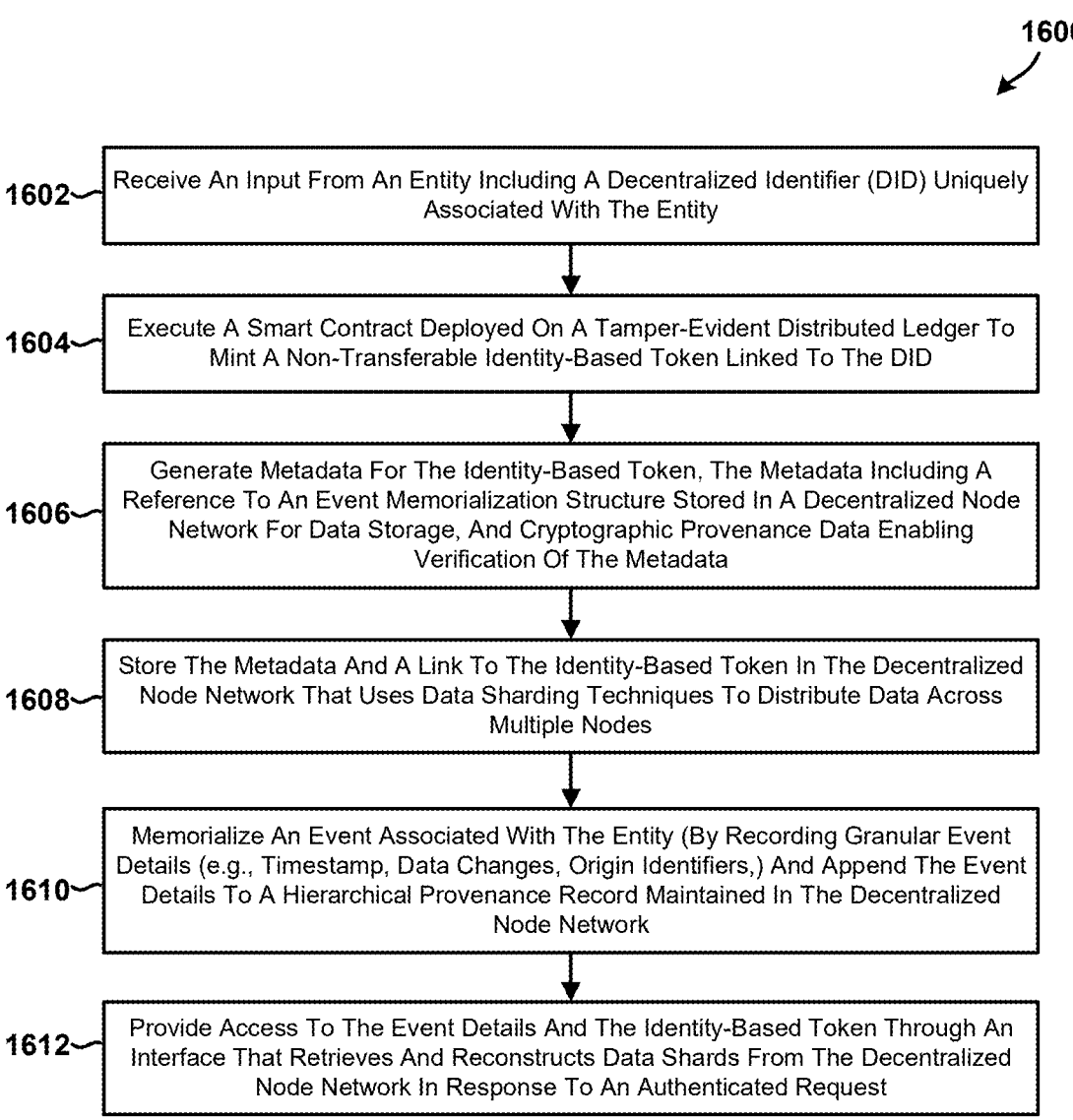

1600

1602— Receive An Input From An Entity Including A Decentralized Identifier (DID) Uniquely Associated With The Entity 1604— Execute A Smart Contract Deployed On A Tamper-Evident Distributed Ledger To Mint A Non-Transferable Identity-Based Token Linked To The DID 1606— Generate Metadata For The Identity-Based Token, The Metadata Including A Reference To An Event Memorialization Structure Stored In A Decentralized Node Network For Data Storage, And Cryptographic Provenance Data Enabling Verification Of The Metadata 1608— Store The Metadata And A Link To The Identity-Based Token In The Decentralized Node Network That Uses Data Sharding Techniques To Distribute Data Across Multiple Nodes 1610— Memorialize An Event Associated With The Entity (By Recording Granular Event Details (e.g., Timestamp, Data Changes, Origin Identifiers,) And Append The Event Details To A Hierarchical Provenance Record Maintained In The Decentralized Node Network 1612— Provide Access To The Event Details And The Identity-Based Token Through An Interface That Retrieves And Reconstructs Data Shards From The Decentralized Node Network In Response To An Authenticated Request

FIG. 16

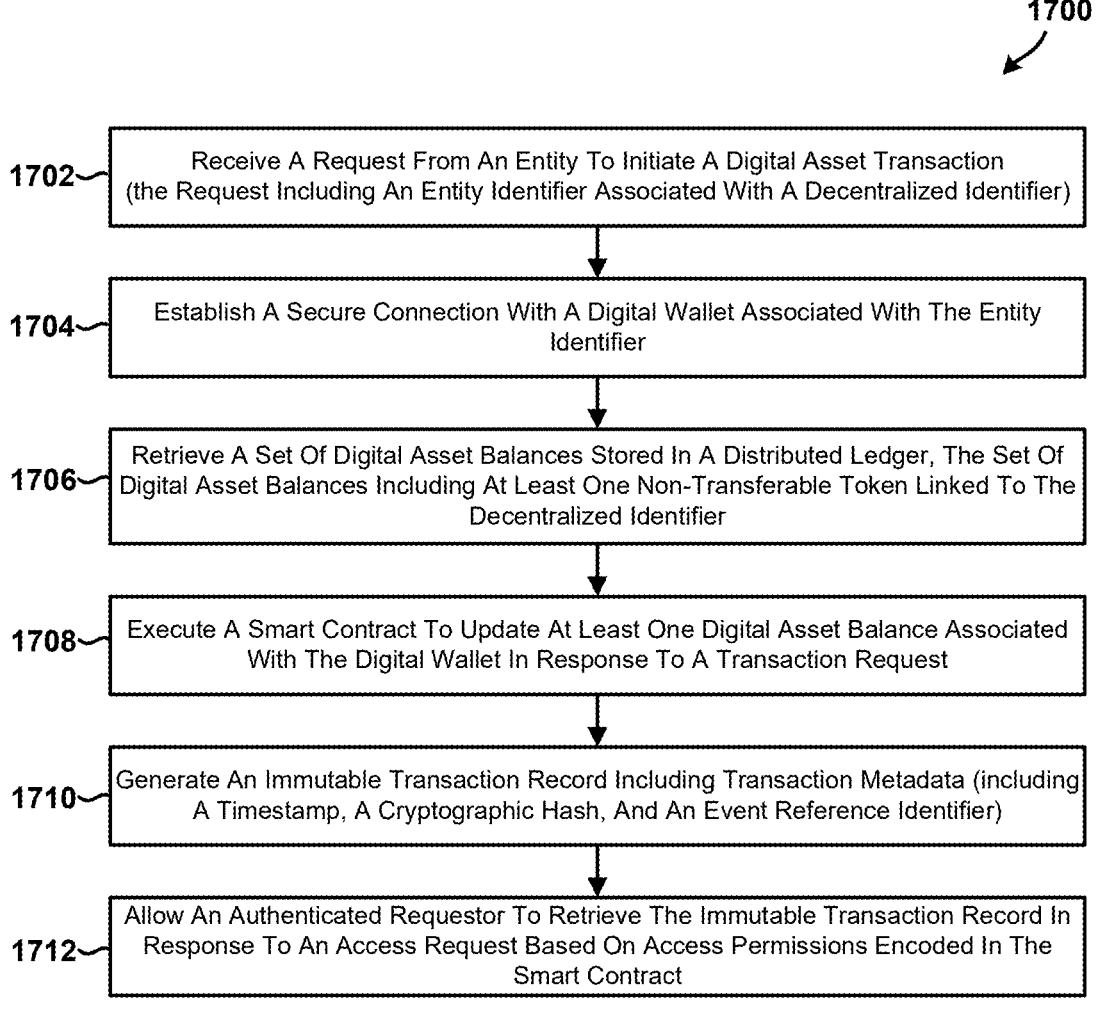

1700

1702— Receive A Request From An Entity To Initiate A Digital Asset Transaction (the Request Including An Entity Identifier Associated With A Decentralized Identifier)

1704— Establish A Secure Connection With A Digital Wallet Associated With The Entity Identifier 1706— Retrieve A Set Of Digital Asset Balances Stored In A Distributed Ledger, The Set Of Digital Asset Balances Including At Least One Non-Transferable Token Linked To The Decentralized Identifier 1708— Execute A Smart Contract To Update At Least One Digital Asset Balance Associated With The Digital Wallet In Response To A Transaction Request 1710— Generate An Immutable Transaction Record Including Transaction Metadata (including A Timestamp, A Cryptographic Hash, And An Event Reference Identifier)

1712— Allow An Authenticated Requestor To Retrieve The Immutable Transaction Record In Response To An Access Request Based On Access Permissions Encoded In The Smart Contract

FIG. 17

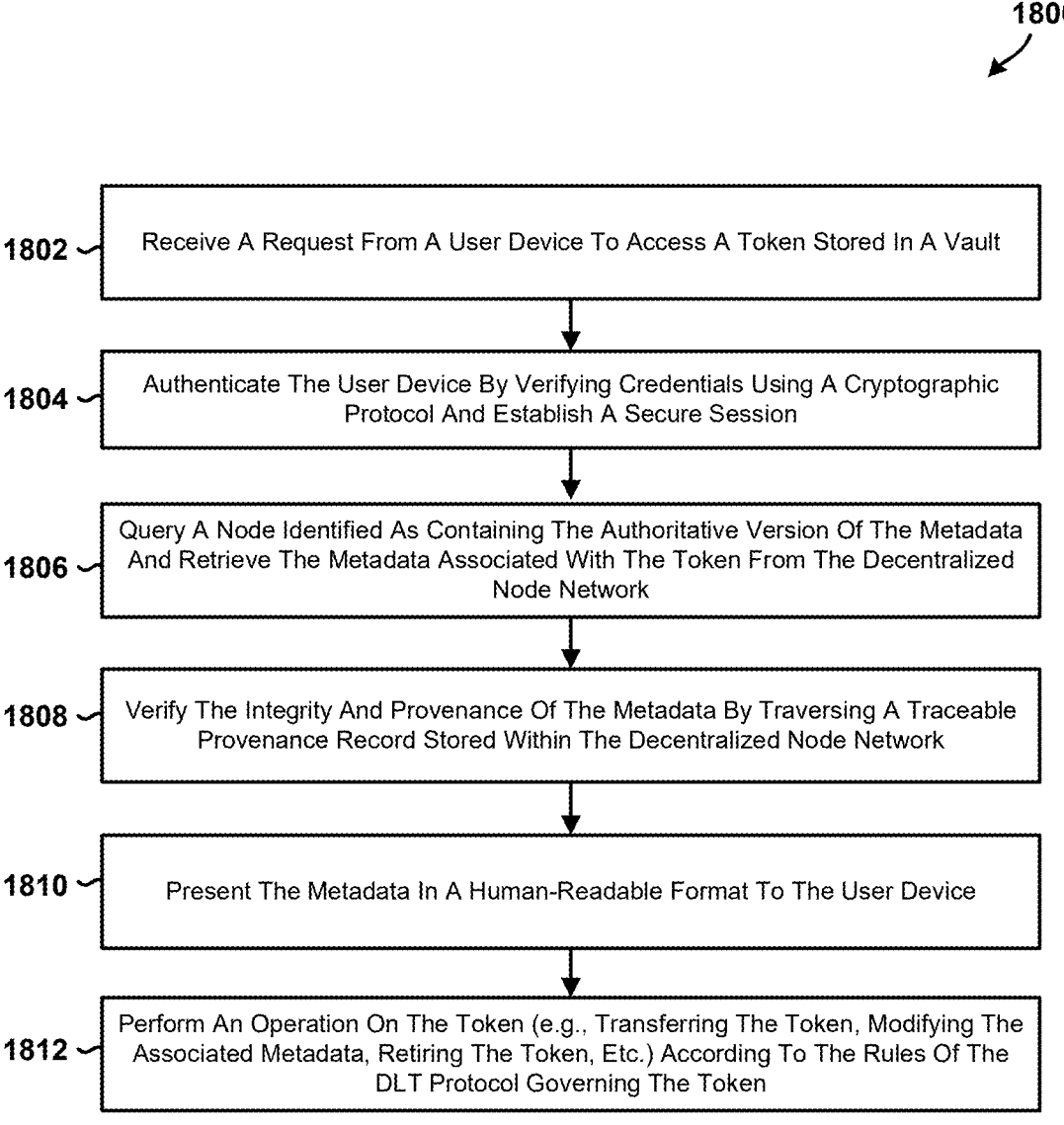

1800

1802 — Receive A Request From A User Device To Access A Token Stored In A Vault

1804 — Authenticate The User Device By Verifying Credentials Using A Cryptographic Protocol And Establish A Secure Session 1806 — Query A Node Identified As Containing The Authoritative Version Of The Metadata And Retrieve The Metadata Associated With The Token From The Decentralized Node Network 1808 — Verify The Integrity And Provenance Of The Metadata By Traversing A Traceable Provenance Record Stored Within The Decentralized Node Network 1810 — Present The Metadata In A Human-Readable Format To The User Device 1812 — Perform An Operation On The Token (e.g., Transferring The Token, Modifying The Associated Metadata, Retiring The Token, Etc.) According To The Rules Of The DLT Protocol Governing The Token

FIG. 18

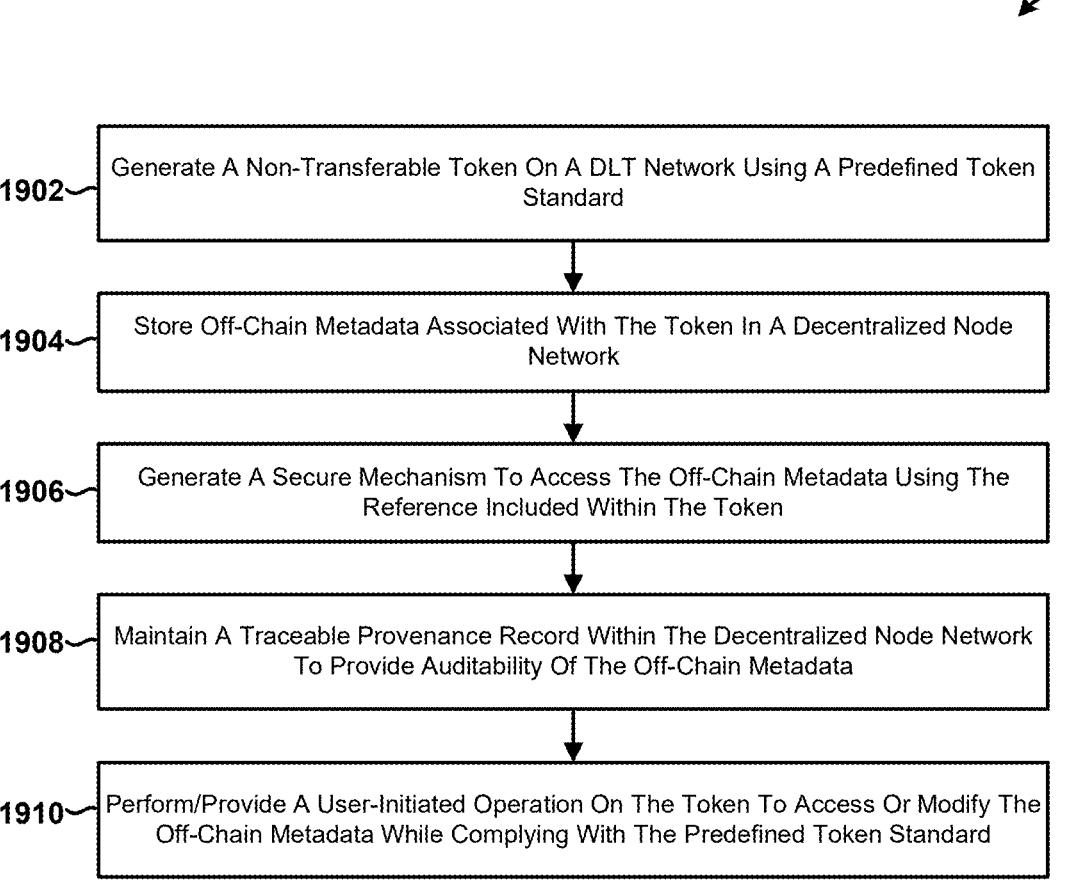

1900

1902~ Generate A Non-Transferable Token On A DLT Network Using A Predefined Token Standard 1904~ Store Off-Chain Metadata Associated With The Token In A Decentralized Node Network 1906~ Generate A Secure Mechanism To Access The Off-Chain Metadata Using The Reference Included Within The Token 1908~ Maintain A Traceable Provenance Record Within The Decentralized Node Network To Provide Auditability Of The Off-Chain Metadata 1910~ Perform/Provide A User-Initiated Operation On The Token To Access Or Modify The Off-Chain Metadata While Complying With The Predefined Token Standard

FIG. 19

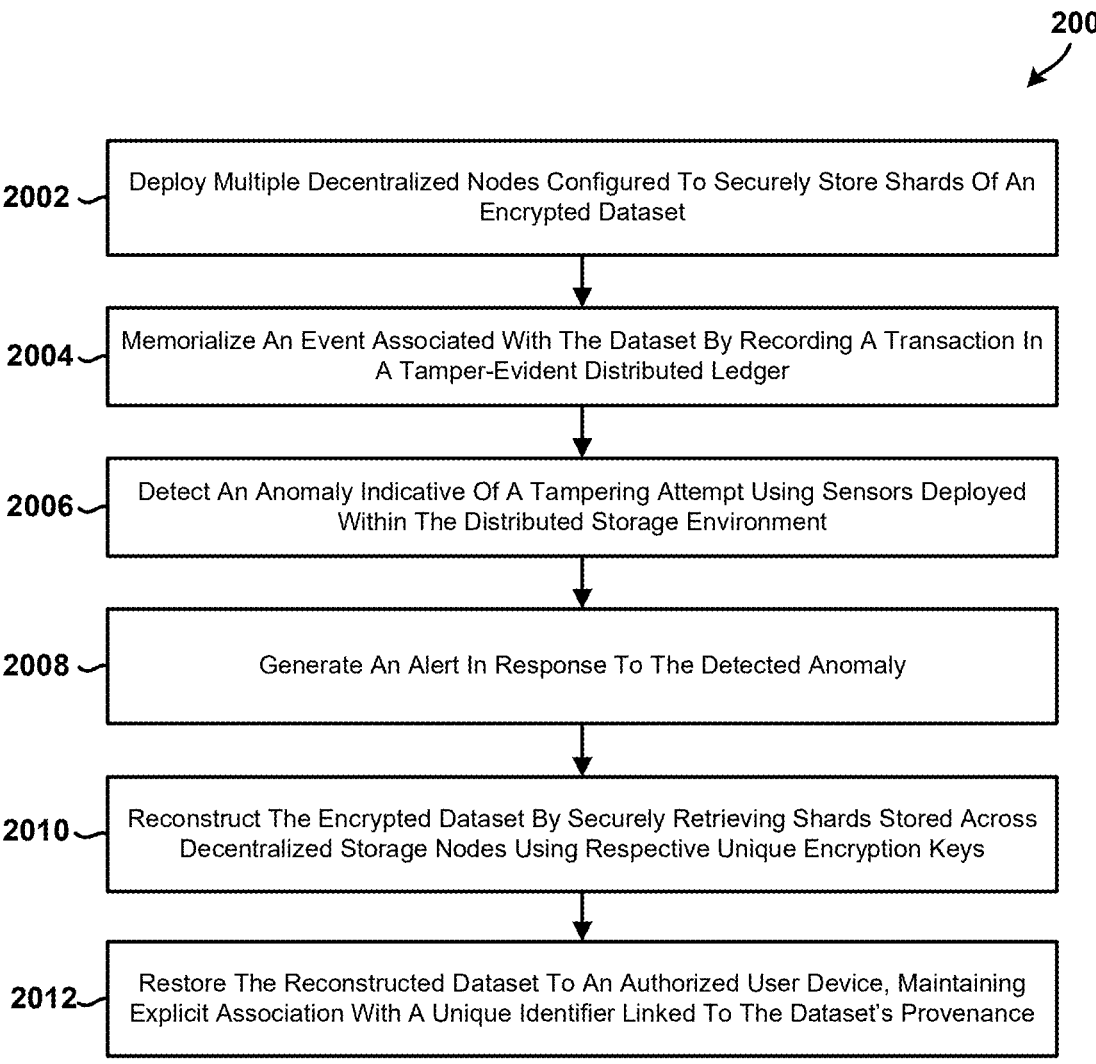

2000

2002 — Deploy Multiple Decentralized Nodes Configured To Securely Store Shards Of An Encrypted Dataset 2004 — Memorialize An Event Associated With The Dataset By Recording A Transaction In A Tamper-Evident Distributed Ledger 2006 — Detect An Anomaly Indicative Of A Tampering Attempt Using Sensors Deployed Within The Distributed Storage Environment 2008 — Generate An Alert In Response To The Detected Anomaly 2010 — Reconstruct The Encrypted Dataset By Securely Retrieving Shards Stored Across Decentralized Storage Nodes Using Respective Unique Encryption Keys 2012 — Restore The Reconstructed Dataset To An Authorized User Device, Maintaining Explicit Association With A Unique Identifier Linked To The Dataset's Provenance

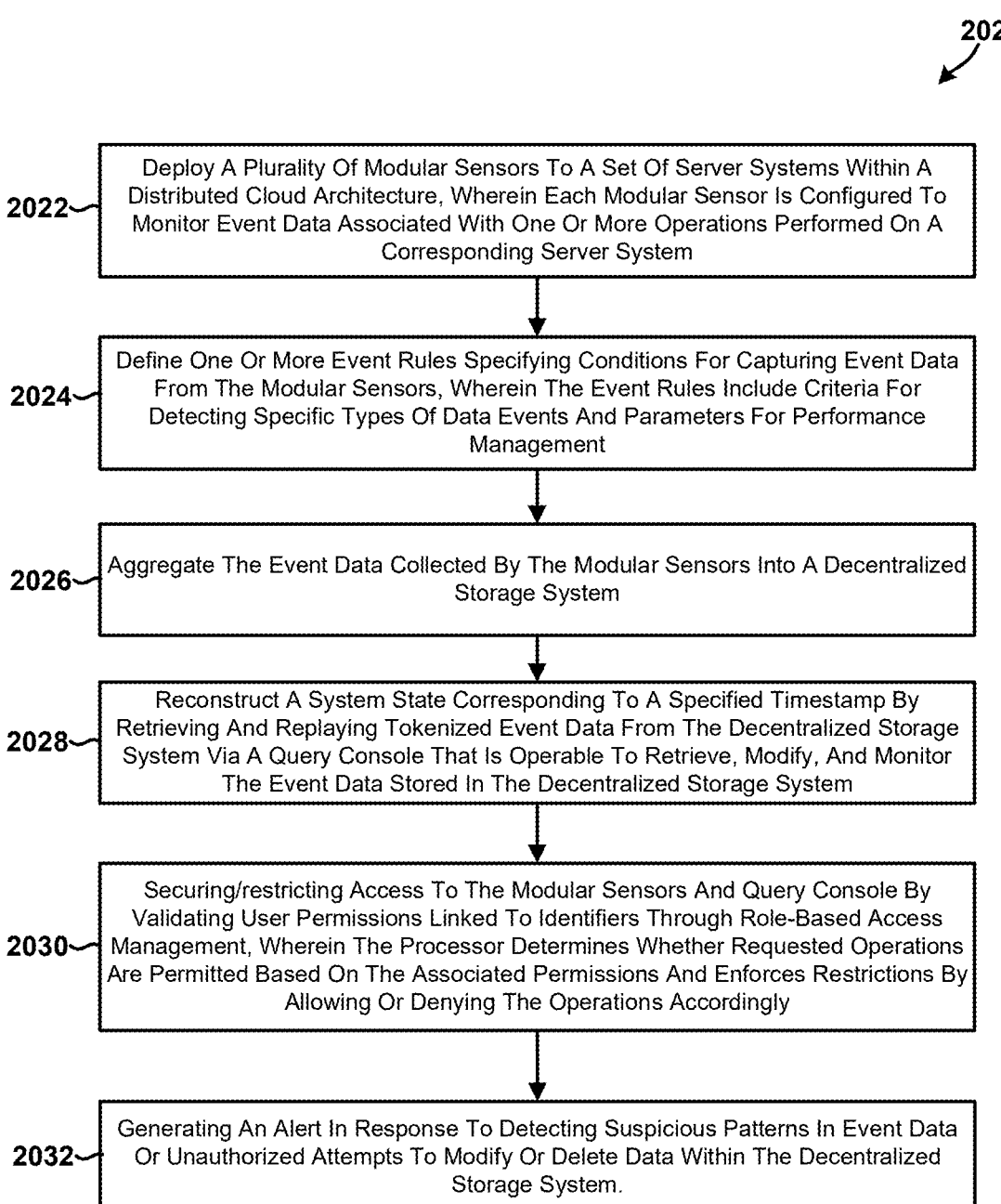

2022 — Deploy A Plurality Of Modular Sensors To A Set Of Server Systems Within A Distributed Cloud Architecture, Wherein Each Modular Sensor Is Configured To Monitor Event Data Associated With One Or More Operations Performed On A Corresponding Server System 2024 — Define One Or More Event Rules Specifying Conditions For Capturing Event Data From The Modular Sensors, Wherein The Event Rules Include Criteria For Detecting Specific Types Of Data Events And Parameters For Performance Management 2026 — Aggregate The Event Data Collected By The Modular Sensors Into A Decentralized Storage System 2028 — Reconstruct A System State Corresponding To A Specified Timestamp By Retrieving And Replaying Tokenized Event Data From The Decentralized Storage System Via A Query Console That Is Operable To Retrieve, Modify, And Monitor The Event Data Stored In The Decentralized Storage System 2030 — Securing/restricting Access To The Modular Sensors And Query Console By Validating User Permissions Linked To Identifiers Through Role-Based Access Management, Wherein The Processor Determines Whether Requested Operations Are Permitted Based On The Associated Permissions And Enforces Restrictions By Allowing Or Denying The Operations Accordingly 2032 — Generating An Alert In Response To Detecting Suspicious Patterns In Event Data Or Unauthorized Attempts To Modify Or Delete Data Within The Decentralized Storage System.

FIG. 20B

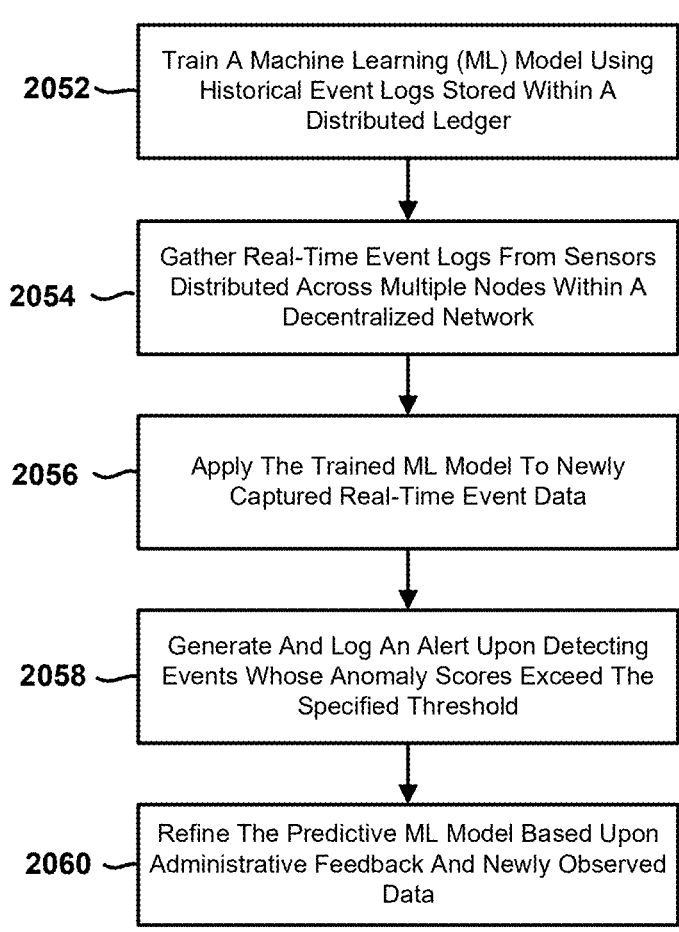

2052 — Train A Machine Learning (ML) Model Using Historical Event Logs Stored Within A Distributed Ledger 2054 — Gather Real-Time Event Logs From Sensors Distributed Across Multiple Nodes Within A Decentralized Network 2056 — Apply The Trained ML Model To Newly Captured Real-Time Event Data 2058 — Generate And Log An Alert Upon Detecting Events Whose Anomaly Scores Exceed The Specified Threshold 2060 — Refine The Predictive ML Model Based Upon Administrative Feedback And Newly Observed Data

FIG. 20C

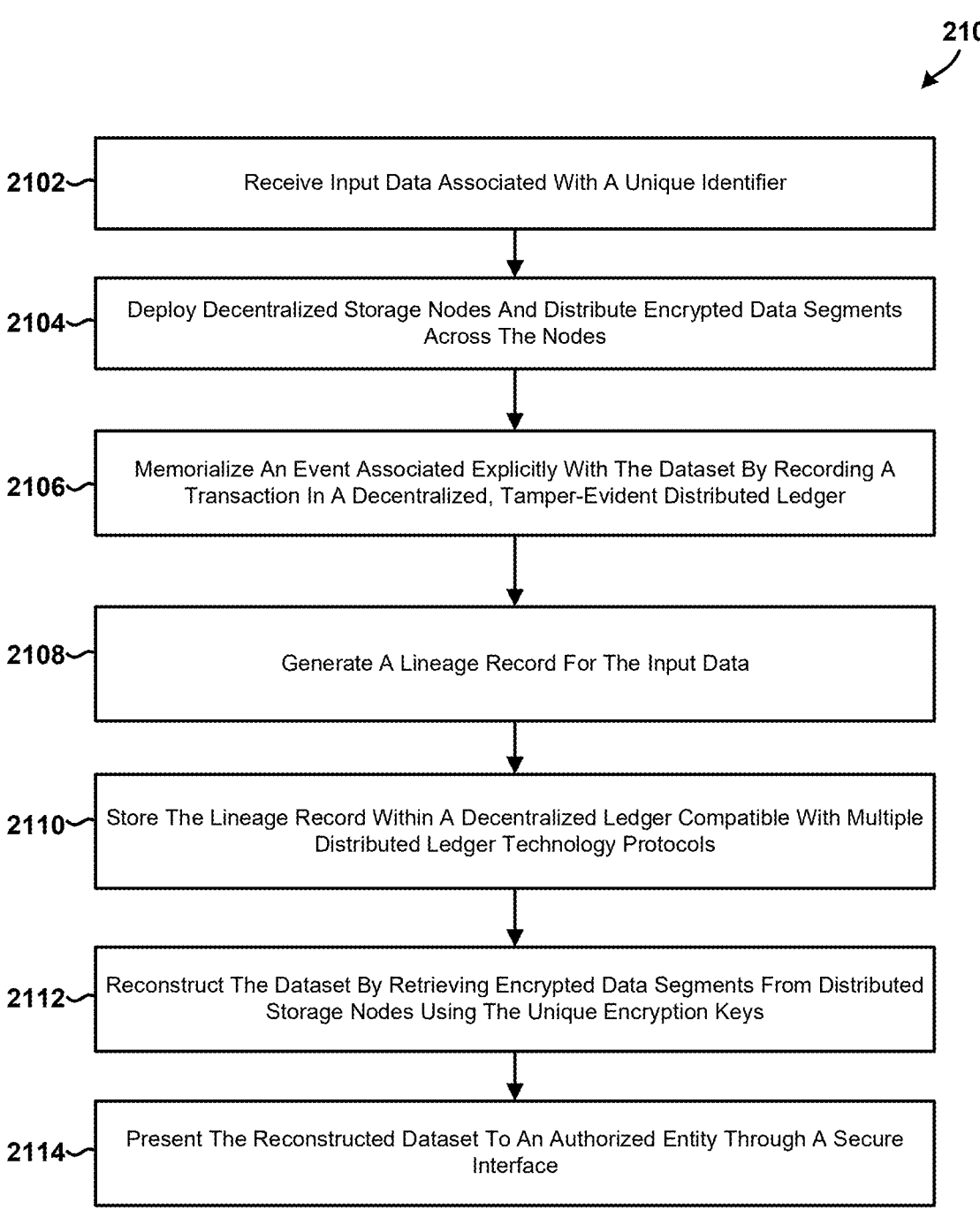

2100

2102~  Receive Input Data Associated With A Unique Identifier

2104~  Deploy Decentralized Storage Nodes And Distribute Encrypted Data Segments Across The Nodes 2106~  Memorialize An Event Associated Explicitly With The Dataset By Recording A Transaction In A Decentralized, Tamper-Evident Distributed Ledger 2108~  Generate A Lineage Record For The Input Data 2110~  Store The Lineage Record Within A Decentralized Ledger Compatible With Multiple Distributed Ledger Technology Protocols 2112~  Reconstruct The Dataset By Retrieving Encrypted Data Segments From Distributed Storage Nodes Using The Unique Encryption Keys 2114~  Present The Reconstructed Dataset To An Authorized Entity Through A Secure Interface

FIG. 21A

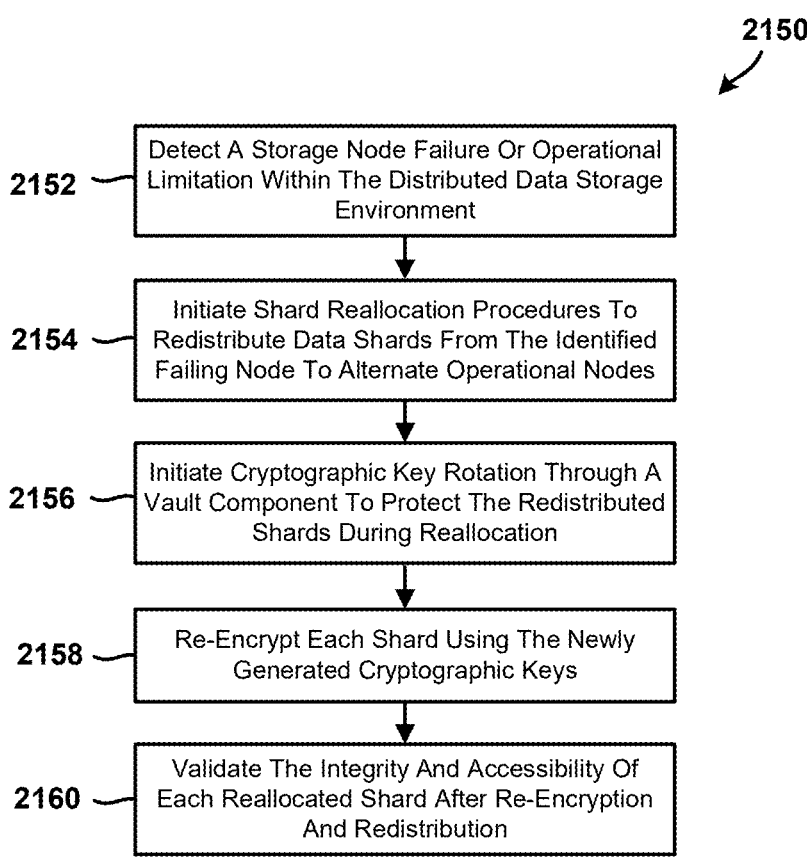

2150

2152 — Detect A Storage Node Failure Or Operational Limitation Within The Distributed Data Storage Environment 2154 — Initiate Shard Reallocation Procedures To Redistribute Data Shards From The Identified Failing Node To Alternate Operational Nodes 2156 — Initiate Cryptographic Key Rotation Through A Vault Component To Protect The Redistributed Shards During Reallocation 2158 — Re-Encrypt Each Shard Using The Newly Generated Cryptographic Keys 2160 — Validate The Integrity And Accessibility Of Each Reallocated Shard After Re-Encryption And Redistribution

FIG. 21B

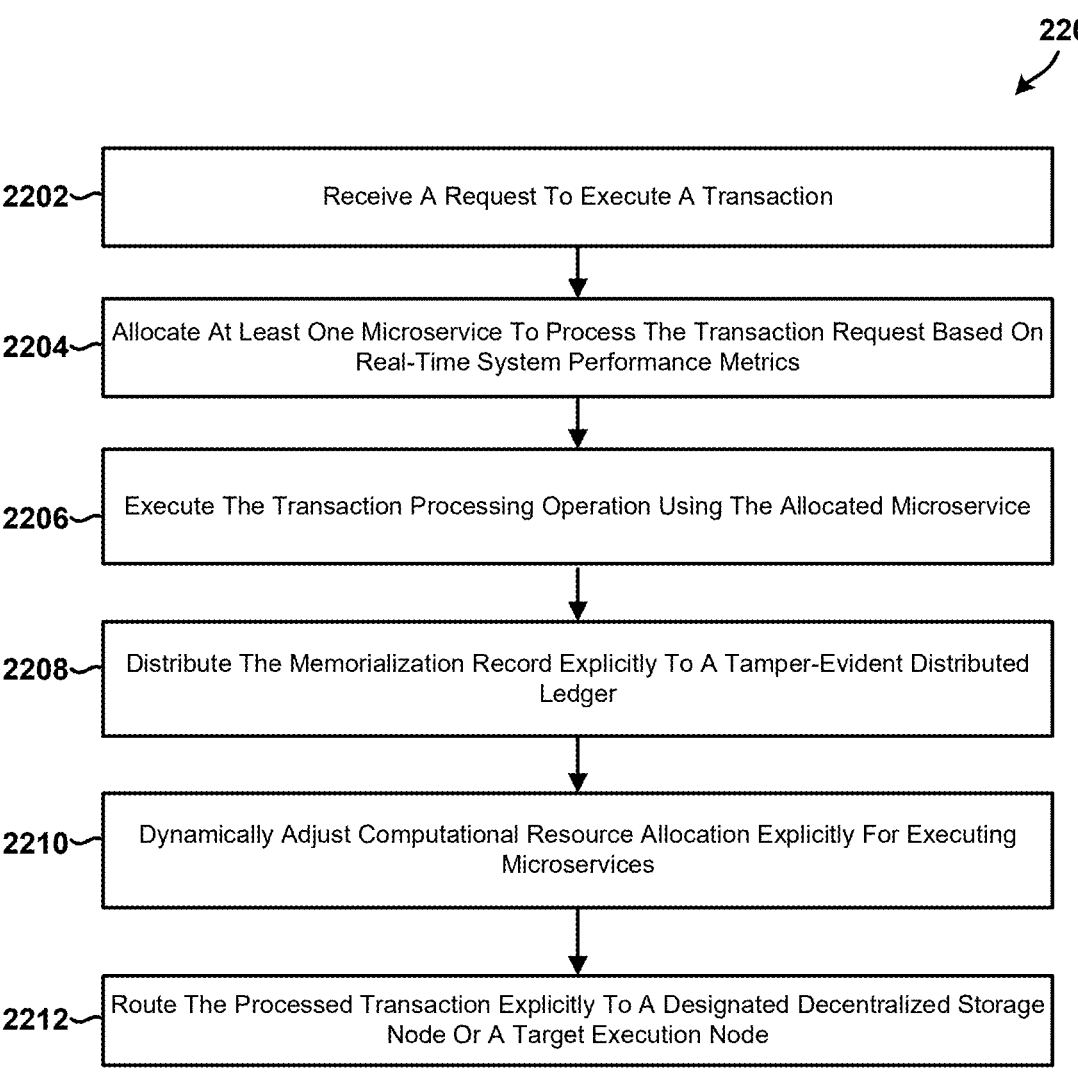

2200

2202 — Receive A Request To Execute A Transaction

2204 — Allocate At Least One Microservice To Process The Transaction Request Based On Real-Time System Performance Metrics 2206 — Execute The Transaction Processing Operation Using The Allocated Microservice 2208 — Distribute The Memorialization Record Explicitly To A Tamper-Evident Distributed Ledger 2210 — Dynamically Adjust Computational Resource Allocation Explicitly For Executing Microservices 2212 — Route The Processed Transaction Explicitly To A Designated Decentralized Storage Node Or A Target Execution Node

FIG. 22A

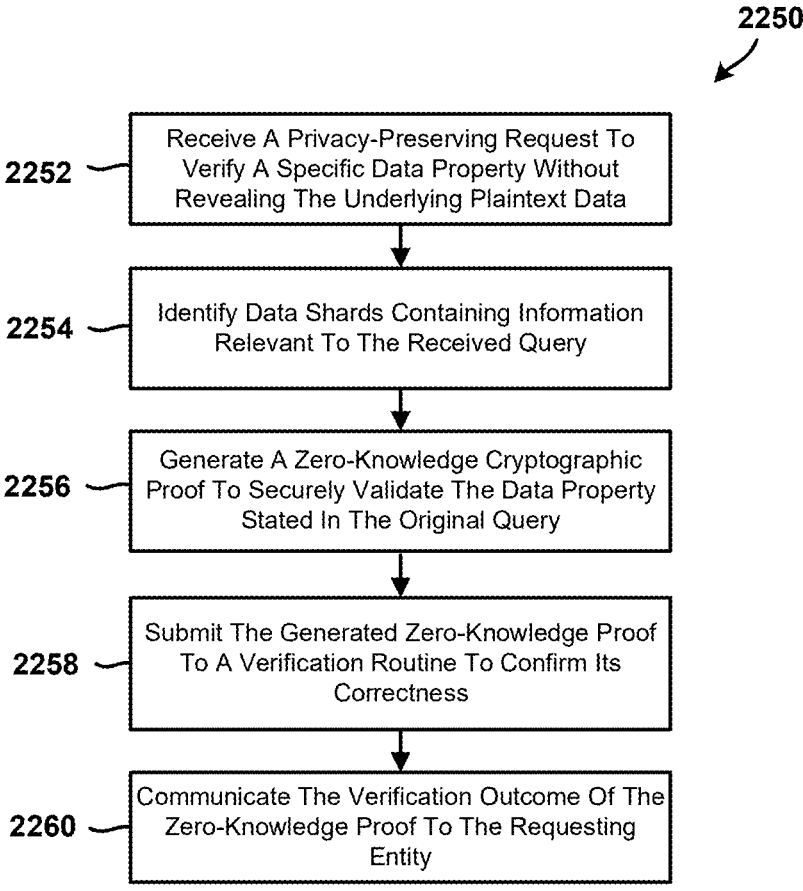

2250

2252 — Receive A Privacy-Preserving Request To Verify A Specific Data Property Without Revealing The Underlying Plaintext Data 2254 — Identify Data Shards Containing Information Relevant To The Received Query 2256 — Generate A Zero-Knowledge Cryptographic Proof To Securely Validate The Data Property Stated In The Original Query 2258 — Submit The Generated Zero-Knowledge Proof To A Verification Routine To Confirm Its Correctness 2260 — Communicate The Verification Outcome Of The Zero-Knowledge Proof To The Requesting Entity

FIG. 22B

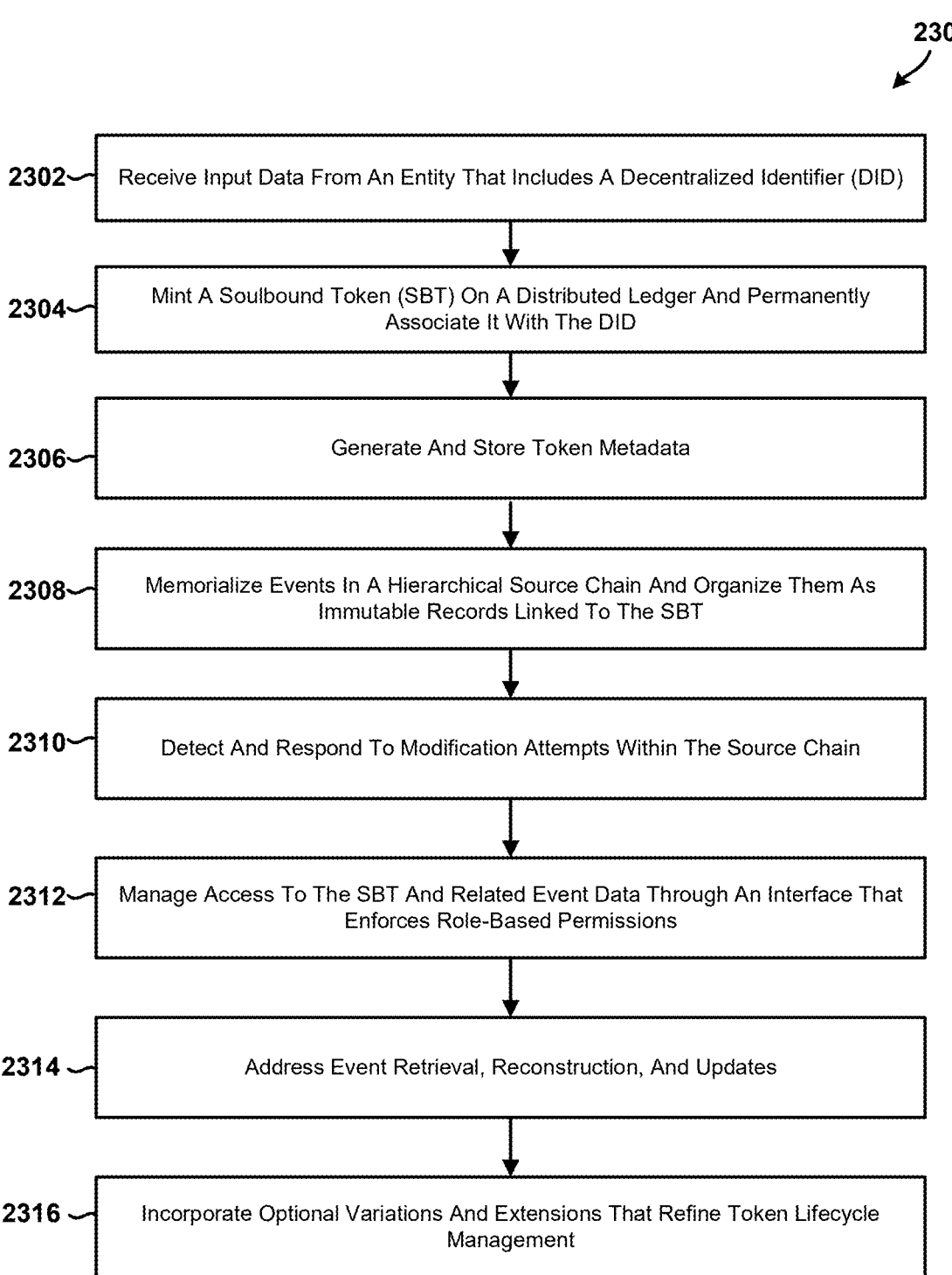

2300

2302 — Receive Input Data From An Entity That Includes A Decentralized Identifier (DID)

2304 — Mint A Soulbound Token (SBT) On A Distributed Ledger And Permanently Associate It With The DID 2306 — Generate And Store Token Metadata 2308 — Memorialize Events In A Hierarchical Source Chain And Organize Them As Immutable Records Linked To The SBT 2310 — Detect And Respond To Modification Attempts Within The Source Chain 2312 — Manage Access To The SBT And Related Event Data Through An Interface That Enforces Role-Based Permissions 2314 — Address Event Retrieval, Reconstruction, And Updates 2316 — Incorporate Optional Variations And Extensions That Refine Token Lifecycle Management

FIG. 23

SYSTEMS AND METHODS FOR SOURCE CHAIN MANAGEMENT WITH IDENTITY-BASED TOKENS AND ENHANCED SECURITY

RELATED APPLICATIONS

This application claims the benefit of priority to U.S. Provisional Patent Application No. 63/566,231 entitled "DIFFUSION/LOAD BALANCER" filed on Mar. 16, 2024, the entire contents of which are hereby incorporated by reference for all purposes.

BACKGROUND

Modern computing systems increasingly include decentralized technologies for managing and verifying event-related data using structured event records, often referred to as source chains. Source chains may record chronological sequences of events or transactions, preserving data integrity and supporting verifiable auditing. Effective source chain management may rely upon cryptographic techniques to maintain the immutability and accurate linkage of records, thereby ensuring transparency, accountability, and reliability of event information.

Identity-based tokens may represent digital identities associated with entities and may be used within decentralized computing frameworks. Such tokens may cryptographically link identity information to digital assets, transactions, or event records. By associating identities directly with tokenized representations, identity-based tokens may facilitate accurate tracking, verification, and secure management of events or associated data.

Enhanced security within decentralized environments is increasingly significant to ensure integrity, compliance, and trust. Robust cryptographic methods—including encryption, cryptographic hashing, multi-signature authorizations, secure storage, and distributed consensus mechanisms—play an important role in safeguarding sensitive data, managing cryptographic keys, and ensuring immutability of recorded data.

Conventional decentralized computing solutions do not adequately integrate source chain management with identity-based tokens or provide sufficient security mechanisms. These solutions do not adequately prevent unauthorized transfer of identity-linked tokens, reliably maintain immutability of hierarchical event records, securely manage cryptographic keys, or effectively detect and respond to anomalous modifications. Conventional solutions also do not adequately ensure data redundancy, availability, or integrity within distributed storage systems.

SUMMARY

Various aspects include methods for source chain management with identity-based tokens and enhanced security. In some aspects, the methods may include receiving, from an entity, an input which may include a decentralized identifier (DID) uniquely associated with the entity, invoking a smart contract deployed on a distributed ledger to mint a non-transferable identity-based token linked permanently to the DID, in which the token cannot be transferred to another DID, generating metadata for the identity-based token which may include a cryptographic reference to a hierarchical source chain structure stored within a decentralized data storage system, and cryptographic verification data configured to validate integrity of the metadata and the hierarchical source chain structure, storing the metadata and a link to the identity-based token in the decentralized data storage system, in which the decentralized data storage system partitions data into a plurality of encrypted data shards, and distributes each encrypted data shard across decentralized storage nodes, memorializing an event associated with the entity by recording granular event details which may include a timestamp, a comprehensive log documenting specific data changes, and an origin identifier of the event, and appending the granular event details into the hierarchical source chain structure stored within the decentralized data storage system, verifying integrity of the hierarchical source chain structure by validating cryptographic links between event records, and providing authorized access through an authenticated interface configured to reconstruct encrypted data shards from the decentralized data storage system upon authenticated request.

In some aspects, cryptographic links between event records may be verified using a Merkle tree structure. Some aspects may further include embedding cryptographically enforceable non-transferability rules directly into the smart contract to prevent unauthorized token transfer. In some aspects, the hierarchical source chain structure may support branching structures, each branch representing cryptographically verifiable relationships between parent events and one or more sub-events. In some aspects, the decentralized data storage system may dynamically adjust data retrieval performance by intelligently routing incoming retrieval requests based on real-time node availability or network performance metrics.

In some aspects, the smart contract may enforce predefined conditions for accessing the identity-based token, and these access conditions may be cryptographically linked to the DID. In some aspects, the decentralized data storage system may provide data redundancy by automatically replicating encrypted data shards across geographically dispersed storage nodes. Some aspects may further include dynamically adjusting the physical storage distribution of encrypted data shards based explicitly on monitored system usage patterns or real-time decentralized storage node conditions to enhance performance or fault tolerance.

Some aspects may further include verifying cryptographic provenance data associated with the metadata prior to granting access to the hierarchical source chain or event details. In some aspects, the visualization may show cryptographic verification status, timestamped events, and event relationships. In some aspects, the metadata embedded within the identity-based token may include compliance-related data structured explicitly to satisfy regulatory auditing and verification requirements. In some aspects, the decentralized data storage system may use cryptographically enforced access controls restricting the reconstruction and retrieval of encrypted data shards exclusively to entities authorized according to access permissions defined within the smart contract. In some aspects, RBAC may define multiple permission levels allowing differentiated access to identity-based tokens and hierarchical event data.

Further aspects may include a computing device having at least one processor or processing system configured with processor-executable instructions to perform various operations corresponding to the methods discussed above. Further aspects may include a computing device having various means for performing functions corresponding to the method operations discussed above. Further aspects may include a non-transitory processor-readable storage medium having stored thereon processor-executable instructions configured to cause at least one processor or processing system to perform various operations corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 7A is a process flow diagram illustrating a method for coordinating interplay between the vault, diffusion, and shield components in accordance with some embodiments.

FIG. 7B is a process flow diagram illustrating a method of decentralized data storage and retrieval within a distributed computing environment in accordance with some embodiments.

FIG. 8 is a process flow diagram illustrating a method for region-based sub-tokenization in cryptographic transaction processing in accordance with some embodiments.

FIG. 9 is a process flow diagram illustrating a method of tokenizing entities with decentralized storage and DLT integration in accordance with some embodiments.

FIG. 10 is a process flow diagram illustrating a method of managing digital assets and SBTs with immutable event records using decentralized identifiers and DLT in accordance with some embodiments.

FIG. 13B is a process flow diagram illustrating a method of reentrancy attack prevention in automated smart contracts in accordance with some embodiments.

FIG. 15A is a process flow diagram illustrating a method of securely memorializing events using SBTs cryptographically linked to immutable event records in accordance with some embodiments.

FIG. 15B is a process flow diagram illustrating a method of hierarchical data provenance and complex event lineage in accordance with some embodiments.

FIG. 16 is a process flow diagram illustrating a method of securely creating and managing SBTs linked to immutable event records in accordance with some embodiments.

FIG. 17 is a process flow diagram illustrating a method of securely performing digital asset transactions using SBTs linked to immutable transaction records in accordance with some embodiments.

FIG. 18 is a process flow diagram illustrating a method of securely accessing, verifying, and managing SBTs and associated metadata stored within distributed computing systems in accordance with some embodiments.

FIG. 19 is a process flow diagram illustrating a method of securely generating, storing, and managing SBTs linked to off-chain metadata stored within distributed computing systems in accordance with some embodiments.

FIG. 20A is a process flow diagram illustrating a method of securely distributing, monitoring, and reconstructing encrypted datasets using decentralized storage nodes and tamper-evident DLT in accordance with some embodiments.

FIG. 20B is a process flow diagram illustrating a method of monitoring, tokenizing, and managing event data in a distributed system in accordance with some embodiments.

FIG. 20C is a process flow diagram illustrating a method of machine learning-driven anomaly detection in sharded event logs in accordance with some embodiments.

FIG. 21A is a process flow diagram illustrating a method of securely segmenting, distributing, and reconstructing encrypted data using decentralized storage nodes and tamper-evident DLT in accordance with some embodiments.

FIG. 21B is a process flow diagram illustrating a method coordinated shard reallocation and key rotation in accordance with some embodiments.

FIG. 22A is a process flow diagram illustrating a method of securely processing transactions using dynamically allocated microservices and recording transaction memorialization data on a tamper-evident distributed ledger in accordance with some embodiments.

FIG. 22B is a process flow diagram illustrating a method for zero-knowledge or privacy-preserving queries of sharded data in accordance with some embodiments.

FIG. 23 is a process flow diagram illustrating a method of creating and managing identity-based, non-transferable tokens that reference immutable event records in a decentralized data storage system in accordance with some embodiments.

DETAILED DESCRIPTION

Figure 1:
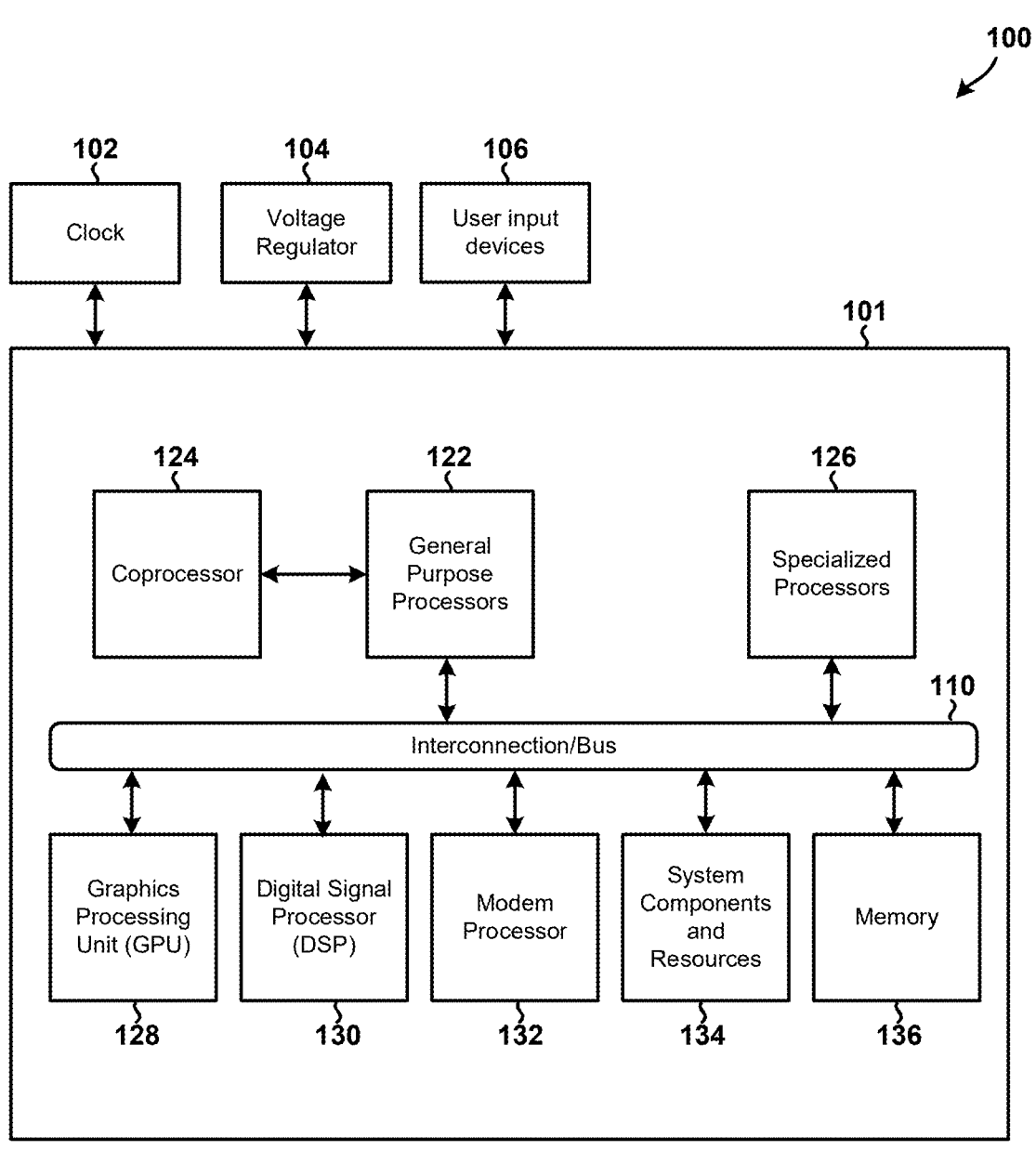
FIG. 1 is a component diagram of a system on chip (SOC) suitable for implementing some embodiments.

The various embodiments may be described in detail with reference to the accompanying drawings. Wherever possible, the same reference numbers may be used throughout the drawings to refer to the same or like parts. References made to particular examples and implementations are for illustrative purposes and are not intended to limit the scope of the invention or the claims.

Conventional blockchain-based hierarchical data structures do not adequately enforce token immutability and traceability linked explicitly to identity. The embodiments include computing systems that include processing systems configured to establish hierarchical source chains cryptographically tied explicitly and immutably to identity-based tokens, enforcing secure, immutable traceability of each data update. Smart contracts may explicitly prevent unauthorized token transfers, validating decentralized data shards against ledger-stored records. The embodiments may provide secure, transparent lineage management for identity-linked hierarchical data. Additional technical advantages and improvements to the performance and functionality of various systems will be evident from the disclosures below.

The term "distributed computing system" may be used herein to refer to a system that includes computing resources distributed across physical or virtual locations, including servers, storage units, databases, and network elements. Distributed computing systems may process, store, and transmit data within decentralized network environments, such as cloud-based infrastructures, hybrid architectures combining on-premises and cloud-based resources, or multi-cloud architectures involving multiple service providers. Nodes in a distributed computing system may coordinate data processing, storage, retrieval, and network services.

The term "computing device" may be used herein to refer to any device capable of executing instructions and processing or storing data within a distributed computing environment. Examples include physical servers, virtual machines, laptops, smartphones, dedicated appliances, or edge devices. A computing device may host one or more processors, memory units, or specialized accelerators (e.g., GPUs, TPUs).

The term "processing system" may be used herein to refer a collection of one or more processors (including multi-core or specialized processors) that perform computational tasks described herein. A processing system may exist as a stand-alone microprocessor, an SoC integrating various cores, or a multi-processor architecture. A processing system may be included in any device or node that participates in the distributed computing system.

The term "system on chip" (SoC) is used herein to refer to a single integrated circuit (IC) chip that includes multiple resources or independent processors integrated on a single substrate. A single SoC may include circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system may also include software for controlling integrated resources and processors, as well as peripheral devices.

The term "node" may be used herein to refer to a tangible computational unit within a distributed computing system. Each node may include hardware and software elements for data processing, communication, or storage. Nodes may be physical servers, virtual machines, containers, or specialized appliances in edge or cloud environments. In some embodiments, nodes in a distributed ledger network may validate transactions or maintain ledgers.

The term "sensor" may be used herein to refer to a software component or agent that monitors specific activities or conditions within a node or computing device. Sensors may detect API calls, file changes, network usage, or security-related events. Collected data may be forwarded for storage, analysis, or triggering of security rules.

The term "event data" may be used herein to refer to information about occurrences in a computing environment, such as user actions, system events, or security incidents. Event data may include timestamps, origin identifiers, event types, and contextual details describing the occurrence.

The term "distributed ledger technology" (DLT) may refer to decentralized data structures, such as blockchains, directed acyclic graphs (DAGs), or Holochain-based frameworks, that record transactions or other data in a tamper-evident, consensus-driven manner. DLT systems allow multiple participants (nodes) to share and validate ledger updates without reliance on a single central authority.

The term "distributed ledger network" (DLN) may refer to a group of nodes that collectively maintain and validate a shared ledger. Nodes often use consensus mechanisms (e.g., proof-of-stake or PBFT) to ensure ledger consistency. A DLN may be permissioned or permissionless and may span geographically distributed regions.

The terms "consensus algorithm" and "consensus mechanism" may be used herein to refer to a protocol nodes use to reach agreement on updates to a distributed ledger. Examples include proof-of-work (PoW), proof-of-stake (POS), delegated proof-of-stake (DPoS), Byzantine fault tolerance (BFT), and practical Byzantine fault tolerance (PBFT). These algorithms verify transactions and maintain ledger integrity.

The term "data sharding" may be used herein to refer to the process of partitioning a dataset into smaller "shards" that reside on different storage nodes. Sharding improves scalability and fault tolerance by allowing parallel processing and distributing risk of data loss. Each shard may carry a unique identifier and cryptographic keys to ensure security and traceability.

The term "provenance record" may be used herein to refer to metadata documenting the origin, modifications, or transfers of data over time. A provenance record may include timestamps, digital signatures, and links to prior data states, allowing audit trails and lineage tracking within a distributed ledger or sharded storage system.

The term "transaction request" may be used herein to refer to a user- or system-initiated operation that specifies a proposed action or data exchange within a distributed ledger network. A transaction request may include transaction data, such as an identifier, source/destination locations, a transaction amount, timestamps, and cryptographic signatures.

The term "transaction data" may be used herein to refer to information that includes details for carrying out and logging a transaction within a ledger-based system, such as the transaction identifier, source and destination addresses, geolocation data, timestamp, and cryptographic proofs. This data may also include rules or references to contracts governing execution.

The term "source location" may be used herein to refer to the originating point of a transaction or data exchange in a distributed system. A source location may be represented by a geolocation coordinate, IP address, node identifier, or cryptographic signature linked to the entity initiating the transaction.

The term "destination location" may be used herein to refer to the target point where a transaction or data exchange is directed in a distributed system. A destination location may be represented by a geolocation coordinate, IP address, node identifier, or cryptographic signature linked to the intended recipient.

The term "region" may be used herein to refer to a logical or geographic subset of the distributed system. Nodes within a region may handle localized validation or storage tasks. A region may be identified by area codes, latitude/longitude boundaries, or jurisdictional rules. Region-based setups can reduce global ledger congestion and tailor compliance or performance constraints.

The term "region-based sub-token" may be used herein to refer to a cryptographic token carrying location-based attributes that allow a transaction to be processed locally within a predefined region. A region-based sub-token may include metadata identifying relevant geolocation or jurisdictional constraints to allow localized validation and subsequent synchronization with a global ledger.

The term "metadata" may be used herein to refer to supplemental information describing a transaction, shard, token, or other data object. Examples include timestamps, IDs, cryptographic signatures, routing tags, compliance fields, or references to prior data states. Metadata provides traceability, authentication, and compliance validation within a distributed or ledger-based environment.

The term "routing identifier" may be used herein to refer to data used to direct a transaction or request to specific nodes or regions in a distributed ledger network. A routing identifier may encode region tags, node addresses, or priority levels. By reading the routing identifier, the network decides how to forward or validate the transaction.

The term "region-specific ledger" may be used herein to refer to a partition of the global ledger that records transactions or events limited to a particular region. Nodes in that region may maintain and validate entries locally, and synchronize relevant data with a global ledger to preserve overall consistency.

The term "global ledger" may be used herein to refer to a unified ledger that aggregates all validated transactions or records from local or region-specific ledgers. A global ledger may be used to ensure that the entire network retains a consistent view of the distributed data. Periodic synchronization merges regional updates into the global ledger.

The term "global ledger synchronization" may be used herein to refer to the process of merging region-specific ledger entries into the global ledger. During synchronization, cryptographic proofs validate that no unauthorized alterations occurred locally and that the global state accurately reflects all validated regional changes.

The term "cryptographic hash function" may be used herein to refer to a mathematical model or operation that transforms an input (e.g., file, dataset, or transaction) into a fixed-size output, often for tamper detection or unique identification. Examples include SHA-256 and SHA-3. These functions are collision-resistant, helping ensure data integrity and authenticity.

The term "soulbound token" (SBT) may be used herein to refer to an identity-based non-transferable token or identity-linked digital token that cannot be transferred to another entity once minted. SBTs typically remain permanently associated with a particular identity key or DID, preventing unauthorized movement. They may represent credentials, achievements, or certifications that remain bound to one entity.

The term "non-fungible token" (NFT) may be used herein to refer to a cryptographic token representing a unique or one-of-a-kind asset, either digital or physical. NFTs are typically compliant with standards like ERC-721 or ERC-1155 and store metadata about ownership, provenance, or characteristics that distinguish one token from another.

The term "fungible token" may be used herein to refer to a cryptographic token representing an interchangeable asset (e.g., a currency or commodity). Fungible tokens adhere to standards such as ERC-20, allowing fractional holdings and uniform value across all units.

The term "role-based access control" (RBAC) may be used herein to refer to a component or mechanism for regulating system access based on assigned user or device roles. RBAC policies may be encoded in a distributed ledger or smart contracts, restricting operations (e.g., data retrieval, token minting) to entities holding the necessary roles or permissions.

The term "decentralized autonomous organization" (DAO) may be used herein to refer to an organization or governance structure managed collectively by its members under rules encoded in smart contracts on a blockchain. DAO participants may hold governance tokens, sometimes in the form of non-transferable or SBTs, to vote on proposals or resource allocations.

The term "smart contract" may be used herein to refer to self-executing computer programs or protocols deployed on a distributed ledger technology (DLT) network, such as Ethereum or other blockchain-compatible platforms. Smart contracts encode terms, rules, and logic that automatically execute transactions, enforce agreements, or manage digital assets without centralized intervention. A smart contract may include embedded metadata, cryptographic validation rules, access control policies, and provenance verification logic. Smart contracts may autonomously mint cryptographic tokens, grant or restrict access to encrypted datasets, validate data authenticity, or execute predefined governance functions according to conditions encoded within the contract logic.

Many conventional data management systems use centralized architectures that are dependent on single databases or servers. These centralized architectures introduce single points of failure that expose data to unauthorized access, limit system resilience, and impede efficient multi-party data exchanges. Conventional tokenization platforms typically operate within proprietary protocols or single-ledger distributed ledger technologies (DLTs). These restrictive standards may reduce interoperability and integration capability with external systems or networks. Conventional solutions often include centralized components to manage cryptographic keys or verify identity credentials. Centralized key or identity management may compromise security because unauthorized parties may gain access to the centralized components. In addition, conventional tokenization platforms often lack comprehensive metadata management or robust auditing features. These deficiencies may decrease traceability, authenticity, or compliance capabilities.

Conventional decentralized data management solutions also include a variety of operational limitations. These solutions typically distribute data storage across geographically dispersed nodes. Coordination among these nodes may introduce latency or reduce performance during high-volume operations. In addition, consensus algorithms in conventional decentralized solutions often become overloaded as network demands increase. Conventional decentralized platforms commonly use rigid single-protocol standards that restrict interoperability across multiple distributed ledger technologies (DLTs), cloud environments, or external enterprise infrastructures. Security functions within these solutions often operate independently of decentralized storage. Independent security operations may result in fragmented policies, inconsistent enforcement, or delayed threat detection. Conventional decentralized systems frequently implement inadequate cryptographic key management or identity credential management practices. These inadequate practices may expose sensitive data or identities to unauthorized access. Further, conventional solutions often provide limited metadata management or data provenance tracking. Limited metadata management or provenance tracking may hinder reliable verification of data lineage or complicate regulatory compliance.

The embodiments described herein include computing systems configured to overcome these and other limitations of conventional systems to improve security, functionality, data integrity, interoperability, and operational efficiency within decentralized or hybrid computing environments. In some embodiments, the computing systems may include a processing system that integrates multiple coordinated components, such as diffusion, tokenization platforms, vault, SBTs, shield, interoperability layers, enhanced monitoring, region-based sub-tokens, role-based access control (RBAC), secure sharding, data provenance, and hardware security modules (HSMs). In some embodiments, these components may collectively form a unified architecture that provides resilient data storage, secure identity management, verifiable asset tokenization, and proactive security monitoring.

In some embodiments, the processing system may implement, include, or use a diffusion component for decentralized data storage and synchronization. The diffusion component may divide data into encrypted shards and distribute these shards among decentralized nodes selected based on geographic proximity, latency criteria, or performance metrics. Nodes may store encrypted shards without possessing complete datasets (which may improve security and availability). A consensus mechanism may rapidly verify and synchronize transactions regionally before performing global synchronization. If nodes become unavailable, the diffusion component may reconstruct data by retrieving shards from remaining nodes. In some embodiments, the system may use multi-layer encryption and secure key management methods, including HSMs and multi-party computation (MPC), to prevent unauthorized access to stored data.

In some embodiments, the processing system may implement, include, or use a tokenization platform configured to support creating, managing, and exchanging digital tokens representing assets, access rights, or credentials. The tokenization platform may generate fungible tokens (e.g., ERC-20 currency tokens, etc.), non-fungible tokens (e.g., ERC-721 collectible tokens, etc.), and identity-linked tokens (e.g., custom credential tokens, etc.). In some embodiments, the processing system may implement standardized smart contracts that govern token minting, transfer, and verification across multiple ledger technologies. In some embodiments, the system may store detailed token attributes or identity credentials in off-chain metadata storage. This may enhance asset tracking, credential verification, and interoperability in various fields and applications, such as finance, healthcare, supply chain management, or digital identity applications. In some embodiments, the processing system may include an interoperability layer component that provides standardized APIs and middleware for integration with multiple DLT networks, cloud providers, or external enterprise systems.

In some embodiments, the processing system may implement, include, or use a vault component configured to securely manage cryptographic keys and digital tokens. The vault component may store private keys securely within HSMs or MPC-based secure enclaves to prevent unauthorized disclosure. The processing system may use multi-signature schemes or threshold cryptography to manage transactions without exposing sensitive cryptographic material. The vault component may provide a unified interface for managing multiple token types (e.g., fungible, non-fungible, SBT, etc.) and associated data analytics. In some embodiments, the vault component may output, or cause integrated visual dashboards to display, cryptographic token histories, key usage events, and/or transaction lineage (e.g., for audit and compliance purposes, etc.).

In some embodiments, the processing system may implement, include, or use SBTs. These digital tokens may permanently link credentials or identity attributes to unique identifiers, such as verified email addresses, government-issued IDs, biometric identifiers, or authenticated devices. The processing system may assign SBTs to represent various attributes, including educational credentials (e.g., academic degrees, certificates, course transcripts, etc.), professional qualifications (e.g., legal certifications, medical licenses, engineering registrations, etc.), membership statuses (e.g., professional associations, trade unions, governmental clearances, etc.), or verified device identities (e.g., authorized IoT devices, etc.). The processing system may enforce non-transferability of SBTs through smart contract rules and selectively disclose credential information through zero-knowledge proofs without revealing sensitive personal data.

In some embodiments, the processing system may implement, include, or use a shield component configured for event management, security enforcement, and efficiently monitoring, collecting, and analyzing data within distributed computing environments, including cloud-based, multi-cloud, and hybrid infrastructures. The shield component may deploy configurable software sensors across decentralized nodes (e.g., servers, cloud platforms, etc.) to selectively monitor targeted events (e.g., file modifications, API requests, security-related activities) or conditions (e.g., network traffic, etc.), detect anomalous behavior, or identify unauthorized transactions. In some embodiments, the system may apply rule-based logic to identify unauthorized access attempts or irregular transactions. The shield component may initiate responsive actions (e.g., alerting administrators, isolating compromised nodes, restricting unauthorized transactions, etc.) in response to detecting threats. In some embodiments, the shield component may maintain tamper-evident event logs within distributed ledgers (e.g., to facilitate forensic investigations, regulatory audits, data authenticity, etc.). In some embodiments, the system may output or render the results on an electronic display via a user interface that allows users to define rules, track metrics, and respond to anomalies in real time.

In some embodiments, the processing system may update vault keys following shard reallocation events. The vault component may use multi-party encryption to prevent any individual participant from obtaining exclusive control over cryptographic keys. Each shard reallocation operation may generate a corresponding ledger entry. The ledger entry may link updated encryption references associated with each shard. In some embodiments, the system may verify compliance with policy requirements by obtaining partial signatures from authorized entities.

In some embodiments, the processing system may be configured to integrate comprehensive security measures across the platform to improve data integrity, enforce rigorous access control, and prevent data tampering. The processing system may apply integrated encryption methods to secure data during transmission or storage. In addition, the processing system may use consensus mechanisms to validate or synchronize operations across decentralized nodes. The processing system may also maintain verifiable event logs within distributed ledger entries to allow secure audits.

In some embodiments, the processing system may be configured to support hybrid or multi-cloud deployments. The processing system may implement ledger-based governance policies to automatically distribute workloads across multiple cloud providers or on-premises infrastructures. The processing system may distribute workloads according to geographic compliance, performance criteria, or cost-efficiency criteria. In addition, the processing system may apply consensus mechanisms to synchronize ledger data across diverse geographic regions or multiple providers. The processing system may also provide a unified management API or middleware layer to facilitate cross-platform integration or reduce vendor lock-in risks.

In some embodiments, the processing system may be configured to implement region-based sub-tokens including metadata that directs transaction routing to regional nodes or ledgers. Nodes may perform local validations compliant with regional regulatory or jurisdictional requirements before synchronizing globally. This localized validation and subsequent global synchronization may reduce latency, prevent global ledger congestion, and satisfy compliance mandates specific to geographic regions.

In some embodiments, the processing system may be configured to implement or use RBAC policies embedded in distributed ledgers. The processing system may use RBAC to enforce permission structures through digital policies associating users, devices, processes, or tokens with specific roles. The processing system may execute smart contracts to verify user permissions through ledger-stored roles before allowing access to data or operations. The processing system may provide ledger-based auditing functions that provide verifiable records of permission assignments and access attempts and/or otherwise prevent unauthorized privilege escalation or misuse.

In some embodiments, the processing system may be configured to securely partition data through sharding. Each data shard may use distinct encryption keys, with shards distributed among decentralized nodes to enhance redundancy. The processing system may record shard locations and cryptographic verification data in distributed ledger metadata. Nodes may reconstruct data by retrieving multiple shards in parallel. The processing system may dynamically optimize shard placement and retrieval routes through machine learning or algorithmic load balancing to reduce latency and ensure efficient data retrieval.

In some embodiments, the processing system may be configured to track verifiable data provenance or data lineage by storing cryptographic records on distributed ledgers. The processing system may cryptographically link each data modification or data transfer to a preceding data state. These cryptographic links may generate verifiable records that identify data origins, transformations, or transfers. In addition, the processing system may store detailed lineage metadata in off-chain storage to supplement ledger-based records for comprehensive audits or compliance reporting.

In some embodiments, the processing system may be configured to integrate hardware security modules (HSMs) or multi-party cryptography methods to improve security. For example, the processing system may use HSMs to securely isolate private keys from unauthorized access. In addition, the processing system may distribute cryptographic key operations across multiple independent devices using multi-party cryptography. Distributed key operations may prevent a single compromise from affecting overall system security. The processing system may also record cryptographic key usage, verify compliance with multi-signature thresholds, or maintain cryptographic operation audit trails through ledger-based records.

In some embodiments, the processing system may integrate two or more components to form a unified decentralized architecture. The processing system may use the integrated architecture to address challenges related to security, resilience, interoperability, compliance, or data lineage verification. The processing system may apply this architecture within diverse decentralized or hybrid computing environments. Examples of these applications or environments include financial systems, healthcare systems, supply chain management applications, law enforcement platforms, educational systems, or digital identity verification platforms.

Various embodiments may be implemented in single-processor or multiprocessor computer systems, including SOC architectures, to for example monitor, collect, and analyze event data in distributed computing environments. FIG. 1 illustrates an example computing system 100 or SoC architecture that may support the operations described in the embodiments.

In the example illustrated in FIG. 1, the computing system 100 includes an SOC 101 coupled to a clock 102, a voltage regulator 104, user input devices 106. The SoC 101 may include various processing units, including a general-purpose applications processor 122, coprocessors 124, specialized processors 126, graphics processing units (GPUs) 128, digital signal processors (DSPs) 130, and modem processors 132. In some embodiments, the processors 122-132 may execute software programs to perform operations described herein. These processors 122-132 may work in conjunction with system components 134 and system memory 136, which may store event data, configuration rules, and executable instructions for managing computing operations. The components may communicate via an interconnection/bus 110 that supports advanced interconnect technologies, such as high-performance networks-on-chip (NoCs).

Each processor in the SoC 101 may include one or more cores, and the cores may perform operations independently or in collaboration with other cores. For example, the SoC 101 may execute distributed event monitoring tasks by using its heterogeneous processor architecture. A general-purpose processor may manage the deployment and configuration of software sensors, while a specialized processor (e.g., an AI processor, etc.) may handle inference tasks for real-time analysis.

In some embodiments, the general-purpose processor 122 may be configured to manage system-level orchestration, which may include managing software sensors, deploying configuration rules, and coordinating data flows between processors. Coprocessors 124 may offload specific tasks, such as encryption or compression, to reduce latency and improve processing efficiency. Specialized processors 126 (e.g., AI processors, neural processing units (NPUs), etc.) may execute inference (i.e., a process that is performed at runtime or during execution of the software application program corresponding to the machine learning algorithm) tasks for real-time pattern recognition, anomaly detection, decision-making, etc.

In some embodiments, the SoC 101 may include a heterogeneous processor architecture that supports, for example, distributed event monitoring by delegating tasks to processors configured for specific functions. For example, the general-purpose processor 122 may deploy and configure software sensors across the system while the specialized processors 126 perform more computationally intensive tasks.

In some embodiments, the SoC 101 may include specialized system components for managing sensor data, including memory controllers and data controllers. These components manage the efficient storage and retrieval of event data, including logs, metadata, and configuration rules. The SoC 101 may include memory controllers that coordinate access to system memory 136 and data controllers that manage input/output (I/O) operations to reduce latency and improve throughput.

In some embodiments, the SoC 101 may include interfaces for integrating with external resources, such as wireless transceivers (e.g., for communication with cloud platforms, edge devices, or other nodes in a distributed computing framework), peripheral interfaces that allow the SoC 101 to interact with external devices (e.g., additional sensors, visualization tools, APIs, etc.), and secure communication modules that provide encrypted communication channels for transmitting sensitive data or configuration rules.

In some embodiments, the SoC 101 may be configured to operate within a broader distributed computing framework. For example, the SoC may process shards distributed by the diffusion component, cryptographic accelerators to manage tokenized data or secure event logs for the vault component or use the specialized processors 126 to detect and respond to potential security threats in real time.

In some embodiments, the integration of specialized system components, advanced processors, and external interfaces may allow the SoC 101 to function as a localized hub for efficient data processing, real-time analytics, and secure event monitoring in a distributed computing system.

In some embodiments, the computing system 100 may include additional accelerated computing units, such as neural processing units (NPUs), data processing units (DPUs), and advanced GPUs 128. High-speed interconnects, such as NVLink, may couple these units to general-purpose central processing units (CPUs) and system memory. Accelerated computing units may execute computationally intensive tasks, including artificial intelligence inference, analytics, encryption, and data transfer operations. The computing system 100 may include high-bandwidth memory, facilitating rapid data storage and retrieval by accelerated computing units. Secure data processing units may manage communication with external devices via advanced network interfaces, such as PCIe Gen 5.0, InfiniBand, or high-speed Ethernet, thereby supporting real-time monitoring, event detection, and analytics tasks in distributed environments.

Some embodiments may leverage specialized hardware modules beyond generic system-on-chip (SoC) configurations. For instance, organizations may embed hardware security modules (HSMs) on local gateway devices or cloud-based appliances for threshold-based key usage. Dedicated accelerators, such as field-programmable gate arrays (FPGAs), may handle repeated encryption-decryption tasks and expedite hashing of large datasets. Where multiple GPUs or tensor units process machine learning inference for anomaly detection, sharded data pipelines might run in parallel, reducing system latency. These details illustrate that hardware-level accelerations are not limited to SoC-based designs but may incorporate dedicated encryption enclaves, specialized boards, or cryptographic co-processors. Hence, the described architecture extends across numerous hardware footprints, from bare-metal servers to container-based microservices using GPU clusters.

In addition to the SoC 101, the embodiments may be implemented in other computing systems with single or multicore processors, multiple processors, or hybrid configurations. Such systems may include cloud-based servers, edge devices, or hybrid setups, allowing for flexible deployment across various distributed computing environments.

Figure 2:
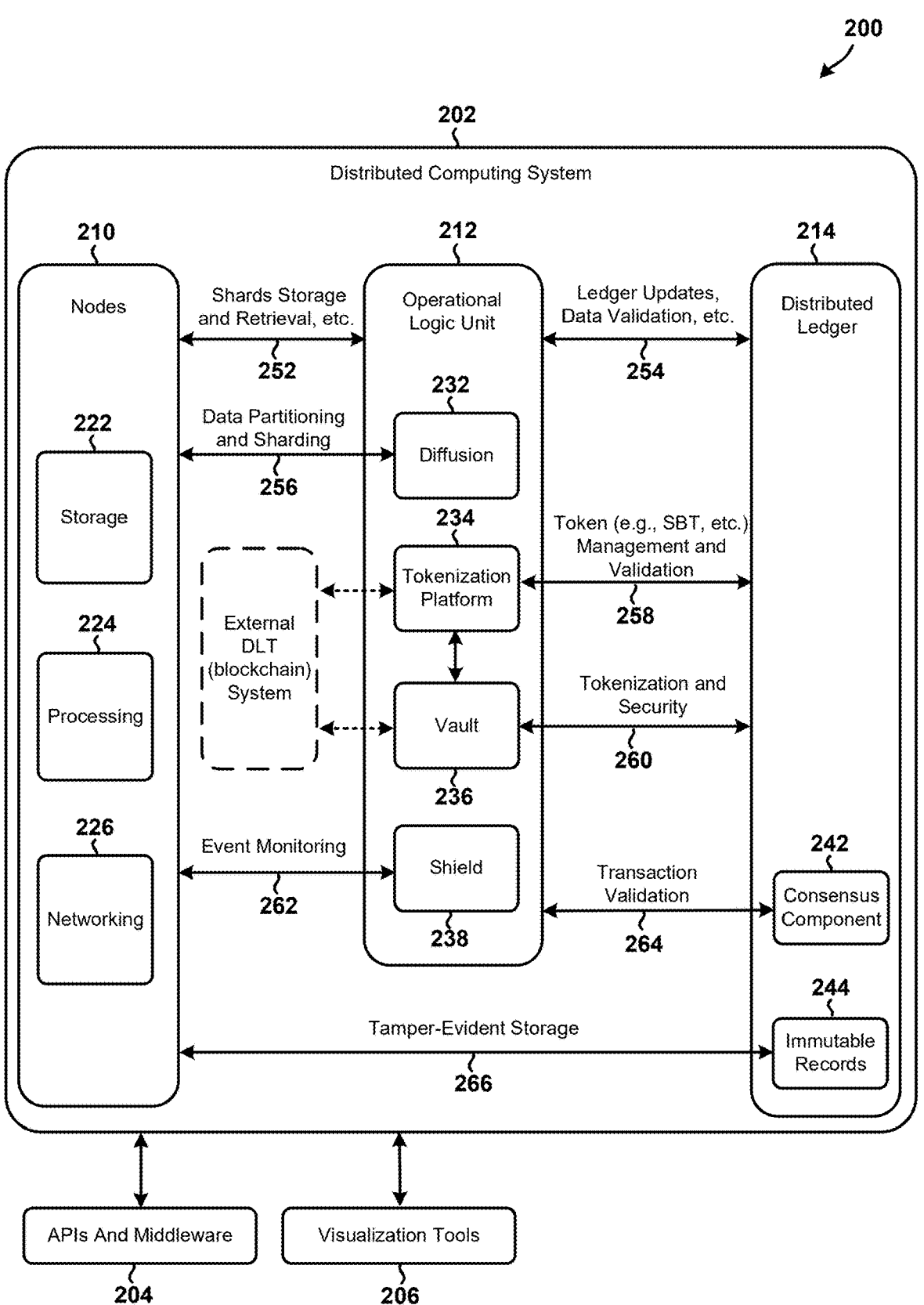
FIG. 2 is a component block diagram illustrating a distributed computing framework that could be configured to coordinate decentralized operations across cloud-based systems, edge devices, and multi-cloud infrastructures or otherwise implement the functions of the various embodiments.

FIG. 2 illustrates a distributed computing framework 200 that could be configured to coordinate decentralized operations across cloud-based systems, edge devices, and multi-cloud infrastructures or otherwise implement the functions of the various embodiments. The framework 200 may implement its functions through interconnected components, which include the distributed computing system 202, APIs and Middleware 204, and visualization tools 206. The distributed computing system 202 includes nodes 210, an operational logic unit 212, and a distributed ledger 214. The nodes 210 include a storage component 222, a processing component 224, and a networking component 226. The operational logic unit 212 includes a diffusion component 232, a tokenization platform 234, a vault component 236, and a shield component 238. The distributed ledger 214 includes consensus components 242 and immutable records 244.

The nodes 210 may be, may include, or may be included in physical servers, virtual machines, edge devices, or other computational units deployed across the distributed environment. Each node 210 may include a storage component 222, a processing component 224, and a networking component 226. These nodes may store sharded data, execute computations, and manage communication with peers. Multiple nodes may be deployed at the edge or in cloud environments for improved performance and redundancy. Nodes 210 may use or work in conjunction with the diffusion component 232 for data partitioning and shard management and/or may receive updates from the vault component 236 and shield component 238 regarding access control, security configuration, or key management.

In some embodiments, the storage component 222 may be configured to manage the retention of data shards and associated metadata. The storage component 222 may operate with distributed storage techniques in which datasets are partitioned and stored as encrypted shards across multiple nodes to enhance fault tolerance and improve scalability. The processing component 224 may be configured to execute tasks such as encryption, decryption, shard validation, and ledger queries. These operations may involve advanced algorithms and techniques, including those for data integrity verification and secure data reconstruction. The networking component 226 may manage communication between nodes using standard protocols, such as HTTP, gRPC, or WebSocket. It may also handle routing and data synchronization tasks within the distributed architecture.

The operational logic unit 212 may include the diffusion component 232, the tokenization platform 234, the vault component 236, and the shield component 238. The operational logic unit 212 may be configured to coordinate activities such as data sharding and retrieval, token creation and management, cryptographic key handling, and security monitoring. Each subcomponent addresses distinct operational functions but may work together to maintain reliability, security, and scalability across the distributed framework.

In some embodiments, a load manager may apply machine learning inference on usage patterns and reference historical node performance metrics. The load manager may place shards after it predicts demand. The ledger may record each placement decision with cryptographic references. The load manager may retrain on new data and adapt to shifting workloads.

The diffusion component 232 may be configured to partition datasets into encrypted shards and distribute them across storage nodes based on parameters such as storage capacity, network topology, or performance metrics. The diffusion component 232 may also retrieve and reassemble shards for data reconstruction. The tokenization platform 234 may be configured to handle the creation, management, and validation of digital tokens, including fungible tokens, non-fungible tokens, and SBT. Token metadata may be associated with these tokens to support operations such as ownership tracking, asset transfer, and identity verification. The vault component 236 may manage cryptographic keys and token storage within secure environments. It may incorporate HSMs or multi-party computation (MPC) protocols to safeguard sensitive cryptographic assets. The shield component 238 may be configured to perform threat monitoring and security management by detecting anomalies in node activities. The shield component 238 may be configured to use configurable rules to isolate affected nodes or alert administrators in response to unauthorized access attempts or unusual traffic patterns.

The distributed ledger 214 may include a consensus component 242 and immutable records 244. This ledger may store cryptographic hashes, transaction records, and lineage data for system events, including data shard metadata, token transactions, and security logs. The consensus component 242 may support algorithms such as PBFT or PoS to validate ledger updates. Immutable records 244 may create tamper-evident logs of data modifications, compliance-related events, and consensus-based approvals. These records may also document re-entrancy-attack prevention operations, data encryption references, and other system-wide security features.

In some embodiments, the distributed ledger 214 may be, may include, or may be included in a decentralized database configured to store tamper-evident and immutable records of transactions, event data, and metadata across the distributed computing framework. The distributed ledger 214 may include a consensus component 242 that validates transactions and provides consistency across the network. The distributed ledger 214 may also include immutable records 244 that store metadata and operational logs in a format that prevents overwriting or alteration. Each record may include cryptographic hashes and digital signatures to maintain traceability and verify data integrity. These immutable records 244 may support auditability and compliance with regulatory requirements by providing an accurate and verifiable history of system operations. In addition, the distributed ledger 214 may interact with other components, such as the tokenization platform 234 and shield component 238, to record token operations and system security events.

In some embodiments, the distributed computing system 202 may orchestrate hybrid or decentralized architectures by coordinating nodes 210, external APIs and Middleware 204, and visualization tools 206. This coordination may allow resource provisioning, data routing, and event processing across multi-cloud, edge, and on-premises environments.

The system 202 may integrate principles of redundancy and distributed resilience, similar to RAID, to reduce reliance on centralized control. The system 202 may also support multi-tenancy by isolating organizational data and ensuring regulatory compliance in shared environments.

In some embodiments, the APIs and Middleware 204 may provide an abstraction layer to integrate the distributed computing framework with external systems. These interfaces may expose platform functionalities, including tokenization, data sharding, and analytics. Developers may interact with these APIs to retrieve token metadata, manage shards, or monitor system metrics. Middleware components may bridge communication between enterprise applications and the framework for enhanced interoperability.

In some embodiments, the APIs and Middleware 204 may provide standardized interfaces for external systems and seamless data exchange and interoperability. These interfaces may support federated queries, data normalization pipelines, and consistent policy enforcement, allowing existing enterprise systems to integrate with the distributed ecosystem. The APIs and Middleware 204 may also manage incoming data streams, unify request handling, and route event data to the appropriate components, including the shield component 238 and diffusion component 232.

In some embodiments, the visualization tools 206 may render graphical representations of operational data, such as system performance metrics, token management, and security events. These tools may display dashboards, charts, or graphs that allow users to gain insights into the system's operational state. For example, administrators may use these tools to monitor shard distribution across nodes, analyze event data, or review token transaction histories.

In some embodiments, the visualization tools 206 may render dashboards and metrics, providing a consolidated view of distributed system operations, tokenization activities, and security events. Administrators may use these tools to analyze real-time performance data, including node status, data access patterns, or token flows. The visualization tools 206 may also integrate advanced analytics to visualize ML-based anomaly detection results or to display event logs in a user-friendly manner.

The integration of the diffusion component 232, tokenization platform 234, vault component 236, and shield component 238 (as well as any or all of SBTs, interoperability layers, enhanced monitoring, region-based sub-tokens, RBAC, secure sharding, data provenance, HSMs, etc.) within the operational logic unit 212 may allow the distributed computing framework 200 to more securely and more efficiently manage decentralized operations. These components may interact with the distributed ledger 214, nodes 210, and external interfaces to provide robust and scalable solutions that are suitable for supporting a wide range of applications across industries.

Figure 3:
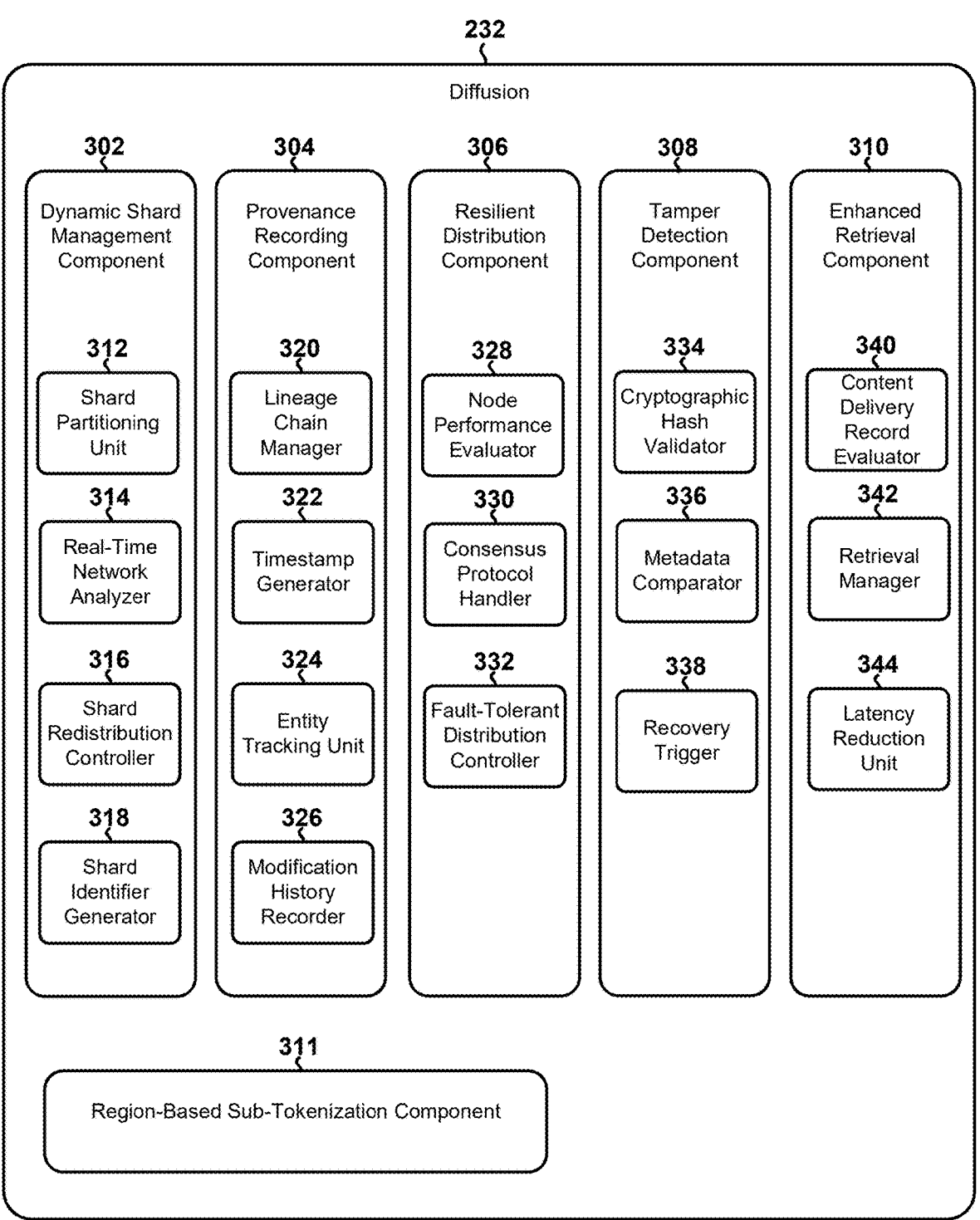
FIG. 3 is a component block diagram illustrating example components of a diffusion component within the operational logic unit of the distributed computing framework that could be configured in accordance with some embodiments.

FIG. 3 illustrates example components of a diffusion component 232 within the operational logic unit of the distributed computing framework that could be configured in accordance with some embodiments. The diffusion component 232 may include various components to manage processes related to sharding, distributing, retrieving, and reconstructing datasets across a decentralized network, such as the illustrated dynamic shard management component 302, provenance recording component 304, resilient distribution component 306, tamper detection component 308, and enhanced retrieval component 310.

The diffusion component 232 may provide resilient data sharding, distribution, and retrieval across decentralized nodes. It may handle multi-modal data and support dynamic scaling in response to resource changes. It may also coordinate caching and load balancing mechanisms based on real-time node performance.

As discussed, the diffusion component 232 may serve as the foundation for resilient data storage and synchronization. For example, the diffusion component 232 may allow the system to divide data into encrypted shards and distribute these shards across a decentralized network of nodes. Each node may store a portion of the data so that no single node possesses the complete dataset (which may enhance security and fault tolerance). The diffusion component 232 may be configured such that, even if some nodes become unavailable, the data remains accessible and recoverable by reassembling the shards from available nodes.

In some embodiments, the processing system may be configured to implement the diffusion component 232 with content distribution network (CDN) functionality to enhance or improve data access and reduce latency across geographically diverse locations. For example, the system may distribute data shards to strategically selected nodes and dynamically route user requests to nodes providing the fastest response based on network conditions and proximity. These embodiments may enhance user experience by allowing efficient data retrieval even in distributed environments.

In some embodiments, the diffusion component 232 may be configured to use machine learning models to predict frequently accessed data shards and enhance or improve caching strategies. For example, the system may analyze historical access logs and user behavior to identify shards likely to experience high demand. The system may improve response times and reduce retrieval latency for anticipated requests by preemptively caching these shards on key nodes.

In some embodiments, the diffusion component 232 may be configured to use enhanced sharding techniques for sharding data across distributed nodes. For example, the system may evaluate parameters such as data size, access patterns, and network topology to determine shard sizes and their optimal distribution. The system may allocate smaller shards to high-traffic regions to enhance retrieval speeds and/or improve storage efficiency across the network.

In some embodiments, the system may address multi-node failures by retrieving validated replicas from unaffected nodes. The system may isolate compromised nodes after referencing shard metadata in the ledger. The ledger may identify alternate paths for complete data reconstruction. The vault may record the operations to confirm that the restored data aligns with prior cryptographic hashes.

In some embodiments, the diffusion component 232 may be configured to maintain data lineage and provenance. For example, each shard may include metadata documenting its origin, modification history, and current state stored in a tamper-evident distributed ledger. This functionality may enhance traceability and allow users to audit data lifecycle activities with precision.

In some embodiments, the diffusion component 232 may be configured to implement multi-layer security features. For example, the system may encrypt each shard with unique cryptographic keys prior to distribution, preventing unauthorized access to data even if a single node is compromised. These security measures may work in tandem with sharding to allow robust protection against data breaches.

In some embodiments, the diffusion component 232 may be configured to use adaptive routing mechanisms to enhance security. For example, the system may detect anomalies such as unauthorized access attempts or network failures and redirect traffic through secure and reliable nodes. These operations may mitigate risks from denial-of-service attacks or compromised nodes while allowing uninterrupted access to data.

In some embodiments, the diffusion component 232 may be configured to use lineage and provenance metadata to obtain a detailed history of changes for auditing and recovery purposes and to support versioning and rollback capabilities for stored data. For example, the system may allow users to access previous data states or revert to a prior version in cases of corruption or unauthorized modifications.

In some embodiments, the diffusion component 232 may be configured to enforce geofencing policies. For example, administrators may define geographic boundaries to allow that data storage and processing comply with jurisdictional regulations, such as those requiring data to remain within specific regions.

In some embodiments, the diffusion component 232 may be configured to implement adaptive compression techniques to enhance or improve storage utilization and bandwidth. For example, the system may adjust compression parameters dynamically based on the type of data and current network conditions to achieve a balance between data reduction and computational overhead.

In some embodiments, the diffusion component 232 may be configured to handle multi-modal data types. For example, the system may efficiently store and retrieve structured data (e.g., database records), semi-structured data (e.g., JSON files), and unstructured data (e.g., multimedia content) while maintaining consistent performance and security.

In some embodiments, the diffusion component 232 may be configured to enhance predictive caching using federated learning techniques. For example, the system may refine machine learning models locally on distributed nodes without centralizing sensitive user data to improve prediction accuracy for data access patterns while preserving privacy and security.

The dynamic shard management component 302 within the diffusion component 232 may partition data into shards and allocate them across nodes 210 for redundancy. It may adjust shard size or location when new nodes join or existing nodes depart, maintaining balanced resource use. It may integrate advanced compression or deduplication logic and geofencing policies for data sovereignty compliance.

The shard partitioning unit 312 may analyze the size and characteristics of input datasets and segment them into shards using algorithms based on node capacity and network conditions. The real-time network analyzer 314 may monitor metrics such as latency and bandwidth to optimize shard sizes and node selection during distribution. The shard redistribution controller 316 may manage the reassignment of shards to different nodes when network conditions change, or nodes become unavailable. The shard identifier generator 318 may assign unique identifiers to each shard for more accurate tracking and retrieval.

The provenance recording component 304 may be configured to maintain lineage chains for data shards and record transformations in the distributed ledger 214. It may store cryptographic signatures and timestamps for each update to provide traceability for compliance audits. It may also integrate with tokenization features to embed metadata or create immutable event records.

In some embodiments, the provenance recording component 304 may record metadata and maintain a verifiable history for each shard. The lineage chain manager 320 may be configured to establish a chain of records that tracks the evolution of each shard over time. The timestamp generator

322 may be configured to append temporal data to each recorded event for more accurate chronological tracking. The entity tracking unit 324 may be configured to associate each modification or operation performed on a shard with the corresponding entity responsible for that action. The modification history recorder 326 may be configured to compile a log of updates, that may allow historical data related to shards to remain accessible and auditable.

The resilient distribution component 306 may be configured to enforce reliable data placement and retrieval, using real-time network conditions to optimize data flow. It may store redundant copies or parity information for self-healing and auto-recovery. The resilient distribution component 306 may automate backup snapshots for archival or compliance.

In some embodiments, the resilient distribution component 306 may be configured to coordinate the secure allocation of shards across storage nodes within the decentralized network. The node performance evaluator 328 may be configured to assess attributes of available nodes, such as storage capacity, geographic proximity, and response times, to inform shard placement. The consensus protocol handler 330 may be configured to maintain synchronization of shard metadata across nodes by coordinating updates through a consensus mechanism. The fault-tolerant distribution controller 332 may be configured to identify shards located on unavailable nodes and reallocate them to operational nodes to maintain data availability and resilience.

The tamper detection component 308 may be configured to validate shard integrity by comparing locally stored hashes to immutable records 244 in the ledger. It may detect unauthorized modifications and trigger alerts or correction procedures through the shield component 238. It may also work with zero-knowledge proof mechanisms to confirm content integrity without exposing data.

In some embodiments, the tamper detection component 308 may be configured to perform operations to detect unauthorized modifications to shards. The cryptographic hash validator 334 may be configured to compute and compare cryptographic hashes for shards to verify that their content remains consistent with stored metadata. The metadata comparator 336 may be configured to cross-check metadata stored in the distributed ledger with metadata retrieved from nodes to identify discrepancies. The recovery trigger 338 may be configured to initiate recovery actions when tampering or data integrity issues are identified.

The enhanced retrieval component 310 may be configured to manage caching and routing policies for faster data access. It may predict high-demand shards using ML-based analytics and place them on strategically selected nodes. The enhanced retrieval component 310 may reduce latency in multi-cloud or edge deployments by localizing shards near data consumers.

In some embodiments, the enhanced retrieval component 310 may be configured to improve the performance of shard retrieval operations. For example, the enhanced retrieval component 310 may include a content delivery record evaluator 340 that is configured to prioritize the retrieval of shards based on node attributes such as bandwidth and response times. The enhanced retrieval component 310 may also include retrieval manager 342 that is configured to coordinate parallel retrieval operations to reduce latency and accelerate dataset reconstruction. The enhanced retrieval component 310 may include a latency reduction unit 344 configured to improve data reassembly by selecting the nodes with the highest performance for shard retrieval.

In some embodiments, the diffusion component 232 may include a region-based sub-tokenization component 311 that is configured to manage specialized partitions of transaction data and metadata based on geographic or jurisdictional requirements. The region-based sub-tokenization component 311 may generate sub-tokens that include location-specific attributes for transactions and route these sub-tokens to nodes in the relevant regions, allowing local consensus and ledger updates. In some embodiments, the region-based sub-tokenization component 311 may apply the same resilient distribution logic that dynamic shard management component 302 uses for data shards. It may also factor node performance metrics into assigning sub-tokens to the best regional nodes. Once region-specific validation completes, the component 311 may coordinate ledger synchronization activities with the global system to maintain consistency across different geographies.

In some embodiments, the region-based sub-tokenization component 311 may interoperate with provenance recording component 304 to record region-aware transaction lineage and with tamper detection component 308 to verify integrity against unauthorized changes. This component may maintain compliance by restricting nodes to certain locations and logging each regional operation in immutable records for auditing. It may also coordinate with the shield component 238 to detect anomalies in sub-token traffic and to trigger corrective actions. This combined solution may allow the diffusion component 232 to unify region-specific transaction handling with the broader decentralized environment, providing localized validation and dynamic reallocation when nodes fail or congestion arises.

Figure 4:
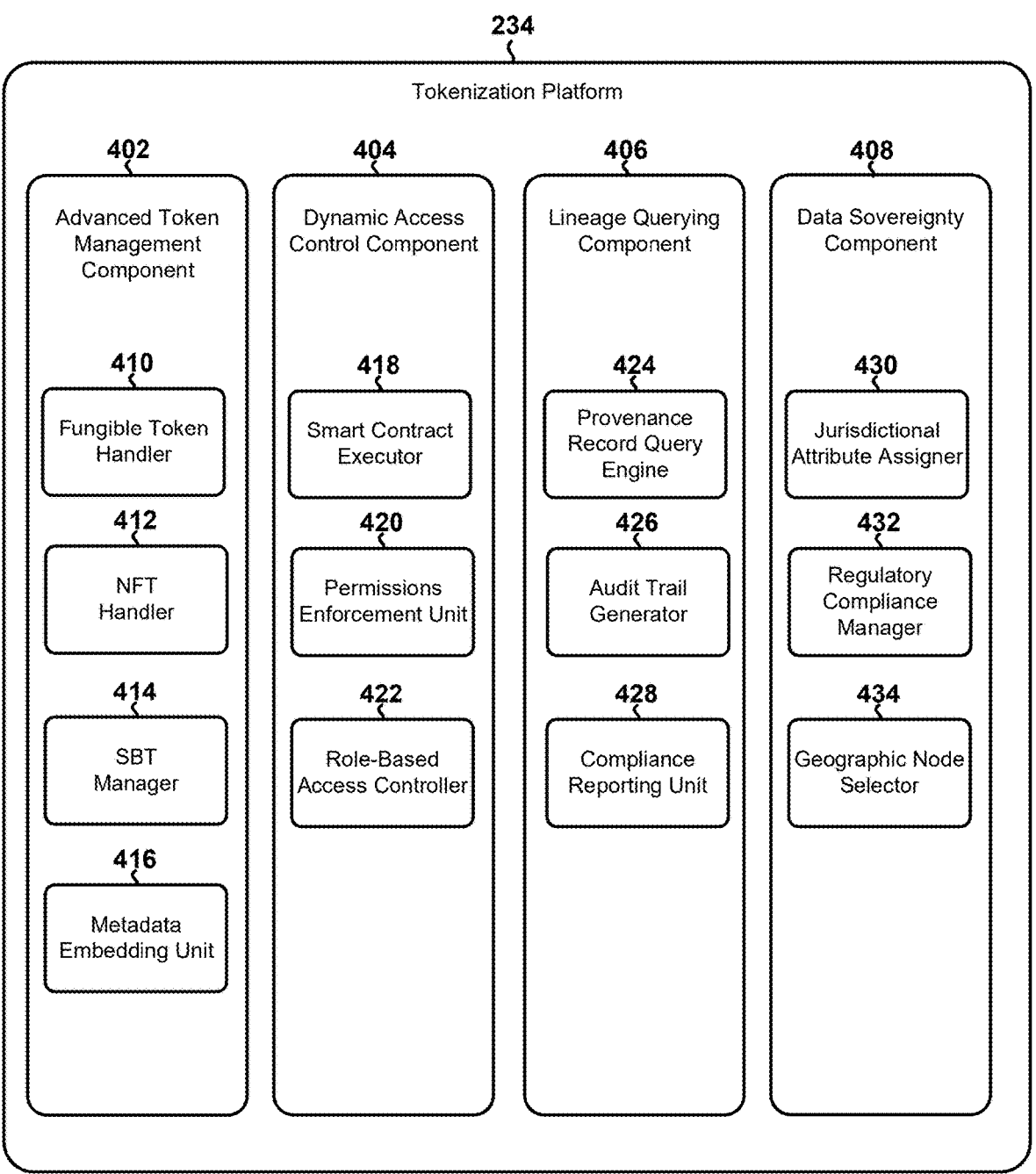
FIG. 4 is a component block diagram illustrating example components of a tokenization platform within the operational logic unit of the distributed computing framework that could be configured in accordance with some embodiments.

FIG. 4 illustrates example components of a tokenization platform 234 within the operational logic unit of the distributed computing framework that could be configured in accordance with some embodiments. The tokenization platform 234 may include various components to manage processes related to token creation, metadata association, and validation, such as the illustrated advanced token management component 402, dynamic access control component 404, lineage querying component 406, and data sovereignty component 408.

As discussed, the processing system may be configured to operate or implement a tokenization platform 234 that facilitates the creation, management, and exchange of digital tokens representing assets, identities, and/or access rights. The tokenization platform 234 may handle creation, validation, and transfer of digital tokens. It may incorporate privacy-preserving operations and RBAC enforcement through smart contracts and provide advanced credential management (e.g., SBTs, fungible tokens, NFTs, etc.).

For example, the system may generate tokens using standardized formats such as ERC-20 for fungible tokens, ERC-721 for non-fungible tokens, or custom formats for identity-linked tokens. As a further example, the tokenization platform may integrate established DLT standards with enhanced diffusion components to allow for secure, efficient tokenization for any of a variety of end-applications (e.g., finance, supply chain, digital identity, etc.) and use cases (e.g., representing ownership of physical assets, granting access to services, creating digital credentials, etc.).

In some embodiments, the tokenization platform 234 may be configured to support multiple token types, including fungible tokens, non-fungible tokens (NFTs), and identity-based tokens such as SBTs. For example, fungible tokens may represent interchangeable assets like currency, while NFTs may encapsulate ownership of unique items, such as art or property. SBTs may link tokens to specific identities or entities, allowing non-transferability and allowing applications in credentials or certifications.

In some embodiments, the processing system may be configured to implement SBTs as non-transferable, identity-linked digital tokens. For example, once minted, SBTs may remain permanently associated with a specific identity or entity, providing a persistent and verifiable record tied to a unique identifier. This property distinguishes SBTs from other token types, such as fungible or non-fungible tokens, which may be freely transferred between addresses.

In some embodiments, the processing system may be configured to use SBTs to represent immutable credentials, qualifications, or affiliations. For example, an educational institution may issue SBTs to students to certify degrees or courses completed. These tokens may serve as tamper-resistant, easily verifiable records of educational achievements, eliminating the need for manual credential verification.

In some embodiments, the processing system may be configured to use smart contracts to facilitate the creation and management of SBTs. For example, smart contracts may define issuance rules, enforce non-transferability, and manage token metadata. These contracts may also incorporate logic for managing expiration dates, conditional visibility, or access rights associated with specific SBTs.

In some embodiments, the processing system may be configured to create "source chains" using SBTs to track interconnected data events linked to a specific identity. Each SBT may cryptographically reference prior tokens, forming a chain of verifiable records. For example, a professional's work history could be represented as a source chain, with each SBT denoting a job role or accomplishment.

In some embodiments, the processing system may be configured to support decentralized reputation systems using SBTs. For example, an individual or organization may accumulate SBTs representing achievements or contributions, creating a digital reputation score. This score, derived from the collection of associated tokens, may provide a tamper-resistant measure of trustworthiness or expertise.

In some embodiments, the processing system may be configured to use SBTs for identity-based access control. For example, organizations may issue SBTs to denote membership or authorization levels. These tokens may then be used to grant or restrict access to specific resources or functionalities within decentralized applications, allowing that access rights are directly tied to verifiable identities.

In some embodiments, the processing system may be configured to support the creation of composite SBTs that aggregate information from multiple source chains or other tokens. For example, a composite token may provide a holistic view of an individual's qualifications while maintaining the verifiability of each individual record.

In some embodiments, the processing system may be configured to incorporate privacy-preserving mechanisms for SBTs. For example, zero-knowledge proofs may allow verification of specific credentials without revealing underlying data. This feature may balance the need for verifiability with privacy in scenarios such as job applications or regulatory compliance.

In some embodiments, the processing system may be configured to use SBTs in governance systems for decentralized autonomous organizations (DAOs). For example, SBTs may represent voting rights or participation levels, allowing sybil-resistant governance models by preventing token transfers that could compromise fairness, such as vote-buying schemes.

In some embodiments, the processing system may be configured to support the issuance of revocable SBTs. For example, credentials or authorizations that may expire or require updates could be invalidated or revised through smart contracts. The revocation process may be recorded on the DLT to allow transparency and accountability.

In some embodiments, the processing system may be configured to manage the lifecycle of SBTs, including issuance, updates, and potential deprecation. For example, tokens may be updated to reflect new credentials or deactivated when no longer relevant, allowing that identity-linked records evolve over time without losing their traceability.

In some embodiments, the processing system may be configured to create hierarchical or nested SBTs to represent complex structures, such as multi-level organizational memberships or layered credentials. For example, a parent token may represent overall membership, while child tokens denote specific roles or achievements within the organization.

In some embodiments, the processing system may be configured to allow interoperability of SBTs across multiple DLT networks or decentralized applications. For example, tokens issued on one platform may be recognized and verified on others, enhancing their utility as a standardized mechanism for identity and credential management in decentralized ecosystems.

In some embodiments, the tokenization platform 234 may be configured to use smart contracts to define token properties, behaviors, and rules. For example, the system may use ERC-20 smart contracts for fungible tokens and ERC-721 contracts for NFTs, adding functionality to integrate with the diffusion architecture. These contracts may automate operations such as minting, transfer, and redemption of tokens.

In some embodiments, the tokenization platform 234 may be configured to create tokens that represent sensor identities within the system. For example, each token may encapsulate metadata such as sensor type, deployment location, and cryptographic keys for secure data signing. These embodiments may provide a tamper-resistant mechanism for tracking sensor deployments and configurations to improve the data integrity of data collection processes.

In some embodiments, the tokenization platform 234 may be configured to tokenize event logs generated by sensors and other components. For example, an event log token may include a cryptographic hash of the log data, timestamps, and references to sensor identity tokens. These operations may create an immutable audit trail that enhances compliance capabilities and facilitates forensic analysis when needed.

In some embodiments, the system may use PBFT for local validation and adopt a PoS framework for block production. PBFT may finalize transactions more rapidly within smaller groups. PoS may maintain global consistency at scale. A summary table may outline throughput, finality intervals, and resource usage under diverse traffic conditions.

In some embodiments, the tokenization platform 234 may be configured to integrate with external data sources to generate tokens representing real-world assets or events. For example, the tokenization platform may interface with smart meters to collect renewable energy data and mint tokens representing energy produced. As part of these operations, the tokenization platform may embed metadata such as generation time, location, and carbon offset information.

In some embodiments, the tokenization platform 234 may be configured to implement a multi-layered metadata storage solution for tokens. For example, essential token information may be stored on-chain for immediate verification, while additional metadata may be stored off-chain in the diffusion network. This hybrid model may enhance or improve performance while allowing tokens to reference rich datasets.

In some embodiments, the tokenization platform 234 may be configured to incorporate geofencing capabilities. For example, administrators may define geographic boundaries for token minting, transfer, or redemption to comply with jurisdictional regulations or contractual requirements.

In some embodiments, the tokenization platform 234 may be configured to create composite tokens representing bundles of other tokens or partial ownership of larger assets. For example, the platform may support fractional ownership of renewable energy projects or allow multiple renewable energy certificates (RECs) to be bundled into a single tradable unit.

In some embodiments, the tokenization platform 234 may be configured to manage token lifecycles, including minting, transfer, burning, and metadata updates. In some embodiments, the tokenization platform 234 may use smart contracts to govern these operations (e.g., minting, transfer, burning, and metadata updates), enforce access controls, and validate conditions to maintain the integrity of the token ecosystem.

In some embodiments, the tokenization platform 234 may be configured to implement token bridging protocols for cross-chain transfers. For example, tokens may be transferred between different DLT networks while preserving their metadata and provenance, increasing their liquidity and utility across diverse ecosystems.

In some embodiments, the tokenization platform 234 may be configured to provide APIs and software development kits (SDKs) for integrating the tokenization platform with external systems. For example, developers may use these tools to incorporate tokenization features into existing workflows or create new applications that use the platform.

In some embodiments, the tokenization platform 234 may be configured to include analytics and reporting tools within the tokenization platform. These tools may provide insights into token usage, transfer patterns, and market trends, and thus allow for more informed decision-making for issuers and holders.

In some embodiments, the tokenization platform 234 may be configured to combine the security and efficiency of the diffusion architecture with advanced tokenization features. For example, this integration may provide a scalable foundation for managing digital assets, identities, and access rights across domains such as finance, supply chain, and energy, supporting a wide range of use cases.

The advanced token management component 402 may be configured to manage the creation, validation, and maintenance of various types of digital tokens to provide secure and verifiable tokenization processes within the distributed computing framework. The advanced token management component 402 may mint, transfer, or burn tokens that represent currencies, assets, or identity-linked credentials. It may use multi-signature schemes for sensitive token operations and create immutable proofs of ownership or affiliation. It may also embed cryptographic hashes into tokens for data provenance. The advanced token management component 402 may include a fungible token handler 410, an NFTs handler 412, a SBT manager 414, and a metadata embedding unit 416.

The fungible token handler 410 may be configured to manage tokens that represent interchangeable assets, such as currencies or commodities. The fungible token handler 410 may be configured to perform operations such as token minting, transfer, and validation. In some embodiments, the fungible token handler 410 may be configured to track the ownership and transaction history of fungible tokens by associating them with metadata stored in a tamper-evident distributed ledger.

The NFT handler 412 may be configured to manage NFTs that represent unique digital or physical items. For example, in some embodiments the NFT handler 412 may be configured to handle the creation of NFTs by embedding unique identifiers and associated metadata, such as asset descriptions, provenance information, and ownership records. In some embodiments, the NFT handler 412 may also be configured to validate the authenticity of NFTs during transfers or modifications by cross-referencing distributed ledger records.

The SBT manager 414 may be configured to create and manage the identity-linked and non-transferable SBTs. In some embodiments, the SBT manager 414 may be configured to enforce rules that prevent unauthorized transfers so that each SBT remains associated with its intended entity, such as a user, IoT device, or organization. In some embodiments, the SBT manager 414 may also be configured to use identity verification protocols to validate the linkage between the token and the corresponding entity.

The metadata embedding unit 416 may be configured to embed descriptive and operational metadata into tokens during their creation or modification. This metadata may include attributes such as token type, asset details, compliance information, and ownership tracking data. In some embodiments, the metadata embedding unit 416 may be configured to ensure that the embedded metadata is cryptographically verifiable and consistent with the records stored in the distributed ledger.

The dynamic access control component 404 may be configured to manage access permissions for tokens and enforce security rules that regulate token interactions. This component may enforce fine-grained permissions for token interactions. It may use RBAC policies, zero-knowledge proofs for secure identity checks, and consensus-based validation for sensitive token activities. It may also integrate reentrancy-attack protections by monitoring contract execution states.

The dynamic access control component 404 may include a smart contract executor 418, a permissions enforcement unit 420, and a role-based access controller 422. The smart contract executor 418 may be configured to execute predefined rules encoded in smart contracts for automated enforcement of token operations, such as transfers, modifications, or revocations. The permissions enforcement unit 420 may be configured to evaluate and apply access control policies by making sure that token interactions comply with access rules defined by token metadata or organizational policies. The role-based access controller 422 may be configured to differentiate user privileges by assigning specific roles, such as administrator or viewer, to regulate the level of access granted to various entities.

The lineage querying component 406 may be configured to retrieve token transaction histories and manage compliance reporting through chain-of-custody records. It may support machine learning routines for event analysis or fraud detection. It may also interface with the vault component 236 for secure token custody. The lineage querying component 406 may include a provenance record query engine 424, an audit trail generator 426, and a compliance reporting unit 428. The provenance record query engine 424 may be configured to retrieve detailed historical records associated with a token, including modifications, transfers, and associated entities, by querying data stored in the distributed ledger. The audit trail generator 426 may be configured to compile an immutable log of token interactions to allow stakeholders to verify the authenticity and integrity of token-related operations. The compliance reporting unit 428 may be configured to generate reports tailored to regulatory requirements and otherwise demonstrate the traceability and legality of tokenized assets and their associated activities.

The data sovereignty component 408 may be configured to manage the geographic and jurisdictional constraints applicable to tokenized assets. This component may enforce geofencing and jurisdictional policies by associating tokens with particular regions or regulations. It may coordinate with the diffusion component 232 to restrict data storage and processing to compliant nodes. It may also log events in the distributed ledger 214 for legal or regulatory oversight.

The data sovereignty component 408 may include a jurisdictional attribute assigner 430, a regulatory compliance manager 432, and a geographic node selector 434. The jurisdictional attribute assigner 430 may be configured to associate tokens with specific geographic or legal domains by embedding jurisdictional attributes into token metadata. The regulatory compliance manager 432 may be configured to evaluate token operations against applicable laws and regulations so that token interactions adhere to the requirements of relevant jurisdictions. The geographic node selector 434 may be configured to determine the placement of tokenized data within storage nodes that reside in compliant regions and determine data storage locations based on jurisdictional constraints and network performance metrics.

Figure 5:
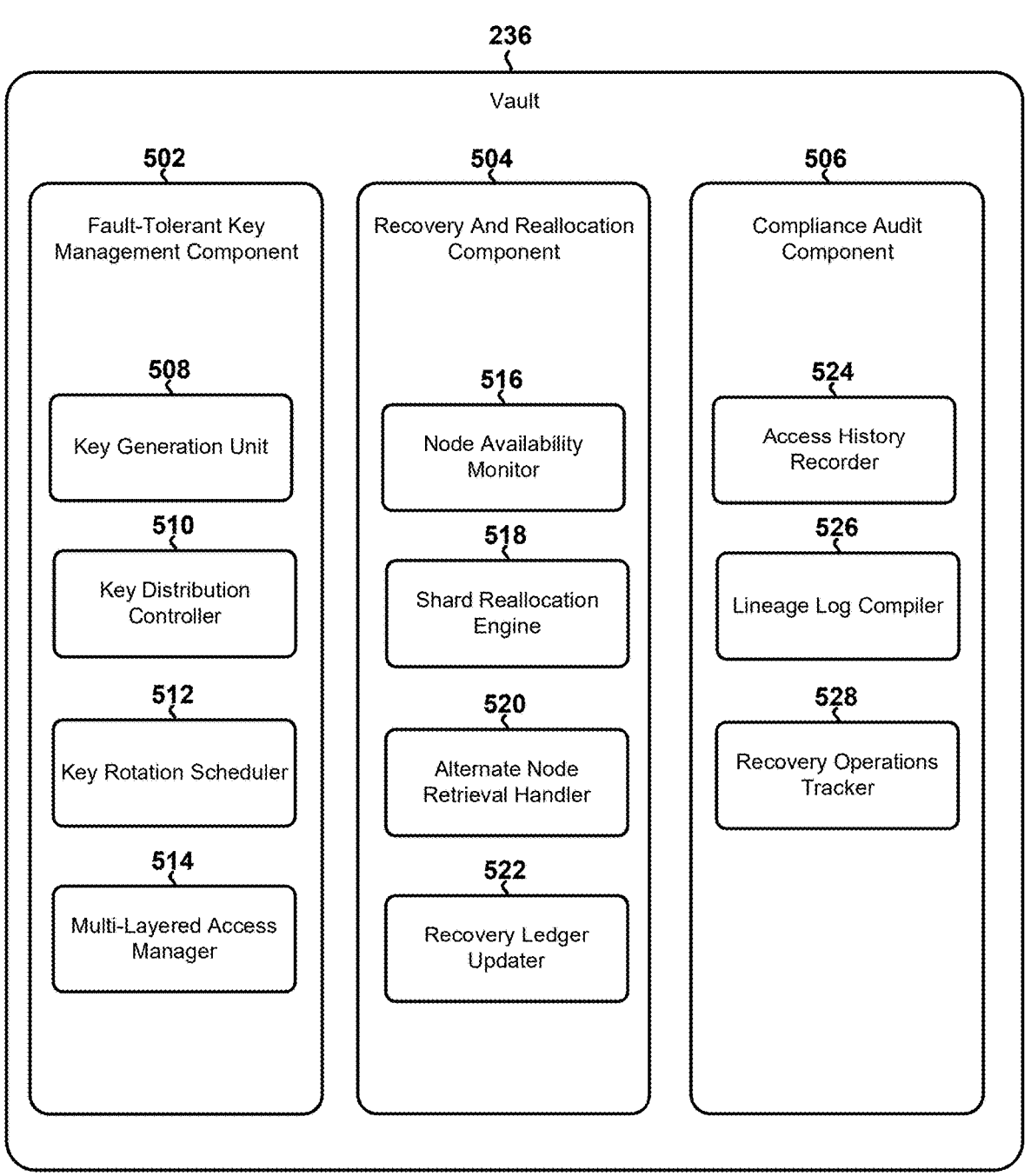
FIG. 5 is a component block diagram illustrating example components of a vault component within the operational logic unit of the distributed computing framework that could be configured in accordance with some embodiments.

FIG. 5 illustrates example components of a vault component 236 within the operational logic unit of the distributed computing framework that could be configured in accordance with some embodiments. The vault component 236 may include various components to manage processes related to key management, secure storage, and access control, such as the illustrated fault-tolerant key management component 502, recovery and reallocation component 504, and compliance audit component 506.

As discussed, in some embodiments the processing system may be configured to implement a vault component 236 that functions as an enhanced cryptocurrency wallet. The vault component 236 may provide multi-layered encryption, fault-tolerant key management, and role-based solutions to secure custody of tokens and data. It may also handle secure enclaves, key rotation, and multi-signature approvals for high-value operations.

The vault component 236 may securely manage digital tokens across multiple DLT protocols and integrate seamlessly with other system components to support advanced token management and data access. For example, the vault component 236 may facilitate secure interactions with decentralized finance (DeFi) protocols or decentralized identity systems.

In some embodiments, HSMs may store cryptographic keys securely. The vault component 236 may use these modules for threshold-based signatures or to protect private key material. The ledger may record each key usage event and reference the approving roles. This arrangement may help preserve trust across nodes that may use distributed cryptographic methods.

In some embodiments, the vault component 236 may be configured to support a wide range of token types, including fungible tokens, NFTs, and SBTs. For example, the vault may allow users to manage financial assets, digital collectibles, and identity-linked credentials within a unified, secure environment.

In some embodiments, the vault component 236 may be configured to incorporate robust security measures for managing private keys. These measures may include hardware-based key storage, multi-signature authentication, and encrypted backups. For example, multi-signature protocols may require multiple approvals for transactions, reducing the risk of unauthorized access.

In some embodiments, the vault component 236 may be configured to integrate with the diffusion architecture. This integration may allow users to retrieve and verify off-chain metadata linked to their tokens efficiently. For example, the vault may provide seamless access to detailed provenance records stored in the diffusion network.

In some embodiments, the vault component 236 may be configured to support interoperability across DLT protocols. For example, users may manage tokens from Ethereum, Solana, and other networks within a single interface, facilitating cross-chain transfers and interactions.

In some embodiments, the vault component 236 may be configured to implement advanced key recovery mechanisms within the vault component, such as social recovery or threshold cryptography. For example, users may designate trusted contacts or use a distributed key-sharing scheme to regain access in case of key loss or device failure.

In some embodiments, the vault component 236 may be configured to manage token lifecycles, including minting, transferring, and burning tokens. In some embodiments, these operations may be executed through secure and auditable processes governed by smart contracts.

In some embodiments, the vault component 236 may be configured to support role-based access control. For example, organizations may define permissions for specific token operations, such as transferring or burning tokens, allowing fine-grained control over token custody.

In some embodiments, the vault component 236 may be configured to provide interfaces for integrating with external systems, such as DeFi protocols or enterprise identity management platforms. For example, users may use their tokens for staking, lending, or other DLT-based activities.

In some embodiments, the vault component 236 may be configured to incorporate privacy-enhancing technologies. For example, zero-knowledge proofs may allow users to verify ownership or attributes of tokens without revealing sensitive information.

In some embodiments, the vault component 236 may be configured to include monitoring and alerting capabilities in the vault component. For example, users may receive notifications of large token transfers, price changes, or potential security incidents, allowing timely responses to important events.

In some embodiments, the vault component 236 may be configured to allow automated token management features. For example, users may schedule token transfers or define conditions for executing specific operations, improving efficiency and flexibility.

In some embodiments, the vault component 236 may be configured to implement comprehensive audit logging. For example, cryptographically secured logs may track all token-related activities, integrating with broader data lineage and compliance systems.

In some embodiments, the vault component 236 may be configured to support multi-token portfolios. For example, users may group tokens by type or use case, allowing holistic portfolio analysis and management.

In some embodiments, the vault component 236 may be configured to provide advanced backup and recovery mechanisms for token-related data. For example, the vault component 236 may use the diffusion architecture to allow redundant, distributed storage of token information.

In some embodiments, the vault component 236 may be configured to support token delegation and proxy voting within the vault component. This may allow, for example, users to assign voting rights to trusted entities for governance processes, such as decentralized autonomous organization (DAO) decision-making.

In some embodiments, the vault component 236 may be configured to integrate HSMs. For example, the vault component 236 may use HSMs to securely manage cryptographic keys to provide enhanced protection for high-value digital assets.

In some embodiments, the vault component 236 may be configured to implement advanced encryption techniques for securing token metadata. This may allow encrypted off-chain data linked to tokens to remain protected during storage and transmission.

In some embodiments, the vault component 236 may be configured to include analytics tools that analyze, for example, on-chain and off-chain data to provide insights into token value, transfer patterns, and market trends.

In some embodiments, the vault component 236 may be configured to integrate DAOs. For example, this integration may allow users to participate in token-based collective decision-making processes, resource allocation, and governance activities. These features may support complex organizational structures and enhance collaboration within token ecosystems.

In some embodiments, the vault component 236 may be configured to implement advanced cryptographic techniques, such as proxy re-encryption or attribute-based encryption, within the vault component. For example, these schemes may allow users to securely share token-related data or metadata while controlling the disclosure of sensitive information. This functionality may be particularly useful in scenarios requiring selective access or secure delegation.

In some embodiments, the vault component 236 may be configured to provide tools for creating and managing token-based crowdfunding or initial coin offering (ICO) campaigns. For example, the vault may allow users to participate in decentralized fundraising activities by issuing and distributing tokens securely. These features may include mechanisms, such as escrow-based token release or built-in compliance checks, for protecting investors.

In some embodiments, the vault component 236 may be configured to support the integration of decentralized identity verification services within the vault component. For example, users may prove specific attributes or credentials linked to their token holdings without revealing unnecessary personal information. These operations may enhance privacy and security in applications requiring identity verification.

In some embodiments, the vault component 236 may be configured to interact with decentralized insurance protocols. For example, users may protect their token holdings against risks, such as theft or market volatility, by participating in risk-sharing pools. This integration may provide additional security options and comprehensive risk management for digital assets.

In some embodiments, the system may be configured to address a retrieval surge from multiple geographic zones by monitoring request volumes and latencies. A node allocator may reroute shards or implement caching on underutilized nodes. Each action may appear in the ledger, preserving accountability. This may sustain continuous data availability during periods of higher usage.

In some embodiments, the vault component 236 may be configured to implement cryptographic techniques, such as verifiable random functions (VRFs) or commit-reveal schemes, within the vault component. These operations may allow fair and transparent random selection or token distribution processes to support applications such as lotteries or randomized governance assignments.

In some embodiments, the vault component 236 may be configured to provide tools for creating and managing token-based prediction markets and information aggregation systems. For example, users may stake tokens to participate in decentralized forecasting activities, with incentive structures designed to reward accurate predictions and aggregate valuable insights.

In some embodiments, the vault component 236 may be configured to integrate decentralized reputation systems. For example, users may build and verify reputation scores based on token-related activities and interactions. These operations may enhance trust and accountability by providing verifiable metrics of behavior and contributions within the ecosystem.

In some embodiments, the vault component 236 may be configured to interact with decentralized networks. For example, users may incorporate real-world data, such as weather conditions or financial market indices, into their token-based systems and smart contracts. This integration may bridge the gap between on-chain and off-chain data sources (expanding token use cases).

In some embodiments, the vault component 236 may be configured to implement advanced cryptographic techniques, such as threshold signatures or distributed key generation, within the vault component. These operations may provide secure multi-party control over high-value tokens or important token operations to support collaborative decision-making and shared custody scenarios.

In some embodiments, the vault component 236 may be configured to create and manage token-based voting systems. The vault component 236 may support voting schemes such as quadratic voting or conviction voting to allow users to express nuanced preferences and participate in decentralized governance processes.

In some embodiments, the vault component 236 may be configured to integrate decentralized identity systems. The vault component 236 may allow users to create and manage verifiable credentials linked to their token holdings. This may in turn allow for secure and privacy-preserving identity verification for access control and other applications.

In some embodiments, the vault component 236 may be configured to support layer-2 scaling solutions, such as state channels or optimistic rollups. These embodiments may facilitate cost-effective and efficient token transactions and improve scalability for high-frequency or low-value operations.

In some embodiments, the vault component 236 may be configured to implement advanced cryptographic techniques, such as homomorphic encryption or secure multiparty computation, to allow privacy-preserving analytics on aggregated token data. For example, the vault component 236 may allow users to analyze token usage patterns or market trends without compromising the confidentiality of individual data points.

The fault-tolerant key management component 502 within the vault component 236 may be configured to securely manage cryptographic keys and maintain their availability in the decentralized network. This component may generate and distribute cryptographic keys, rotating them periodically to reduce long-term risk of compromise. It may store these keys in hardware-based modules or secure enclaves. It may also implement advanced key recovery mechanisms (e.g., threshold schemes) for lost or corrupted keys.

The fault-tolerant key management component 502 may include a key generation unit 508, a key distribution controller 510, a key rotation scheduler 512, and a multi-layered access manager 514. The key generation unit 508 may be configured to generate cryptographic keys using algorithms such as Rivest-Shamir-Adleman (RSA) or Elliptic Curve Cryptography (ECC) and may associate these keys with specific shards or tokens. The key distribution controller 510 may be configured to securely distribute generated keys to authorized entities using encrypted channels. The key rotation scheduler 512 may be configured to periodically replace cryptographic keys to mitigate risks associated with key aging or exposure. The multi-layered access manager 514 may be configured to regulate access to cryptographic keys by implementing hierarchical access controls based on user roles or privileges.

The recovery and reallocation component 504 may be configured to manage the reallocation of data shards and allow recovery from node failures in the decentralized network. This component may automate shard recovery when node failures or malicious actions occur. It may locate validated replicas in the diffusion component 232 and reassign them to healthy nodes. It may document these events in immutable records 244 for auditing.

The recovery and reallocation component 504 may include a node availability monitor 516, a shard reallocation engine 518, an alternate node retrieval handler 520, and a recovery ledger updater 522. The node availability monitor 516 may be configured to track the status of storage nodes by analyzing attributes such as response times, error rates, and operational health. The shard reallocation engine 518 may be configured to identify shards located on unavailable nodes and redistribute them to operational nodes based on network conditions and performance metrics. The alternate node retrieval handler 520 may be configured to locate validated replicas of compromised shards to facilitate data recovery. The recovery ledger updater 522 may be configured to record details of recovery and reallocation operations in a tamper-evident ledger to maintain an auditable history of recovery events.

The compliance audit component 506 may be configured to enforce adherence to regulatory and organizational policies by tracking and documenting key management and recovery processes. This component may track and log access attempts to cryptographic keys, generating compliance reports that reference data changes in the distributed ledger 214. It may also align with General Data Protection Regulation (GDPR), Health Insurance Portability and Accountability Act (HIPAA), or other regulatory requirements by providing tamper-evident records of system operations.

The compliance audit component 506 may include an access history recorder 524, a lineage log compiler 526, and a recovery operations tracker 528. The access history recorder 524 may be configured to log all access attempts to cryptographic keys and associated metadata for compliance verification. The lineage log compiler 526 may be configured to aggregate data modification and transaction histories into a unified, traceable format. The recovery operations tracker 528 may be configured to maintain records of shard recovery and reallocation activities to provide transparency and support regulatory reporting.

Figure 6:
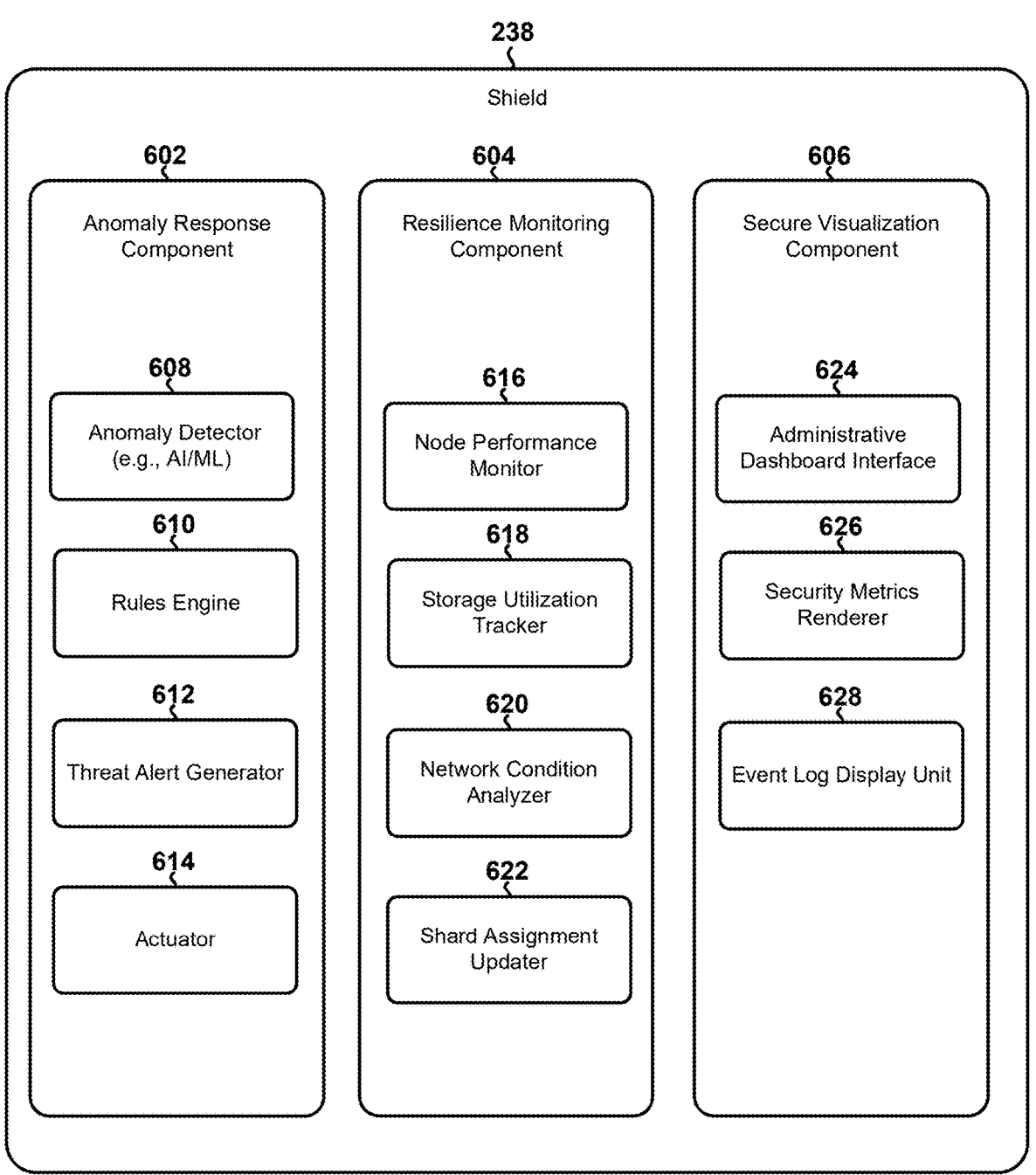
FIG. 6 is a component block diagram illustrating example components of a shield component within the operational logic unit of the distributed computing framework that could be configured in accordance with some embodiments.

FIG. 6 illustrates example components of a shield component 238 within the operational logic unit of the distributed computing framework that could be configured in accordance with some embodiments. The shield component 238 may include various components to manage processes related to monitoring, anomaly detection, and response, such as the illustrated anomaly response component 602, resilience monitoring component 604, and secure visualization component 606.

The shield component 238 may provide advanced monitoring, anomaly detection, and response features. It may deploy software sensors, manage high-volume data collection, and operate ML-driven security analytics. It may integrate with external systems through standardized APIs and coordinate protective measures across the distributed environment. For example, the shield component 238 may deploy modular sensors across various nodes in the network to capture granular data on server activities and events for comprehensive security analysis and system oversight.

In some embodiments, the shield component 238 may be configured to use configurable software sensors for monitoring specific events. For example, sensors may track file modifications, API requests, or security-related activities based on predefined criteria. These embodiments may allow the system to focus its monitoring operations on the most relevant occurrences, reducing unnecessary data collection and optimizing system performance.

In some embodiments, the shield component 238 may be configured to implement rule-based mechanisms for managing high-volume data collection. For example, users may define event rules specifying conditions such as server operations or data interaction patterns. These rules may filter and identify important event data for more efficient monitoring and resource utilization.

In some embodiments, the shield component 238 may be configured to incorporate performance throttling mechanisms to handle data collection in high-volume scenarios. For example, users may set thresholds for sensors to dynamically adjust data collection rates based on system load. These embodiments may balance comprehensive monitoring with system resource efficiency.

In some embodiments, the shield component 238 may be configured to integrate with third-party platforms and APIs. For example, the system may synchronize data with cloud services for seamless orchestration between the shield and external enterprise tools.

In some embodiments, the shield component 238 may be configured to include a query console for interacting with sensors and event records. For example, administrators may execute custom queries, retrieve specific data subsets, or generate analytics reports directly within the system, eliminating reliance on external APIs.

In some embodiments, the shield component 238 may be configured to incorporate a billing module. For example, the system may generate detailed usage reports, including metrics on API requests, database interactions, and sensor activity, providing insights into operational costs and system usage.

In some embodiments, the shield component 238 may be configured to support the creation and management of custom extensions or plugins. This may allow users to develop tailored solutions for data ingestion or visualization and/or otherwise extend the functionality of the shield component to meet specific organizational needs.

In some embodiments, the shield component 238 may be configured to implement role-based access control for administrative functions. For example, the system may allow organizations to define user permissions for accessing sensitive data or configuring the system so that only authorized personnel have access to important operations.

In some embodiments, a wide-scale outage may trigger advanced reassembly workflows. The vault may combine data shards from unaffected nodes or from parity blocks. The system may use recorded lineage references to detect anomalies. The ledger may confirm each reconstruction operation and validate final integrity through prior cryptographic hashes.

In some embodiments, the shield component 238 may be configured to provide real-time monitoring and alerting capabilities. For example, users may define security rules to detect anomalies. The system may generate alerts via customizable notification methods, such as email or SMS, to facilitate timely responses.

In some embodiments, the shield component 238 may be configured to include advanced data visualization features. For example, the system may allow users to create interactive dashboards to analyze system performance, security metrics, or usage patterns for more informed decision-making and strategic resource allocation.

In some embodiments, the shield component 238 may be configured to implement custom event collection mechanisms. For example, the shield component 238 may allow users to define specialized monitoring routines for unique environments or industry-specific requirements.

The anomaly response component 602 within the shield component 238 may be configured to detect and mitigate anomalies or security threats in the decentralized network. This component may identify suspicious activities using machine learning models and rule-based triggers. It may scan for potential reentrancy exploits or brute-force attempts by evaluating event streams against known patterns. Upon detecting anomalies, it may generate alerts, isolate compromised nodes, or revert affected transactions.

The anomaly response component 602 may include an anomaly detector 608, a rules engine 610, a threat alert generator 612, and an actuator 614. The anomaly detector 608 may monitor system behavior and compare observed metrics with baseline models. The anomaly detector 608 may use machine learning models or predefined patterns to identify deviations from expected network behavior. The rules engine 610 may evaluate anomalies against defined security parameters, ML-based thresholds, or predefined security criteria to determine appropriate response actions. The threat alert generator 612 may be configured to generate alerts and notify administrators or automated systems of potential security incidents. The actuator 614 may be configured to implement corrective actions, such as isolating compromised nodes, terminating unauthorized processes, traffic throttling, node quarantining, etc.

In some embodiments, the anomaly response component 602 may be configured to use machine learning algorithms and techniques to enhance monitoring and analysis. For example, these algorithms may detect anomalies, predict potential issues, or refine data collection strategies using historical patterns and real-time inputs.

The resilience monitoring component 604 may be configured to monitor and maintain the operational health and performance of the decentralized or distributed network. It may optimize node performance, monitor storage usage, and detect potential faults. It may also coordinate dynamic scaling when new nodes join or resources are decommissioned.

The resilience monitoring component 604 may include a node performance monitor 616, a storage utilization tracker 618, a network condition analyzer 620, and a shard assignment updater 622. The node performance monitor 616 may be configured to assess node attributes such as computational capacity and response times to ensure efficient shard distribution. The storage utilization tracker 618 may be configured to monitor storage consumption across nodes to optimize data allocation and prevent overloading. The network condition analyzer 620 may be configured to analyze latency, bandwidth, and connectivity metrics to maintain optimal network performance. The shard assignment updater 622 may be configured to reallocate data shards in response to performance changes. The shard assignment updater 622 may dynamically adjust shard distribution based on network conditions and performance evaluations.

The secure visualization component 606 may be configured to provide a user interface for monitoring and managing system operations and security events. This component may provide administrative dashboards, graphical analytics, and event log displays for system oversight. It may include real-time charts, usage metrics, and compliance views. It may also present aggregated data from token transactions or data lineage records stored in the distributed ledger 214.

The secure visualization component 606 may include an administrative dashboard interface 624, a security metrics renderer 626, and an event log display unit 628. The administrative dashboard interface 624 may be configured to allow administrators to view and control system configurations, including access controls and node statuses. The security metrics renderer 626 may be configured to display graphical representations of security-related data, such as detected threats or system vulnerabilities. The event log display unit 628 may be configured to present detailed logs of system events to allow users to audit operations and investigate incidents.

FIG. 7A is a process flow diagram illustrating a method 700 for coordinated interplay between the vault, diffusion, and shield components in accordance with some embodiments. Method 700 may be performed by a processing system including one or more processors and components described in this application (e.g., with reference to FIGS. 1-6). The processing system may execute software or firmware to perform some or all operations of method 700. References to a "processing system" encompass alternative hardware configurations implementing any portion of method 700.

In block 702, the processing system may detect an event that references data shards or cryptographic keys. For example, the processor may identify that a node reached a usage threshold of 90 percent disk space or that an administrative console issued a request to rotate encryption keys for regulatory compliance. The node storage threshold may be a parameter indicating maximum safe capacity for a storage node. The processing system may record a new entry in a tamper-evident ledger to show which node exceeded the threshold, the date and time of the detection, and a reference that links the reason for the request.

In block 704, the processing system may seek multi-signature approval from a vault component. For example, the processor may gather endorsements from multiple authorized participants. Each participant may sign an approval message that reflects consent to initiate key operations. The vault component uses a hardware security module, also referred to as an HSM, to protect private cryptographic fragments. This solution ensures that no individual participant unilaterally approves key changes. The processing system appends each partial endorsement to the ledger with a unique identifier that notes who provided the approval and at what time.

In block 706, the processing system may invoke a diffusion process that reassigns shards. For example, the processor may retrieve updated encryption keys from the vault component and encrypt each shard with the newly generated keys. The processor may select new storage nodes that meet latency or geographic requirements. The diffusion component may update a shard pointer, which may be a unique reference that links a shard identifier to a specific node. The processing system may log these pointer changes in the ledger to confirm the node assignments and to preserve an immutable record.

In block 708, the processing system may invoke a shield component to monitor the overall operation. For example, the processor may retrieve node performance metrics, such as disk utilization, error rates, or throughput. The shield component may check for suspicious shard movements, such as multiple reassignments over a short interval, or mismatched ledger entries. These monitoring operations may flag irregular events that might indicate malicious activity. The shield component may write each finding in the ledger to build a record of potential anomalies.

In block 710, the processing system may compile a combined ledger entry that references the vault, diffusion, and shield activities. For example, the processor may collect each partial signature from the vault, the updated shard pointers from the diffusion component, and the shield's performance metrics in one cryptographic reference. The cryptographic reference may associate these individual records under a single identifier in the ledger. This structure may preserve traceability for the entire workflow, which may span key approvals, shard reallocation, and security checks.

Some embodiments may include systems and methods for decentralized data storage and handling with intelligent routing, data provenance, and enhanced security features.

Some embodiments may include methods performed by a processing system operating within a distributed computing system for decentralized data storage and retrieval. In some embodiments, the methods may include receiving a dataset for storage, partitioning the dataset into a plurality of data shards (in which each data shard is associated with a unique shard identifier and includes a portion of the dataset), encrypting each data shard using a unique cryptographic key, distributing the plurality of data shards across a plurality of storage nodes in the distributed computing system (in which each storage node is selected based on network performance metrics such as latency, storage utilization, and reliability), recording metadata associated with each data shard in a tamper-evident distributed ledger (the metadata including the unique shard identifier, the cryptographic key reference, and the storage node location), receiving a retrieval request specifying the dataset, querying the tamper-evident distributed ledger to determine the storage node locations of the data shards associated with the dataset, retrieving the data shards from the identified storage nodes in parallel, validating the integrity of each retrieved data shard by comparing metadata stored in the tamper-evident distributed ledger with metadata retrieved from the storage nodes, decrypting each validated data shard using the unique cryptographic key associated with the data shard, and reconstructing the dataset from the validated and decrypted data shards based on their shard identifiers.

In some embodiments, recording metadata associated with each data shard in the tamper-evident distributed ledger may include recording a lineage chain for each data shard. In some embodiments, the lineage chain may include a record of each transformation or modification performed on the data shard, the entity responsible for the modification, and a cryptographic signature of the modification. In some embodiments, distributing the plurality of data shards across the plurality of storage nodes may include dynamically assigning data shards to storage nodes based on real-time network conditions and predefined performance policies that balance tradeoffs between data retrieval latency and fault tolerance. In some embodiments, the methods may further include dynamically adjusting the size of the data shards based on real-time network conditions (e.g., storage utilization, node availability, data characteristics, etc.).

In some embodiments, the methods may further include detecting a failure of at least one node in the decentralized network and autonomously reallocating data shards stored on the failed node to operational nodes based on real-time performance metrics and availability. In some embodiments, validating the integrity of each retrieved data shard may include detecting unauthorized modifications to the data shard by performing a cryptographic hash comparison between the metadata stored in the tamper-evident distributed ledger and the metadata retrieved from the storage node storing the data shard.

In some embodiments, the methods may further include storing operation-specific details (e.g., cryptographic hashes, timestamps, operator identifiers, etc.) in a tamper-evident distributed ledger to create a tamper-evident record of operations performed on the data shards. In some embodiments, the methods may further include identifying a compromised data shard based on a mismatch between the metadata stored in the tamper-evident distributed ledger and the metadata retrieved from the storage node, retrieving a validated copy of the compromised data shard from an alternate storage node, and updating the tamper-evident distributed ledger to record the recovery operation.

In some embodiments, the methods may further include identifying data shards likely to experience high access demand based on historical access patterns and real-time network conditions, caching the identified data shards on strategically selected storage nodes to optimize retrieval efficiency, and recording updates to cache assignments in the tamper-evident distributed ledger. In some embodiments, identifying data shards likely to experience high access demand may include applying a machine learning model trained on historical access logs and network performance metrics to predict future access patterns for the data shards. In some embodiments, distributing the plurality of data shards across the plurality of storage nodes may include assigning a jurisdictional attribute to each data shard based on a unique identifier linking the data shard to an owning entity, and restricting storage node selection for the data shard to nodes located within a jurisdiction compliant with the laws and regulations applicable to the owning entity.

In some embodiments, encrypting each data shard using the unique cryptographic key may include generating, for each data shard, a cryptographic hash representing the content of the data shard, the cryptographic hash being linked to a provenance record identifying an origin and a modification history of the data shard, and reconstructing the dataset from the validated and decrypted data shards based on their shard identifiers may include reconstructing the dataset by retrieving and combining at least a subset of the plurality of data shards from the decentralized network based on their respective shard identifiers and cryptographic hashes, in which the integrity of the shards is validated during reconstruction. In some embodiments, encrypting each data shard using the unique cryptographic key may include encrypting each data shard using an asymmetric cryptographic technique. In some embodiments, the provenance record may include a lineage chain linking the data shard to one or more prior versions, a timestamp indicating when the data shard was created or modified, and a unique identifier associated with the entity responsible for the creation or modification.

In some embodiments, the methods may further include querying the tamper-evident distributed ledger for the lineage chain of a specified data shard, and presenting a record of the lineage chain to an authorized entity, in which the lineage chain may include cryptographic evidence of each transformation, access, and modification associated with the data shard. In some embodiments, the methods may further include sending or providing the reconstructed dataset to a client device with cryptographically verifiable lineage records. In some embodiments, recording metadata in the tamper-evident distributed ledger may include applying a consensus mechanism to validate updates to the metadata, the consensus protocol including proposer node selection based on node reliability and performance metrics, proposal generation for metadata updates, and cryptographic signature validation of the proposals.

In some embodiments, the consensus mechanism may use a proof-of-stake algorithm to validate updates to the distributed ledger and periodic integrity checks to detect tampering before shard retrieval operations. In some embodiments, encrypting each data shard using a unique cryptographic key may include managing the cryptographic keys in a fault-tolerant key management system operatively connected to the distributed computing system, and securely distributing the cryptographic keys to authorized entities based on access control policies recorded in the tamper-evident distributed ledger. In some embodiments, retrieving the data shards in parallel may include prioritizing retrieval operations based on a weighted combination of latency metrics, bandwidth availability, and node reliability metrics for each storage node storing the data shards. In some embodiments, the methods may further include generating a security audit report that may include access histories, lineage records, and transformation events for each data shard, and presenting the security audit report to authorized entities via a secure interface.

FIG. 7B is a process flow diagram illustrating a method 750 of decentralized data storage and retrieval within a distributed computing environment in accordance with some embodiments. Method 750 may be performed by a diffusion component 232 or a processing system including one or more processors and components described in this application (e.g., with reference to FIGS. 1-6). The processing system may execute software or firmware to perform some or all operations of method 750. References to a "processing system" encompass alternative hardware configurations implementing any portion of method 750.

In block 752, the processing system may receive a dataset intended for decentralized storage across a node network. For example, the processing system may receive structured records, semi-structured JSON documents, or multimedia files via an application programming interface (API). In some embodiments, the processing system may retrieve datasets automatically from external sources based on scheduled intervals or event triggers. For example, the processing system may periodically collect transactional records from databases or sensor-generated data from IoT devices. In some embodiments, the processing system may validate dataset completeness or accuracy upon receipt. In some embodiments, the processing system may be further configured to normalize the dataset into a consistent schema to facilitate efficient subsequent storage or retrieval operations.

In block 754, the processing system may partition the dataset into a plurality of data shards, each associated with a unique shard identifier. For example, the processing system may divide database records or file segments into uniformly sized shards and assign each shard an alphanumeric identifier. In some embodiments, the processing system may dynamically adjust shard sizes according to real-time network conditions, data characteristics, or anticipated access frequency. For example, smaller shard sizes may be used for frequently accessed data, or larger shard sizes for nodes having higher storage capacities. In some embodiments, the processing system may generate redundancy or parity data for each shard to facilitate fault tolerance or recovery.

In block 756, the processing system may encrypt each data shard using a unique cryptographic key. For example, the processing system may apply AES-256 symmetric encryption algorithms individually to shards, associating each shard with distinct cryptographic key identifiers. In some embodiments, the processing system may securely manage these keys in a fault-tolerant key management system using HSMs. For example, keys may reside in HSMs and may be distributed securely to authorized entities according to access permissions recorded in a distributed ledger. In some embodiments, the processing system may periodically rotate cryptographic keys to mitigate security risks associated with compromised keys.

In block 758, the processing system may distribute the encrypted data shards across decentralized storage nodes selected based on network performance metrics, including latency, storage utilization, node reliability, or jurisdictional compliance. For example, the processing system may dynamically assign data shards to nodes using adaptive algorithms evaluating real-time network conditions. In some embodiments, the processing system may enforce data sovereignty requirements by restricting shard storage to nodes geographically compliant with regulations applicable to the dataset-owning entity. In some embodiments, the processing system may replicate shards across multiple nodes to enhance resilience against node failures or malicious attacks.

In block 760, the processing system may record metadata associated with each data shard in a tamper-evident distributed ledger. Metadata may include shard identifiers, cryptographic key references, storage node locations, jurisdictional attributes, timestamps, and data provenance records. For example, each ledger entry may include cryptographically signed hash pointers linking shard data, modifications, and access histories. In some embodiments, the processing system may maintain data lineage chains that include cryptographic evidence of data origins and transformations. In some embodiments, the processing system may apply a consensus mechanism—such as proof-of-stake—to synchronize shard metadata updates across nodes without centralized coordination. In some embodiments, the processing system may periodically audit metadata entries in the ledger to detect unauthorized modifications.

In block 762, the processing system may receive a retrieval request specifying the desired dataset. For example, the processing system may receive authenticated API requests from client devices identifying datasets through metadata references. In some embodiments, the processing system may enforce access controls by validating cryptographic signatures or digital credentials of requesting entities before proceeding.

In block 764, the processing system may query the distributed ledger to determine storage node locations of data shards associated with the requested dataset. For example, shard identifiers recorded in ledger metadata may allow rapid location of shards stored across decentralized nodes. In some embodiments, ledger queries may verify cryptographic proofs to authenticate shard metadata integrity. In some embodiments, alternative shard locations may be identified when primary storage nodes are temporarily unavailable.

In block 766, the processing system may retrieve identified data shards from storage nodes concurrently. For example, parallel download operations may be initiated using secure transport protocols (e.g., HTTPS, gRPC) to expedite shard retrieval. In some embodiments, adaptive retrieval strategies dynamically select alternate nodes when network performance metrics indicate delays or retrieval issues. In some embodiments, cached copies of frequently accessed shards may be proactively retrieved from strategically positioned nodes to further reduce latency.

In block 768, the processing system may validate the integrity of retrieved data shards by comparing metadata from storage nodes to corresponding metadata entries in the ledger. For example, the system may perform cryptographic hash comparisons to detect unauthorized modifications or tampering attempts. In some embodiments, discrepancies trigger autonomous recovery procedures involving retrieval of redundant shard copies from alternate nodes. The ledger may be updated to record details of validation or recovery operations, creating a verifiable operational log.

In block 770, the processing system may decrypt validated shards using their associated cryptographic keys. For example, cryptographic keys may be securely retrieved from a fault-tolerant key management system to decrypt shards individually. In some embodiments, key management policies account for periodic key rotation to ensure correct keys are used corresponding to shard timestamps.

In block 772, the processing system may reconstruct the dataset from decrypted data shards according to shard identifiers. For example, the processing system may reorder shards based on metadata-defined sequences and validate dataset completeness by verifying the presence of all shards listed in the ledger. In some embodiments, the reconstructed dataset, along with cryptographically verifiable lineage records, may be securely returned to the requesting entity.

As discussed, systems implementing the above methods may securely store and retrieve data within distributed computing systems. Many storage solutions may use centralized architectures prone to single points of failure and data breach vulnerabilities. The embodiments addresses these limitations by using decentralized storage and retrieval strategies involving data partitioning, shard encryption, node selection based on performance metrics and compliance criteria, metadata integrity verification, and autonomous shard reallocation. These operations may synergistically enhance security, resilience, regulatory compliance, and operational efficiency.

Systems that implement these methods may integrate adaptive data sharding, systematic cryptographic key rotation, geographic compliance enforcement, CDN-like retrieval optimization, and parallel shard retrieval into a cohesive decentralized framework. Decentralized solutions generally implement these elements independently or sequentially, without considering integrated coordination or combined functionality. In contrast, the embodiments dynamically adjust shard sizes and distribution, regularly rotate encryption keys, actively ensure geographic compliance, and retrieve multiple data shards concurrently through optimized paths. The embodiments include a carefully structured combination of elements that produce a unified system with enhanced security, regulatory compliance, computational efficiency, and adaptability, overcoming practical limitations present when individual elements are implemented in isolation.

Systems that implement these methods experience improved system performance and operational efficiency. Concurrent shard retrieval from multiple storage nodes may reduce retrieval latency, dynamic node selection based on real-time metrics may improve retrieval responsiveness, and cryptographic shard encryption and ledger-based metadata validation may reinforce data security and integrity. These systems provide enhanced computational efficiency, enhanced security, robust compliance, and autonomous recovery mechanisms effectively addressing node failures and malicious attacks.

Some embodiments may include systems and methods for region-specific sub-tokenization in cryptographic transaction processing.

Some embodiments may include methods performed by a processing system operating within a distributed computing system for processing cryptographic transactions using region-based sub-tokenization. In some embodiments, the methods may include receiving a transaction request that includes transaction data, the transaction data including a source location, a destination location, and a transaction amount, identifying a region associated with the source location and the destination location based on geolocation data corresponding to the transaction data, generating a region-based sub-token associated with the identified region, in which the region-based sub-token includes metadata indicative of the transaction data, routing the transaction request to a set of distributed nodes associated with the identified region, in which the set of distributed nodes is configured to process the transaction request locally within the identified region to validate the transaction using a consensus mechanism, and update a region-specific ledger associated with the identified region, and synchronizing the region-specific ledger with a global ledger stored across the distributed ledger network to reduce network congestion and transaction processing latency.

In some embodiments, the methods may further include generating a region-specific routing identifier based on the source location and the destination location, in which the routing identifier determines the region associated with the transaction. In some embodiments, the metadata indicative of the transaction data includes a transaction identifier, a timestamp, and cryptographic authentication data. In some embodiments, the consensus mechanism used by the set of distributed nodes includes a distributed validation protocol configured to validate the transaction request without centralized mining. In some embodiments, the methods may further include dynamically reassigning the transaction request to a different region-based sub-token in response to detecting network congestion or node failure in the identified region. In some embodiments, the synchronization may include aggregating transaction records from multiple region-specific ledgers, and merging the aggregated transaction records into the global ledger while maintaining the consistency and immutability of the transaction data.

In some embodiments, the transaction request may be processed within the identified region using a distributed ledger framework (e.g., Holochain, etc.). In some embodiments, the methods may further include encrypting the transaction data and the region-based sub-token prior to routing the transaction request to the set of distributed nodes. In some embodiments, processing the transaction request locally within the identified region includes executing a distributed consensus algorithm configured to verify transaction authenticity, validate transaction inputs, and record transaction outputs. In some embodiments, the methods may further include providing a confirmation receipt to a user associated with the transaction request, in which the confirmation receipt includes the transaction identifier, the processing region, and the final transaction status. In some embodiments, the region-based sub-token is generated using a cryptographic hash function configured to embed geolocation data and transaction data into the sub-token. In some embodiments, the methods may further include using a machine learning model to detect an anomaly in the transaction request and isolating the transaction request for additional validation.

In some embodiments, the global ledger is partitioned into multiple region-specific segments to support parallel synchronization across the distributed ledger network. In some embodiments, the methods may further include generating an analytics report based on aggregated transaction data from multiple region-specific ledgers, in which the analytics report includes metrics related to transaction volume, network latency, or processing efficiency. In some embodiments, the processor is configured to execute governance rules for the region-based sub-token (and/or rules for token expiration, reissuance, and revocation). In some embodiments, the set of distributed nodes is dynamically allocated based on real-time monitoring of network conditions. In some embodiments, the methods may further include storing a copy of the region-specific ledger in a secure, non-volatile memory for redundancy and disaster recovery.

FIG. 8 is a process flow diagram illustrating a method 800 for region-based sub-tokenization in cryptographic transaction processing in accordance with some embodiments. Method 800 may be performed by a processing system that includes one or more processors and components described herein (e.g., with reference to FIGS. 1-6). The processing system may execute software or firmware to perform some or all operations of method 800. References to the "processing system" encompass alternative hardware configurations implementing any portion of method 800.

In block 802, the processing system may receive a transaction request including transaction data, the transaction data including a source location, a destination location, and a transaction amount. For example, the processing system may receive transaction requests through an application programming interface (API) in standardized formats (e.g., JSON, XML). These formats may specify geographic coordinates, network addresses, cryptographic signatures, timestamps, and monetary values. In some embodiments, the processing system may authenticate transaction requests by validating cryptographic signatures embedded within the request data. In some embodiments, the processing system may receive transaction requests from decentralized finance (DeFi) platforms or supply chain systems interacting with DLT frameworks. In some embodiments, the processing system may log incoming transaction requests in a secure audit record for compliance verification purposes.

In block 804, the processing system may identify a region associated with the source location and the destination location based on geolocation data corresponding to the transaction data. For example, the processing system may query a geographic information system (GIS) or external geolocation service to map geographic coordinates or network addresses to predefined geographic regions. In some embodiments, the processing system may identify regions directly from metadata embedded in transaction requests, such as region codes or compliance zone identifiers. In some embodiments, the processing system may analyze historical transaction records stored in a distributed ledger to correlate frequent transaction paths with specific regions. In some embodiments, the processing system may verify identified regions by cross-checking geolocation data against jurisdictional compliance rules defined in smart contracts.

In block 806, the processing system may generate a region-based sub-token associated with the identified region, the region-based sub-token including metadata indicative of the transaction data. For example, the processing system may mint tokens conforming to DLT standards such as ERC-20 or ERC-721. Token metadata may include transaction identifiers, timestamps, geolocation data, cryptographic authentication data, and transaction amounts. In some embodiments, the processing system may generate sub-tokens using cryptographic hashing functions (e.g., SHA-256) embedding both geolocation and transaction data. In some embodiments, the processing system may associate jurisdictional attributes, regulatory compliance indicators, or references to smart contracts within token metadata. In some embodiments, the processing system may store generated sub-tokens in a secure cryptographic vault that manages keys and token lifecycle events.

In block 808, the processing system may route the transaction request to a set of distributed nodes associated with the identified region. For example, the processing system may query a node registry stored on the distributed ledger to identify nodes capable of local transaction processing within the geographic region. Nodes within this set may validate transactions using a consensus mechanism (e.g., POS, PBFT, or DPoS) and update a region-specific ledger accordingly. In some embodiments, the processing system may dynamically allocate nodes based on real-time monitoring of network conditions, such as latency, reliability, or processing efficiency. In some embodiments, the processing system may embed region-specific routing identifiers within transaction metadata, allowing automatic processing by recipient nodes. In some embodiments, the processing system may dynamically reassign transactions to alternative regions in response to detecting network congestion or node failures in the originally identified region.

In block 810, the processing system may synchronize the region-specific ledger with a global ledger maintained across the distributed ledger network. For example, the processing system may periodically aggregate validated transactions from multiple region-specific ledgers and merge aggregated records into the global ledger, maintaining data consistency and immutability. In some embodiments, the processing system may apply cryptographic validation protocols, such as Merkle trees, to verify ledger consistency before synchronization. In some embodiments, the processing system may use partitioned global ledgers segmented into multiple region-specific portions to allow parallel synchronization and improved transaction throughput. In some embodiments, synchronization operations may be governed by consensus algorithms configured specifically for reconciling regional and global ledgers. In some embodiments, the processing system may maintain audit logs of synchronization events and associated cryptographic proofs in a tamper-evident ledger to facilitate compliance audits.

In some embodiments, the processing system may encrypt transaction data and region-based sub-tokens prior to routing transaction requests to region-specific nodes. For example, the processing system may use symmetric or asymmetric cryptographic algorithms to secure data in transit and at rest. In some embodiments, the processing system may store redundant copies of region-specific ledgers in secure non-volatile memory to provide fault tolerance and disaster recovery capabilities.

In some embodiments, the processing system may use a machine learning model to detect anomalies in transaction requests. For example, the processing system may isolate transactions flagged by the model for additional validation and prevent fraudulent activities or data corruption.

In some embodiments, the processing system may generate analytics reports from aggregated transaction data collected from region-specific ledgers. Analytics reports may include metrics regarding transaction volume, latency, processing efficiency, or node reliability. In some embodiments, the processing system may provide transaction confirmation receipts to users associated with transaction requests, receipts including transaction identifiers, processing regions, and transaction statuses.

In some embodiments, the processing system may execute governance rules associated with region-based sub-tokens. Governance rules may define conditions for token expiration, reissuance, revocation, or regional compliance requirements, enforced through smart contracts linked to token metadata.

As discussed, systems that implement method 800 provide a decentralized, secure, and efficient mechanism for cryptographic transaction processing using region-based sub-tokenization. Centralized or globally-consistent validation protocols may introduce latency and increase vulnerability to network congestion. In contrast, method 800 uses localized validation, dynamic node allocation, encrypted transaction data handling, and ledger synchronization protocols. These operations may improve processing efficiency, scalability, security, and regulatory compliance across decentralized networks.

In addition, systems that implement method 800 may securely and efficiently manage digital transactions within decentralized networks by implementing region-specific digital tokens in a uniquely integrated process. Many solutions depend on centralized validation or global consensus protocols, often resulting in processing delays, increased network congestion, or heightened security risks. Instead of merely incorporating existing regional routing or token-generation practices independently, the embodiments combine automatic geographic identification, metadata-rich token creation, and localized validation at region-specific nodes. This precise arrangement of functions may allow rapid transaction validation and may reduce reliance on global resources. Transactions validated locally synchronize seamlessly with a global ledger, further mitigating latency and security issues common to traditional solutions. This targeted integration may enhance transaction efficiency, security, and regulatory compliance.

Method 800 also significantly enhances computing system performance by substantially reducing transaction processing latency and network congestion. Through the strategic use of localized validation within regional nodes, the system shortens the transaction validation path and thereby accelerates transaction completion. In addition, dynamically allocating transactions based on real-time network conditions reduces bottlenecks and improves reliability, while periodic synchronization with the global ledger conserves bandwidth and computational resources. Encrypting transaction metadata and using secure regional sub-tokens further enhance overall system security and data integrity, contributing to more efficient resource utilization and improved transaction throughput.

Some embodiments may include systems and methods for tokenizing entities with decentralized storage and DLT integration.

Some embodiments may include methods performed by a computing system for tokenizing entities. In some embodiments, the methods may include receiving, by a processor, an input dataset associated with an entity, the input dataset including asset attributes, identity information, or event metadata, encrypting the input dataset to generate encrypted data, partitioning the encrypted data into multiple encrypted segments, each encrypted segment being associated with a unique segment identifier, distributing the encrypted segments across a plurality of decentralized storage nodes, in which each decentralized storage node is configured to store and synchronize at least one encrypted segment, generating a token associated with the input dataset (in which the token is a fungible token, a non-fungible token, or a SBT), embedding, in the token, metadata including at least a reference to the encrypted segments stored across the decentralized storage nodes, a data provenance, a smart contract deployed on a tamper-evident distributed ledger identifier, and a timestamp, minting the token on a DLT network by executing a smart contract (in which the smart contract links the token metadata to the encrypted segments stored across the decentralized storage nodes), and providing, via the smart contract, access to the input dataset associated with the token based on predefined access permissions.

In some embodiments, the methods may further include verifying, prior to encrypting, the integrity of the input dataset by generating a cryptographic hash of the input dataset and comparing the generated cryptographic hash to a reference hash to confirm data integrity. In some embodiments, the metadata embedded in the token may include an access control list specifying authorized entities permitted to access the input dataset. In some embodiments, distributing the encrypted segments across the decentralized storage nodes may include assigning a subset of the encrypted segments to a specific decentralized storage node based on an availability score of the node, and replicating the subset of the encrypted segments on at least one additional decentralized storage node to enhance data redundancy and fault tolerance.

In some embodiments, the token may be a SBT. Some embodiments may include associating the token with a unique identifier corresponding to an individual or an IoT device and restricting transferability of the token to maintain its linkage to the unique identifier.

In some embodiments, the methods may further include associating renewable energy certificate information with the token, the renewable energy certificate information including energy generation attributes, including a generation timestamp, location, and source identifier, environmental descriptors of the energy source, and certification information verifying the renewable characteristics of the energy. In some embodiments, the methods may further include generating a provenance record for the input dataset, the provenance record including a historical log of data updates, identifiers of entities responsible for the updates, and timestamps associated with the updates. In some embodiments, allowing access to the input dataset associated with the token may include retrieving the encrypted segments from the decentralized storage nodes, decrypting the encrypted segments using a private key associated with the token, and reassembling the decrypted segments into the original input dataset. In some embodiments, the methods may further include monitoring access requests to the decentralized storage nodes, dynamically routing the access requests to a node based on network performance metrics and node availability, and logging the access requests for auditing purposes.

In some embodiments, minting the token on the DLT network may include embedding validation rules in the smart contract, the validation rules specifying conditions for accessing or modifying the input dataset. In some embodiments, the methods may further include generating a visualization of encrypted segment distribution across the decentralized storage nodes, the visualization including active decentralized storage nodes, allocation details for encrypted segments, and status indicators for synchronization and availability of the nodes. In some embodiments, the methods may further include implementing security for the decentralized storage nodes by encrypting communications between the decentralized storage nodes, implementing role-based access permissions for administrators of the decentralized storage nodes, and maintaining an audit log of all activities performed on the decentralized storage nodes.

In some embodiments, the DLT network may be Ethereum, Solana, or a compatible layer one or layer two protocol. In some embodiments, the smart contract executed for minting the token may be configured to verify the authenticity of the input dataset using the data provenance identifier, and execute access permissions based on the embedded metadata and predefined access control policies.

FIG. 9 is a process flow diagram illustrating a method 900 of tokenizing entities with decentralized storage and DLT integration in accordance with some embodiments. Method 900 may be performed by a processing system including one or more processors and components discussed in this application (e.g., referencing FIGS. 1-6). The processing system may execute software or firmware to perform some or all operations of method 900. References to a "processing system" herein encompass alternative hardware configurations performing any portion of the method 900.

In block 902, the processing system may receive an input dataset associated with an entity, the input dataset including asset attributes, identity information, or event metadata. For example, the processing system may receive structured records detailing asset properties, credentials of users, or sensor-generated metadata through an application programming interface (API). In some embodiments, the processing system may receive datasets from external systems such as Internet of Things (IoT) sensors or third-party databases. For example, the processing system may retrieve environmental data from IoT devices, such as smart meters, at periodic intervals or upon detecting specific events. In some embodiments, the processing system may receive input datasets by validating their completeness, consistency, or format compliance according to predefined data schemas. In some embodiments, the processing system may be further configured to normalize diverse data formats into a unified schema to simplify subsequent operations.

In block 904, the processing system may encrypt the input dataset to generate encrypted data. For example, the processing system may perform encryption operations using symmetric algorithms, such as AES-256, which transform dataset contents from plaintext to ciphertext. In some embodiments, the processing system may encrypt each dataset by generating and associating unique cryptographic keys stored securely within a vault component including HSMs. For example, the processing system may retrieve encryption keys from secure key management modules to perform encryption. In some embodiments, the processing system may encrypt datasets by associating metadata such as cryptographic key identifiers, encryption algorithm parameters, or timestamps. In some embodiments, the processing system may be further configured to periodically rotate cryptographic keys according to defined policies to minimize security risks.

In block 906, the processing system may partition the encrypted data into multiple encrypted segments, each encrypted segment associated with a unique segment identifier. For example, the processing system may partition encrypted data into segments of uniform size determined according to system configuration policies and assign each segment a unique alphanumeric identifier to support subsequent tracking operations. In some embodiments, the processing system may dynamically adjust the size or number of encrypted segments based on dataset characteristics, anticipated access frequency, or current network conditions. For example, frequently accessed datasets may be partitioned into smaller segments for faster retrieval, whereas larger segments may be used when storage capacity remains abundant. In some embodiments, the processing system may partition encrypted data segments by generating redundancy information, such as parity bits, to improve fault tolerance. In some embodiments, the processing system may be further configured to embed segment identifiers in metadata stored within a distributed ledger for transparent auditing or recovery purposes.

In block 908, the processing system may distribute the encrypted segments across a plurality of decentralized storage nodes, in which each decentralized storage node stores and synchronizes at least one encrypted segment. For example, the processing system may select decentralized storage nodes according to predefined criteria such as network latency, available storage capacity, geographic location, or compliance attributes. In some embodiments, the processing system may distribute encrypted segments by evaluating real-time node performance metrics collected through node monitoring systems. For example, nodes demonstrating poor reliability or excessive latency may be avoided during segment distribution. In some embodiments, the processing system may distribute encrypted segments by replicating segments across multiple nodes to achieve data redundancy or fault tolerance. In some embodiments, the processing system may be further configured to monitor synchronization status of encrypted segments and autonomously reallocate segments to alternative nodes if node availability or reliability changes.

In block 910, the processing system may generate a token associated with the input dataset, in which the token may be a fungible token, a non-fungible token (NFT), or a SBT. For example, the processing system may mint an ERC-721 non-fungible token to represent unique identity or asset information within the input dataset. In some embodiments, the processing system may generate fungible tokens conforming to standards such as ERC-20 to represent fractional ownership interests in standardized assets, commodities, or renewable energy certificates. For example, renewable energy production information or carbon offsets may be represented as fungible tokens. In some embodiments, the processing system may generate SBTs to permanently link identity-related credentials or certifications to individuals or IoT devices, ensuring non-transferability and traceable identity associations. In some embodiments, the processing system may be further configured to embed identity references, asset provenance, or regulatory compliance information directly within token metadata.

In block 912, the processing system may embed metadata in the generated token, in which the metadata includes at least a reference to encrypted segments stored across the decentralized storage nodes, a data provenance identifier, and a timestamp. For example, the processing system may incorporate cryptographic hashes representing encrypted segment content, identifiers of corresponding storage nodes, and timestamps indicating dataset creation or modification into the metadata. In some embodiments, the processing system may embed metadata using cryptographic hashing algorithms, such as SHA-256, to verify segment integrity or support traceability of associated data or entities. In some embodiments, the processing system may embed metadata according to standardized schema definitions to maintain interoperability across diverse decentralized applications or DLT networks. In some embodiments, the processing system may be further configured to store metadata references within a tamper-evident distributed ledger to facilitate secure auditing and regulatory compliance validation.

In block 914, the processing system may mint the token on a DLT network (e.g., blockchain network, etc.) by executing a smart contract, in which the smart contract links token metadata to encrypted segments stored across the decentralized storage nodes. For example, the processing system may execute smart contracts deployed on DLT networks such as Ethereum or Solana to authenticate and mint tokens compliant with standards such as ERC-20 or ERC-721. In some embodiments, the processing system may mint tokens by executing smart contracts configured to validate cryptographic proofs included within token metadata prior to token issuance. In some embodiments, the processing system may be further configured to periodically audit token metadata and linkage to decentralized storage segments to maintain continuous verification of data authenticity and integrity on-chain.

In block 916, the processing system may provide, via the smart contract, access to the input dataset associated with the token based on predefined access permissions. For example, the processing system may execute smart contract logic that authenticates requests submitted by authorized entities, retrieves encrypted data segments from decentralized storage nodes, decrypts segments using private keys associated with the token, and reassembles the segments into the original dataset. In some embodiments, the processing system may provide data access by enforcing granular, role-based permissions encoded within the smart contract, including permissions associated with user identities or token ownership status. In some embodiments, the processing system may provide access using cryptographic verification techniques, such as attribute-based encryption or zero-knowledge proofs, that validate permissions without revealing underlying sensitive data. In some embodiments, the processing system may be further configured to log each access attempt, token usage, and dataset interaction activity within a DLT ledger to maintain auditable and tamper-evident records suitable for compliance monitoring or forensic analysis.

Systems that implement method 900 provide a secure and decentralized solution for representing assets or sensitive data as digital tokens stored within DLT networks. These solutions divide input data into securely encrypted segments distributed across multiple decentralized storage nodes. Tokens representing these datasets carry metadata linking them directly to the encrypted segments, data provenance information, timestamps, and strict access controls. Smart contracts manage the tokens, controlling who may access the data based on defined permissions. By securely distributing and managing data this way, the method 900 may significantly enhance security, transparency, and compliance, especially in environments sensitive to data integrity, regulatory demands, or potential cybersecurity threats.

Systems that implement method 900 integrate decentralized storage, DLT-based tokenization, and detailed metadata-driven access controls into a unified solution. Some solutions separate data storage, metadata management, and tokenization into distinct operations or use centralized databases that lack robust tracking of data provenance, rigorous enforcement of access permissions, or secure linkage of tokens to encrypted datasets. Rather than merely aggregating these separate components, method 900 embeds comprehensive metadata directly within DLT tokens and manages encrypted segments across decentralized storage nodes. This structured integration addresses shortcomings of existing systems, such as vulnerability to unauthorized access, ineffective provenance tracking, and insufficient compliance controls.

Method 900 improves computing system performance by securely distributing encrypted data segments across decentralized nodes and managing them through integrated DLT-based tokens. By segmenting and distributing data securely across multiple independent nodes, the system reduces vulnerability to data loss or unauthorized access, which commonly affects centralized storage solutions. In addition, embedding detailed metadata within DLT tokens streamlines data access and verification processes, reducing delays associated with centralized or manual data validation. The use of smart contracts to automate data handling and access control further improves computational efficiency, reduces network congestion, and provides transparent, auditable records of all data transactions. This results in a computing environment that operates faster, more securely, and more reliably compared to existing centralized or partially decentralized solutions.

FIGS. 10-17 are process flow diagrams illustrating methods 1000, 1100, 1200, 1300, 1400, 1500, 1600, 1700 for implementing an enhanced cryptocurrency wallet for improved token management and secure data access. In some embodiments, methods 1000, 1100, 1200, 1300, 1400, 1500, 1600, 1700 may be performed by a vault 236 or a processing system including one or more processors and components described in this application (e.g., FIGS. 1-6). The processing system may execute software or firmware to perform some or all operations of any of methods 1000, 1100, 1200, 1300, 1400, 1500, 1600, 1700. References to a "processing system" encompass alternative hardware configurations implementing portions or all of any of methods 1000, 1100, 1200, 1300, 1400, 1500, 1600, 1700.

These methods 1000, 1100, 1200, 1300, 1400, 1500, 1600, 1700 may integrate identity-based tokens, decentralized storage, consensus-driven event verification, and multi-signature authentication into a cohesive platform for improved data custody and operational integrity. Each addresses a specialized function (e.g., multi-signature document storage, region-based sub-tokenization, dynamic shard distribution, etc.) and may merge it with an identity-driven token framework that leverages cryptographic proofs and tamper-evident logging. Rather than isolating ledger-based data verification, token issuance, or secure node interactions, these embodiments connect them to create a single architecture that may handle identity, access controls, anomaly detection, and data retrieval with reduced reliance on centralized services.

The combined functionality may allow the systems and methods to achieve consistency across tasks such as token minting, data sharding, ledger-based auditing, adaptive resource allocation, and multi-signature authentication. For example, several embodiments may integrate direct references between identity tokens and distributed provenance records to allow user-owned credentials or assets to remain traceable through cryptographic hashes and hierarchical linking. This linkage supports real-time validations and dynamic reassignments of data shards based on network conditions or node performance metrics, while preserving auditability and compliance. The resulting framework may unify decentralized data management, secure token handling, and advanced event memorialization procedures in a manner not described in typical standalone systems.

Some embodiments may include methods of securely memorializing, tokenizing, and managing non-transferable identity-based token (also referred to as a SBT) linked to immutable event records. In some embodiments, the methods may include receiving a data input associated with an event. The data input may include event metadata such as a timestamp, an origin identifier, and event-specific information. The methods may further include generating a cryptographic hash of the data input, in which the cryptographic hash uniquely identifies the event and the associated metadata. In some embodiments, the methods may further include determining, based on a classification rule, whether to store the data input on-chain or off-chain. For on-chain storage, the processing system may encode the cryptographic hash and event metadata into a token metadata structure. For off-chain storage, the processing system may generate a storage pointer referencing an off-chain storage location and incorporate the storage pointer into the token metadata structure. The methods may further include creating a SBT representing the event, in which the SBT includes the token metadata structure cryptographically bound to an identity key associated with a decentralized identifier. The SBT may be stored on a blockchain ledger, providing immutability and traceability. In some embodiments, the methods may further include allowing secure querying of the SBT by authenticating a querying user based on an identity key linked to the decentralized identifier. The processing system may verify access permissions encoded in the token metadata structure, retrieve data associated with the token, including off-chain data referenced by the storage pointer, and reconstruct an event record including the event metadata and associated data. The processing system may provide the event record to the querying user in a human-readable format.

Some embodiments may include methods of managing digital assets and event-linked identity tokens in a decentralized computing environment. In some embodiments, the methods may include receiving a request from an entity to initiate a digital asset transaction, the request including an entity identifier associated with a decentralized identifier. In some embodiments, the methods may further include establishing a secure connection with a digital wallet associated with the entity identifier. The processing system may retrieve digital asset balances stored in a distributed ledger, in which the digital asset balances include at least one SBT linked to the decentralized identifier. In some embodiments, the methods may further include executing a smart contract to update at least one digital asset balance associated with the digital wallet in response to the transaction request, and generating an immutable transaction record including transaction metadata including a timestamp, a cryptographic hash, and an event reference identifier. The immutable transaction record may be stored in the distributed ledger, which maintains cryptographic integrity of the transaction metadata. In some embodiments, the methods may further include allowing an authenticated requestor to retrieve the immutable transaction record based on access permissions encoded in the smart contract.

In some embodiments, the methods may further include minting a SBT linked to the decentralized identifier, in which the identity-based token metadata references an event memorialization structure stored in a distributed computing system. In some embodiments, event records associated with the event memorialization structure may be distributed across multiple nodes in the distributed computing system, with each event record encrypted using an encryption key associated with the decentralized identifier. In some embodiments, the processing system may reconstruct an event record from encrypted data shards stored in the distributed computing system in response to an authenticated access request. In some embodiments, the methods may further include validating cryptographic provenance data associated with an event record prior to granting access. In some embodiments, the methods may further include integrating event records with an external platform via an API, allowing retrieval of event records based on authenticated requests. In some embodiments, the methods may further include adjusting storage distribution of encrypted data shards based on network conditions. In some embodiments, the methods may further include executing a token swap transaction validated by a decentralized exchange protocol, updating digital asset balances, and generating a swap transaction record stored in the distributed ledger.

In some embodiments, the processing system may store an encrypted document in a decentralized storage network and control document access using permissions encoded in the distributed ledger. In some embodiments, the methods may further include detecting an anomaly in an entity's activity pattern, generating an anomaly alert, and updating an event memorialization structure with the detected anomaly. In some embodiments, the processing system may display a visual representation of a hierarchical provenance record associated with the entity's digital asset transactions and identity tokens. In some embodiments, the methods may further include executing multi-signature transactions following verification of cryptographic signatures recorded in the distributed ledger. In some embodiments, the methods may further include verifying entity authentication credentials prior to granting access to identity-based tokens stored in the distributed ledger. In some embodiments, the methods may further include controlling access to digital asset balances using role-based access control policies stored in the distributed ledger. In some embodiments, the processing system may detect attempted modifications of immutable transaction records and generate alerts indicating potential security anomalies. In some embodiments, event records may be timestamped using a consensus mechanism supported by the distributed ledger, ensuring chronological consistency.

FIG. 10 is a process flow diagram illustrating a method 1000 of managing digital assets and SBTs with immutable event records using decentralized identifiers and DLT in accordance with some embodiments.

In block 1002, the processing system may receive user credentials associated with an entity identifier linked to a DID. For example, the processing system may obtain user login details, digital signatures, or cryptographic authentication tokens provided via an application programming interface (API) or a secure user interface. In some embodiments, the processing system may receive user credentials through biometric authentication techniques such as fingerprint scans or facial recognition. For example, biometric identifiers provided by the user may be verified against stored biometric templates associated with a decentralized identifier managed on the distributed ledger. In some embodiments, the processing system may receive user credentials by implementing multi-factor authentication methods combining passwords, digital tokens, or biometric data. In some embodiments, the processing system may be further configured to record credential verification events on the distributed ledger for auditing or compliance purposes.

In block 1004, the processing system may establish a secure connection with a digital wallet associated with the received entity identifier and decentralized identifier. For example, the processing system may initiate a cryptographically secured communication channel using protocols such as Transport Layer Security (TLS), mutual certificate verification, or public-private cryptographic key pairs exchanged between the wallet and processing system. In some embodiments, the processing system may establish the secure connection using dedicated HSMs configured to store and authenticate cryptographic keys securely. For example, the processing system may continuously monitor session security parameters, immediately detecting unauthorized access attempts or potential security threats. In some embodiments, the processing system may establish secure connections by verifying digital signatures generated by wallet endpoints using decentralized public key infrastructure (DPKI). In some embodiments, the processing system may be further configured to terminate secure connections automatically upon detecting unauthorized activities.

In block 1006, the processing system may retrieve digital asset balances stored in the distributed ledger and associated with the digital wallet. For example, the processing system may query DLT nodes or decentralized finance (DeFi) platforms through APIs configured to return asset balances, including cryptocurrencies, fungible tokens, NFTs, or SBTs linked specifically to the decentralized identifier. In some embodiments, the processing system may retrieve asset balances from multiple decentralized networks such as Ethereum, Solana, or Bitcoin, aggregating data into a unified portfolio representation. For example, the processing system may confirm legitimate asset ownership by verifying cryptographic proofs recorded on-chain. In some embodiments, the processing system may retrieve balances by independently validating DLT transaction records and asset provenance metadata to ensure accuracy. In some embodiments, the processing system may be further configured to store retrieved balances locally to expedite subsequent retrieval operations.

In block 1008, the processing system may authorize execution of a digital asset transaction involving the digital wallet by executing a smart contract on the distributed ledger. For example, the processing system may validate transaction details such as recipient wallet addresses, asset quantities, or transaction types by verifying user-provided cryptographic signatures against public keys stored in the decentralized identifier metadata. In some embodiments, the processing system may authorize asset transactions based on RBAC policies encoded within smart contracts deployed on the distributed ledger. For example, the processing system may confirm sufficient asset balances before transaction execution, enforcing predefined compliance rules via smart contract logic. In some embodiments, the processing system may authorize asset transactions by verifying event-based access restrictions or permissions defined explicitly in the metadata of identity-based tokens. In some embodiments, the processing system may be further configured to log all transaction authorization attempts and associated event references in an immutable audit ledger.

In block 1010, the processing system may generate an immutable transaction record including transaction metadata stored in the distributed ledger. For example, the processing system may create a structured record including unique transaction identifiers, cryptographic hashes (generated using algorithms such as SHA-256), timestamps established through a consensus mechanism, decentralized identifier references, participating wallet addresses, and references to associated event records. In some embodiments, the processing system may generate transaction records formatted according to decentralized token standards such as ERC-721 or ERC-20 to maintain compatibility within distributed ledger networks. For example, transaction records may embed regulatory compliance indicators or jurisdictional metadata to facilitate automated compliance audits. In some embodiments, the processing system may generate transaction records linked cryptographically to hierarchical provenance structures maintained on-chain, ensuring immutable and verifiable event histories. In some embodiments, the processing system may be further configured to digitally sign each transaction record to enhance authenticity and immutability.

In block 1012, the processing system may store the generated transaction record in a tamper-evident distributed ledger. For example, the processing system may broadcast transaction records to a decentralized DLT network using consensus algorithms such as PoS or DPOS, ensuring decentralized validation and immutable storage of transaction metadata. In some embodiments, the processing system may store transaction records by partitioning the ledger based on asset types, decentralized identifiers, or geographic compliance requirements to improve data retrieval performance. For example, cryptographic proofs or Merkle trees may be used to verify ledger consistency and validate transaction authenticity across distributed nodes. In some embodiments, the processing system may store transaction records by periodically auditing distributed ledger entries, confirming accuracy, compliance, and integrity of transaction histories. In some embodiments, the processing system may be further configured to provide secure, authenticated access to transaction records through interfaces governed by smart contract-encoded permissions, allowing authorized entities to retrieve and review immutable transaction details.

In some embodiments, the processing system may receive a request to mint a SBT uniquely linked to the decentralized identifier. For example, the processing system may invoke a smart contract on the distributed ledger to create identity-based tokens embedding metadata referencing event memorialization structures stored across decentralized nodes. The event memorialization structures may record granular event details, including timestamps, data changes, and origin identifiers.

In some embodiments, the processing system may distribute event records associated with identity tokens across decentralized nodes using encrypted shards secured by cryptographic keys derived from decentralized identifiers. For example, data redundancy may be achieved by replicating shards across geographically distributed storage nodes to enhance availability.

In some embodiments, the processing system may detect anomalies in entity activities, generating alerts recorded as events within the event memorialization structures linked to identity-based tokens. For example, role-based access controls encoded in smart contracts may restrict viewing or editing of event memorialization data to authorized entities.

In some embodiments, the processing system may reconstruct event records by securely retrieving and decrypting encrypted shards from decentralized nodes upon authenticated access requests. For example, cryptographic provenance data may be validated against hierarchical structures to ensure authenticity before granting access to event details.

In some embodiments, the processing system may display visual representations of hierarchical provenance records, illustrating relationships between identity-based tokens, digital asset transactions, and event memorialization data. For example, visualizations may be timestamped using consensus-based timestamps to support chronological verification and forensic analyses.

Systems that implement these methods may integrate decentralized identifiers, SBTs, and secure event memorialization through distributed ledger technology. This solution may address security, compliance, and scalability challenges in decentralized asset management systems. The system may function as a secure and decentralized solution to manage digital identities, digital assets, and transaction records and may promote security and transparency. Instead of reliance on centralized databases, the system may issue unique identity-linked tokens that securely represent individuals or entities and may link them to event histories and asset transactions that a tamper-evident ledger stores. The system may apply advanced cryptography and distributed storage to provide proof of identity and asset ownership, secure transaction execution, and immutable event records. This configuration may streamline regulatory compliance and audit processes and reduce risks of fraud, unauthorized access, or data breaches.

Solutions that manage digital identities and asset transactions commonly store information on centralized systems or separate identity verification and transaction processes across disconnected workflows. Such solutions, even when decentralized, do not combine identity management with a comprehensive record of events and create fragmented records and potential vulnerabilities from limited integration. In contrast, these embodiments may tie non-transferable identity tokens to decentralized identifiers and embed detailed event data on a unified tamper-evident ledger. This may link identity, asset management, and transaction events within a decentralized structure and overcome the fragmentation and coordination issues.

In addition, systems that implement these methods may lower processing overhead and improve computational efficiency by associating identity-linked tokens with immutable transaction and event records in a secure manner. Some systems may use redundant data verification and reconciliation across separate databases or transaction ledgers. This solution creates latency, inconsistencies, and vulnerability to malicious data alterations. Systems that implement method 1000 may reduce redundancy and verification complexity by using decentralized identifiers, cryptographically secured identity-based tokens, and consolidated event logs. The system accelerates identity verification, reduces transaction processing times, and improves data integrity. This solution may allow rapid anomaly detection and streamlines audit processes. It increases computational reliability and operational efficiency.

Figure 11A:
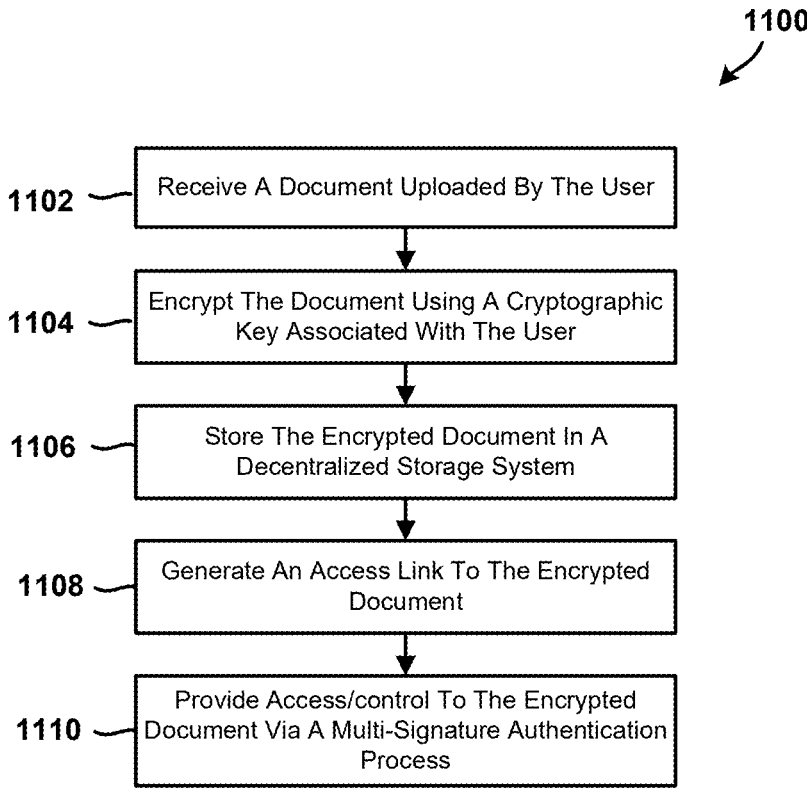
FIG. 11A is a process flow diagram illustrating a method of securely storing electronic documents using decentralized storage and enforcing access control through multi-signature authentication in accordance with some embodiments.

FIG. 11A is a process flow diagram illustrating a method 1100 of securely storing electronic documents using decentralized storage and enforcing access control through multi-signature authentication in accordance with some embodiments. The method 1100 may be performed by a processing system including one or more processors and the components described in this application (e.g., FIGS. 1-6). The processing system may execute software or firmware to perform some or all operations of method 1100. References to a "processing system" encompass alternative hardware configurations implementing portions or all of method 1100.

In block 1102, the processing system may receive a document uploaded by a user. For example, the processing system may accept electronic files including PDF documents, images, or text documents through a secure application interface accessed via a web browser or mobile device. In some embodiments, the processing system may retrieve documents automatically from cloud storage associated with a user account at scheduled intervals or when triggered by predefined events. For example, the processing system may periodically query cloud storage repositories linked to user credentials to collect recently modified documents. In some embodiments, the processing system may validate document formats, sizes, or metadata against predefined criteria to confirm compatibility with encryption and storage methods. In some embodiments, the processing system may be further configured to maintain audit records logging document uploads and associated user activities.

In block 1104, the processing system may encrypt the document using a cryptographic key associated with the user. For example, the processing system may apply a symmetric encryption algorithm such as Advanced Encryption Standard (AES-256) to generate encrypted data accessible only using the user's cryptographic key. In some embodiments, the processing system may use asymmetric encryption to generate a public-private key pair for securing the user's identity and data. For example, the private key may reside securely within dedicated HSMs or user-controlled secure storage devices. In some embodiments, the processing system may incorporate timestamps, user identity attributes, or document-specific metadata into the encryption key generation process. In some embodiments, the processing system may be further configured to periodically rotate encryption keys according to defined security policies to mitigate data exposure risks.

In block 1106, the processing system may store the encrypted document in a decentralized storage system. For example, the processing system may divide encrypted document data into segments and distribute these segments across decentralized nodes selected through a consensus mechanism or based on metrics such as availability, geographic location, and latency. In some embodiments, the processing system may replicate encrypted segments across geographically diverse nodes to achieve fault tolerance or jurisdictional compliance with data residency requirements. For example, multiple encrypted copies of a document may reside on nodes distributed across jurisdictions meeting specific regulatory standards. In some embodiments, the processing system may assign unique identifiers to encrypted segments and track these identifiers using metadata entries recorded in a distributed, tamper-evident ledger. In some embodiments, the processing system may be further configured to dynamically reallocate document segments from nodes identified as compromised or unresponsive to maintain secure and uninterrupted document availability.

In block 1108, the processing system may generate an access link to the encrypted document. For example, the processing system may create a secure Uniform Resource Locator (URL) that includes a cryptographic token uniquely identifying the storage location of the encrypted document within the decentralized network. In some embodiments, the processing system may embed time-bound or session-specific attributes within the access link to restrict document access to predefined periods or specific authenticated sessions. For example, the access link may include an expiration timestamp to prevent unauthorized prolonged document access. In some embodiments, the processing system may associate access links with specific user identities, digital wallets, or authorization tokens stored securely in a decentralized ledger. In some embodiments, the processing system may be further configured to monitor the use of access links and invalidate them automatically upon detection of suspicious activities or breaches of security rules.

In block 1110, the processing system may enforce access control to the encrypted document using a multi-signature authentication process. For example, the processing system may require a threshold number of digital signatures from authorized entities, such as the document owner and designated third parties, to authorize document decryption. In some embodiments, the processing system may embed multi-signature rules specifying required signatories into smart contracts executed on a DLT network. For example, the processing system may verify digital signatures submitted by each authorized participant against corresponding public keys stored within the smart contract before permitting document access. In some embodiments, the processing system may use threshold cryptographic schemes that require a predefined minimum number of valid signatures from authorized participants to grant document access. In some embodiments, the processing system may be further configured to log multi-signature authentication events, signatory approvals, and transaction validations in a tamper-evident distributed ledger to allow compliance auditing or forensic analysis.

Some embodiments address the shortcomings of conventional document storage methods by combining decentralized data distribution, encryption, and multi-signature authentication into one cohesive system. Instead of storing critical files on a single server prone to cyberattacks or hardware failure, these embodiments partition documents into encrypted segments and distribute them across geographically dispersed storage nodes. The result is a network architecture that avoids single points of failure, offers robust fault tolerance, and supports real-time adjustments in the face of compromised nodes or surging demand.

These embodiments solve key technical problems tied to centralized repositories. By requiring multiple independent cryptographic signatures for document decryption, multi-signature authentication prevents unauthorized access even if one signature or private key is compromised. Integration of distributed ledger technology (DLT) and smart contracts automates these authentication checks, thus reducing manual oversight, cutting down on approval delays, and creating a tamper-evident record of who accessed what data and when.

These embodiments also enhance security and reliability through ongoing key rotation, intelligent node monitoring, and dynamic reallocation of document shards. Key rotation may allow the system to regularly replace cryptographic keys, mitigating risks associated with key aging or suspected breaches. Meanwhile, node monitoring detects degraded performance or attacks in near real time, prompting the system to shift document segments away from at-risk nodes. This maintains uninterrupted data availability and lowers the chance of data theft or downtime due to localized failures. Further, the synergy of decentralized storage, cryptographic partitioning, multi-signature authentication, and adaptive resource allocation may provide measurable improvements over conventional systems. These include significantly lowered risks of large-scale data breaches, minimized retrieval latency through automated consensus-based approvals, and enhanced auditability for compliance needs.

Figure 11B:
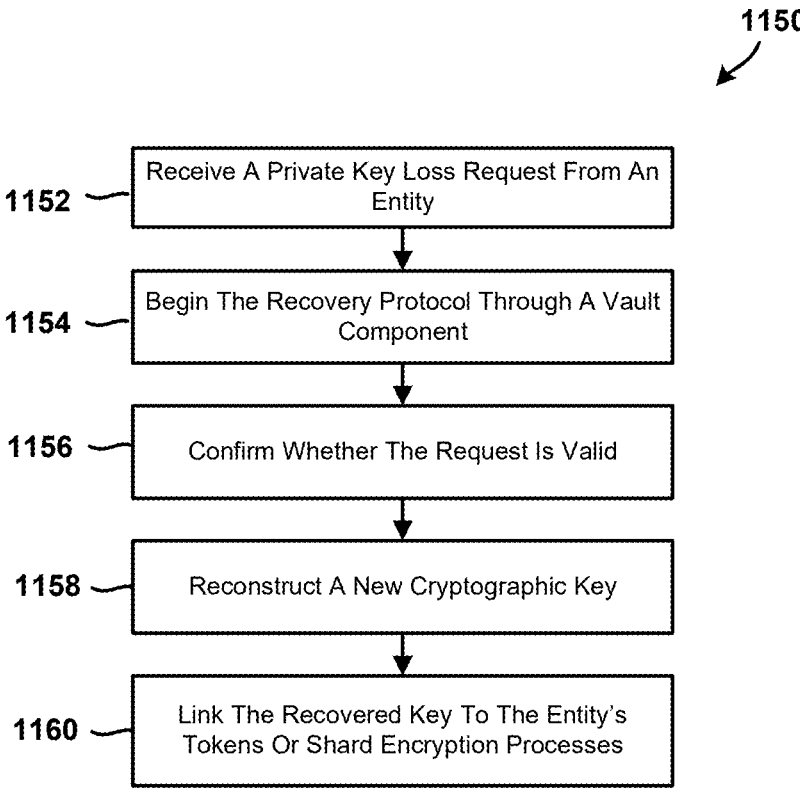
FIG. 11B is a process flow diagram illustrating a method 1150 dynamic multi-signature key recovery and social recovery workflows in accordance with some embodiments.

FIG. 11B is a process flow diagram illustrating a method 1150 dynamic multi-signature key recovery and social recovery workflows in accordance with some embodiments. Method 1150 may be performed by a processing system including one or more processors and related components described herein (e.g., FIGS. 1-6). The processing system may execute software or firmware to perform some or all operations of method 1150. References to a "processing system" encompass alternative hardware configurations implementing portions or all of method 1150.

In block 1152, the processing system may receive a private key loss request from an entity. For example, the processor may receive an electronic notification from an entity indicating that its decentralized identifier (DID), a unique cryptographic identifier stored on a distributed ledger, lost access due to compromise or hardware failure. The processing system logs a detailed ledger entry that includes the entity's DID, the timestamp of the request, and a unique reference number that facilitates tracking and auditability.

In block 1154, the processing system may initiate a recovery protocol through a vault component. For example, the processor may electronically communicate with social recovery agents or threshold signers designated previously by the requesting entity. Each agent may hold a partial cryptographic secret stored securely on separate hardware devices or secure enclaves. The processor may contact these agents electronically to request approval and collect their digitally signed partial secrets. The processing system may record each partial approval separately in the ledger along with the respective agent's identifier and timestamp.

In block 1156, the processing system may confirm the validity of the key loss request. For example, the shield component may examine past activity records or anomaly detection logs that highlight unusual access patterns, unauthorized attempts, or repeated failed access events related to the DID of the entity. The shield component may further consult predefined policy rules specifying the minimum number of social recovery agents or threshold signers necessary for recovery authorization. The processing system may update the ledger to reflect successful verification of the recovery request in compliance with these rules.

In block 1158, the processing system may reconstruct a new cryptographic key. For example, the processor may use threshold cryptography techniques to reconstruct a complete cryptographic key from the partial secrets provided by authorized signers. Each partial secret may contribute mathematically to recreate the full key. The processor may securely transfer the reconstructed key into the hardware security module within the vault component. The processing system may log an updated ledger reference that identifies the newly generated cryptographic key, its associated DID, and the time of creation.

In block 1160, the processing system may associate the reconstructed key with the entity's tokens or shard encryption processes. For example, the processor may update cryptographic references that control access to encrypted data shards or cryptographically secured tokens owned by the entity. The processor may direct future encryption or decryption operations involving these data shards or tokens to utilize the newly reconstructed cryptographic key. By updating these references in the ledger, the processing system may maintain seamless continuity and secure access, even after the original private key becomes unusable.

Figure 12A:
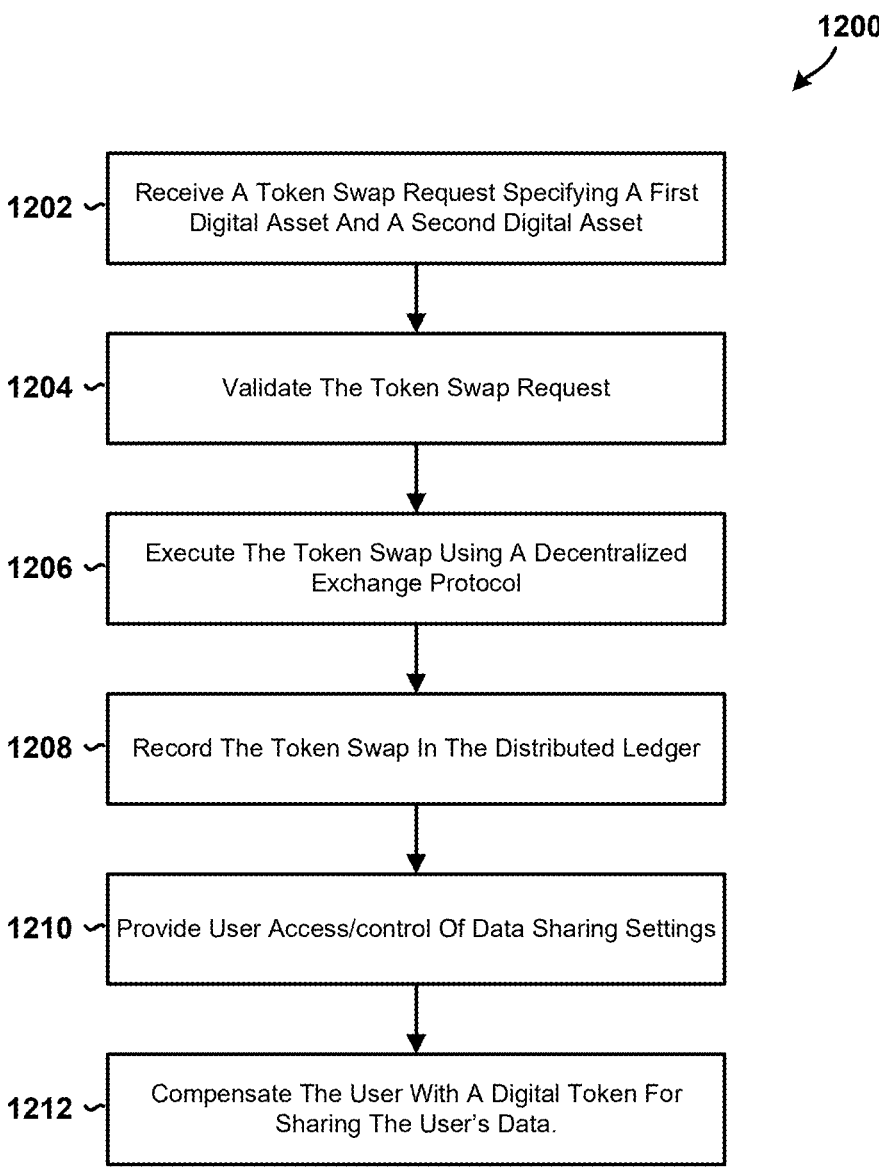
FIG. 12A is a process flow diagram illustrating a method of securely performing token swaps through decentralized exchange protocols integrated with distributed ledger technology in accordance with some embodiments.

FIG. 12A is a process flow diagram illustrating a method 1200 of securely performing token swaps through decentralized exchange protocols integrated with distributed ledger technology in accordance with some embodiments. Method 1200 may be performed by a processing system including one or more processors and related components described herein (e.g., FIGS. 1-6). The processing system may execute software or firmware to perform some or all operations of method 1200. References to a "processing system" encompass alternative hardware configurations implementing portions or all of method 1200.

In block 1202, the processing system may receive a token swap request specifying a first digital asset and a second digital asset. For example, the processing system may receive token swap requests through a secure application programming interface (API), where requests include identifiers and quantities for digital tokens or cryptocurrencies selected for exchange. In some embodiments, the processing system may receive token swap requests through decentralized applications (dApps) integrated with DLT networks such as Ethereum, Solana, or other compatible platforms. For example, the processing system may process token swap requests originating directly from digital wallets connected to decentralized exchanges (DEXs). In some embodiments, the processing system may receive token swap requests by authenticating cryptographic signatures to verify request authenticity. In some embodiments, the processing system may be further configured to securely log received token swap requests within an audit ledger to support compliance monitoring.

In block 1204, the processing system may validate the token swap request. For example, the processing system may confirm user authorization, verify sufficient asset balances, and ensure compliance with exchange rules and regulatory standards prior to executing the token swap. In some embodiments, the processing system may validate token swap requests by cryptographically verifying signatures associated with the user's digital wallet address. For example, the processing system may cross-reference the user's digital wallet public key with cryptographic signatures embedded within the request. In some embodiments, the processing system may validate requests by querying decentralized ledger nodes to verify asset ownership and confirm transaction authenticity. In some embodiments, the processing system may be further configured to record token swap validation events within a distributed ledger for subsequent auditing and compliance reporting.

In block 1206, the processing system may execute the token swap using a decentralized exchange protocol. For example, the processing system may interact with DLT-based smart contracts compatible with automated market maker (AMM) protocols, including Uniswap or PancakeSwap, to perform decentralized token exchanges without intermediaries. In some embodiments, the processing system may execute token swaps by calculating optimal exchange rates automatically based on real-time liquidity pool information retrieved from decentralized platforms. For example, the processing system may determine optimal swap paths according to asset pricing, pool liquidity, and network fees. In some embodiments, the processing system may execute swaps by routing transactions across multiple decentralized exchanges to minimize transaction slippage or enhance transaction efficiency. In some embodiments, the processing system may be further configured to securely record executed transaction confirmations generated by smart contracts in an auditable ledger for transparency and auditability.

In block 1208, the processing system may record the executed token swap in the distributed ledger. For example, the processing system may broadcast token swap transaction data—including asset identifiers, quantities exchanged, timestamps, and cryptographic proofs—to DLT nodes participating in consensus validation. In some embodiments, the processing system may record token swaps using decentralized consensus mechanisms such as PoS or DPOS protocols, maintaining the immutability and cryptographic integrity of transaction records. For example, the processing system may apply cryptographic hashing functions to generate unique identifiers for token swap transactions associated with the involved wallet addresses and assets. In some embodiments, the processing system may periodically audit token swap records within the distributed ledger to identify unauthorized changes, discrepancies, or potential security anomalies. In some embodiments, the processing system may be further configured to generate and store detailed audit trails that document transaction histories for regulatory compliance.

In block 1210, the processing system may provide users with configurable access control over data sharing settings. For example, the processing system may allow users to specify which entities may access shared data, define time-limited access periods, and select specific data fields authorized for sharing, with these conditions enforced by DLT-based smart contracts. In some embodiments, the processing system may implement user-configured data sharing rules through DLT-based smart contracts enforcing permissions directly on distributed ledger platforms. For example, the processing system may generate cryptographically secured agreements reflecting user-defined data sharing conditions recorded within the ledger. In some embodiments, the processing system may dynamically revoke or update sharing permissions automatically in response to user instructions or after defined expiration periods. In some embodiments, the processing system may be further configured to document all user-configured permissions and revocation events within the distributed ledger for traceability and auditing purposes.

In block 1212, the processing system may compensate users with digital tokens for authorizing data sharing. For example, the processing system may issue fungible tokens or NFTs as compensation when users share authorized data with designated entities, such as market researchers or advertisers. In some embodiments, the processing system may compensate users through DLT-based smart contracts configured to automatically issue tokens following verification of authorized data-sharing events. For example, the processing system may dynamically calculate compensation based on factors such as data sensitivity, volume, frequency, or user preferences encoded on-chain. In some embodiments, the processing system may securely distribute compensation tokens by interfacing directly with decentralized finance (DeFi) protocols or decentralized exchanges (DEXs) to facilitate transparent and verifiable compensation. In some embodiments, the processing system may be further configured to maintain detailed records of compensation transactions in the distributed ledger to support ongoing compliance validation and auditing.

Method 1200 provides a secure, automated process for performing digital token swaps within a decentralized exchange system that is integrated with DLT. It may allow users to exchange digital assets like cryptocurrencies without relying on central intermediaries, thereby enhancing transparency and security. The method includes various stages such as receiving and validating swap requests, executing the transaction using smart contracts, recording the transaction details in an immutable ledger, and offering users control over the sharing of their data. The system ensures trust and accountability by maintaining a tamper-proof record of every transaction and providing users with compensation for sharing their data. This solution may enhance the efficiency, privacy, and scalability of token swaps in a decentralized environment.

Many decentralized exchanges (DEXs) and DLT technologies and solutions do not integrate the concept of event-driven data sharing alongside token swaps. Traditional DEXs focus primarily on asset exchanges, but this solution adds a layer of controlled data sharing and incentivization tied to secure, verifiable transactions. The incorporation of real-time transaction validation, the use of decentralized identifiers (DIDs), and the cryptographic tracking of each token swap event provide an additional level of transparency and security. Further, the system's ability to dynamically adjust swap paths and optimize transaction routes based on real-time data to enhance liquidity and reduce transaction slippage.

Method 1200 may improve the performance of computing systems by integrating decentralized exchange protocols with distributed ledger technology in a highly efficient manner. By using smart contracts to automatically execute token swaps and log every transaction on an immutable ledger, the system reduces the need for manual intervention, minimizing human error and delays. This method optimizes the execution of trades by dynamically selecting the best route for token swaps based on current market conditions, thus reducing transaction fees and slippage. Moreover, the distributed nature of the system ensures that no single point of failure exists, making it more resilient, scalable, and secure compared to traditional centralized systems. As such, the system offers a faster, more reliable, and scalable solution for managing digital asset exchanges in a decentralized environment.

Figure 12B:
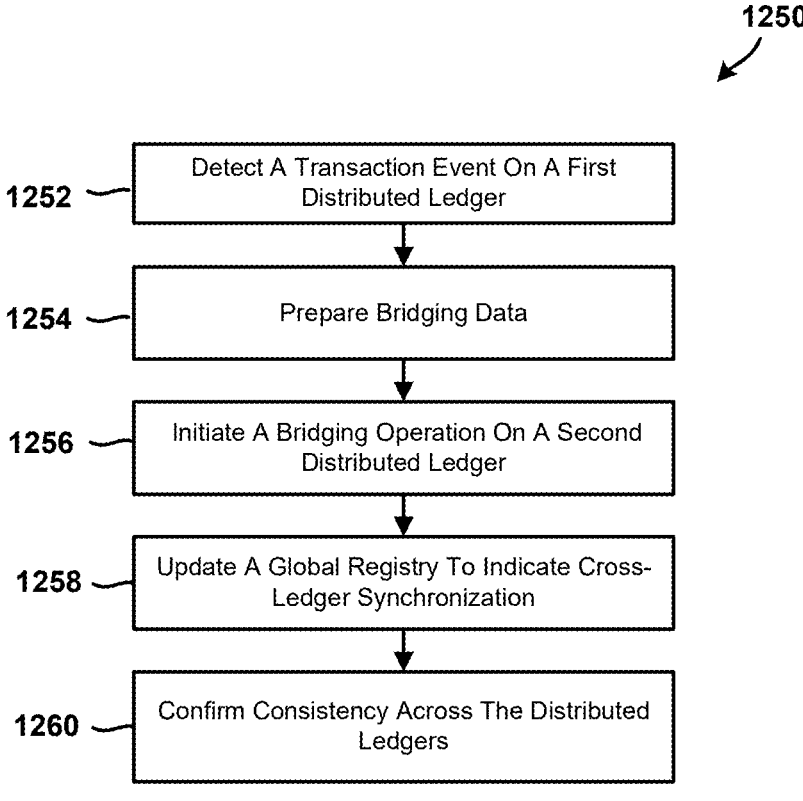
FIG. 12B is a process flow diagram illustrating a method of automated cross-chain bridging and global ledger synchronization in accordance with some embodiments.

FIG. 12B is a process flow diagram illustrating a method 1250 of automated cross-chain bridging and global ledger synchronization in accordance with some embodiments. Method 1250 may be performed by a processing system including one or more processors and related components described herein (e.g., FIGS. 1-6). The processing system may execute software or firmware to perform some or all operations of method 1250. References to a "processing system" encompass alternative hardware configurations implementing portions or all of method 1250.

In block 1252, the processing system may detect a transaction event on a first distributed ledger. For example, the processor may electronically monitor transaction records and detect the execution of a token transfer on a blockchain network such as Ethereum or Hyperledger Fabric. The processor identifies the specific transaction by extracting a transaction hash, a unique cryptographic identifier assigned at the time of submission, or by noting the corresponding ledger block number. The processing system electronically records a summary of this event, including the token amount, addresses of the sender and recipient, transaction timestamp, and block number, in bridging metadata stored securely in memory or a database.

In block 1254, the processing system may prepare bridging data. For example, the processor may collect cryptographic signatures from validator nodes that authorized the transaction event on the first distributed ledger. The processor may compile cryptographic proofs such as Merkle proofs or cryptographic attestations that confirm the event authenticity and ledger consensus. The bridging data also includes pointers referencing original transaction hashes or block numbers that facilitate later verification. The processor organizes these data elements into a structured bridging payload suitable for transfer and validation by a subsequent distributed ledger.

In block 1256, the processing system may initiate a bridging operation on a second distributed ledger. For example, the processor may electronically invoke a bridging smart contract on a secondary blockchain, such as Avalanche, Solana, or Polkadot, to replicate or reference the transaction previously recorded on the first ledger. The smart contract electronically retrieves the prepared bridging data, validates cryptographic signatures against known validator public keys, verifies Merkle proofs against previously committed blocks, and provides consistency between the bridging data and the initial transaction event. Upon successful validation, the smart contract updates ledger state on the second ledger accordingly.

In block 1258, the processing system may update a global registry to indicate cross-ledger synchronization. For example, after validation and successful completion of the bridging operation, the processor may electronically update a globally accessible registry or distributed data structure to reflect synchronized states. The processor records mirrored token balances, newly locked or unlocked tokens, or cryptographically referenced data objects now associated with the second ledger. The processor appends a bridging reference, including the transaction hashes from both ledgers, timestamps, and bridging metadata pointers, ensuring that future audits may reliably trace asset movements across ledger boundaries.

In block 1260, the processing system may confirm consistency across the distributed ledgers. For example, the processor may electronically execute a reconciliation operation comparing asset balances, cryptographic state hashes, or transaction counts between the first and second distributed ledgers. The processor confirms consistency through cryptographic verification of state proofs, balance confirmations, and bridging metadata. Once verified, the processing system electronically saves a bridging completion record in the global registry. This record includes final reconciled balances, cryptographic proofs, timestamps, and cross-references to ledger-specific transaction hashes, which provide transparency and facilitate subsequent audit trails or troubleshooting.

Figure 13A:
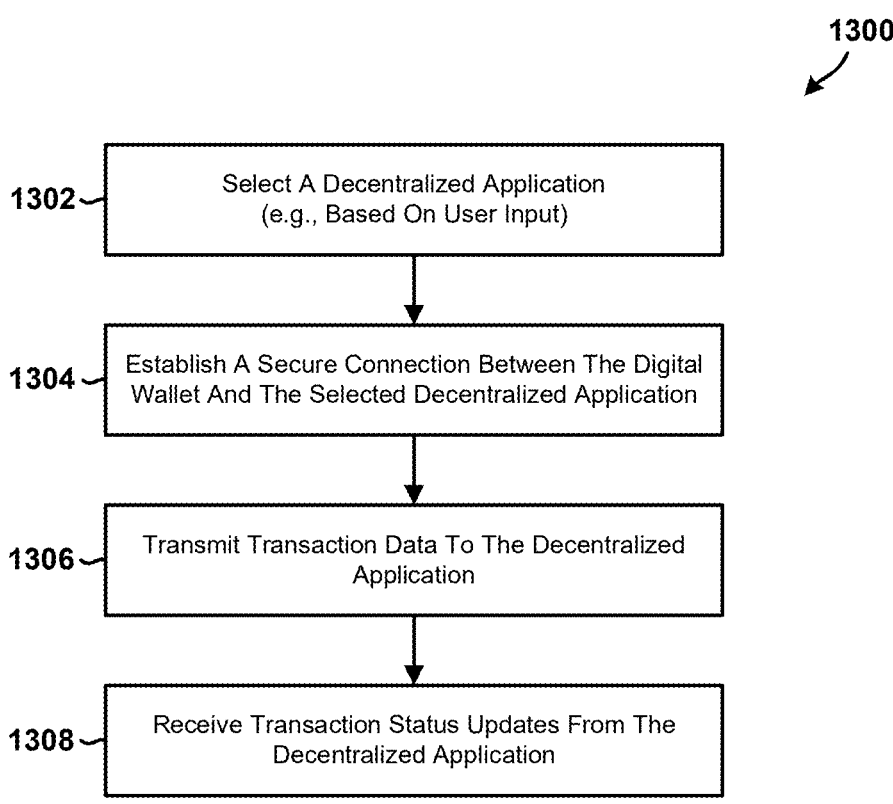
FIG. 13A is a process flow diagram illustrating a method of securely interacting with decentralized applications (dApps) via digital wallets integrated with distributed ledger technology in accordance with some embodiments.

FIG. 13A is a process flow diagram illustrating a method 1300 of securely interacting with decentralized applications (dApps) via digital wallets integrated with distributed ledger technology in accordance with some embodiments. The method 1300 may be performed by a processing system including one or more processors and components described in this application (e.g., FIGS. 1-6). The processing system may execute software or firmware to perform some or all operations of the method 1300. References to a "processing system" encompass alternative hardware configurations implementing portions or all of the method 1300.

In block 1302, the processing system may select a decentralized application. For example, the processing system may identify and select a decentralized finance (DeFi) application, a non-fungible token (NFT) marketplace, or DLT-based gaming platforms based on user-provided input through a graphical user interface (GUI) or application programming interface (API). In some embodiments, the processing system may automatically select a decentralized application based on predefined criteria such as user preferences, historical interaction patterns, or current network performance metrics. For example, the processing system may select applications demonstrating the lowest latency or highest reliability metrics within defined user preferences or criteria. In some embodiments, the processing system may select decentralized applications by retrieving previously used application preferences stored in user-specific digital profiles. In some embodiments, the processing system may be further configured to maintain an auditable record of decentralized application selections for regulatory compliance or activity tracking.

In block 1304, the processing system may establish a secure connection between the digital wallet and the selected decentralized application. For example, the processing system may initiate a secure session using cryptographic protocols such as Transport Layer Security (TLS), mutual certificate authentication, or decentralized wallet integration standards, including WalletConnect. In some embodiments, the processing system may establish secure connections by exchanging public-private cryptographic keys between the wallet and the decentralized application to authenticate sessions securely. For example, the processing system may validate exchanged cryptographic signatures to confirm secure and trusted interactions. In some embodiments, the processing system may establish secure connections through HSMs or secure enclave technologies configured to safeguard digital keys and sensitive data. In some embodiments, the processing system may be further configured to periodically verify connection security through cryptographic session integrity checks to detect potential compromise attempts.

In block 1306, the processing system may transmit transaction data to the decentralized application. For example, the processing system may send transaction requests or related metadata specifying digital asset identifiers, transaction amounts, recipient addresses, and cryptographic authorization signatures to the dApp for execution. In some embodiments, the processing system may transmit encrypted transaction data formatted in standardized DLT transaction schemas to ensure compatibility across multiple decentralized networks. For example, the processing system may encode transaction data using JSON-RPC or similar communication protocols compatible with DLT systems. In some embodiments, the processing system may transmit transaction data by routing transactions through decentralized relay networks to minimize network latency or congestion. In some embodiments, the processing system may be further configured to verify successful data transmission and log transaction transmissions to ensure transaction traceability or regulatory compliance.

In block 1308, the processing system may receive transaction status updates from the decentralized application. For example, the processing system may obtain status confirmations such as pending, completed, or failed transaction statuses directly from the decentralized application's transaction execution interface. In some embodiments, the processing system may receive transaction status updates via standardized APIs configured to report DLT confirmation statuses or consensus validation outcomes. For example, the processing system may receive transaction hash identifiers and cryptographic proofs validating successful DLT transaction confirmations. In some embodiments, the processing system may receive transaction status updates by querying decentralized ledger nodes or consensus validators to independently verify transaction statuses reported by decentralized applications. In some embodiments, the processing system may be further configured to record transaction status updates within a secure, tamper-evident distributed ledger to maintain comprehensive, auditable transaction histories.

Method 1300 provides a secure and efficient process for interacting with decentralized applications (dApps) using digital wallets integrated with distributed ledger technology. The method involves selecting a dApp based on user preferences or predefined criteria, establishing a secure connection between the digital wallet and the dApp using advanced cryptographic protocols, and transmitting transaction data such as digital asset details and cryptographic signatures. In addition, the system continuously monitors transaction statuses for secure and reliable interactions. Method 1300 enhances user experience by offering seamless, secure transactions, while leveraging the benefits of decentralized applications and DLT technology.

The embodiments integrate advanced cryptographic protocols for secure communication, dynamically select dApps based on user preferences and network performance, and incorporate real-time monitoring of transaction statuses. The embodiments securely exchange cryptographic keys and signatures between wallets and dApps while maintaining connection integrity.

Method 1300 may improve the performance and functioning of computing systems by allowing secure and efficient interactions with decentralized applications. By using advanced cryptographic techniques such as secure key exchanges and session integrity checks, the system mitigates risks of fraud or unauthorized access. The process also improves the efficiency of DLT transactions, as it provides compatibility across multiple decentralized networks and reduces latency. By automating dApp selection based on performance metrics, the method optimizes user interaction, allowing users access the most reliable applications. Overall, this leads to faster, more secure transactions, and a more robust decentralized ecosystem.

FIG. 13B is a process flow diagram illustrating a method 1350 of reentrancy attack prevention in automated smart contracts in accordance with some embodiments. The method 1350 may be performed by a processing system including one or more processors and components described in this application (e.g., FIGS. 1-6). The processing system may execute software or firmware to perform some or all operations of the method 1350. References to a "processing system" encompass alternative hardware configurations implementing portions or all of the method 1350.

In block 1352, the processing system may receive a smart contract call intended to modify token balances or shard references. For example, the processor may electronically receive a transaction request targeting an Ethereum ERC-20 smart contract. The processor parses input parameters, including the sender's address, recipient's address, token amount, shard identifiers, or data storage references associated with the request. The processor electronically records these parameters and places an initial transaction entry in a ledger-based transaction queue. The ledger-based queue electronically tracks pending operations sequentially and maintains transparency regarding contract interactions.

In block 1354, the processing system may electronically lock the execution state of the targeted smart contract to prevent reentrant calls. For example, the processor may electronically set an internal execution flag labeled 'executionActive' to 'true' within contract storage. The processor may electronically place a corresponding record in the tamper-evident ledger, reflecting the locked state of the contract. This state may prevent subsequent contract invocations from executing concurrently. If a concurrent call occurs while the execution state remains active, the processing system may electronically detect the locked state and rejects the transaction, preventing unauthorized recursive operations.

In block 1356, the processing system may electronically execute the primary logic contained within the smart contract call. For example, the processor may electronically modify token balances by decrementing the sender's balance and incrementing the recipient's balance, updating these records within the distributed ledger. In addition, the processor may electronically update data shard pointers or finalize write operations to a decentralized storage network, such as IPFS or Filecoin. During this operation, the processor electronically enforces the locked state established previously. If another invocation of the contract arrives while 'executionActive' remains set, the processor electronically identifies this second call and denies its execution to maintain contract state integrity.

In block 1358, the processing system may electronically finalize or revert the transaction based on contract execution outcomes. For example, upon successful execution of the primary contract operations, the processor may electronically reset the execution flag 'executionActive' to 'false', releasing the contract state and permitting subsequent legitimate calls. Alternatively, if the processor electronically detects a forbidden reentrant invocation during the active execution phase, the processor immediately reverts the state changes to their original conditions, restoring token balances and shard references. Each finalized or reverted transaction outcome receives an individual entry electronically recorded in the ledger, including status indicators, timestamps, and involved addresses.

In block 1360, the processing system may electronically append a comprehensive transaction record to a tamper-evident ledger for transparency and future verification. For example, the processor may electronically create and store a detailed record containing the final contract state, including balances of affected tokens, shard pointers, transaction outcome status, timestamp, and cryptographic references such as Merkle roots or transaction hashes. This electronic record provides a verifiable and immutable audit trail, allowing system participants or external auditors to confirm transaction validity and to verify that the reentrancy prevention mechanism consistently protects smart contract states from unauthorized recursive modifications.

Figure 14:
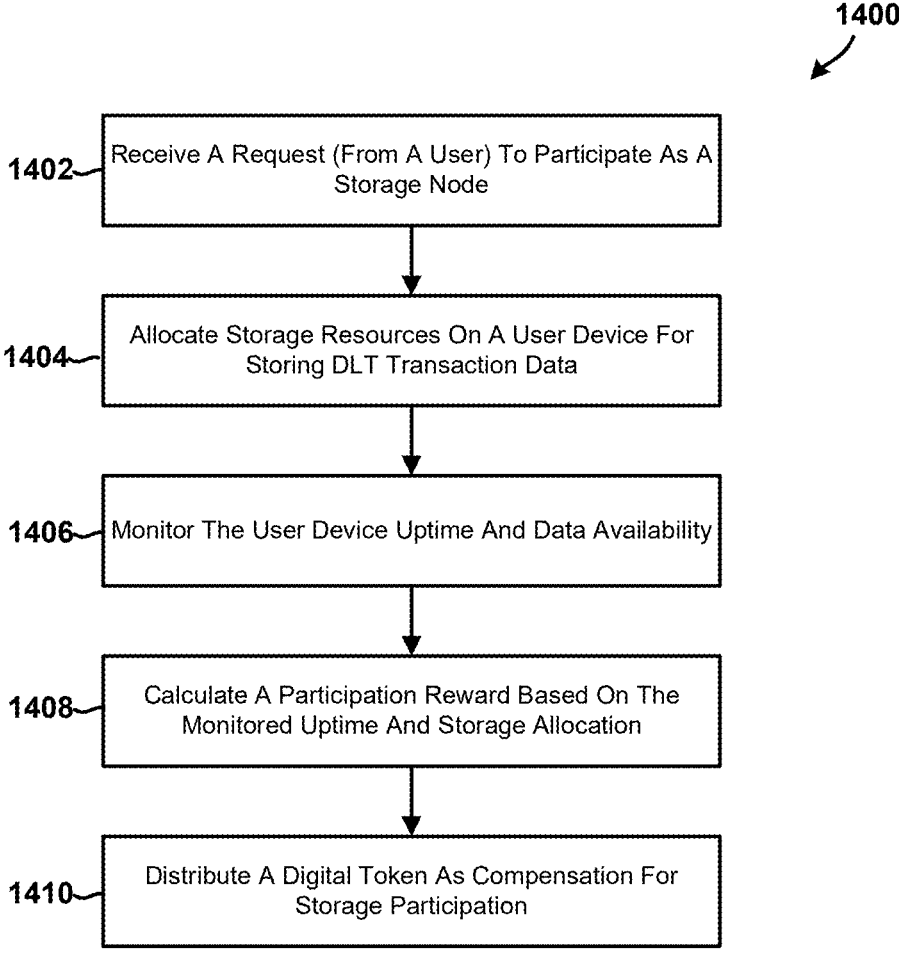
FIG. 14 is a process flow diagram illustrating a method of incentivizing decentralized storage participation within DLT networks through digital token compensation in accordance with some embodiments.

FIG. 14 is a process flow diagram illustrating a method 1400 of incentivizing decentralized storage participation within DLT networks through digital token compensation in accordance with some embodiments. The method 1400 may be performed by a processing system, which includes one or more processors and components described in this application (e.g., FIGS. 1-6). The processing system may execute software or firmware to perform some or all operations of the method 1400. References to a "processing system" encompass alternative hardware configurations that implement portions or all of the method 1400.

In block 1402, the processing system may receive a request from a user to participate as a storage node. For example, the processing system may receive participation requests through a user interface, mobile application, or application programming interface (API) provided to users wishing to allocate device resources to decentralized storage. In some embodiments, the processing system may automatically detect available storage resources on user devices and prompt users to participate as storage nodes based on resource availability. For example, the processing system may periodically query user devices to assess available disk space or network bandwidth. In some embodiments, the processing system may receive participation requests by verifying user identity through decentralized identifiers (DIDs) and cryptographic authentication methods such as digital signatures or biometric authentication protocols. In some embodiments, the processing system may be further configured to log user participation requests in a secure distributed ledger, facilitating auditing, regulatory compliance, and the creation of immutable event records associated with the participation.

In block 1404, the processing system may allocate storage resources on a user device for storing DLT transaction data. For example, the processing system may reserve disk space on the user's computing device or mobile device for securely storing transaction records, ledger data, or encrypted data segments associated with DLT networks. In some embodiments, the processing system may allocate storage resources dynamically by evaluating device performance metrics, such as storage availability, network speed, or processing capabilities. For example, the processing system may adjust allocated storage space based on real-time monitoring of device utilization. In some embodiments, the processing system may allocate resources by partitioning storage space into dedicated segments exclusively reserved for DLT-related data to prevent interference with user operations. The processing system may also apply cryptographic encryption techniques to the data stored, ensuring data integrity and confidentiality, as well as linking the data to immutable event records stored on the decentralized ledger.

In block 1406, the processing system may monitor the user device uptime and data availability. For example, the processing system may periodically check device availability status by sending heartbeat signals or querying network status indicators to confirm continuous connectivity and storage accessibility. In some embodiments, the processing system may monitor storage availability by retrieving status reports generated by software agents running on user devices, which indicate device uptime or performance metrics. In some embodiments, the processing system may apply machine learning models trained on historical performance data to predict future availability patterns. In some embodiments, the processing system may be further configured to record uptime monitoring results in a distributed ledger, forming part of an immutable event history linked to the entity's DID. These records may include timestamps, cryptographic hashes, and event reference identifiers to guarantee data integrity and facilitate auditing.

In block 1408, the processing system may calculate a participation reward based on the monitored uptime and storage allocation. For example, the processing system may compute rewards proportionally according to the user's total storage space allocated, device availability percentage, and continuous participation duration. In some embodiments, the processing system may calculate rewards using predetermined reward rate formulas or smart contract logic deployed on DLT networks, with rewards linked to the performance of SBTs. The smart contract may adjust rewards based on predefined thresholds, such as achieving continuous uptime for specified durations or meeting other network participation criteria. In some embodiments, the processing system may periodically audit calculated rewards using cryptographic proofs or DLT records to ensure fairness and compliance with the reward policies.

In block 1410, the processing system may distribute a digital token as compensation for storage participation. For example, the processing system may transfer cryptocurrency tokens, utility tokens, or fungible DLT assets directly to digital wallets linked to participating users upon validating their performance metrics. In some embodiments, the processing system may distribute digital tokens automatically via smart contracts executing token transfers upon successful verification of storage participation metrics stored in a distributed ledger. Tokens may be minted as SBTs linked to a DID, ensuring that the compensation records are immutable and auditable. The system may further generate event records related to token distribution, including timestamps, cryptographic hashes, and references to associated event histories, which are stored in the distributed ledger. This guarantees transparency and provides a verifiable trail for auditing and compliance purposes. In addition, the processing system may securely interact with decentralized finance (DeFi) protocols or decentralized exchange (DEX) networks to facilitate token distribution and liquidity.

Method 1400 incentivizes participation in decentralized storage networks by rewarding users with digital tokens based on their storage contributions. It may allow users to allocate their device's storage to help store DLT data, and in return, they receive tokens as compensation. The system tracks factors such as device uptime, storage availability, and network performance to determine rewards, ensuring fair and transparent compensation. By utilizing DLT technology and smart contracts, the system automates reward distribution and enhances the reliability of decentralized storage networks, making them more scalable and accessible. These embodiments may help address the challenges of centralized data storage by leveraging the collective power of individual devices.

Some decentralized storage solutions only provide basic token-based compensation or storage allocation, but not a more dynamic and performance-driven reward system. Unlike these systems, method 1400 adjusts rewards based on real-time monitoring of multiple device performance metrics, such as available storage space and network bandwidth. By integrating these factors with decentralized DLT records, it offers a more precise and fair way to compensate users for their participation. Moreover, the use of smart contracts to automatically distribute tokens based on validated performance records provides transparency and reduces the risk of manipulation, creating a more reliable and equitable system.

FIG. 15A is a process flow diagram illustrating a method 1500 of securely memorializing events using SBTs cryptographically linked to immutable event records in accordance with some embodiments. The method 1500 may be performed by a processing system including one or more processors and components described herein (e.g., FIGS. 1-6). The processing system may execute software or firmware to perform some or all operations of method 1500. References to a "processing system" encompass alternative hardware configurations implementing portions or all of method 1500.

In block 1502, the processing system may receive a data input associated with an event. For example, the processing system may receive event metadata including a timestamp of event occurrence, an origin identifier associated with an entity, and specific event details such as digital asset transaction parameters. In some embodiments, the processing system may receive the data input through a secure interface accessed by entities using digital wallets associated with decentralized identifiers (DIDs). In some embodiments, the processing system may authenticate the received data input by verifying cryptographic signatures generated using private keys linked to the DID. In some embodiments, the processing system may be further configured to record audit logs capturing the received data input, associated DID, and authentication outcomes to support regulatory compliance and auditing.

In block 1504, the processing system may generate a cryptographic hash of the data input. For example, the processing system may apply a secure hashing algorithm such as SHA-256 to generate a cryptographic hash uniquely identifying the event metadata, timestamp, origin identifier, and event-specific information. In some embodiments, the processing system may generate the cryptographic hash by concatenating event metadata elements into a serialized format prior to hashing. In some embodiments, the processing system may generate the cryptographic hash by including cryptographic salts or nonce values for increased uniqueness and security. In some embodiments, the processing system may be further configured to temporarily store cryptographic hashes in a secure cache to expedite subsequent validation or query operations.

In block 1506, the processing system may determine, based on a classification rule, whether the data input may be stored on-chain or off-chain. For example, the processing system may evaluate event metadata characteristics such as data size, sensitivity, regulatory obligations, or storage cost constraints against predefined classification rules to determine suitable storage placement. In some embodiments, the processing system may apply classification rules implemented through machine learning models trained on historical event data. In some embodiments, the processing system may determine storage placement by applying rules encoded in smart contracts governing data storage and event memorialization. In some embodiments, the processing system may be further configured to periodically update the classification rules based on system performance analysis or regulatory policy changes.

In block 1510, the processing system may encode the cryptographic hash and event metadata into a token metadata structure in response to determining the data input may be stored on-chain. For example, the processing system may create a standardized token metadata record including the cryptographic hash, timestamp, origin identifier, and event-specific information formatted according to blockchain standards such as JSON. In some embodiments, the processing system may digitally sign the token metadata structure using cryptographic keys associated with the entity's decentralized identifier. In some embodiments, the processing system may encode compliance-specific fields within the token metadata structure to support regulatory audits. In some embodiments, the processing system may be further configured to validate the token metadata structure against blockchain protocol requirements prior to submission.

In block 1512, the processing system may generate a storage pointer referencing an off-chain storage location and incorporate the storage pointer into the token metadata structure in response to determining the data input may be stored off-chain. For example, the processing system may generate a secure Uniform Resource Identifier (URI) linking to an off-chain storage repository on a decentralized storage network such as IPFS or Filecoin. In some embodiments, the processing system may generate storage pointers by embedding cryptographic keys, access permissions, or identity-related metadata to manage secure retrieval of off-chain data. In some embodiments, the processing system may verify storage pointer availability periodically and dynamically update pointers to maintain continuous access to off-chain data. In some embodiments, the processing system may be further configured to encrypt off-chain data using encryption keys derived from the decentralized identifier before storage.

In block 1514, the processing system may create a SBT representing the event, including the token metadata structure cryptographically bound to an identity key associated with the decentralized identifier. For example, the processing system may execute blockchain-based smart contracts deployed on DLT networks such as Ethereum to mint identity-linked, SBTs. In some embodiments, the processing system may create tokens by encoding non-transferability rules explicitly into the smart contract logic controlling token minting. In some embodiments, the processing system may cryptographically bind tokens to the decentralized identifier by signing token metadata structures using the private identity key associated with the DID. In some embodiments, the processing system may be further configured to record token creation metadata, including timestamps and issuer identifiers, onto the distributed ledger to support auditing and traceability.

In block 1516, the processing system may store the SBT on a distributed ledger. For example, the processing system may submit token data, cryptographic proofs, and metadata to blockchain nodes using decentralized consensus mechanisms, such as PoS, to provide token immutability, auditability, and decentralized storage. In some embodiments, the processing system may replicate token data across multiple geographically distributed blockchain nodes to enhance redundancy and fault tolerance. In some embodiments, the processing system may perform periodic ledger audits, verifying token integrity and detecting unauthorized modifications. In some embodiments, the processing system may be further configured to detect anomalies in ledger data and generate security alerts upon identifying potential integrity violations.

In block 1518, the processing system may securely query the SBT by authenticating a querying entity based on an identity key linked to the decentralized identifier and verifying access permissions encoded in the token metadata structure. For example, the processing system may authenticate querying entities by verifying cryptographic signatures generated using private identity keys stored within entity-controlled digital wallets. In some embodiments, the processing system may verify access permissions embedded in smart contract rules governing token metadata and token querying. In some embodiments, the processing system may reference RBAC policies defined in the token metadata structure to enforce differentiated access to token information. In some embodiments, the processing system may be further configured to record token query events, including timestamps and entity identifiers, within the ledger to facilitate compliance audits.

In block 1520, the processing system may retrieve data associated with the token, including off-chain data referenced by the storage pointer, and reconstruct an event record including event metadata and associated data. For example, the processing system may securely retrieve encrypted data shards from decentralized storage locations referenced by storage pointers and decrypt them using cryptographic keys derived from the DID, reconstructing a complete event record. In some embodiments, the processing system may reconstruct event records by intelligently routing data retrieval requests across decentralized nodes based on node availability or response time metrics. In some embodiments, the processing system may validate data integrity prior to reconstruction by verifying cryptographic hashes stored in token metadata. In some embodiments, the processing system may be further configured to log reconstruction activities within the ledger for auditing and anomaly detection purposes.

In block 1522, the processing system may provide the event record to the querying entity in a human-readable format. For example, the processing system may convert the reconstructed event record from encoded blockchain or storage formats into standardized, readable outputs such as PDF documents or structured JSON records displayed through secure user interfaces. In some embodiments, the processing system may provide interactive visualizations of the event provenance chain or hierarchical event structures to enhance readability and audit clarity. In some embodiments, the processing system may format event records to comply with standardized auditing frameworks and external reporting tools. In some embodiments, the processing system may be further configured to enforce differentiated visibility based on RBAC rules encoded in the token metadata structure when displaying event records.

FIG. 15B is a process flow diagram illustrating a method 1550 of hierarchical data provenance and complex event lineage in accordance with some embodiments. The method 1550 may be performed by a processing system including one or more processors and components described herein (e.g., FIGS. 1-6). The processing system may execute software or firmware to perform some or all operations of method 1550. References to a "processing system" encompass alternative hardware configurations implementing portions or all of method 1550.

In block 1552, the processing system may electronically create a parent record that represents an initial state of a dataset or digital asset. For example, the processing system may electronically select a raw data file such as customer transaction logs, medical records, or sensor-generated IoT data, the processing system then electronically calculates a cryptographic hash, such as a SHA-256 digest, of the original data to produce a unique digital fingerprint. In addition, the processing system electronically records associated metadata, including a timestamp of data creation and a unique record identifier. the processing system electronically stores this parent record within a distributed ledger system, such as a blockchain or permissioned ledger, establishing the baseline for data lineage tracking.

In block 1554, the processing system may electronically insert a child record directly referencing the previously created parent record. For example, the processing system may electronically apply modifications to the original dataset, such as correcting inaccuracies, adding supplementary information, or removing sensitive entries. After applying these changes, the processing system electronically computes a new cryptographic hash of the modified dataset. the processing system electronically links the child record by embedding a reference to the unique identifier or cryptographic hash of the parent record. In addition, an authorized entity, such as a data steward or system administrator, electronically signs the child record using digital signature techniques (e.g., ECDSA signatures). the processing system electronically appends this verified child record to the ledger, ensuring traceability and authorized modification.

In block 1556, the processing system may electronically create additional child branches referencing the same parent record to establish a hierarchical, tree-like data provenance structure. For example, multiple authorized entities may electronically create parallel or alternative modifications to the original dataset for distinct use cases, such as regulatory compliance, research analysis, or product testing scenarios. Each separate modification results in an electronically generated child record, each uniquely identified by a distinct cryptographic hash. the processing system electronically embeds references to the same parent identifier in each of these child records. As the processing system electronically appends each branch to the distributed ledger, the system develops a structured, hierarchical representation of divergent yet traceable data modifications.

In block 1558, the processing system may electronically validate the integrity and consistency of the entire hierarchical lineage structure. For example, the processing system may electronically perform a sequential recalculation of cryptographic hashes beginning from each child record, verifying each hash reference backward through all preceding parent records. the processing system electronically confirms that computed hashes match previously recorded ledger entries. If discrepancies occur, indicating unauthorized data tampering or ledger corruption, the processing system electronically records detailed entries regarding the nature and location of these discrepancies. The system electronically retains these discrepancy logs in the ledger, allowing future audits, regulatory compliance checks, or incident responses.

In block 1560, the processing system may electronically retrieve and present the complete hierarchical data lineage path upon request. For example, a requesting entity, such as a regulatory auditor or internal compliance officer, may electronically submit a query specifying a particular dataset or asset identifier. In response, the processing system electronically accesses the distributed ledger records, starting from the most recent child record and systematically traversing references back to the initial parent record. the processing system electronically compiles and presents a structured view, including each node's timestamp, cryptographic hash, metadata, and associated digital signatures. This comprehensive, electronically generated lineage history provides transparent documentation of data evolution and provides accountability for dataset modifications across multiple stages or branches.

Some embodiments may include methods for creating and managing SBTs linked to immutable event records, which may include receiving an input from an entity including a DID uniquely associated with the entity, invoking a smart contract deployed on a distributed ledger to mint an identity-based token linked to the DID (in which the identity-based token is non-transferable), and generating metadata for the identity-based token, the metadata including a reference to an event memorialization structure stored in a decentralized data storage system and cryptographic data for verifying the integrity of the metadata and the source chain. The method may further include storing the metadata and a link to the identity-based token in the decentralized data storage system, in which the system uses sharding techniques to distribute data across multiple nodes. The method may include memorializing an event associated with the entity by recording granular event details including a timestamp, data changes, and origin identifiers, and appending the event details to a hierarchical source chain maintained in the decentralized data storage system. In addition, the method may include providing access to the event details and the identity-based token through an interface configured to retrieve and reconstruct data shards from the decentralized data storage system in response to an authenticated request.

In some embodiments, the method may further include encrypting each data shard in the decentralized data storage system using an encryption key uniquely associated with the DID. In some embodiments, invoking the smart contract may further include specifying rules for restricting access to the identity-based token based on predefined conditions associated with the entity. In some embodiments, the source chain may include multiple event records, in which each record is linked to a preceding record using cryptographic hashes, forming an immutable chain. In some embodiments, the method may further include detecting an attempt to modify the source chain and generating an alert indicating a potential security anomaly. In some embodiments, the decentralized data storage system may improve data retrieval by implementing intelligent routing based on real-time network conditions and node availability. In some embodiments, the interface may include a vault configured to display the metadata of the identity-based token in a human-readable format and allow query-based retrieval of event details associated with the identity-based token.

In some embodiments, the method may further include verifying cryptographic provenance data of the metadata prior to granting access to the event details. In some embodiments, the method may further include integrating the identity-based token with an external platform via an application programming interface (API). In some embodiments, the hierarchical source chain may support branching structures, in which each branch represents a sub-event linked to a parent event in the chain. In some embodiments, the method may further include implementing a mechanism to prevent unauthorized transfer of the identity-based token by embedding non-transferability rules in the smart contract. In some embodiments, granular event details recorded during event memorialization may include an identifier of the entity initiating the event and a log of data changes associated with the event.

In some embodiments, the decentralized data storage system may ensure data redundancy by maintaining replicated shards across geographically distributed nodes. In some embodiments, the method may further include generating a visual representation of the source chain for display within the interface. In some embodiments, the metadata of the identity-based token may include compliance-related data for auditing and verification purposes. In some embodiments, appending the event details to the source chain may further include timestamping each event record using a consensus mechanism supported by the distributed ledger. In some embodiments, the method may further include dynamically adjusting the storage distribution of data shards based on system load and access patterns. In some embodiments, the decentralized data storage system may use access control mechanisms to restrict reconstruction of data shards to authorized entities. In some embodiments, the method may further include monitoring activity patterns associated with the entity to detect anomalies and updating the event memorialization structure based on detected anomalies. In some embodiments, the interface may provide role-based access control allowing differentiated levels of access to the identity-based token and associated event details.

Some embodiments may include systems and methods for creating and managing identity-based, non-transferable tokens linked to immutable event records.

Some embodiments may include methods of creating and managing SBTs linked to immutable event records. In some embodiments, the methods may include receiving from an entity an input including a decentralized identifier (DID) uniquely associated with the entity. The methods may further include invoking a smart contract deployed on a tamper-evident distributed ledger to mint a non-transferable identity-based token (e.g., a SBT) linked to the DID. In some embodiments, the methods may further include generating metadata for the identity-based token, in which the metadata includes a reference to an event memorialization structure stored in a distributed computing system and cryptographic provenance data allowing verification of the metadata. The processing system may store the metadata and a link to the identity-based token in the distributed computing system, which may use data sharding techniques to distribute data across multiple nodes. In some embodiments, the methods may further include memorializing an event associated with the entity by recording granular event details such as a timestamp, data changes, and origin identifiers, and appending the event details to a hierarchical provenance record maintained in the distributed computing system. The processing system may provide access to the event details and the identity-based token through an interface that retrieves and reconstructs data shards from the distributed computing system in response to an authenticated request.

In some embodiments, the methods may further include encrypting each data shard in the distributed computing system using an encryption key uniquely associated with the DID. In some embodiments, invoking the smart contract may further include specifying rules for restricting access to the identity-based token based on predefined conditions associated with the entity. In some embodiments, the provenance record may include multiple event records, each cryptographically linked to a preceding record using cryptographic hashes to form an immutable chain. In some embodiments, the methods may further include detecting an attempt to modify the provenance record and generating an alert indicating a potential security anomaly. In some embodiments, the distributed computing system may dynamically adjust storage distribution of data shards based on real-time network conditions and node availability. In some embodiments, the interface may include a vault configured to display metadata of the identity-based token in a human-readable format and allow query-based retrieval of associated event details. In some embodiments, the methods may further include verifying cryptographic provenance data of the metadata prior to granting access to event details. In some embodiments, the methods may further include facilitating integration of the identity-based token with an external platform via an application programming interface (API). In some embodiments, the hierarchical provenance record may support branching structures in which each branch represents a sub-event linked to a parent event. In some embodiments, the methods may further include preventing unauthorized transfer of the identity-based token by embedding non-transferability rules in the smart contract. In some embodiments, granular event details may include an identifier of the entity initiating the event and a log of data changes associated with the event. In some embodiments, the distributed computing system may maintain replicated shards across geographically distributed nodes to ensure data redundancy. In some embodiments, the methods may further include generating a visual representation of the provenance record for display within the interface. In some embodiments, metadata of the identity-based token may include compliance-related data to facilitate auditing and verification. In some embodiments, appending event details to the provenance record may further include timestamping each event record using a consensus mechanism supported by the tamper-evident distributed ledger. In some embodiments, the methods may further include monitoring activity patterns associated with the entity to detect anomalies and updating the event memorialization structure based on detected anomalies. In some embodiments, the interface may provide role-based access control allowing differentiated levels of access to the identity-based token and associated event details.

FIG. 16 is a process flow diagram illustrating a method 1600 of securely creating and managing SBTs linked to immutable event records in accordance with some embodiments. The method 1600 may be performed by a processing system including one or more processors and components described herein (e.g., FIGS. 1-6). The processing system may execute software or firmware to perform some or all operations of method 1600. References to a "processing system" encompass alternative hardware configurations implementing portions or all of method 1600.

In block 1602, the processing system may receive an input from an entity including a DID uniquely associated with the entity. For example, the processing system may obtain the DID via a secure application interface in response to a token minting request initiated by the entity through a digital wallet. In some embodiments, the processing system may receive the DID by verifying cryptographic signatures presented by the requesting entity, in which the signatures originate from private identity keys linked to the DID. In some embodiments, the processing system may receive the DID via an API integrated with an external decentralized application (dApp) or blockchain identity provider. In some embodiments, the processing system may be further configured to maintain audit logs capturing DID submissions, timestamps, and authentication outcomes for compliance and regulatory purposes.

In block 1604, the processing system may execute a smart contract deployed on a tamper-evident distributed ledger to mint a SBT linked to the DID. For example, the processing system may invoke blockchain-based smart contracts hosted on Ethereum or comparable blockchain platforms to securely create tokens explicitly tied to the DID. In some embodiments, the processing system may execute smart contracts by specifying embedded non-transferability rules that prevent unauthorized transfer of tokens after minting. In some embodiments, the processing system may mint tokens by cryptographically binding token data to the DID using digital signatures generated from private identity keys associated with the DID. In some embodiments, the processing system may be further configured to record token minting transactions and metadata, including timestamps and issuer details, directly on the distributed ledger.

In block 1606, the processing system may generate metadata for the identity-based token. For example, the processing system may generate token metadata structures that include references to event memorialization records stored in distributed computing systems and cryptographic provenance data allowing verification of metadata integrity. In some embodiments, the processing system may generate metadata by embedding URIs referencing off-chain storage repositories, such as IPFS nodes, holding encrypted event data linked to the token. In some embodiments, the processing system may include cryptographic digital signatures associated with the DID within metadata structures to facilitate metadata authenticity verification. In some embodiments, the processing system may be further configured to incorporate compliance-related metadata elements for regulatory reporting purposes into token metadata structures.

In block 1608, the processing system may store the metadata and a link to the identity-based token in the distributed computing system using data sharding techniques. For example, the processing system may distribute metadata and associated references across multiple decentralized storage nodes to reduce centralized vulnerability and increase system resiliency. In some embodiments, the processing system may encrypt each data shard using cryptographic keys derived from the DID before storage in decentralized nodes. In some embodiments, the processing system may dynamically distribute data shards based on network load conditions or node availability metrics, maintaining consistent data retrieval performance. In some embodiments, the processing system may be further configured to regularly verify shard integrity by applying cryptographic hashing techniques and updating storage nodes upon detecting discrepancies.

In block 1610, the processing system may memorialize an event associated with the entity. For example, the processing system may record granular event details such as timestamps, changes to data records, or entity identifiers initiating actions, and append these details to a hierarchical provenance record maintained within the distributed computing system. In some embodiments, the processing system may memorialize events by recording cryptographic hashes linking each event record to preceding records, thus creating an immutable chain of event history. In some embodiments, the processing system may memorialize events by using blockchain consensus mechanisms to timestamp each event, ensuring chronological accuracy. In some embodiments, the processing system may be further configured to detect attempts to alter the hierarchical provenance record and generate alerts indicating potential security anomalies.

In block 1612, the processing system may provide access to the event details and the identity-based token through an interface that retrieves and reconstructs data shards from the distributed computing system in response to an authenticated request. For example, the processing system may securely retrieve encrypted shards referenced by the token metadata structure, decrypt the shards using cryptographic keys derived from the DID, and present complete event records to authorized entities. In some embodiments, the processing system may reconstruct event records by intelligently routing retrieval requests across storage nodes based on real-time network conditions or node responsiveness metrics. In some embodiments, the processing system may validate data integrity prior to reconstruction by recalculating cryptographic hashes and comparing these to stored hash values. In some embodiments, the processing system may be further configured to enforce role-based access control policies defined in the token metadata structure when reconstructing and presenting event records.

FIG. 17 is a process flow diagram illustrating a method 1700 of securely performing digital asset transactions using SBTs linked to immutable transaction records in accordance with some embodiments. The method 1700 may be performed by a processing system including one or more processors and components discussed herein (e.g., FIGS. 1-6). The processing system may execute software or firmware to perform some or all operations of the method 1700. References to a "processing system" encompass alternative hardware configurations implementing portions or all of method 1700.

In block 1702, the processing system may receive a request from an entity to initiate a digital asset transaction. For example, the processing system may receive the request via a secure interface from an entity's digital wallet, in which the request includes an entity identifier explicitly linked to a DID. In some embodiments, the processing system may authenticate the request by verifying cryptographic signatures generated using private identity keys associated with the DID. In some embodiments, the processing system may receive the transaction request through decentralized applications (dApps) integrated with blockchain networks and connected via secure application programming interfaces (APIs). In some embodiments, the processing system may be further configured to record received transaction requests within an audit ledger stored on a decentralized ledger technology (DLT) network to support compliance auditing.

In block 1704, the processing system may establish a secure connection with a digital wallet associated with the entity identifier. For example, the processing system may initiate the connection using cryptographic protocols such as Transport Layer Security (TLS), mutual authentication, or decentralized wallet communication standards such as WalletConnect. In some embodiments, the processing system may establish the secure connection by exchanging cryptographic keys with the entity's digital wallet linked explicitly to the DID. In some embodiments, the processing system may establish secure connections by interacting with secure hardware modules or enclaves embedded within the entity's digital wallet. In some embodiments, the processing system may be further configured to periodically verify the security integrity of wallet connections by performing cryptographic session integrity checks.

In block 1706, the processing system may retrieve a set of digital asset balances stored in a distributed ledger. For example, the processing system may query decentralized ledger nodes or smart contracts to retrieve asset balances, including at least one SBT explicitly linked to the entity's decentralized identifier. In some embodiments, the processing system may retrieve balances by submitting secure queries to blockchain-based smart contracts managing asset ownership data. In some embodiments, the processing system may retrieve asset balances from multiple ledger nodes to validate data consistency and detect potential discrepancies. In some embodiments, the processing system may be further configured to cache retrieved balances temporarily to expedite response times during subsequent transaction requests.

In block 1708, the processing system may execute a smart contract to update at least one digital asset balance associated with the digital wallet in response to the transaction request. For example, the processing system may invoke blockchain-based smart contracts, deployed on networks such as Ethereum or Solana, to automatically update balances upon verifying transaction conditions, including asset ownership or available balances. In some embodiments, the processing system may execute smart contracts using decentralized consensus protocols, such as PoS, validating transaction authenticity and integrity. In some embodiments, the processing system may record asset balance changes directly on the distributed ledger to reflect transaction outcomes. In some embodiments, the processing system may be further configured to verify smart contract execution outcomes through cryptographic proofs prior to finalizing balance updates.

In block 1710, the processing system may generate an immutable transaction record including transaction metadata. For example, the processing system may generate a structured transaction record including a timestamp, a cryptographic hash uniquely identifying the transaction details, and an event reference identifier linking the transaction to associated event records stored on the ledger. In some embodiments, the processing system may generate transaction records by cryptographically hashing serialized transaction data structures compatible with blockchain data standards. In some embodiments, the processing system may timestamp transaction records using consensus protocols deployed on the DLT network to confirm chronological accuracy. In some embodiments, the processing system may be further configured to incorporate compliance-related metadata into transaction records to facilitate auditing.

In block 1712, the processing system may allow an authenticated requestor to retrieve the immutable transaction record based on access permissions encoded in the smart contract. For example, the processing system may authenticate requestors by verifying cryptographic signatures generated using identity keys explicitly associated with the decentralized identifier before providing access. In some embodiments, the processing system may enforce access permissions defined within smart contracts governing transaction records, allowing access only to entities meeting predefined conditions. In some embodiments, the processing system may reconstruct encrypted transaction records stored off-chain using decryption keys derived from the DID. In some embodiments, the processing system may be further configured to generate interactive visualizations of transaction histories presented via secure user interfaces, thereby supporting improved readability and auditability.

FIG. 18 is a process flow diagram illustrating a method 1800 of securely accessing, verifying, and managing SBTs and associated metadata stored within distributed computing systems in accordance with some embodiments. The method 1800 may be performed by a processing system including one or more processors and components described herein (e.g., FIGS. 1-6). The processing system may execute software or firmware to perform some or all operations of method 1800. References to a "processing system" encompass alternative hardware configurations implementing portions or all of method 1800.

In block 1802, the processing system may receive a request from a user device to access a token stored in a vault. For example, the processing system may receive the request via a secure application interface from a user device associated with a DID, in which the token references metadata stored in a distributed computing system using distributed storage methods. In some embodiments, the processing system may receive the request by verifying cryptographic signatures generated using private identity keys securely stored in the user's digital wallet. In some embodiments, the processing system may receive the access request through an application programming interface (API) integrated with decentralized wallet applications compliant with DLT protocols. In some embodiments, the processing system may be further configured to record the received access request, including the DID and request timestamp, within a distributed ledger to facilitate auditing and compliance verification.

In block 1804, the processing system may authenticate the user device by verifying credentials using a cryptographic protocol and establish a secure session. For example, the processing system may authenticate credentials by performing cryptographic verification using mutual digital certificate exchanges or identity-based public-private key exchanges linked explicitly to the DID associated with the user device. In some embodiments, the processing system may authenticate the user device by applying biometric authentication integrated with cryptographic protocols managed within the user's digital wallet. In some embodiments, the processing system may authenticate the user device using hardware-based security modules or secure enclaves embedded within the user device. In some embodiments, the processing system may be further configured to store logs capturing authentication events, including timestamps, user identifiers, and authentication results, for auditing purposes.

In block 1806, the processing system may query a node identified as including the authoritative version of the metadata and retrieve the metadata associated with the token from the distributed computing system. For example, the processing system may locate decentralized storage nodes including encrypted metadata shards referenced by the token's storage pointers, retrieve these shards, and decrypt them using encryption keys derived from the DID. In some embodiments, the processing system may retrieve metadata by querying decentralized nodes through intelligent routing methods that select nodes based on real-time availability or latency metrics. In some embodiments, the processing system may query decentralized storage nodes using cryptographic hashes stored within token metadata structures to verify the correct retrieval of data. In some embodiments, the processing system may be further configured to periodically validate node responsiveness and automatically reroute queries upon detecting node performance degradation.

In block 1808, the processing system may verify the integrity and provenance of the metadata by traversing a traceable provenance record stored within the distributed computing system. For example, the processing system may confirm metadata integrity by sequentially verifying cryptographic hashes that securely link each metadata record in an immutable hierarchical provenance chain associated with the token. In some embodiments, the processing system may verify metadata provenance by cryptographically validating digital signatures included with each metadata record, confirming association with the correct DID. In some embodiments, the processing system may traverse provenance records including multiple sub-events linked hierarchically to parent events and verify each event's integrity. In some embodiments, the processing system may be further configured to detect anomalies or unauthorized attempts to modify the provenance record and generate security alerts upon detecting such occurrences.

In block 1810, the processing system may present the metadata in a human-readable format to the user device (e.g., in a format customized based on a predetermined market vertical, etc.). For example, the processing system may transform metadata into standardized formats specifically optimized for finance, healthcare, real estate, or supply chain applications and display this information securely through user interfaces on web or mobile devices. In some embodiments, the processing system may generate interactive graphical interfaces displaying metadata provenance chains, event timelines, or hierarchical event relationships tailored to the market vertical. In some embodiments, the processing system may present metadata formatted according to regulatory compliance requirements specific to the relevant industry or jurisdiction. In some embodiments, the processing system may be further configured to enforce RBAC policies defined in the token metadata structure before presenting sensitive metadata information.

In block 1812, the processing system may perform an operation on the token, such as transferring the token, modifying the associated metadata, or retiring the token, according to the rules of the DLT protocol governing the token. For example, the processing system may execute blockchain-based smart contracts deployed on Ethereum or similar DLT networks, in which operations follow explicit protocol-defined conditions, identity-based permissions, and non-transferability rules. In some embodiments, the processing system may transfer tokens by verifying cryptographic signatures from sending and receiving entities, confirming both signatures against identity keys linked to respective DIDs. In some embodiments, the processing system may modify token metadata by appending new event records, updating the provenance chain with additional cryptographic hashes and timestamps. In some embodiments, the processing system may retire tokens by marking the token metadata structure as inactive or non-transferable using smart contracts, permanently prohibiting subsequent token transfers or modifications. In some embodiments, the processing system may be further configured to log all token-related operations, including timestamps, event identifiers, and involved entities' DIDs, within an immutable distributed ledger to support continuous regulatory auditing and compliance verification.

In some embodiments, tokens may be transferable if the smart contract logic permits such transfers under specific conditions. For example, a token that initially functions as an identity-based credential may become transferable upon the holder's completion of defined requirements, such as confirmation of ownership, user authentication, or satisfaction of protocol-based maturity events. In contrast, tokens categorized as non-transferable may be strictly linked to the identity keys of specific entities and encoded with rules that permanently forbid token transfers. These rules may be enforced at the contract level, where each attempted transfer requires validation of identity keys and compliance checks. If the rules fail, the token remains locked to the originating entity's DID, preventing unauthorized or unintended changes in token custody.

Depending on the DLT network or contract implementation, the system may dynamically update transferability based on external triggers or event data. For example, tokens representing time-sensitive credentials may switch from a non-transferable to a transferable state once an entity's role changes or a certain date is reached, as defined by contract logic. Another scenario may allow partial transfers of a token's associated rights, preserving certain identity-linked elements while delegating transferable components. These conditions may be noted in the token metadata that the system may reference at each transaction attempt to confirm compliance with the established rules.

FIG. 19 is a process flow diagram illustrating a method 1900 of securely generating, storing, and managing SBTs linked to off-chain metadata stored within distributed computing systems in accordance with some embodiments. The method 1900 may be performed by a processing system including one or more processors and components discussed herein (e.g., FIGS. 1-6). The processing system may execute software or firmware to perform some or all operations of method 1900. References to a "processing system" encompass alternative hardware configurations implementing portions or all of method 1900.

In block 1902, the processing system may generate a SBT on a DLT network using a predefined token standard. For example, the processing system may execute a smart contract deployed on a blockchain (e.g., Ethereum), in which the smart contract mints a token conforming to standards such as ERC-721 or ERC-1155, and includes a reference to off-chain metadata stored in a distributed computing system (e.g., IPFS). In some embodiments, the processing system may generate the token by cryptographically binding the token to a DID associated with an entity, using digital signatures derived from identity keys associated with the DID. In some embodiments, the processing system may generate tokens that include non-transferability rules explicitly defined within the smart contract logic, preventing unauthorized token transfers. In some embodiments, the processing system may be further configured to store an audit record of the token creation event-including timestamp and entity identifier-on the DLT ledger for compliance and auditing purposes.

In block 1904, the processing system may store off-chain metadata associated with the token in a distributed computing system. For example, the processing system may encrypt metadata related to the token, divide the metadata into multiple data shards, and distribute these encrypted shards across decentralized storage nodes within a network (e.g., IPFS, etc.). In some embodiments, the processing system may assign each stored metadata file or shard a cryptographic hash, uniquely identifying the data and securely linking it to the token via the token's reference (e.g., a URI). In some embodiments, the processing system may securely store metadata shards by encrypting the shards with cryptographic keys generated from the decentralized identifier, limiting access exclusively to authorized entities. In some embodiments, the processing system may be further configured to dynamically redistribute stored metadata shards according to real-time node availability, network performance metrics, or redundancy requirements.

In block 1906, the processing system may provide a secure mechanism to access the off-chain metadata using the reference included within the token. For example, the processing system may embed a Uniform Resource Identifier (URI) in the token metadata, in which the URI securely references metadata locations within decentralized storage nodes. In some embodiments, the processing system may implement secure application programming interfaces (APIs) integrated with decentralized wallets, allowing authorized entities to securely retrieve metadata after cryptographic authentication. In some embodiments, the processing system may authenticate metadata access requests by verifying cryptographic signatures created using private identity keys linked explicitly to the decentralized identifier associated with the token. In some embodiments, the processing system may be further configured to periodically verify the accessibility and integrity of the metadata stored in decentralized nodes, automatically updating the token's metadata references if storage nodes become unresponsive or compromised.

In block 1908, the processing system may maintain a traceable provenance record within the distributed computing system to provide auditability of the off-chain metadata. For example, the processing system may sequentially record metadata events—such as data creation, modification, or access—by appending cryptographic hashes that link each event to preceding events, creating an immutable and verifiable provenance chain. In some embodiments, the processing system may store provenance records with cryptographic digital signatures verifying the identity of entities involved in each event, explicitly linking each metadata modification to the decentralized identifier. In some embodiments, the processing system may construct provenance records supporting hierarchical branching, allowing tracking of parent events and associated sub-events, thus providing detailed audit trails. In some embodiments, the processing system may be further configured to detect unauthorized attempts to modify the provenance record and generate alerts in response to potential security anomalies.

In block 1910, the processing system may perform a user-initiated operation on the token to access or modify the off-chain metadata while complying with the predefined token standard. For example, the processing system may invoke blockchain-based smart contracts deployed on DLT networks, performing operations such as updating metadata content, retiring the token, or modifying metadata records.

In some embodiments, the processing system may update off-chain metadata by securely retrieving encrypted data shards, decrypting and modifying the metadata, and re-encrypting and storing updated shards across decentralized storage nodes. In some embodiments, the processing system may retire tokens by permanently marking metadata structures and token records as inactive or non-transferable within the smart contract logic, preventing subsequent modifications or transfers. In some embodiments, the processing system may be further configured to log details of all token operations—including timestamps, user decentralized identifiers, cryptographic hashes, and transaction information—in the immutable distributed ledger, supporting continuous compliance monitoring and auditing.

Some embodiments may include systems and methods for secure event memorialization, data integrity verification, and distributed ledger-based restoration in a distributed computing system.

Some embodiments may include methods for securely storing, accessing, and restoring data in a distributed computing system that include deploying a plurality of nodes, each node configured to store a respective shard of a dataset, in which the dataset is divided into multiple shards and each shard is encrypted using a unique encryption key. The method may further include memorializing an event associated with the dataset as a transaction within a distributed ledger, the transaction including a timestamp, metadata describing the event, and a cryptographic hash of the dataset. In addition, the method may include detecting, by one or more sensors deployed within the distributed computing system, an anomaly indicative of a tampering attempt, the anomaly identified based on a deviation from predefined operational thresholds. The method may further include generating an alert in response to the detected anomaly, the alert including a reference to the memorialized event and the detected deviation. The method may also include reconstructing the dataset by accessing the shards stored across the plurality of nodes using the unique encryption keys and verifying authenticity of the reconstructed dataset by comparing the cryptographic hash of the reconstructed dataset to the cryptographic hash memorialized in the distributed ledger. In addition, the method may include restoring the reconstructed dataset to a user device, in which the restored dataset retains its association with a unique identifier linked to the dataset's provenance.

In some embodiments, the method may further include propagating updates to the dataset across the plurality of nodes, in which a node holding an authoritative version of the dataset determines the updates to be propagated. The method may also include synchronizing the propagated updates with the memorialized event in the distributed ledger to maintain consistency across the plurality of nodes. In some embodiments, the method may further include executing a smart contract stored on the distributed ledger to validate access to the dataset, in which the smart contract enforces permissions based on an access control policy associated with the unique identifier. In some embodiments, the method may further include generating a replayable timeline of events for the dataset by iteratively accessing transactions memorialized in the distributed ledger, in which each transaction includes metadata linking the transaction to a prior event. The method may include displaying the replayable timeline to an authorized user through an interactive interface. In addition, the method may include allowing the user to select a specific event in the timeline to initiate reconstruction of the dataset at a state corresponding to the selected event.

In some embodiments, the method may further include generating an identity-linked token for an entity associated with the dataset, in which the identity-linked token is memorialized as a transaction within the distributed ledger. The method may also include linking the identity-linked token to the dataset's unique identifier. In addition, the method may include allowing an authorized entity to trade, sell, or exchange access to the dataset by transferring the identity-linked token according to the access control policy defined in the smart contract.

In some embodiments, tokens remain permanently non-transferable and cannot be reassigned to other entities, regardless of subsequent conditions. For instance, identity tokens linked to sensitive credentials or certifications may incorporate explicit rules prohibiting any changes to token ownership. These tokens may remain strictly associated with the original entity's DID so that they remain valid only for the user who meets the prescribed identity criteria. The smart contract may encode non-transferability rules that govern each attempted transfer, systematically rejecting attempts that fail to match the identity-bound conditions.

In other embodiments, a token may be initially designated as non-transferable but may transition to a transferable state after one or more contractual prerequisites are satisfied. For example, certain tokens might become transferable upon confirmation that the entity has fulfilled a defined milestone or permission level. Another solution may allow partial transfers, separating specific privileges linked to the token while leaving certain identity-bound attributes intact. These variations may be expressed as conditional statements in the token's metadata or within the logic of the governing smart contract, which validates whether an attempted transfer meets the indicated criteria before completing the transaction.

In some embodiments, detecting the anomaly may include monitoring data interactions within the distributed computing system using the sensors, which includes identifying patterns associated with unauthorized data modifications. The detecting may further include analyzing the monitored data interactions using a machine learning model trained to detect deviations indicative of tampering or re-entrancy attacks. In addition, detecting may include memorializing the anomaly as a transaction in the distributed ledger. In some embodiments, the method may further include using a content distribution network to optimize data access for users in geographically distant locations, in which the content distribution network routes requests to the node providing the lowest latency response. In addition, the method may include updating the content distribution network routing rules to account for changes in network conditions and node availability. In some embodiments, the unique identifier associated with the dataset may include a cryptographic key pair, the public key of the cryptographic key pair embedded in the metadata of the memorialized event. The unique identifier may also include a reference to an identity token stored on the distributed ledger, in which the identity token is non-transferable and tied to a specific entity.

In some embodiments, the method may further include generating an identity-linked token for an entity associated with the dataset, in which the identity-linked token is memorialized as a transaction within the distributed ledger. The method may also include linking the identity-linked token to the dataset's unique identifier. In addition, the method may include allowing an authorized entity to trade, sell, or exchange access to the dataset by transferring the identity-linked token according to the access control policy defined in the smart contract. In some embodiments, reconstructing the dataset may further include identifying inaccessible nodes among the plurality of nodes, dynamically rerouting data requests to accessible nodes, and using parity data stored within the distributed computing system to recreate shards corresponding to the inaccessible nodes. In some embodiments, the method may further include recording each modification to the dataset as an independent transaction within the distributed ledger, in which each transaction includes metadata linking the modification to the unique identifier. The method may also include allowing traceability of the dataset by sequentially retrieving transactions from the distributed ledger to construct a complete modification history. In addition, the method may include generating an audit report summarizing the modification history and providing the audit report to an authorized user.

FIG. 20A is a process flow diagram illustrating a method 2000 of securely distributing, monitoring, and reconstructing encrypted datasets using decentralized storage nodes and tamper-evident DLT in accordance with some embodiments. The method 2000 may be performed by a processing system including one or more processors and components discussed in this application (e.g., FIGS. 1-6). The processing system may execute software or firmware to perform some or all operations of method 2000. References to a "processing system" encompass alternative hardware configurations implementing portions or all of method 2000.

In block 2002, the processing system may deploy multiple decentralized nodes configured to securely store shards of an encrypted dataset. For example, the processing system may divide the dataset into multiple shards, encrypt each shard using a unique encryption key derived from a DID, and distribute each encrypted shard across geographically dispersed decentralized storage nodes operating on a network (e.g., IPFS, etc.). In some embodiments, the processing system may distribute dataset shards by selecting storage nodes based on factors including node availability, geographic dispersion, network latency, or redundancy policies. In some embodiments, the processing system may encrypt each dataset shard using encryption keys cryptographically derived from the decentralized identifier associated explicitly with the originating entity. In some embodiments, the processing system may be further configured to dynamically monitor storage node availability and reallocate shards automatically if node performance falls below predefined operational thresholds.

In block 2004, the processing system may memorialize an event associated with the dataset by recording a transaction in a tamper-evident distributed ledger. For example, the processing system may store the transaction on a blockchain ledger (e.g., Ethereum), in which each transaction record includes a timestamp, metadata describing the event (e.g., creation or modification), and a cryptographic hash uniquely identifying the encrypted dataset. In some embodiments, the processing system may generate cryptographic hashes using secure hashing algorithms (e.g., SHA-256) to reliably represent the dataset's state at the event timestamp. In some embodiments, the processing system may memorialize dataset-related events by digitally signing transaction metadata using a private identity key linked explicitly to the decentralized identifier. In some embodiments, the processing system may be further configured to periodically validate transactions recorded on the distributed ledger to detect potential unauthorized modifications or ledger inconsistencies.

In block 2006, the processing system may detect an anomaly indicative of a tampering attempt using sensors deployed within the distributed storage environment. For example, the processing system may monitor metrics such as data shard access patterns, storage node response times, cryptographic verification outcomes, or data retrieval attempts, and detect anomalies upon identifying deviations from predefined operational thresholds. In some embodiments, the processing system may detect anomalies by analyzing real-time operational metrics and comparing these metrics against historical baselines previously recorded in the distributed ledger. In some embodiments, the processing system may apply a machine learning model trained on historical node behavior data to identify subtle deviations indicative of potential tampering attempts or security anomalies. In some embodiments, the processing system may be further configured to record anomaly detection events—including detected metric deviations and associated timestamps—in the distributed ledger to allow traceable security audits.

In block 2008, the processing system may generate an alert in response to the detected anomaly. For example, the processing system may issue a secure notification referencing the memorialized event recorded in the distributed ledger, including details such as the nature of the deviation, dataset identifier, timestamp, and affected storage nodes. In some embodiments, the processing system may deliver anomaly alerts directly to authorized user devices or administrators using secure, encrypted messaging protocols. In some embodiments, the processing system may trigger smart contracts executed on the distributed ledger in response to anomaly detection, automatically initiating corrective actions or security measures. In some embodiments, the processing system may be further configured to store generated alerts in an immutable audit log maintained within the distributed ledger forensic analysis or compliance reporting.

In block 2010, the processing system may reconstruct the encrypted dataset by securely retrieving shards stored across decentralized storage nodes using respective unique encryption keys. For example, the processing system may securely access each shard from corresponding storage nodes, decrypt shards using cryptographic keys derived from the decentralized identifier, and combine the shards to reconstruct the complete dataset. In some embodiments, the processing system may confirm authenticity of the reconstructed dataset by recalculating its cryptographic hash and comparing the calculated hash against the cryptographic hash stored within the distributed ledger at the event timestamp. In some embodiments, the processing system may reconstruct datasets by intelligently selecting optimal storage nodes based on real-time node performance, availability, or latency metrics. In some embodiments, the processing system may be further configured to document reconstruction activities, including shard retrieval details, timestamps, cryptographic hash verification results, and node identifiers, within an audit ledger for continuous monitoring.

In block 2012, the processing system may restore the reconstructed dataset to an authorized user device, maintaining explicit association with a unique identifier linked to the dataset's provenance. For example, the processing system may securely transfer the verified dataset along with metadata including provenance information—including event timestamps, cryptographic hashes, and decentralized identifiers—to a secure application interface accessible by the user. In some embodiments, the processing system may restore datasets by encoding detailed provenance records within the dataset's metadata, allowing future validation and auditability. In some embodiments, the processing system may securely store the restored dataset within a cryptographically secured vault or digital wallet associated explicitly with the user's decentralized identifier. In some embodiments, the processing system may be further configured to periodically verify the restored dataset and associated provenance metadata on the user device, confirming ongoing integrity and compliance with predefined security protocols.

Some embodiments may include systems and methods for monitoring, tokenizing, and managing event data in a distributed system.

Some embodiments may include methods performed by a processing system for monitoring, tokenizing, and managing event data in a distributed system. In some embodiments, the methods may include deploying a plurality of modular sensors to a set of server systems within a distributed cloud architecture (in which each modular sensor is configured to monitor event data associated with one or more operations performed on a corresponding server system), defining, via a rules-based system, one or more event rules specifying conditions for capturing event data from the modular sensors (in which the event rules include criteria for detecting specific types of data events and parameters for performance management), aggregating the event data collected by the modular sensors into a decentralized storage system, (in which the decentralized storage system tokenizes the event data to generate immutable records that each include metadata that includes a timestamp, a source identifier, and a description of the event), shards the tokenized event data into segments distributed across a plurality of nodes, and associates each data segment with an identifier for lineage and provenance tracking, reconstructing a system state corresponding to a specified timestamp by retrieving and replaying tokenized event data from the decentralized storage system via a query console that is operable to retrieve, modify, and monitor the event data stored in the decentralized storage system, securing/restricting access to the modular sensors and query console by validating user permissions linked to identifiers through role-based access management (in which the processor determines whether requested operations are permitted based on the associated permissions and enforces restrictions by allowing or denying the operations accordingly), and generating an alert in response to detecting suspicious patterns in event data or unauthorized attempts to modify or delete data within the decentralized storage system.

In some embodiments, the methods may include encrypting the event data collected by the modular sensors prior to tokenization and encrypting data segments prior to their distribution across the plurality of nodes. In some embodiments, the decentralized storage system includes a content distribution network for optimizing access to the distributed data, and dynamic routing mechanisms for adjusting data retrieval paths based on network conditions and node availability. In some embodiments, tokenizing the event data includes generating a token representing an event memorialization, the token being a non-fungible token (NFT) or a SBT, and associating the token with metadata indicative of compliance attributes and the event's provenance. In some embodiments, the SBT is associated with a unique identifier linked to an entity or device, and the SBT remains non-transferable while preserving immutability of the event data.

In some embodiments, the methods may include integrating the modular sensors with a third-party platform via middleware, in which the middleware may allow document synchronization, orchestration, and Web3 application integration. In some embodiments, the rules-based system dynamically adjusts data collection thresholds based on predefined performance limits or detected workload variations. In some embodiments, the methods may include providing a visual interface displaying real-time metrics for modular sensor activity, aggregated event data, and node performance within the decentralized storage system, and allowing administrative actions via the interface, including pausing, resuming, or modifying modular sensor configurations. In some embodiments, the methods may include generating, by a billing module, a usage report based on a count of event data records processed by the decentralized storage system, a number of API calls made by external systems, and an operational status of the modular sensors over a predefined time period. In some embodiments, the decentralized storage system provides compliance verification by storing tokenized event data as immutable records within a blockchain ledger, the ledger allowing verification of operations performed on the monitored systems.

In some embodiments, the methods may include detecting a data modification request via the query console, validating the data modification request against role-based access permissions, and updating the decentralized storage system to reflect the modification while preserving the provenance of the original data. In some embodiments, the methods may include monitoring event data patterns indicative of ransomware activity using predefined security rules in the rules-based system, and generating an alert in response to detecting a pattern that matches the predefined security rules. In some embodiments, the decentralized storage system dynamically scales by orchestrating additional nodes using containerized microservices based on workload demand. In some embodiments, the query console may allow predefined or custom queries for retrieving specific subsets of tokenized event data from the decentralized storage system. In some embodiments, the methods may include validating, by the processor, an integrity status of the modular sensors using periodic health checks. In some embodiments, the methods may include receiving, via an API gateway, external data from a third-party system, and ingesting the external data into the decentralized storage system for analysis alongside the event data collected by the modular sensors.

FIG. 20B is a process flow diagram illustrating a method 2050 of monitoring, tokenizing, and managing event data in a distributed system in accordance with some embodiments. The method 2050 may be performed by a processing system including one or more processors and components discussed in this application (e.g., FIGS. 1-6). The processing system may execute software or firmware to perform some or all operations of method 2050. References to a "processing system" encompass alternative hardware configurations implementing portions or all of method 2050.

In block 2022, the processing system may deploy a plurality of modular sensors to a set of server systems within a distributed cloud architecture. For example, the processing system may deploy a modular sensor on each server system to gather event data that captures network interactions, file operations, or resource usage metrics. In some embodiments, the processing system may reference an orchestration script that defines target servers, sensor parameters, or deployment timing. For example, the processing system may use metadata that describes server configurations or roles to coordinate sensor placement and operation. In some embodiments, the processing system may deploy the modular sensors through a container-based solution that hosts each sensor in a lightweight container environment. In some embodiments, the processing system may record sensor deployment details in a distributed log to preserve a tamper-evident history of sensor locations.

In block 2024, the processing system may define one or more event rules that set conditions for capturing event data from the modular sensors. For example, the processing system may associate each rule with an event category, such as file access, system resource usage, or network connection attempts. In some embodiments, the processing system may define performance thresholds that trigger event data capture when certain CPU or memory usage parameters exceed specified levels. For example, the processing system may specify that sensor logs become active if CPU usage surpasses a threshold for longer than a set interval. In some embodiments, the processing system may define these event rules through a user-driven policy management interface that may allow administrators to set or modify rule conditions. In some embodiments, the processing system may store the event rules in a decentralized configuration repository. The repository may maintain an immutable record of rule versions.

In block 2026, the processing system may aggregate event data that the modular sensors collect into a decentralized storage system. For example, the processing system may transform raw sensor data into tokenized records that include a timestamp, a source identifier, and an event description. In some embodiments, the processing system may shard the tokenized records into multiple segments and associate each segment with an identifier that supports lineage or provenance analysis. For example, the processing system may apply cryptographic hashing to link each segment to its metadata, preventing unauthorized changes. In some embodiments, the processing system may aggregate the event data and stream updates from the sensors to a distributed ledger node that initiates tokenization and data sharding. In some embodiments, the processing system may preserve references to each data segment in a tamper-evident ledger that provides traceable retrieval and validation.

In block 2028, the processing system may reconstruct a system state that corresponds to a specified timestamp. The processing system may retrieve and replay tokenized event data from the decentralized storage system through a query console. For example, the processing system may reference event records associated with the specified timestamp, retrieve relevant shards, decrypt them if needed, and compile them to represent the state of the system. In some embodiments, the processing system may replay event sequences in chronological order to show changes in server configurations or application data. For example, the processing system may apply each logged modification to a baseline snapshot until it reconstructs the requested state. In some embodiments, the processing system may reconstruct the system state by referencing an indexing structure that maps timestamps to shard identifiers. In some embodiments, the processing system may log each reconstruction event in an audit trail that indicates the requesting user and final outcome.

In block 2030, the processing system may secure and restrict access to the modular sensors and query console. The processing system may validate user permissions linked to identifiers through role-based access management. For example, the processing system may check a user's assigned roles to decide whether that user may view sensor data, run queries, or replay event histories. In some embodiments, the processing system may maintain a directory of users mapped to permission sets that define read, write, or administrative capabilities. For example, the processing system may apply minimal privileges by granting sensor configuration rights to designated roles and limiting general users to read access. In some embodiments, the processing system may secure the sensors and console through cryptographic tokens or credentials that validate user identities. In some embodiments, the processing system may record each attempted operation in a tamper-evident ledger that indicates whether the operation was allowed or denied.

In block 2032, the processing system may generate an alert in response to suspicious patterns in event data or unauthorized attempts to modify or delete data within the decentralized storage system. For example, the processing system may detect repetitive file access from a single source that departs from historical activity or see an unapproved data deletion request. In some embodiments, the processing system may detect anomalies through a machine learning algorithm that references baseline behaviors observed during normal operation. For example, the processing system may track usage patterns and compare real-time events to identify unusual frequency or timing. In some embodiments, the processing system may generate an alert through a rules-based engine that scans ledger updates for unauthorized changes. In some embodiments, the processing system may forward alert notifications to designated incident responders or automated remediation services.

FIG. 20C is a process flow diagram illustrating a method 2050 of machine learning-driven anomaly detection in sharded event logs in accordance with some embodiments. The method 2050 may be performed by a processing system including one or more processors and components described herein (e.g., FIGS. 1-6). The processing system may execute software or firmware to perform some or all operations of method 2050. References to a "processing system" encompass alternative hardware configurations implementing portions or all of method 2050.

In block 2052, the processing system may electronically train a machine learning (ML) model using historical event logs stored within a distributed ledger. For example, the processing system may electronically access historical logs that record detailed events such as shard access patterns, node response times, storage capacity utilization, cryptographic key usage frequency, and node downtime incidents. the processing system may electronically extract quantitative features, including shard read-write frequency, request-response latency, cryptographic key rotation intervals, and node failure rates. the processing system may electronically use these features to train predictive models, such as gradient boosting classifiers or deep neural networks. In addition, the processing system may electronically validate the authenticity of each historical log entry by confirming ledger cryptographic signatures, which prevents the training dataset from incorporating fraudulent or unauthorized data.

In block 2054, the processing system may electronically gather real-time event logs from sensors distributed across multiple nodes within a decentralized network. For example, sensors embedded in node components may electronically capture detailed activities such as shard reads and writes, unsuccessful access attempts, changes in node storage thresholds, cryptographic key usage requests, and attempts at data modification or deletion. Each sensor may electronically timestamp each event and record node identifiers, IP addresses, request details, or cryptographic keys involved. the processing system may electronically index and store these event records as entries in a tamper-evident distributed ledger. This process provides transparency, traceability, and auditability of real-time data collected across the distributed network.

In block 2056, the processing system may electronically apply the trained ML model to newly captured real-time event data. For example, the processing system may electronically input extracted features from recent events-such as frequency of shard access, latency spikes, or repeated node authentication failures-into the previously trained predictive model. the processing system may electronically compute anomaly scores by comparing the incoming event features against established baselines learned during the initial training operation. For instance, the processing system may electronically use statistical distance metrics (e.g., Mahalanobis distance or z-scores) to measure deviation from historical distributions. Events that electronically produce anomaly scores exceeding a predefined threshold—such as scores above three standard deviations from the baseline—may trigger additional scrutiny.

In block 2058, the processing system may electronically generate and log an alert upon detecting events whose anomaly scores exceed the specified threshold. For example, the processing system may electronically identify unusual patterns, such as repeated unauthorized shard access requests originating from the same network address within a short interval, unusual node downtimes exceeding normal operational standards, or unexpected cryptographic key access attempts. When such anomalies occur, the processing system may electronically create an alert containing detailed references to the implicated event data, including timestamps, node identifiers, IP addresses, event classification, and computed anomaly scores. the processing system may electronically store each alert as an entry in the distributed ledger, ensuring visibility and accountability.

In block 2060, the processing system may electronically refine the predictive ML model based upon administrative feedback and newly observed data. For example, system administrators may electronically review alerts recorded in the distributed ledger and classify each as either confirmed security incidents or false-positive detections. the processing system may electronically integrate this feedback, labeling the corresponding event records to form an updated training set. the processing system may electronically retrain the ML model periodically using these refined datasets to enhance anomaly detection accuracy. Each retraining operation may electronically produce a ledger entry documenting the versioned model, changes to training parameters, datasets involved, and timestamps of refinement. This solution may allow systematic verification of model evolution during future audits or regulatory compliance assessments.

Some embodiments may include systems and methods for decentralized data management, interoperable storage, and blockchain-enabled lineage verification across distributed platforms. In some embodiments, a processing system may perform decentralized data management across interoperable platforms. For example, the processing system may receive input data associated with a unique identifier, the unique identifier representing an entity, event, or resource. The processing system may segment the input data into multiple data segments, in which each data segment includes an encrypted subset of the input data. The processing system may distribute the data segments to a distributed data infrastructure including interoperable nodes spanning multiple platforms and technologies. The distribution may follow a redundancy scheme configured to allow recovery from node failures. The processing system may generate a lineage record for the input data, the lineage record including metadata indicating an origin, a timestamp, and an identity of an entity performing an operation on the input data. The processing system may store the lineage record on a decentralized ledger compatible with multiple blockchain protocols. The processing system may reconstruct the input data by aggregating the data segments retrieved from the distributed data infrastructure based on the unique identifier. In addition, the processing system may verify the reconstructed data using the lineage record and present the reconstructed input data to an authorized entity via an interface, in which access control policies linked to the unique identifier are verified against the decentralized ledger.

In some embodiments, the redundancy scheme may include a distributed parity method for data resilience. For example, data segments may include parity information allowing reconstruction in the event of partial data loss. In some embodiments, the distributed data infrastructure may span multiple cloud providers, private enterprise systems, and edge devices, allowing platform-agnostic storage and retrieval of data segments. In some embodiments, the processing system may synchronize updates made to the input data in the distributed data infrastructure with a centralized enterprise system. For example, the processing system may propagate updates made in the centralized enterprise system to the distributed data infrastructure, maintaining data consistency across platforms.

In some embodiments, the processing system may generate a digital token associated with the unique identifier. For example, the digital token may adhere to a blockchain token standard compatible with the decentralized ledger. The processing system may embed metadata in the digital token referencing the lineage record. In addition, the processing system may use the digital token to represent ownership, access rights, or traceability for the input data. In some embodiments, the digital token may include a SBT. For example, the metadata of the SBT may include immutable associations with an entity, maintaining non-transferable identity-linked data. In some embodiments, the processing system may identify an event associated with the input data and memorialize the event by generating a smart contract on the decentralized ledger. For example, the smart contract may include details of the event, the unique identifier, and associated metadata. In addition, the processing system may link subsequent events to the memorialized event, forming a chain of interconnected records on the decentralized ledger. As examples, the memorialized event may capture activities such as signing legal agreements, issuing certifications or credentials, documenting training milestones, recording academic progress, or creating immutable employment records.

In some embodiments, the distributed data infrastructure may include intelligent routing mechanisms. For example, the routing mechanisms may dynamically optimize retrieval of data segments based on network conditions, geographic proximity, and node availability. In some embodiments, the processing system may integrate the distributed data infrastructure with an enterprise application programming interface (API) gateway, allowing communication between decentralized and centralized systems. In some embodiments, the processing system may implement a ransomware mitigation strategy. For example, the processing system may detect unauthorized modifications to the input data using the lineage record, retrieve unaltered data segments from the distributed data infrastructure, and reconstruct a verified version of the input data based on the unaltered data segments. In some embodiments, the lineage record may include data provenance, modification history, and access logs, supporting traceability and verification of all operations performed on the input data.

In some embodiments, the processing system may allow interoperability by abstracting storage operations into a protocol-agnostic layer, allowing interaction with decentralized ledgers adhering to different blockchain standards. In some embodiments, the authorized entity may interact with the input data through a user interface providing access to lineage records, event memorialization, and the reconstructed data, supporting transparency and traceability. In some embodiments, the processing system may receive a data retrieval request from an authorized entity. For example, the processing system may query the decentralized ledger to identify nodes including the requested data segments and dynamically aggregate the data segments to provide the requested input data with minimized latency. In some embodiments, the processing system may monitor data flow within the distributed data infrastructure, generate operational metrics including system load and data retrieval times, and present these operational metrics to an administrator via a dashboard. In some embodiments, event memorialization may support compliance with regulatory standards. For example, the processing system may maintain immutable records of interactions, modifications, and ownership transfers of the input data.

In some embodiments, the distributed data infrastructure may support evergreen data capabilities by maintaining continuity of data availability and updates across evolving system configurations and technologies. In some embodiments, the processing system may validate the integrity of the decentralized ledger. For example, the processing system may verify cryptographic hashes of stored lineage records and resolve inconsistencies using consensus mechanisms across interoperable nodes. In some embodiments, the interoperable design may allow addition of new nodes, storage platforms, or blockchain protocols without modifying the underlying architecture.

FIG. 21A is a process flow diagram illustrating a method 2100 of securely segmenting, distributing, and reconstructing encrypted data using decentralized storage nodes and tamper-evident DLT in accordance with some embodiments. The method 2100 may be performed by a processing system including one or more processors and components discussed in this application (e.g., FIGS. 1-6). The processing system may execute software or firmware to perform some or all operations of method 2100. References to a "processing system" encompass alternative hardware configurations implementing portions or all of method 2100.

In block 2102, the processing system may receive input data associated with a unique identifier. For example, the processing system may receive an electronic document, such as a PDF file or an image, along with a unique identifier linked explicitly to an entity, event, or resource. In some embodiments, the processing system may receive the input data by authenticating cryptographic signatures generated using identity keys associated explicitly with a DID. In some embodiments, the processing system may receive input data via secure interfaces or APIs integrated with user digital wallets or external platforms. In some embodiments, the processing system may be further configured to maintain an audit record within a distributed ledger, logging timestamps, entity identifiers, and authentication statuses associated with received input data for compliance and auditing purposes.

In block 2104, the processing system may deploy decentralized storage nodes and distribute encrypted data segments across the nodes. For example, the processing system may divide the received input data into multiple data segments, encrypt each segment using a unique encryption key cryptographically derived from the DID, and store each encrypted segment on different geographically dispersed nodes operating in decentralized networks (e.g., IPFS, etc.). In some embodiments, the processing system may select nodes based on predefined operational criteria such as node availability, geographic distribution, or data redundancy policies. In some embodiments, the processing system may encrypt segments using a secure algorithm (e.g., AES-256), storing encryption keys securely within hardware security modules or secure enclaves. In some embodiments, the processing system may be further configured to dynamically monitor the decentralized nodes and reallocate data segments if node availability or performance metrics fall below predefined thresholds.

In block 2106, the processing system may memorialize an event associated explicitly with the dataset by recording a transaction in a decentralized, tamper-evident distributed ledger. For example, the processing system may record a transaction in a blockchain (e.g., Ethereum), the transaction including a timestamp, event metadata (e.g., origin identifier and dataset details), and a cryptographic hash uniquely representing the encrypted dataset. In some embodiments, the processing system may generate cryptographic hashes using hashing algorithms such as SHA-256 applied to the combined encrypted data segments. In some embodiments, the processing system may digitally sign the transaction using the private identity key associated explicitly with the DID to verify the provenance of the recorded event. In some embodiments, the processing system may be further configured to periodically validate transaction records in the distributed ledger to detect potential unauthorized alterations or ledger inconsistencies.

In block 2108, the processing system may generate a lineage record for the input data. For example, the processing system may construct lineage records including metadata such as data origin, timestamps, identity of entities performing data-related actions, and references explicitly linking each event within the decentralized ledger. In some embodiments, the processing system may cryptographically bind lineage records to the DID through digital signatures verifying entity identity during data-related operations. In some embodiments, the processing system may create hierarchical lineage records with branching structures representing multiple related events, explicitly supporting complex audit trails. In some embodiments, the processing system may be further configured to periodically audit lineage records stored within the distributed ledger to detect unauthorized modifications and preserve data integrity.

In block 2110, the processing system may store the lineage record within a decentralized ledger compatible with multiple distributed ledger technology protocols. For example, the processing system may record lineage metadata into a blockchain-based ledger such as Ethereum, using consensus mechanisms (e.g., Proof-of-Stake) to maintain immutability, traceability, and cryptographic verification. In some embodiments, the processing system may store lineage records in decentralized nodes across multiple interoperable blockchain networks to enhance redundancy and ledger availability. In some embodiments, the processing system may digitally sign stored lineage records with cryptographic keys associated with the decentralized identifier to reliably authenticate stored metadata. In some embodiments, the processing system may be further configured to periodically audit lineage records stored within the decentralized ledger to verify integrity and identify unauthorized modifications.

In block 2112, the processing system may reconstruct the dataset by retrieving encrypted data segments from distributed storage nodes using the unique encryption keys. For example, the processing system may securely retrieve encrypted segments from decentralized nodes, decrypt each segment using the DID-linked encryption keys, and recombine the segments to reconstruct the original dataset. In some embodiments, the processing system may verify the authenticity of the reconstructed dataset by recalculating the cryptographic hash of the reconstructed data and comparing it with the cryptographic hash stored within the lineage records on the decentralized ledger. In some embodiments, the processing system may reconstruct datasets by selectively routing retrieval requests to nodes based on real-time availability or network performance metrics. In some embodiments, the processing system may be further configured to document each reconstruction operation, including cryptographic verification outcomes, timestamps, and node identifiers, storing this documentation within the decentralized ledger.

In block 2114, the processing system may present the reconstructed dataset to an authorized entity through a secure interface. For example, the processing system may display the reconstructed and verified dataset in a secure graphical user interface accessed through digital wallets or web applications, maintaining explicit links to the dataset's unique identifier and its associated provenance data. In some embodiments, the processing system may enforce access control policies explicitly linked to the DID by verifying cryptographic signatures before presenting data. In some embodiments, the processing system may present reconstructed data alongside detailed provenance information, such as event timestamps, lineage metadata, and cryptographic hashes, within an interactive user interface. In some embodiments, the processing system may be further configured to periodically audit access events—including requestor identities and timestamps—and record these events within the decentralized ledger to support compliance monitoring or forensic analysis.

FIG. 21B is a process flow diagram illustrating a method 2150 coordinated shard reallocation and key rotation in accordance with some embodiments. The method 2150 may be performed by a processing system including one or more processors and components described herein (e.g., FIGS. 1-6). The processing system may execute software or firmware to perform some or all operations of method 2150. References to a "processing system" encompass alternative hardware configurations implementing portions or all of method 2150.

In block 2152, the processing system may electronically detect a storage node failure or operational limitation within the distributed data storage environment. For example, the processing system may electronically monitor node-specific performance indicators, including latency statistics, data throughput rates, node response times, memory utilization percentages, and frequency of error messages. Upon electronically observing latency metrics exceeding a predefined acceptable threshold, such as average response delays exceeding 200 milliseconds, or frequent storage errors, including disk write failures, memory allocation errors, or node disconnection messages, the processing system may electronically determine a potential node failure. The processing system may electronically reference the ledger entry that maintains historical records of each node's operational health status and node reliability metrics to identify the specific failing node.

In block 2154, the processing system may electronically initiate shard reallocation procedures to redistribute data shards from the identified failing node to alternate operational nodes. For example, the processing system may electronically access metadata stored in the ledger that details current shard-to-node assignments, node storage capacities, node performance capabilities, and redundancy policies. the processing system may electronically evaluate available nodes by comparing storage availability, current load, data throughput performance, and latency metrics against the shard storage requirements. Upon electronically identifying suitable alternate nodes meeting predefined performance and capacity conditions, the processing system may electronically assign shards to these nodes and electronically record provisional assignments in a temporary ledger entry. This action creates an audit trail documenting interim redistribution.

In block 2156, the processing system may electronically initiate cryptographic key rotation through a vault component to protect the redistributed shards during reallocation. For example, the processing system may electronically request partial cryptographic signatures from multiple authorized signers, each signer possessing a unique cryptographic fragment managed within a hardware security module (HSM). Each signer electronically provides a partial approval by signing the key-rotation request using their private key fragment. the processing system may electronically gather these partial signatures to satisfy a predefined cryptographic threshold, such as three out of five signers. The vault component electronically combines the partial fragments to generate new cryptographic keys. Each partial signature, participant identifier, and key-rotation timestamp may electronically appear in the ledger, providing verifiable proof of multi-party authorization.

In block 2158, the processing system may electronically re-encrypt each shard using the newly generated cryptographic keys. For example, the processing system may electronically retrieve each shard's data from the failing node, decrypt the data using the previously valid cryptographic key, and re-encrypt the data with the new cryptographic key. the processing system may electronically transfer the newly encrypted shard data securely over a protected communication channel, such as TLS (Transport Layer Security), to the selected alternate storage nodes. In addition, the processing system may electronically update ledger entries associated with each shard to reflect the new cryptographic references, storage locations, encryption metadata, and associated node identifiers. These ledger updates provide a detailed and tamper-evident record of shard encryption and data relocation.

In block 2160, the processing system may electronically validate the integrity and accessibility of each reallocated shard after re-encryption and redistribution. For example, the processing system may electronically retrieve representative segments of reallocated shard data from the new storage nodes, decrypt the segments using the corresponding new cryptographic keys, and electronically compare the resulting data against cryptographic hashes stored previously in the ledger. If the processing system electronically confirms exact matches, shard data integrity may remain verified. the processing system may electronically record successful validation results, including cryptographic hash confirmations, timestamp validations, and final node assignments, in a ledger entry. This final entry documents successful shard redistribution and key rotation, providing a tamper-evident record suitable for subsequent auditing or compliance verification.

Some embodiments may include systems and methods for decentralized event orchestration and microservice-based transaction processing in a distributed ledger network. In some embodiments, the methods may be performed by a processing system operating a plurality of microservices distributed across decentralized execution nodes within a distributed computing system for decentralized event orchestration. In some embodiments, the method may include receiving a request to execute a transaction, allocating at least one microservice to process the transaction based on real-time system performance metrics (e.g., processing load, memory availability, and network latency of the execution nodes), executing, by the at least one allocated microservice, a transaction processing operation (e.g., verifying an authenticity of the transaction using a cryptographic signature validation protocol, and tokenizing transaction data to generate a memorialization record associated with the transaction, etc.), distributing the memorialization record to a tamper-evident distributed ledger that includes a plurality of consensus nodes configured to enforce immutability constraints on recorded transactions, dynamically adjusting a computational resource allocation for executing microservices based on decentralized execution node load conditions and predefined scaling policies, and routing the processed transaction to a designated decentralized storage node or a target execution node.

In some embodiments, allocating at least one microservice to process the transaction based on real-time system performance metrics may include dynamically assigning a microservice instance to a decentralized execution node based on predefined load-balancing criteria (e.g., a weighted round-robin protocol, a least-connections selection protocol, a latency-optimized routing policy, etc.). In some embodiments, tokenizing the transaction data to generate the memorialization record associated with the transaction may include generating a SBT that represents the transaction and is associated with a DID, and embedding metadata (e.g., a transaction reference, a timestamp, an originating execution node identifier, etc.) in the SBT. In some embodiments, distributing the memorialization record may include segmenting the memorialization record into cryptographic shards that are each associated with a unique identifier, encrypting each cryptographic shard using a unique cryptographic key assigned to the originating execution node, and distributing the cryptographic shards across a plurality of decentralized storage nodes for redundancy and fault tolerance. In some embodiments, dynamically adjusting computational resource allocation may include deploying an additional microservice instance on a decentralized execution node when a system utilization metric exceeds a predefined scalability threshold, and terminating at least one microservice instance when the system utilization metric falls below a predefined deallocation threshold.

In some embodiments, verifying an authenticity of the transaction may include performing a cryptographic hash comparison between the transaction payload and a reference cryptographic hash stored in the tamper-evident distributed ledger, and validating a cryptographic signature associated with the transaction using a public-key infrastructure (PKI) framework. In some embodiments, routing the processed transaction may include identifying a target execution node based on at least one of geographic proximity, available processing capacity, or a predefined priority level assigned to the transaction, encrypting the transaction payload prior to transmission using a node-specific encryption key, and recording metadata associated with the routing operation in the tamper-evident distributed ledger. In some embodiments, the decentralized execution nodes operate within a containerized execution environment (managed using Kubernetes, Docker, or an equivalent container orchestration framework).

In some embodiments, the tamper-evident distributed ledger may include a permissioned blockchain network configured to restrict write access to authorized execution nodes based on a role-based access control policy. In some embodiments, the method may include detecting an unauthorized attempt to modify the memorialization record stored in the distributed ledger, generating a security alert in response to detecting the unauthorized modification attempt, and propagating a corrective transaction to the distributed ledger to revalidate the integrity of the memorialization record. In some embodiments, receiving the execution request may include receiving an API request via a decentralized API gateway, verifying an authentication credential associated with the API request using a zero-trust security framework, and forwarding the request to an assigned microservice instance for processing. In some embodiments, the decentralized execution nodes may be deployed within a decentralized cloud infrastructure (may be dynamically managed using infrastructure-as-code framework).

In some embodiments, the processing system may be configured to implement an immutable backup process by replaying memorialization records stored in the tamper-evident distributed ledger. In some embodiments, executing the transaction processing may include segmenting the transaction data into multiple fragments for parallel processing by a plurality of decentralized execution nodes, and synchronizing processing results across execution nodes using a distributed consensus protocol. In some embodiments, the method may include synchronizing memorialization records across a plurality of decentralized execution nodes to ensure redundancy and fault tolerance, and periodically verifying the consistency of synchronized memorialization records (using a Merkle tree validation, etc.).

FIG. 22A is a process flow diagram illustrating a method 2200 of securely processing transactions using dynamically allocated microservices and recording transaction memorialization data on a tamper-evident distributed ledger in accordance with some embodiments. The method 2200 may be performed by a processing system including one or more processors and components described herein (e.g., FIGS. 1-6). The processing system may execute software or firmware to perform some or all operations of method 2200. References to a "processing system" encompass alternative hardware configurations implementing portions or all of method 2200.

In block 2202, the processing system may receive a request to execute a transaction. For example, the processing system may receive transaction requests initiated by an authorized entity through a secure digital wallet or decentralized application interface. The request may explicitly include transaction-specific details such as asset identifiers, transaction amount, participant decentralized identifiers (DIDs), and transaction type. In some embodiments, the processing system may authenticate received transaction requests using cryptographic signature verification explicitly associated with identity keys linked to participant DIDs. In some embodiments, the processing system may receive the transaction request via secure application programming interfaces (APIs) integrated with external decentralized applications (dApps) or blockchain-based platforms. In some embodiments, the processing system may be further configured to generate an audit log entry within the distributed ledger, explicitly recording details including timestamps, participant DIDs, and transaction metadata for compliance auditing.

In block 2204, the processing system may allocate at least one microservice to process the transaction request based on real-time system performance metrics. For example, the processing system may select microservices explicitly from decentralized execution nodes after evaluating current computational loads, available memory resources, network latency, and node performance metrics obtained through continuous monitoring. In some embodiments, the processing system may dynamically allocate multiple microservices explicitly across distributed execution nodes to balance computational workload and prevent resource bottlenecks. In some embodiments, the processing system may allocate microservices by applying predefined resource-allocation rules explicitly configured to adapt based on real-time monitoring of decentralized node conditions. In some embodiments, the processing system may be further configured to automatically redistribute microservices explicitly if real-time performance metrics deviate beyond predefined operational thresholds.

In block 2206, the processing system may execute the transaction processing operation using the allocated microservice. For example, the processing system may explicitly verify the authenticity of the transaction request by applying a cryptographic signature validation protocol using public-private cryptographic keys linked explicitly to participant DIDs. In addition, the processing system may tokenize transaction data explicitly to generate a structured memorialization record, which may include asset identifiers, transaction amount, timestamps, participant identities, and cryptographic hashes uniquely representing transaction details. In some embodiments, the processing system may generate the cryptographic hashes explicitly using secure hashing algorithms, such as SHA-256, applied directly to transaction-specific data. In some embodiments, the processing system may digitally sign the memorialization record explicitly with identity keys associated with participant DIDs to establish clear provenance and facilitate future verifications. In some embodiments, the processing system may be further configured to include compliance-related metadata explicitly within memorialization records to support regulatory audits or compliance reporting.

In block 2208, the processing system may distribute the memorialization record explicitly to a tamper-evident distributed ledger. For example, the processing system may broadcast the memorialization record explicitly to blockchain nodes participating in decentralized consensus protocols, such as PoS, to provide immutability, auditability, and cryptographic integrity of recorded transaction data. In some embodiments, the processing system may redundantly store the memorialization records explicitly across multiple geographically distributed consensus nodes to provide fault tolerance and data availability. In some embodiments, the processing system may explicitly validate ledger updates using decentralized consensus mechanisms among multiple independent ledger nodes to prevent unauthorized ledger alterations. In some embodiments, the processing system may be further configured to periodically audit memorialization records explicitly within the ledger to detect anomalies, inconsistencies, or unauthorized modifications.

In block 2210, the processing system may dynamically adjust computational resource allocation explicitly for executing microservices. For example, the processing system may adjust resource allocation explicitly based on real-time performance monitoring of decentralized execution nodes, applying predefined scaling policies explicitly triggered by transaction volumes, node performance thresholds, or computational resource constraints. In some embodiments, the processing system may allocate additional execution nodes explicitly or redistribute microservices automatically if current load conditions exceed predefined resource utilization thresholds. In some embodiments, the processing system may explicitly scale resource allocations by referencing adaptive resource-management policies encoded in smart contracts executed on decentralized ledgers. In some embodiments, the processing system may be further configured to maintain detailed logs explicitly recording adjustments to computational resources, node identifiers, timestamps, and the rationale for changes, facilitating subsequent performance audits and compliance verifications.

In block 2212, the processing system may route the processed transaction explicitly to a designated decentralized storage node or a target execution node. For example, the processing system may explicitly transmit verified and tokenized transaction data to decentralized storage platforms (e.g., IPFS, etc.) or decentralized execution nodes selected explicitly based on real-time node availability, geographic distribution, and predefined routing policies. In some embodiments, the processing system may encrypt transaction data explicitly prior to routing using encryption keys derived explicitly from participant DIDs, ensuring confidentiality during transmission and storage. In some embodiments, the processing system may explicitly select routing paths based on real-time network latency, node responsiveness, or compliance requirements governing data residency or jurisdictional constraints. In some embodiments, the processing system may be further configured to log routing events explicitly, including storage node identifiers, transmission timestamps, and cryptographic verification outcomes, to support comprehensive auditing, compliance monitoring, and anomaly detection processes.

FIG. 22B is a process flow diagram illustrating a method 2250 for zero-knowledge or privacy-preserving queries of sharded data in accordance with some embodiments. The method 2250 may be performed by a processing system including one or more processors and components described herein (e.g., FIGS. 1-6). The processing system may execute software or firmware to perform some or all operations of method 2250. References to a "processing system" encompass alternative hardware configurations implementing portions or all of method 2250.

In block 2252, the processing system may electronically receive a privacy-preserving request to verify a specific data property without revealing the underlying plaintext data. For example, the processing system may electronically parse an encrypted query that requests confirmation of an individual's membership within a dataset, such as verifying whether an individual belongs to an access-control list, voter registry, or medical patient group. the processing system electronically identifies the requesting entity's cryptographic credentials or decentralized identifier (DID) and electronically records a ledger entry linking the requestor's identifier to the query. This ledger entry electronically preserves auditability and request traceability without compromising plaintext data confidentiality.

In block 2254, the processing system may electronically identify data shards containing information relevant to the received query. For example, the processing system may electronically query a diffusion component responsible for shard-to-node mapping information, including shard identifiers, cryptographic commitments, node assignments, and encrypted shard metadata. The diffusion component may electronically return cryptographic pointers, such as Merkle tree roots or hash-based identifiers, referencing the storage nodes that hold the relevant encrypted shards. the processing system may electronically organize these cryptographic pointers within a temporary data structure, such as a cryptographically secured array or linked list, and electronically document interim pointers in the ledger. This arrangement electronically facilitates efficient retrieval and proof generation without exposing underlying sensitive data.

In block 2256, the processing system may electronically generate a zero-knowledge cryptographic proof to securely validate the data property stated in the original query. For example, the processing system may electronically utilize cryptographic libraries implementing zero-knowledge succinct non-interactive argument of knowledge or zero-knowledge scalable transparent arguments of knowledge to construct proofs. Specifically, the processing system may electronically form a cryptographic statement, such as proving dataset membership or possession of specific attributes, without revealing the actual plaintext data, the processing system may electronically incorporate cryptographic commitments from each relevant shard, referencing these commitments directly from the ledger to confirm the accuracy and integrity of input data used in proof construction. This process may allow reliable validation while maintaining data confidentiality.

In block 2258, the processing system may electronically submit the generated zero-knowledge proof to a verification routine to confirm its correctness. For example, the processing system may electronically invoke a verification smart contract deployed on a ledger-based distributed network, such as Ethereum or a similar blockchain environment. The smart contract may electronically execute embedded cryptographic verification logic to examine the validity of proof statements, cryptographic signatures, and commitments, the processing system may electronically append the resulting verification status, such as proof acceptance or rejection, and the associated cryptographic proof reference, to the ledger. This action electronically creates an immutable and tamper-evident audit record verifying the correctness of the privacy-preserving query.

In block 2260, the processing system may electronically communicate the verification outcome of the zero-knowledge proof to the requesting entity. For example, the processing system may electronically transmit an encrypted notification or response message explicitly confirming the validation outcome, such as confirming successful membership in the queried dataset or affirming possession of a specified attribute. This communication may electronically contain a ledger reference pointing to each cryptographic pointer and verification record involved in generating and confirming the proof. the processing system electronically logs this transaction within the ledger, preserving traceability and auditability of the zero-knowledge verification process.

FIG. 23 is a process flow diagram illustrating a method 2300 of creating and managing identity-based, non-transferable tokens that reference immutable event records in a decentralized data storage system in accordance with some embodiments. The method 2300 may be performed by a processing system including one or more processors and components discussed in this application (e.g., FIGS. 1-6). The processing system may execute software or firmware to perform some or all operations of method 2300. References to a "processing system" encompass alternative hardware configurations implementing portions or all of method 2300.

In block 2302, the processing system may receive input data from an entity that includes a decentralized identifier (DID). For example, the processing system may collect this DID through an authenticated request that includes cryptographic signatures derived from private identity keys linked to the entity. In some embodiments, the processing system may verify these signatures by comparing them to entries in a distributed ledger that associates the entity with the DID.

For example, the processing system may confirm request authenticity by matching the received signature with a reference stored on the ledger. In some embodiments, the processing system may parse additional parameters that define usage conditions or compliance requirements prior to subsequent operations.

In block 2304, the processing system may mint a SBT on a distributed ledger and permanently associate it with the DID. For example, the processing system may invoke a smart contract that creates a token and embeds non-transferability rules, preventing future reassignment to another DID. In some embodiments, the processing system may record a creation transaction that includes a token identifier, a timestamp, and cryptographic references, establishing an immutable ledger record. For example, the processing system may store metadata in the transaction that indicates usage or regional policies. In some embodiments, the processing system may reference compliance fields in the smart contract to preserve auditing data for regulators.

In block 2306, the processing system may generate and store token metadata. For example, the processing system may incorporate references to a source chain that captures event data, cryptographic proofs for verifying data integrity, and optional compliance fields. In some embodiments, the processing system may encrypt the metadata using an encryption key that the DID defines or manages. For example, the processing system may derive the encryption key from secrets linked to the DID. In some embodiments, the processing system may store the metadata or pointers to off-chain data in the distributed ledger, possibly via sharding mechanisms that split and replicate data across multiple nodes.

In block 2308, the processing system may memorialize events in a hierarchical source chain and organize them as immutable records linked to the SBT. For example, the processing system may record granular information that includes timestamps, origin identifiers, data changes, or cryptographic proofs. In some embodiments, the processing system may append each new record to the chain by referencing a previously recorded link. For example, the processing system may compute hashes that connect child events to parent records, forming a tree or graph of sub-events. In some embodiments, the processing system may distribute these event records across a decentralized data storage system that relies on geographically redundant sharding to maintain availability.

In block 2310, the processing system may detect and respond to modification attempts within the source chain. For example, the processing system may periodically verify cryptographic links by recomputing hashes or traversing a Merkle tree that reflects the chain's structure. In some embodiments, the processing system may generate an alert if tampering appears likely. For example, the processing system may log a mismatch event in the ledger and notify an administrator of a potential security issue. In some embodiments, the processing system may isolate suspicious records, restrict further changes, or quarantine compromised nodes.

In block 2312, the processing system may manage access to the SBT and related event data through an interface that enforces role-based permissions. For example, the processing system may present a vault application or API that checks DID credentials to confirm authorization before releasing event shards or metadata. In some embodiments, the processing system may validate cryptographic provenance, for example by verifying digital signatures or proofs that confirm the requesting entity's right to view data. In some embodiments, the processing system may present the token's metadata in a human-readable format or visualize parent-child event relationships for efficient auditing or troubleshooting.

In block 2314, the processing system may address event retrieval, reconstruction, and updates. For example, the processing system may locate relevant shards by referencing ledger-based pointers that map to storage nodes. In some embodiments, the processing system may download or stream shards, decrypt them with the DID-specific key, and reassemble the event data. For example, the processing system may use dynamic routing or load-balancing if network conditions vary. In some embodiments, the processing system may integrate anomaly detection or compliance checks to ensure the reconstructed data aligns with the ledger's cryptographic records.

In block 2316, the processing system may incorporate optional variations and extensions that refine token lifecycle management. For example, the processing system may expose an application programming interface (API) so external platforms may read token metadata, initiate event memorializations, or verify source chain integrity. In some embodiments, the processing system may support hierarchical sub-events, dynamic shard placement strategies, or specialized encryption solutions such as homomorphic or attribute-based encryption. For example, the processing system may adjust shard distribution based on node metrics and track usage patterns to detect suspicious behavior. In some embodiments, the processing system may include dashboards that visualize each event, sub-event link, or transaction log, allowing retrieval or reconstruction as needed.

Some embodiments may include computer-implemented methods of creating and managing source chains with SBTs linked to immutable event records. In some embodiments, the methods may include receiving an input from an entity including a DID uniquely associated with the entity. The methods may further include invoking a smart contract deployed on a distributed ledger to mint a SBT linked to the DID, in which the token remains permanently associated with the DID and may not be transferred to another DID. In addition, the methods may include generating metadata for the token, the metadata including a reference to a source chain structure stored in a decentralized data storage system and cryptographic data for verifying the integrity of the metadata and the source chain. The methods may also include appending an event record to the source chain, the event record including a timestamp associated with the event, cryptographic links to preceding records in the source chain, and hierarchical links to one or more sub-events. In addition, the methods may include verifying the integrity of the source chain by validating cryptographic links within the source chain, each cryptographic link representing a verified relationship between the event record and other records in the source chain.

In some embodiments, the methods may further include detecting an attempt to modify the source chain and generating an alert indicating a potential anomaly within the decentralized data storage system. In some embodiments, the source chain may include a hierarchical structure, each branch representing a sub-event linked to a parent event, in which the hierarchical structure may be cryptographically verified. In some embodiments, the methods may further include storing the source chain structure in the decentralized data storage system using sharding techniques to distribute data across multiple nodes, thereby providing data redundancy and continuous data availability. In some embodiments, the methods may further include encrypting event data stored in the decentralized data storage system using an encryption key associated with the DID. In some embodiments, appending the event record to the source chain may further include timestamping each event record using a consensus mechanism supported by the distributed ledger. In some embodiments, the methods may further include dynamically verifying cryptographic links within the source chain to provide immutability and detect unauthorized modifications. In some embodiments, the metadata of the identity-based token may include a log of data changes associated with the source chain for auditing and verification purposes.

In some embodiments, the methods may further include providing access to the source chain through an interface configured to retrieve and reconstruct event data stored within the decentralized data storage system. In some embodiments, the source chain may support hierarchical branching, allowing representation of sub-events and verified relationships to parent events. In some embodiments, the decentralized data storage system may provide data redundancy by replicating shards across geographically distributed nodes. In some embodiments, verifying cryptographic links within the source chain may include using a Merkle tree structure to validate hierarchical relationships between event records. In some embodiments, the methods may further include allowing query-based retrieval of event details from the source chain through the interface. In some embodiments, the decentralized data storage system may include access control mechanisms restricting access to event data exclusively to entities authorized by the DID. In some embodiments, the methods may further include embedding non-transferability rules in the smart contract, thereby preventing unauthorized transfers of the identity-based token.

Some embodiments may include computer-implemented methods for creating and managing SBTs linked to immutable event records. In some embodiments, the methods may include receiving an input from an entity including a DID uniquely associated with the entity. The methods may further include invoking a smart contract deployed on a distributed ledger to mint an identity-based token linked to the DID (in which the identity-based token may not be transferred). In addition, the methods may include generating metadata for the identity-based token, the metadata including a reference to an event memorialization structure stored in a decentralized data storage system and cryptographic data for verifying integrity of the metadata and source chain. The methods may further include storing the metadata and a link to the identity-based token in the decentralized data storage system using sharding techniques distributing data across multiple nodes. In addition, the methods may include memorializing an event associated with the entity by recording granular event details including timestamps, data changes, and origin identifiers, and appending the event details to a hierarchical source chain maintained within the decentralized data storage system. The methods may further include providing access to the event details and the identity-based token through an interface configured to retrieve and reconstruct data shards stored in the decentralized data storage system in response to authenticated requests.

In some embodiments, the methods may further include encrypting each data shard stored in the decentralized data storage system using an encryption key uniquely associated with the DID. In some embodiments, invoking the smart contract may further include specifying rules restricting access to the identity-based token based on predefined conditions associated with the entity. In some embodiments, the source chain may include a plurality of event records, each record cryptographically linked to a preceding record, thereby forming an immutable chain. In some embodiments, the methods may further include detecting attempts to modify the source chain and generating alerts indicating potential security anomalies. In some embodiments, the decentralized data storage system may optimize data retrieval by implementing intelligent routing determined by real-time network conditions and node availability. In some embodiments, the interface may include a vault configured to display metadata of the identity-based token in a human-readable format and allow query-based retrieval of event details associated with the identity-based token. In some embodiments, the methods may further include verifying cryptographic provenance data of metadata prior to granting access to event details.

In some embodiments, the methods may further include integrating the identity-based token with external platforms via application programming interfaces (APIs). In some embodiments, the hierarchical source chain may support branching structures, each branch representing a sub-event cryptographically linked to a parent event. In some embodiments, the methods may further include embedding non-transferability rules in smart contracts to explicitly prevent unauthorized transfer of identity-based tokens. In some embodiments, granular event details recorded during memorialization may include identifiers of entities initiating events and logs of data changes associated with events. In some embodiments, the decentralized data storage system may provide data redundancy by maintaining replicated shards across geographically distributed nodes. In some embodiments, the methods may further include generating visual representations of the source chain for display within the interface.

In some embodiments, metadata of the identity-based token may include compliance-related data supporting auditing and verification. In some embodiments, appending event details to the source chain may further include time-stamping each event record using a consensus mechanism supported by the distributed ledger. In some embodiments, the methods may further include dynamically adjusting storage distribution of data shards based on system load and data access patterns. In some embodiments, the decentralized data storage system may use access control mechanisms restricting reconstruction of data shards exclusively to authorized entities. In some embodiments, the methods may further include monitoring activity patterns associated with entities to detect anomalies and updating the event memorialization structure based on detected anomalies. In some embodiments, the interface may provide role-based access control allowing differentiated levels of access to identity-based tokens and associated event details.

Some embodiments may include components for verifying data integrity and regulatory compliance through DLT-based tokenization and immutable audit trails. These components may allow organizations to maintain tamper-proof records of system activities for improved transparency and accountability. Some embodiments may include dynamic scalability components that allow the monitoring system to adjust as resources are provisioned, decommissioned, or reconfigured.

In some embodiments, the processing system may be configured to use machine learning algorithms and techniques to enhance monitoring and analysis. For example, these algorithms may detect anomalies, predict potential issues, or refine data collection strategies using historical patterns and real-time inputs.

In some embodiments, the processing system may be configured to provide data retention and archiving mechanisms. For example, organizations may define retention policies for historical event data to support compliance, auditing, or analytics. The system may implement secure archiving processes to allow long-term accessibility and integrity of stored data.

In some embodiments, the processing system may be configured to implement comprehensive security features across all components to allow data integrity, access control, and tamper resistance. For example, the system may use DLT to maintain immutable backup systems and audit trails, enhancing transparency and resilience throughout the distributed environment.

In some embodiments, the processing system may be configured to store cryptographic hashes of data shards, metadata, and transaction records on a distributed ledger. For example, this immutable record may allow the detection of unauthorized changes or tampering attempts. The decentralized nature of the ledger may eliminate single points of failure and provide robust data recovery capabilities in case of system failures or malicious attacks.

In some embodiments, the processing system may be configured to implement protection mechanisms against reentrancy attacks in decentralized environments. For example, smart contracts governing token operations or data access may include execution state variables to prevent recursive calls. Transactions may be reverted automatically if reentrancy attempts are detected, allowing the integrity of system operations.

In some embodiments, the processing system may be configured to use multi-layered encryption techniques to secure data at rest and in transit. For example, each data shard may be encrypted with unique cryptographic keys, and the key management system may use advanced protocols to protect key access. This solution may allow that compromised nodes or shards remain unintelligible without the corresponding decryption keys.

In some embodiments, the processing system may be configured to incorporate early detection mechanisms to identify anomalies or tampering attempts. For example, patterns in data access, modification requests, and network traffic may be analyzed to detect potential threats. Machine learning algorithms may establish baseline behavior patterns and flag deviations indicative of malicious activity.

In some embodiments, the processing system may be configured to implement consensus-based validation mechanisms for critical operations, such as token transfers or data modifications. For example, multiple nodes may be required to verify and approve transactions before execution. This consensus process may reduce the risk of unauthorized changes or malicious actions by compromised nodes.

In some embodiments, the processing system may be configured to enforce granular access control mechanisms using cryptographic proofs and identity verification. For example, users may present valid credentials or tokens to access specific data or perform operations. Smart contracts may enforce these access policies consistently across the distributed network.

In some embodiments, the processing system may be configured to support privacy-preserving computations using advanced cryptographic techniques, such as zero-knowledge proofs or secure multi-party computation. For example, these methods may allow for the verification of data properties or the execution of sensitive computations without exposing underlying information, enhancing both security and privacy.

In some embodiments, the processing system may be configured to implement tamper-evident logging mechanisms that record system events, including data access, modifications, and administrative actions. For example, these logs may be cryptographically signed and stored across multiple nodes in the distributed network, allowing an auditable and immutable trail of activities. This solution may support forensic analysis, meet compliance requirements, and deter insider threats by providing transparency and accountability.

In some embodiments, the processing system may be configured to incorporate automated backup and recovery procedures leveraging the distributed architecture. For example, the system may create regular snapshots of the system state and store them across multiple nodes. Cryptographic hashes stored in the distributed ledger may verify the integrity of these backups, allowing rapid recovery in case of data corruption or node failures.

In some embodiments, the processing system may be configured to support secure key rotation and management protocols to mitigate the risk of long-term key compromise. For example, cryptographic keys used for encryption and access control may be periodically updated using secure procedures, allowing continuous protection without disrupting operations.

In some embodiments, the processing system may be configured to implement secure multi-signature schemes for high-value transactions or critical system changes. For example, sensitive operations may require approvals from multiple authorized parties, reducing the risk of unauthorized actions and enhancing security for key assets or configurations.

In some embodiments, the processing system may be configured to use network segmentation and isolation techniques to limit the impact of security breaches. For example, critical components and sensitive data may be logically or physically separated, with strict access controls and monitoring mechanisms managing communication between segments.

In some embodiments, the processing system may be configured to implement rate limiting and throttling mechanisms to mitigate denial-of-service attacks or brute-force attempts. For example, the system may dynamically adjust thresholds based on observed traffic patterns, maintaining availability while reducing exposure to potential threats.

In some embodiments, the processing system may be configured to provide secure channels for system updates and patch management. For example, update packages may be cryptographically signed and verified before installation, allowing that the system remains protected from malicious code introduced during the update process.

In some embodiments, the processing system may be configured to support secure enclaves or trusted execution environments for processing sensitive data or executing critical operations. For example, hardware-level security guarantees may isolate these operations, protecting them from vulnerabilities in the broader system.

In some embodiments, the processing system may be configured to incorporate robust identity and access management features, such as multi-factor authentication and continuous authentication mechanisms. For example, additional verification factors or user behavior monitoring may prevent unauthorized access even when credentials are compromised.

In some embodiments, the processing system may be configured to implement secure key recovery mechanisms for restoring access to encrypted data or tokens in case of key loss. For example, the system may use multi-party protocols or threshold schemes to distribute trust and eliminate single points of failure during the recovery process.

In some embodiments, the processing system may be configured to provide tools for security auditing and compliance reporting. For example, administrators may assess the system's security posture and generate regulatory reports leveraging immutable audit trails and cryptographic proofs maintained in the distributed architecture.

In some embodiments, the processing system may address the transition from centralized systems to distributed architectures by integrating principles of distributed computing and redundancy. For example, these architectures may improve data resilience and scalability while reducing reliance on centralized control, akin to the functionality of RAID (Redundant Array of Independent Disks) systems.

In some embodiments, the processing system may be configured to partition data across multiple nodes, with each node maintaining a subset of the dataset. For example, redundancy mechanisms like data replication or parity calculations may allow data integrity and recoverability in case of node failures, eliminating single points of failure.

In some embodiments, the processing system may be configured to use hybrid architectures to integrate decentralized infrastructure with existing enterprise systems. For example, critical operations may remain within centralized infrastructure, while distributed technologies are adopted to enhance scalability and resilience, addressing challenges in data consistency, security, and performance.

In some embodiments, the processing system may be configured to use DLT to create immutable audit trails and allow data provenance across the distributed network. For example, cryptographic hashes stored on the ledger may provide an unalterable record of data modifications and system events, supporting compliance requirements and resolving disputes in multi-party scenarios.

In some embodiments, the processing system may be configured to implement intelligent data routing and caching mechanisms to enhance performance in geographically distributed environments. For example, the system may dynamically adjust data placement and replication strategies based on access patterns, network latency, and storage capacity. This solution may minimize transfer distances and enhance or improve resource utilization, improving response times and reducing bandwidth consumption.

In some embodiments, the processing system may be configured to provide standardized APIs and data exchange protocols to allow seamless integration with existing enterprise systems. For example, these interfaces may support bidirectional data flow between centralized databases and the distributed network, allowing organizations to benefit from decentralized infrastructure while leveraging their existing assets.

In some embodiments, the processing system may be configured to use advanced consensus algorithms to maintain data consistency across the distributed network. For example, algorithms such as practical Byzantine fault tolerance (PBFT) or proof-of-stake (POS) may allow that nodes converge on a common state, even in the presence of network partitions or node failures. The choice of algorithm may depend on factors like transaction volume and desired finality guarantees.

In some embodiments, the processing system may be configured to support dynamic scaling within the distributed architecture. For example, the system may use automatic node discovery, load balancing, and data rebalancing to adapt to changing workloads and data volumes. New nodes may be seamlessly integrated into the network, and workloads may be redistributed to maintain optimal performance.

In some embodiments, the processing system may be configured to implement geofencing capabilities to address data sovereignty and regulatory compliance. For example, administrators may define geographic boundaries for data storage and processing, allowing adherence to data localization requirements while leveraging the benefits of distributed systems.

In some embodiments, the processing system may be configured to integrate multi-layered security mechanisms that combine traditional perimeter defenses with distributed authentication and authorization protocols. For example, sensitive data and operations may be protected by both centralized and decentralized access controls, enhancing security across hybrid environments.

In some embodiments, the processing system may be configured to use edge computing principles to improve performance and reduce latency for dispersed users. For example, lightweight processing nodes deployed near data sources or end-users may allow real-time analytics and data processing while maintaining synchronization with the distributed infrastructure.

In some embodiments, the processing system may be configured to implement versioning and immutability features to support evergreen data capabilities. For example, the system may maintain historical records of data changes while allowing the availability of the latest information. These features may support auditing, compliance reporting, and temporal data analysis.

In some embodiments, the processing system may be configured to incorporate self-healing and auto-recovery mechanisms to enhance resilience. For example, in the event of node failures or network disruptions, the system may automatically reconstruct data using redundant copies or parity information, minimizing downtime and reducing the need for manual intervention.

In some embodiments, the processing system may be configured to accommodate multi-modal data types within the distributed infrastructure. For example, the system may manage structured, semi-structured, and unstructured data formats, allowing organizations to unify diverse datasets within a single architecture.

In some embodiments, the processing system may be configured to implement rolling update mechanisms for seamless system maintenance and upgrades. For example, organizations may apply patches or enhancements incrementally without disrupting ongoing operations, supporting continuous improvement and adaptation.

In some embodiments, the processing system may be configured to support advanced analytics and machine learning within the distributed architecture. For example, the system may distribute analytical workloads across nodes, allowing large-scale model training and insights from datasets spread across the network.

In some embodiments, the processing system may be configured to allow multi-tenancy within the distributed infrastructure. For example, multiple organizations or departments may share the same network while maintaining logical separation and data isolation, enhancing cost-efficiency and resource utilization.

In some embodiments, the processing system may be configured to implement adaptive compression and deduplication techniques to enhance or improve storage and bandwidth usage. For example, the system may dynamically adjust these mechanisms based on data type, access patterns, and available resources.

In some embodiments, the processing system may be configured to integrate with cold storage solutions for long-term data retention and archival. For example, organizations may store historical data at reduced costs while maintaining accessibility for compliance or analysis.

In some embodiments, the processing system may be configured to implement distributed caching mechanisms to enhance performance for frequently accessed data. For example, caches may be dynamically updated based on data access patterns, reducing latency for common queries.

In some embodiments, the processing system may be configured to support federated queries across multiple data sources and nodes. For example, users may execute complex analytics without data centralization, maintaining locality and respecting access control policies.

In some embodiments, the processing system may be configured to support a wide range of applications and use cases across various industries. For example, the system may address challenges in data management, tokenization, and security with tailored solutions for finance, healthcare, law enforcement, and education.

In some embodiments, the processing system may provide event memorialization features for documenting and verifying critical legal proceedings. For example, immutable records of contract lifecycles may include timestamps, cryptographic signatures, and metadata, allowing verifiable proof of participation using SBTs.

In some embodiments, the processing system may be configured to log training activities, mission briefings, and operational events for law enforcement and military applications. For example, a chain of interconnected SBTs may document certifications, commendations, and disciplinary actions, providing a verifiable career history.

In some embodiments, the processing system may be configured to revolutionize academic credentialing by issuing SBTs for degrees, course completions, and achievements. For example, these tokens may include metadata on coursework, grades, and skills, creating a secure and verifiable academic profile.

In some embodiments, the processing system may be configured to enforce RBAC to manage permissions in specific applications. For example, only designated personnel, such as lawyers or notaries, may have permissions to create or modify records. As a further example, the processing system may be configured to implement RBAC for an educational environment such that professors may input grades while registrars manage and verify academic credentials.

In some embodiments, the processing system may be configured to support fine-grained RBAC actions. For example, paralegals may annotate documents without signing contracts, while certain military roles may log training completions but lack permissions for issuing commendations.

In some embodiments, the processing system may be configured to enforce RBAC policies using smart contracts. For example, permissions may be dynamically assigned or revoked based on predefined rules or organizational hierarchies, allowing consistent access control across decentralized systems.

In some embodiments, the processing system may be configured to support dynamic RBAC, allowing real-time adjustments to user permissions based on contextual factors like location or time. For example, law enforcement personnel may gain temporary access to specific records during active operations.

In some embodiments, the processing system may combine robust event memorialization and RBAC features to create secure, auditable, and verifiable records. For example, legal, military, and educational applications may benefit from the system's ability to maintain data integrity while enforcing precise access controls tailored to each use case.

The various embodiments provide a comprehensive system and methods for monitoring, collecting, and analyzing event data in distributed computing environments. These embodiments address technical challenges and complexities of distributed systems by integrating lightweight software sensors, sharded database architectures, and DLT-based tokenization. The embodiments provide an efficient and scalable solution for managing complex, large-scale event data.

As discussed, some embodiments may include a processing system configured to address limitations in conventional monitoring systems by deploying configurable software sensors that monitor specific events such as file modifications, API requests, and security activities. In some embodiments, the processing system may use these sensors to collect event data that aligns with predefined criteria to isolate relevant occurrences.

In some embodiments, the processing system may transform data from diverse formats into a unified structure using a data normalization pipeline. In some embodiments, the processing system may implement schema mapping to normalize structured logs, semi-structured metadata, and unstructured text for analysis.

In some embodiments, the processing system may provide actionable insights by applying rule-based analysis and advanced algorithms to the collected event data. In some embodiments, the processing system may detect anomalies, calculate metrics, and trigger alerts or responses based on user-defined thresholds or system-defined rules. In some embodiments, the processing system may display insights and allow users to assess and act upon real-time operational data.

In some embodiments, the processing system may operate effectively in multi-cloud and hybrid setups by addressing inconsistencies in data collection methods, security measures, and compliance protocols.

In some embodiments, the processing system may deploy configurable software sensors to monitor targeted events such as file modifications, API requests, or security-related activities. In some embodiments, the processing system may process granular event data collected by these sensors and generate operational insights, metrics, and analytics.

In some embodiments, the processing system may use DLT-based tokenization to create immutable records that serve as tamper-proof audit trails. In some embodiments, the processing system may enhance traceability and compliance with regulatory frameworks, such as the General Data Protection Regulation (GDPR) or the Health Insurance Portability and Accountability Act (HIPAA), through the use of tokenized records. In some embodiments, the processing system may dynamically scale to adapt to changes in resource allocation, including the addition or removal of nodes in a distributed environment, to maintain consistent monitoring and analysis capabilities.

Some embodiments include a processing system configured to implement decentralized data management, cryptographic security, and compliance solutions using distributed ledger technology (DLT). Some embodiments may include DLT-based tokenization with immutable audit trails for data integrity and compliance. These embodiments may preserve system activity records in a tamper-proof format that supports transparency and accountability. Some embodiments may provide dynamic scalability that adapts monitoring as resources change or reconfigure. Some embodiments may use machine learning techniques to augment monitoring and analysis to detect anomalies, predict issues, or refine data collection strategies based on historical patterns and real-time inputs.

Some embodiments may provide data retention and archiving based on user-defined policies. Some embodiments may store historical event data for compliance, auditing, or analytics. Some embodiments may integrate comprehensive security mechanisms, such as distributed ledger references, cryptographic proofs, and immutable backup systems. Some embodiments may use cryptographic hashes of data shards, metadata, and transactions, recorded in decentralized ledgers for unauthorized change detection. These embodiments may eliminate single failure points and offer robust data recovery in case of system failures or malicious actions.

Some embodiments may apply protection for reentrancy attacks in decentralized contexts. Smart contracts for token transfers or data access may use execution state variables that reject recursive calls. Transactions revert when reentrancy appears, which preserves operational integrity. Some embodiments add multi-layered encryption for data at rest or in transit. Each data shard includes unique keys under advanced key management, which means node compromises do not reveal the underlying data. Some embodiments identify anomalies or tampering attempts by analyzing data access or network traffic patterns. Machine learning baselines highlight deviations that suggest malicious behavior.

Some embodiments may require consensus-based validation for token transfers or data modifications. Multiple nodes verify and approve transactions. This method reduces the effect of compromised nodes and denies unauthorized changes. Some embodiments enforce granular access control through cryptographic proofs and identity verification. This solution relies on user credentials or tokens for read or write permissions. Smart contracts apply these policies in a consistent manner across the network. Some embodiments use privacy-preserving computations, such as zero-knowledge proofs or secure multi-party computation, which verify data properties without revealing sensitive information.

Some embodiments may include tamper-evident logging for data access, modifications, and administrative actions. Cryptographic signatures appear in distributed logs, supporting forensic analysis. Others include automated backup and recovery that creates snapshots of the system state across multiple nodes. Cryptographic hashes verify snapshot integrity, which helps restore data during corruption or node failure. Some embodiments rotate cryptographic keys in a secure manner to reduce long-term key exposure. Others apply multi-signature schemes for high-value transactions or critical changes. This solution distributes approval among multiple parties to avoid unauthorized actions.

Some embodiments may implement network segmentation that isolates critical components or data. This arrangement enforces strict access policies and monitors communication between segments. Others apply rate limiting to prevent denial-of-service attacks or brute-force attempts. Some embodiments maintain secure channels for updates by cryptographically signing packages to prevent malicious code injection. Others may use secure enclaves or trusted execution environments for critical operations. Certain embodiments add multi-factor authentication or continuous verification to enhance identity and access management.

Others include secure key recovery procedures that distribute trust among multiple parties, preventing single points of failure.

Some embodiments may provide security auditing and compliance reporting. Administrators review the system's posture and generate reports from immutable audit logs and cryptographic proofs. Others migrate away from centralized systems by adopting distributed redundancy, similar to RAID. Distributed data partitioning stores subsets of the dataset on each node, with replication or parity that provides recoverability. Some embodiments operate as hybrid architectures that combine decentralized infrastructure with enterprise systems. This technique increases scalability, data consistency, and performance Some embodiments may record cryptographic hashes of events on ledgers to provide data provenance. These ledgers verify modifications and system events, useful in multi-party scenarios. Others apply intelligent routing and caching to optimize performance in geographically distributed settings. These embodiments place data strategically based on network latency or capacity and reference standardized APIs for interoperability between decentralized networks and existing enterprise frameworks. Consensus algorithms, such as PBFT or proof-of-stake, validate data consistency across multiple nodes. Dynamic scaling procedures monitor workloads and rebalance resources to ensure system continuity. Geofencing addresses local data regulations by storing and processing data within designated geographic areas.

Some embodiments may combine perimeter defenses with decentralized authentication for layered security. Others incorporate edge computing for local processing and real-time analytics. Certain embodiments add versioning that retains historical data records for auditing and temporal analysis. Self-healing or auto-recovery procedures rebuild data when node failures occur. Some embodiments manage structured, semi-structured, or unstructured data in a unified architecture. Rolling updates allow seamless maintenance or patches without downtime. Advanced analytics and machine learning spread workloads across nodes for large-scale model training. Multi-tenancy separates organizations or departments while sharing a decentralized network.

Some embodiments may integrate adaptive compression or deduplication to improve bandwidth usage. Others coordinate with cold storage solutions for long-term data retention at reduced cost. Distributed caching accelerates frequently accessed data. Federated queries span multiple data sources without centralizing. This solution may suit many use cases in finance, healthcare, legal, and education. Some embodiments memorialize events for legal proofs through SBTs that reference timestamps and cryptographic signatures. Others log training and mission records for law enforcement and military. SBT-based credentialing supports academic transcripts and achievements. Role-based access control (RBAC) grants or revokes permissions for lawyers or professors, with fine-grained actions for paralegals or military roles. RBAC policies embed in smart contracts to adapt dynamically. This integrated solution addresses challenges in data management, tokenization, and security. Lightweight sensors capture file modifications or security-related events. A data normalization pipeline unifies raw data, and rule-based analysis or advanced algorithms produce alerts, metrics, and analytics. Some embodiments allow multi-cloud or hybrid deployments that unify security measures and compliance. Sensors collect granular data, DLT-based tokenization forms tamper-proof audit trails, and dynamic scaling adjusts resource usage. This architecture aligns with regulatory frameworks such as GDPR or HIPAA. Scalability accommodates node additions or removals while preserving consistent monitoring and analysis.

Some embodiments may include decentralized systems and methods that integrate multiple cryptographic, security, and data management components to enhance secure data distribution, authentication, and compliance. The embodiments address decentralized data distribution, cryptographic security, and compliance requirements in distributed computing environments. Data shards, encryption keys, metadata references, and token-based architectures combine to address known risks in conventional architectures that involve centralized controls or fragmented decentralized solutions.

Some embodiments may provide a unified solution that introduces a diffusion layer for distributing electronic datasets as encrypted data shards across decentralized nodes. Each data shard includes a unique cryptographic key. Shard metadata references appear in a tamper-evident ledger, which may record provenance details, such as timestamps and responsible signatories. Tokens, such as fungible tokens, non-fungible tokens, or SBTs, each include references to shard locations and cryptographic proofs. A vault component manages key custody and multi-signature approvals. A security shield monitors network events and triggers automated mitigation when suspicious behavior appears. Region-based sub-tokenization addresses compliance by limiting certain transactions to specific jurisdictions and synchronizing updates to a global ledger after regional validations conclude. This solution integrates cryptographic vault management, distributed event-driven monitoring, and hierarchical token references. It supports dynamic reallocation of shards, threshold cryptography for key rotation, and ledger-based provenance tracking, which removes single points of failure. Each element provides operations for auditing, data retrieval, shard reallocation, and cryptographic key generation.

Some of the technical challenges overcome by the various embodiments include limited access controls, incomplete monitoring of unauthorized activities, and inconsistent adherence to geographic rules. Several architectures partition data in ways that lack robust encryption or multi-signature approvals. Other architectures store tokens without ledger-backed lineage or use separate systems that do not preserve end-to-end auditability. These gaps reduce reliability and compliance assurance.

As an example, the vault may maintain multi-signature approvals for token issuance or key rotations. An entity that wants to store regulated data may use region-based tokens that confine some shards to local nodes. The ledger may track each node's performance metrics, which triggers shard reallocation if a node fails to confirm a heartbeat signal. The vault may update cryptographic keys, and the shield may isolate the failing node. This process maintains operational continuity. Another example involves SBT credentials that reference hierarchical events in a ledger-backed chain of updates. Each record includes a unique signature from an authorized role, and an SBT that reflects the entity's verified attributes. This ledger-based structure provides data retrieval and auditing.

In addition, microservices may allocate or terminate themselves based on real-time metrics. Each microservice performs tasks, such as verifying cryptographic signatures or partitioning data shards, and each operation appears in the ledger. This architecture may integrate multiple DLT platforms for broader interoperability, with token metadata referencing local or global ledger segments. The diffusion component manages data distribution, while the vault secures cryptographic keys, and the shield continuously scans for anomalies. These features support reliability and preserve compliance in complex hybrid or multi-cloud systems.

Embodiments disclosed herein may include various technical solutions integrated within a unified decentralized architecture.

Some embodiments may implement adaptive diffusion to partition electronic datasets into uniquely encrypted data shards distributed across decentralized storage nodes. Adaptive diffusion refers to dynamically dividing and distributing data shards according to predefined performance criteria, geographic considerations, or usage patterns. Each data shard remains uniquely encrypted with an individual encryption key and referenced by shard metadata and cryptographic proofs stored within decentralized, tamper-evident ledgers. This solution enhances redundancy, supports parallel data retrieval or reassembly, and provides verifiable data integrity.

Some embodiments may create and manage fungible, non-fungible, and SBTs representing digital assets, identity credentials, or event logs. Tokens link metadata stored off-chain within decentralized storage nodes. Each token metadata references shard locations, lineage information, and cryptographic signatures. Tokens may interoperate with multiple distributed ledger technologies (DLT) or cloud services through standardized application programming interfaces (APIs) and smart contracts, thereby improving flexibility, interoperability, and security.

Some embodiments may implement a cryptographic vault that secures cryptographic keys and token custody through multi-signature approvals or threshold cryptography. Threshold cryptography refers to distributing cryptographic approvals among multiple independent signatories, ensuring no single party controls the private key. The vault protects private keys using hardware security modules (HSMs) or secure enclaves. Each token issuance, encryption key rotation, or data shard reallocation references validations recorded within decentralized ledgers, thereby preventing unauthorized modifications and single-point key compromises.

Some embodiments integrate an event-driven security shield that monitors data events occurring throughout decentralized nodes. Data events may include file access, network actions, or API requests. The shield may apply predefined rule-based or machine-learning algorithms to detect anomalous activity indicative of unauthorized or suspicious behavior. Upon detecting anomalies, the shield may trigger automated security responses, including node isolation, restricting unauthorized access, or requiring additional vault approvals. All security actions and detected events may appear as ledger entries to maintain a transparent, tamper-evident security record.

Some embodiments may implement region-based sub-tokenization to route transactions or data references to decentralized storage nodes located within specific geographic regions. Region-based sub-tokenization may include embedding geographic metadata within tokens, which directs validation and compliance checks to local nodes. Local nodes verify jurisdiction-specific regulatory requirements and synchronize validated sub-tokens globally after regional validation completes. This method limits global ledger traffic, accelerates regional compliance, and supports jurisdiction-specific data protection regulations.

Some embodiments may track data provenance and lineage hierarchically through cryptographic linkages recorded within decentralized ledgers. Data provenance refers to verifying the origin, modifications, and authenticity of data shards, token issuance, or event updates. Each ledger entry references prior states, timestamps, authorized roles, and digital signatures. Hierarchical provenance tracking may allow granular auditing, data rollback to earlier states, and simplified compliance verification.

Some embodiments may include decentralized microservices that process transactions or data requests distributed among decentralized nodes. Real-time system performance metrics guide microservice allocation or termination decisions to manage resources effectively. Microservices verify transactions using cryptographic authentication, tokenize events, or redistribute data shards. Resource allocation decisions remain recorded within decentralized ledgers, providing transparent records of system scaling, load balancing, and microservice execution.

Some embodiments may incorporate non-transferable (soulbound) tokens permanently linked to unique decentralized identifiers corresponding to a single identity. Non-transferable tokens reference off-chain credentials, event logs, or encrypted data shards through metadata stored within decentralized ledgers. Smart contracts enforce token non-transferability and associate identity attributes with a hierarchical event chain. This method provides verifiable, tamper-resistant representations of credentials or certifications.

Some embodiments may integrate adaptive diffusion, tokenization, cryptographic vaults, and security shields into a cohesive decentralized architecture. Each component interoperates through decentralized ledger references and metadata links. Encrypted data shards dynamically distribute based on geographic or performance criteria. Tokens remain interoperable across multiple ledgers and secured by vault-managed cryptographic keys. The security shield continuously monitors decentralized nodes, responds automatically to detected threats, and logs all responses within decentralized ledgers. This unified solution directly mitigates risks associated with data fragmentation, cryptographic key exposure, and delayed security response inherent in isolated or single-protocol systems.

The embodiments disclosed herein may thus enhance data availability, reduce latency, support granular auditability, improve cryptographic security management, ensure regulatory compliance, and increase overall resilience within decentralized environments.

Several technical challenges have persisted in conventional distributed data management and ledger-based systems. One of the more important challenges is the single point of failure introduced by centralized architectures or insufficient shard partitioning, which leaves data vulnerable to unauthorized access, downtime, and performance bottlenecks. In addition, conventional configurations often lack robust real-time monitoring and anomaly detection, leading to delayed threat responses and leaving systems exposed to distributed denial-of-service attacks or stealthy data tampering. Further complicating matters, reliance on narrowly scoped protocols or proprietary ledger platforms has stifled cross-chain interoperability, preventing efficient synchronization and validation across multiple distributed ledger technologies (DLTs) or cloud services. These gaps in reliability, security, and interoperability have impeded broader adoption of decentralized computing in industries that demand real-time performance, data provenance, and strong compliance controls.

Some embodiments address these issues by dynamically sharding data based on node performance, geographic constraints, and usage patterns. By encrypting each shard with unique keys—managed and rotated through hardware security modules (HSMs) or multi-party computation—these embodiments remove single points of failure and mitigate unauthorized data disclosure or corruption. Meanwhile, the shield component may coordinate anomaly detection, using rule-based logic and machine learning models to isolate compromised nodes and proactively detect suspicious behaviors (e.g., file tampering, brute-force attempts). Together, these features improve security and resilience in a truly decentralized architecture, as data is partitioned, monitored, and reassembled using cryptographically verifiable references stored in one or more distributed ledgers.

Another technical challenge has been ensuring robust lineage tracking and regulatory compliance across hybrid or multi-cloud environments. The embodiments unify data provenance records, cryptographic hashes, and token-based references (including fungible, non-fungible, and SBTs) into a ledger-backed framework, creating an immutable trail of any data modification or asset transfer. Because each ledger entry cross-references shard identifiers, timestamps, and responsible entities, stakeholders can conduct precise audits and satisfy region-specific requirements (e.g., GDPR, HIPAA) while preserving high throughput. This lineage infrastructure is further extended by region-based sub-tokens, which allow localized validation and routing of transactions or data shards within particular legal jurisdictions. The result is not only a reduction in global ledger congestion but also a more transparent compliance posture.

In addition, conventional architectures for decentralized storage and token management often silo security and vault capabilities from data sharding. Some embodiments may remedy this by tightly coupling a vault component that enforces multi-signature approvals, threshold cryptography, and hierarchical role-based access control (RBAC) with the rest of the diffusion architecture. This may allow cryptographic key usage, token issuance, and shard reallocation events to be consistently governed through ledger-based records. As a result, all high-value or sensitive operations— such as minting identity-linked SBTs or rotating data encryption keys—are subject to automated verification and tamper-evident audit trails. By unifying these elements, the embodiments deliver a cohesive, secure, and highly scalable system that solves the persistent technical problems of single-protocol dependency, inconsistent security enforcement, slow threat response, insufficient fault tolerance, and incomplete data lineage tracking across modern distributed computing environments.

The embodiments may differ from conventional decentralized solutions by unifying multiple security methods, cross-ledger interoperability, real-time shard reallocation, or rigorous cryptographic key custody measures. Rather than relying upon basic ledger transactions or conventional sharding, the processing system may integrate dynamic region-based validation, specialized sub-tokenization, advanced role-based access control, or adaptive cryptographic key rotation. The processing system may use this integrated solution to reduce fragmentation present in conventional decentralized systems. To achieve this reduction, the processing system may securely bind identity-driven tokens, data provenance records, or ledger-based event memorialization into a unified architecture. Unlike frameworks that store partial metadata on a single ledger or issue tokens without secure multi-signature protocols, the processing system may combine shield components, vault components, or diffusion components into an interlinked structure. Through these combined operations, the processing system may realize security or interoperability advantages unavailable in single-protocol or single-ledger deployments.

As an example, the processing system may operate within a medical research consortium that applies the decentralized architecture described herein. In this example, IoT devices at individual clinics gather anonymized patient data or generate SBTs linked to event logs. The processing system may use these SBTs to provide data integrity or ensure compliance with healthcare data regulations. The processing system may dynamically distribute shards containing event logs to nodes near the geographic region of each clinic. Shards may remain encrypted through the vault component's multi-party cryptographic method. Simultaneously, the processing system may enforce sensor-specific rules that identify anomalous behavior, such as suspicious data modifications or repeated failed access attempts. Administrators located in different jurisdictions may verify cryptographic hashes recorded within a global ledger. This verification may allow local compliance checks while maintaining a global tamper-evident record.

The embodiments disclosed herein provide features or processes that collectively improve data security, interoperability, or operational efficiency within decentralized or hybrid frameworks. These embodiments do not explicitly enumerate claims but describe operations the processing system may perform. Examples of these operations include dynamic shard distribution, event logging within tamper-evident ledgers, token-based identity verification, or multi-signature cryptographic key management. Such operations may individually or collectively enhance system performance or functionality. In addition, the processing system may use region-based sub-token validation or shield-based anomaly detection combined with ledger updates. Implementers skilled in the art may combine or individually use these features to define specific embodiments within the scope of the disclosure.

In some embodiments, each component within the architecture may address technical limitations present in conventional decentralized systems. For example, the processing system may dynamically select nodes to reduce latency during shard retrieval operations. The vault component may use multi-signature authorization or hardware-based key protection to avoid single-point cryptographic key compromise. The shield component may perform rule-based event monitoring to mitigate delays commonly encountered in threat detection performed by conventional logs. The diffusion component may allow local validation of region-based rules to reduce congestion on global ledgers. These operational improvements may directly reduce overhead, expedite data retrieval, or increase security compared to software-only or partially decentralized systems. Collectively, these improvements may result in measurable technical enhancements such as reduced transaction latency, accelerated anomaly detection, decreased data breaches, or reduced overhead associated with cryptographic rekeying.

It should be understood that the embodiments may implementers flexibility in combining features according to specific project needs or constraints. For example, one embodiment may apply region-based sub-tokens combined with cross-chain bridging, whereas another embodiment may focus upon advanced multi-party cryptographic key distribution. Each function described herein may serve as a modular component within a unified decentralized platform. For instance, the processing system may deploy vault, diffusion, or shield components as containerized microservices within multi-cloud environments. Each container may include specialized software agents configured for cryptographic key management or anomaly detection operations. The processing system may replicate shards according to metadata associated with tokens, such as SBTs or region-based sub-tokens. The processing system may maintain a curated ledger node cluster using PoS consensus combined with local PBFT layers. This implementation may allow real-time ledger updates, localized token validations, hardware-based cryptographic key protection, or event-based shard reassignment. The coordinated interaction of these components may produce enhanced operational continuity or comprehensive security across multiple regulatory jurisdictions.

In some embodiments, when the vault component may redistribute cryptographic keys due to shard reallocation and the diffusion component may update node references within the ledger. Updated ledger entries may include partial signatures from authorized vault operators. The shield component may monitor these ledger updates to detect sudden or inconsistent shard reallocation attempts. Upon detection of anomalous patterns, the shield component may initiate a workflow to respond to the anomaly. Simultaneously, tokenization processes may incorporate updated cryptographic key references provided by the vault component to maintain newly generated SBTs. If the shield component detects a suspicious file access event, the vault component may deny subsequent token-based data retrieval attempts until completion of a multi-party threshold review. As such, it should be understood that, in some embodiments, ledger-based events may drive coordinated actions across vault, diffusion, tokenization, or shield components. These coordinated actions may ensure consistency or verifiability of data movement, cryptographic key reallocation, or event logging during each operation.

Unlike conventional generalized decentralized storage and scalable computing solutions, the embodiments may include integrating shard-level encryption keys directly with ledger-stored metadata (so that no single node contains the full dataset or keys), parallel shard retrieval from storage nodes chosen explicitly using real-time metrics including latency, storage utilization, and reliability, autonomous real-time reallocation of shards from failed nodes using these dynamic network metrics, and/or machine learning predictions explicitly applied for intelligent caching decisions based on historical and real-time access patterns.

Unlike conventional blockchain-based financial services and geographically distributed ledger networks, the embodiments may include creation and use of region-specific cryptographic sub-tokens explicitly embedding geolocation data (processed locally within specific geographic boundaries before global ledger integration), dynamic reassignment of transactions among regional nodes responsive specifically to congestion or node downtime, the generation of region-specific routing identifiers explicitly determined by geolocation data, and using machine learning anomaly detection explicitly within region-specific sub-token transaction processing.

Unlike conventional generalized tokenization and decentralized storage solutions, the embodiments may include binding cryptographic tokens explicitly to encrypted and partitioned data segments stored off-chain (in which each minted token directly references the precise decentralized storage node locations), smart contracts explicitly minting tokens with embedded metadata (such as provenance identifiers and timestamps) linking tokens directly to decentralized data segments, embedding access-control permissions directly within tokens governing decentralized storage access, and integration of tokens explicitly referencing decentralized encrypted segments for secure and verifiable off-chain data retrieval.

Unlike conventional identity management solutions, the embodiments may include minting non-transferable tokens (SBTs, etc.) explicitly and permanently linked to DIDs and immutable off-chain event records, cryptographic linkage between identity tokens and hierarchical event chains specifically enforced by smart contracts to prevent token transferability, and/or enforcing explicit cryptographic rules to validate event authenticity and immutability explicitly associated with identity tokens.

Unlike conventional digital asset management on decentralized networks, the embodiments may include integration of digital wallet operations directly interacting with non-transferable identity-based tokens explicitly linked to DIDs, executing smart contracts performing multi-signature verifications and ledger-based asset transactions specifically linked with identity tokens, and/or immutable ledger entries explicitly capturing cryptographic references, asset balances, and timestamps within identity-linked tokens to enforce secure, automated asset management.

Unlike generic blockchain-based hierarchical structures, the embodiments may include hierarchical source chains cryptographically linked explicitly and immutably to identity-based non-transferable tokens (providing explicit traceability of each data update), smart contract enforcement explicitly preventing the movement or transfer of tokens away from the original entity, and/or cryptographic validation of event data shards stored across decentralized nodes explicitly verified against immutable identity-linked ledger records.

Unlike conventional decentralized event monitoring solutions, the embodiments may include deployment of modular sensors specifically for decentralized tokenized shard creation and timestamp-based replay of event logs, integration of token-based shard data explicitly fed by modular sensors and listeners into decentralized storage with cryptographic lineage validation, and rule-based and machine-learning anomaly detection explicitly linked to modular sensor-generated event logs within decentralized environments.

Unlike conventional data integrity verification solutions, the embodiments may include cryptographic event memorialization explicitly recording operation-specific cryptographic hashes directly within a distributed ledger for automated anomaly detection and rollback capabilities, autonomous reconstruction of compromised shards using cryptographic proofs and ledger-based recovery mechanisms explicitly designed for distributed environments, and integration of DID-derived encryption keys explicitly used for shard encryption with cryptographic validation through ledger-stored proofs.

Unlike conventional decentralized cloud integrations and multi-platform solutions, the embodiments may include explicit ledger-based cryptographic lineage management tracking encrypted data segments distributed explicitly across multiple independent decentralized platforms, unique identifiers explicitly linking each encrypted data segment across decentralized systems for consistent cryptographic origin verification, and/or geofencing and multi-cloud storage explicitly integrated with cross-platform ledger-based cryptographic verification mechanisms.

Unlike conventional microservices and cloud-DLT orchestration solutions, the embodiments may include real-time dynamic orchestration explicitly based on performance metrics including processing load, memory utilization, and latency in decentralized execution nodes, explicit cryptographic tokenization and immutable event logging for each microservice transaction linked explicitly to decentralized identifiers, and/or automated real-time adjustment and real-location of microservice resources specifically responsive to node utilization metrics in decentralized environments.

Figure 24:
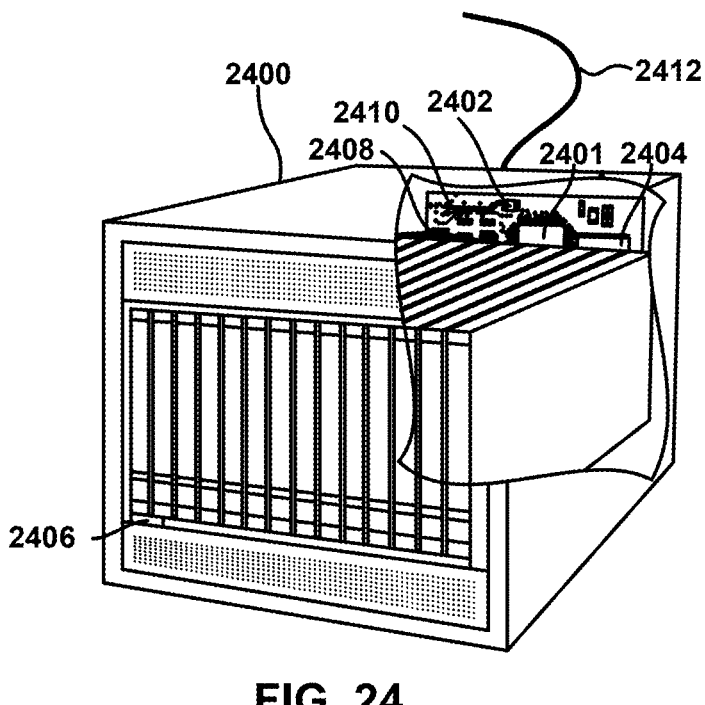
FIG. 24 is a component diagram of a computing device suitable for implementing some embodiments.

Some embodiments may be implemented on a variety of commercially available computing devices, such as the server computing device 2400 illustrated in FIG. 24. The server device 2400 may include one or more processors 2401 (e.g., multi-core processor, etc.) coupled to volatile memory 2402, such as RAM, and a large capacity nonvola-tile memory, such as a solid-state drive (SSD) 2403. The server device 2400 may also include additional storage interfaces such as USB ports and NVMe slots coupled to the processor 2401. The server device 2400 may include net-work access ports 2406 coupled to the processor 2401 that allow data connections through a network interface card (NIC) 2404 and a communication network 2407 (e.g., an Internet Protocol (IP) network) connected to other network elements.

For the sake of clarity and ease of presentation, the methods discussed in this application are presented as sepa-rate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. from producing a modified or alternative result or solution. The presentation of individual methods, blocks, operations, etc. should not be interpreted as mutually exclusive, limiting, or as being required unless expressly recited as such in the claims.

The processors discussed in this application may be any programmable microprocessor, microcomputer, or a combi-nation of multiple processor chips configured by software instructions (applications) to perform diverse functions, including those of the various embodiments described herein. Severs 2400 often include multiple processors, with dedicated processors for specific tasks such as managing cloud computing operations, data analytics, or wireless communication functions. Software applications may be stored in the internal memory before being accessed and executed by the processor. Modern processors may include extensive internal memory, often augmented with fast access cache memory, to efficiently store and process application software instructions.

Implementation examples are described in the following paragraphs. While some of the following implementation examples are described in terms of example methods, further example implementations may include: the example meth-ods discussed in the following paragraphs implemented by a computing device including a processor configured (e.g., with processor-executable instructions) to perform opera-tions of the methods of the following implementation examples; the example methods discussed in the following paragraphs implemented by a computing device including means for performing functions of the methods of the following implementation examples; and the example meth-ods discussed in the following paragraphs may be imple-mented as a non-transitory processor-readable storage medium having stored thereon processor-executable instruc-tions configured to cause a processor of a computing device to perform the operations of the methods of the following implementation examples.

Example 1: A computer-implemented method for source chain management with identity-based tokens and enhanced security, the method including receiving, from an entity, an input including a decentralized identifier (DID) uniquely associated with the entity, invoking a smart contract deployed on a distributed ledger to mint a non-transferable identity-based token linked permanently to the DID, in which the token cannot be transferred to another DID, generating metadata for the identity-based token including a cryptographic reference to a hierarchical source chain struc-ture stored within a decentralized data storage system, and cryptographic verification data configured to validate integ-rity of the metadata and the hierarchical source chain struc-ture, storing the metadata and a link to the identity-based token in the decentralized data storage system, in which the decentralized data storage system partitions data into a plurality of encrypted data shards, and distributes each encrypted data shard across decentralized storage nodes, memorializing an event associated with the entity by record-ing granular event details including a timestamp, a compre-hensive log documenting specific data changes, and an origin identifier of the event, and appending the granular event details into the hierarchical source chain structure stored within the decentralized data storage system, verify-ing integrity of the hierarchical source chain structure by validating cryptographic links between event records, and providing authorized access through an authenticated inter-face configured to reconstruct encrypted data shards from the decentralized data storage system upon authenticated request.

Example 2: The method of example 1, further including encrypting each data shard using an encryption key uniquely derived from the DID.

Example 3: The method of any of the examples 1 and 2, in which cryptographic links between event records are verified using a Merkle tree structure.

Example 4: The method of any of the examples 1-3, further including embedding cryptographically enforceable non-transferability rules directly into the smart contract to prevent unauthorized token transfer.

Example 5: The method of any of the examples 1-4, further including detecting unauthorized attempts to modify the hierarchical source chain structure and automatically generating cryptographically authenticated security anomaly alerts.

Example 6: The method of any of the examples 1-5, in which the hierarchical source chain structure supports branching structures, each branch representing crypto-graphically verifiable relationships between parent events and one or more sub-events.

Example 7: The method of any of the examples 1-6, in which the decentralized data storage system dynamically adjusts data retrieval performance by intelligently routing incoming retrieval requests based on real-time node avail-ability or network performance metrics.

Example 8: The method of any of the examples 1-7, further including generating and maintaining cryptographi-cally secured audit logs within the metadata for regulatory compliance and transaction verification.

Example 9: The method of any of the examples 1-8, in which the smart contract enforces predefined conditions for accessing the identity-based token, and these access condi-tions are cryptographically linked to the DID.

Example 10: The method of any of the examples 1-9, in which the decentralized data storage system ensures data redundancy by automatically replicating encrypted data shards across geographically dispersed storage nodes.

Example 11: The method of any of the examples 1-10, further including dynamically adjusting the physical storage distribution of encrypted data shards based explicitly on monitored system usage patterns or real-time decentralized storage node conditions to enhance performance or fault tolerance.

Example 12: The method of any of the examples 1-11, further including verifying cryptographic provenance data associated with the metadata prior to granting access to the hierarchical source chain or event details.

Example 13: The method of any of the examples 1-12, further including generating a graphical visualization of the hierarchical source chain for interactive display via an authenticated user interface, in which the visualization shows cryptographic verification status, timestamped events, and event relationships.

Example 14: The method of any of the examples 1-13, in which the metadata embedded within the identity-based token includes compliance-related data structured explicitly to satisfy regulatory auditing and verification requirements.

Example 15: The method of any of the examples 1-14, further including integrating the identity-based token and hierarchical source chain with external third-party platforms via an application programming interface (API), enabling secure external access and query-based retrieval.

Example 16: The method of any of the examples 1-15, in which the decentralized data storage system uses cryptographically enforced access controls restricting the reconstruction and retrieval of encrypted data shards exclusively to entities authorized according to access permissions defined within the smart contract.

Example 17: The method of any of the examples 1-16, further including implementing role-based access control (RBAC) within the authenticated interface, in which RBAC defines multiple permission levels enabling differentiated access to identity-based tokens and hierarchical event data.

As used in this application, terms such as "component," "module," "system," etc., are intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function, or procedure calls, electronic signaling, data packet exchanges, memory interactions, among other known methods of network, computer, processor, or process-related communications.

A variety of memory types and technologies, both currently available and anticipated for future development, may be incorporated into systems and computing devices that implement the various embodiments. These memory technologies may include non-volatile random-access memories (NVRAM) such as magnetoresistive RAM (MRAM), resistive random-access memory (RcRAM or RRAM), phase-change memory (PCM, PC-RAM, or PRAM), ferroelectric RAM (FRAM), spin-transfer torque magnetoresistive RAM (STT-MRAM), and three-dimensional cross point (3D XPoint) memory. Non-volatile or read-only memory (ROM) technologies may also be included, such as programmable read-only memory (PROM), field programmable read-only memory (FPROM), and one-time programmable non-volatile memory (OTP NVM).

Volatile random-access memory (RAM) technologies may further be used, including dynamic random-access memory (DRAM), double data rate synchronous dynamic random-access memory (DDR SDRAM), static random-access memory (SRAM), and pseudostatic random-access memory (PSRAM). In addition, systems and computing devices implementing these embodiments may use solid-state non-volatile storage mediums, such as FLASH memory. The aforementioned memory technologies may store instructions, programs, control signals, and/or data for use in computing devices, SOC components, or other electronic systems. Any references to specific memory types, interfaces, standards, or technologies are provided for illustrative purposes and do not limit the claims to any particular memory system or technology unless explicitly recited in the claim language.

The foregoing method descriptions and the process flow diagrams are provided merely as illustrative examples and are not intended to require or imply that the blocks of the various aspects must be performed in the order presented. As may be appreciated by one of skill in the art the order of steps in the foregoing aspects may be performed in any order. Words such as "thereafter," "then," "next," etc. are not intended to limit the order of the blocks, these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithmic steps described in connection with the aspects disclosed herein may be implemented as electronic hardware, computer software, or combinations of both. To clearly illustrate the interchangeability of hardware and software, various components, blocks, modules, circuits, and steps have been described in terms of their functionality. Whether such functionality is implemented as hardware or software may depend on the specific application and the design constraints of the overall system. Skilled artisans may implement the described functionality in different ways for each particular application, and such implementation decisions should not be interpreted as limiting or altering the scope of the claims unless explicitly recited in the claim language.

The hardware used to implement the various illustrative logics, logical blocks, modules, and circuits described in connection with the embodiments disclosed herein may include or be performed by a general-purpose processor, a digital signal processor (DSP), an application-specific integrated circuit (ASIC), a field-programmable gate array (FPGA), a graphics processing unit (GPU), a tensor processing unit (TPU), or other programmable logic devices, discrete gate or transistor logic, discrete hardware components, or any combination thereof, designed to perform the functions described. A general-purpose processor may be a microprocessor, or alternatively, it may be any conventional processor, controller, microcontroller, or state machine. A processor may also be implemented as a combination of computing devices, such as a DSP combined with a microprocessor, multiple microprocessors, one or more microprocessors used in conjunction with a DSP core, a GPU, or AI accelerators such as TPUs. Alternatively, some operations or methods may be performed by circuitry designed specifically for a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module that resides on a non-transitory computer-readable or processor-readable storage medium. Non-transitory computer-readable or processor-readable storage media include any storage media that may be accessed by a computer or processor. By way of example, but not limitation, such non-transitory computer-readable or processor-readable media may include RAM, ROM, EEPROM, flash memory, SSDs, NVMe drives, 3D NAND flash, or any other medium capable of storing program code in the form of instructions or data structures that may be accessed by a computer. Cloud-based storage solutions, including infrastructure-as-a-service (IaaS) platforms, may provide scalable and distributed options for storing and accessing program code. In addition, the operations of a method or algorithm may reside as one or more sets of instructions or code on a non-transitory processor-readable or computer-readable medium, which may be incorporated into a computer program product. Emerging technologies, such as quantum computing storage media and DLT-based storage solutions, may enhance data integrity and security. AI and ML-based hardware accelerators, such as GPUs, TPUs, and other dedicated processing units, may be used to efficiently execute complex algorithms.

The preceding description of the disclosed aspects is provided to allow any person skilled in the art to make or use the claims. Various modifications to these aspects may be apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A computing system, comprising:
a processing system comprising one or more processors configured to:
   receive, from an entity, an input comprising a decentralized identifier (DID) uniquely associated with the entity;
   invoke a smart contract deployed on a distributed ledger to mint a non-transferable identity-based token linked permanently to the DID, wherein the token cannot be transferred to another DID;
   generate metadata for the identity-based token comprising:
      a cryptographic reference to a hierarchical source chain structure stored within a decentralized data storage system; and
      cryptographic verification data configured to validate integrity of the metadata and the hierarchical source chain structure;
   store the metadata and a link to the identity-based token in the decentralized data storage system, wherein the decentralized data storage system partitions data into a plurality of encrypted data shards and distributes each encrypted data shard across decentralized storage nodes;
   memorialize an event associated with the entity by:
      recording granular event details comprising a timestamp, a comprehensive log documenting specific data changes, and an origin identifier of the event; and
      appending the granular event details into the hierarchical source chain structure stored within the decentralized data storage system;
   verify integrity of the hierarchical source chain structure by validating cryptographic links between event records; and
   provide authorized access through an authenticated interface to reconstruct data from encrypted shards stored in the decentralized data storage system,
   wherein reconstructing the data from the encrypted shards comprises:
      retrieving encrypted shards referenced by the metadata from the decentralized storage nodes;
      decrypting the encrypted shards using one or more decryption keys derived from the DID;
      reconstructing a data object by assembling at least a subset of the decrypted shards; and
      presenting the reconstructed data object to authorized entities.

2. The computing system of claim 1, wherein the processing system is further configured to encrypt each data shard using an encryption key uniquely derived from the DID.

3. The computing system of claim 1, wherein cryptographic links between event records are verified using a Merkle tree structure.

4. The computing system of claim 1, wherein the processing system is further configured to embed cryptographically enforceable non-transferability rules directly into the smart contract to prevent unauthorized token transfer.

5. The computing system of claim 1, wherein the processing system is further configured to detect unauthorized attempts to modify the hierarchical source chain structure and automatically generate cryptographically authenticated security anomaly alerts.

6. The computing system of claim 1, wherein the hierarchical source chain structure supports branching structures, each branch representing cryptographically verifiable relationships between parent events and one or more sub-events.

7. The computing system of claim 1, wherein the decentralized data storage system dynamically adjusts data retrieval performance by intelligently routing incoming retrieval requests based upon real-time node availability or network performance metrics.

8. The computing system of claim 1, wherein the processing system is further configured to generate and maintain cryptographically secured audit logs within the metadata for regulatory compliance and transaction verification.

9. The computing system of claim 1, wherein the smart contract enforces predefined conditions for accessing the identity-based token, wherein the predefined conditions are cryptographically linked to the DID.

10. The computing system of claim 1, wherein the decentralized data storage system provides data redundancy by automatically replicating encrypted data shards across geographically dispersed storage nodes.

11. The computing system of claim 1, wherein the processing system is further configured to dynamically adjust physical storage distribution of encrypted data shards based on monitored system usage patterns or real-time decentralized storage node conditions to enhance performance or fault tolerance.

12. The computing system of claim 1, wherein the processing system is further configured to verify cryptographic provenance data associated with the metadata prior to granting access to the hierarchical source chain structure or event details.

13. The computing system of claim 1, wherein the processing system is further configured to generate a graphical visualization of the hierarchical source chain structure for interactive display via an authenticated user interface, wherein the visualization shows cryptographic verification status, timestamped events, and event relationships.

14. The computing system of claim 1, wherein the metadata embedded within the identity-based token includes compliance-related data structured explicitly to satisfy regulatory auditing and verification requirements.

15. The computing system of claim 1, wherein the processing system is further configured to integrate the identity-based token and hierarchical source chain structure with external third-party platforms via an application programming interface (API), enabling secure external access and query-based retrieval.

16. The computing system of claim 1, wherein the decentralized data storage system uses cryptographically enforced access controls restricting the reconstruction and retrieval of encrypted data shards exclusively to entities authorized according to access permissions defined within the smart contract.

17. The computing system of claim 1, wherein the processing system is further configured to implement role-based access control (RBAC) within the authenticated interface, wherein RBAC defines multiple permission levels enabling differentiated access to identity-based tokens and hierarchical event data.

18. A computer-implemented method for source chain management with identity-based tokens and enhanced security, the method comprising:

receiving, from an entity, an input comprising a decentralized identifier (DID) uniquely associated with the entity;

invoking a smart contract deployed on a distributed ledger to mint a non-transferable identity-based token linked permanently to the DID, wherein the token cannot be transferred to another DID;

generating metadata for the identity-based token comprising:

a cryptographic reference to a hierarchical source chain structure stored within a decentralized data storage system; and cryptographic verification data configured to validate integrity of the metadata and the hierarchical source chain structure;

storing the metadata and a link to the identity-based token in the decentralized data storage system, wherein the decentralized data storage system partitions data into a plurality of encrypted data shards, and distributes each encrypted data shard across decentralized storage nodes;

memorializing an event associated with the entity by:

recording granular event details comprising a timestamp, a comprehensive log documenting specific data changes, and an origin identifier of the event; and appending the granular event details into the hierarchical source chain structure stored within the decentralized data storage system;

verifying integrity of the hierarchical source chain structure by validating cryptographic links between event records; and providing authorized access through an authenticated interface to reconstruct data from encrypted shards stored in the decentralized data storage system, wherein reconstructing the data from the encrypted shards comprises:

retrieving encrypted shards referenced by the metadata from the decentralized storage nodes;

decrypting the encrypted shards using one or more decryption keys derived from the DID;

reconstructing a data object by assembling at least a subset of the decrypted shards; and presenting the reconstructed data object to authorized entities.

19. The method of claim 18, further comprising embedding cryptographically enforceable non-transferability rules directly into the smart contract to prevent unauthorized token transfer.

20. A non-transitory processor-readable storage medium having stored thereon processor-executable instructions configured to cause a processing system in a computing device to perform operations for source chain management with identity-based tokens and enhanced security, the operations comprising:

receiving, from an entity, an input comprising a decentralized identifier (DID) uniquely associated with the entity;

invoking a smart contract deployed on a distributed ledger to mint a non-transferable identity-based token linked permanently to the DID, wherein the token cannot be transferred to another DID;

generating metadata for the identity-based token comprising:

a cryptographic reference to a hierarchical source chain structure stored within a decentralized data storage system; and cryptographic verification data configured to validate integrity of the metadata and the hierarchical source chain structure;

storing the metadata and a link to the identity-based token in the decentralized data storage system, wherein the decentralized data storage system partitions data into a plurality of encrypted data shards, and distributes each encrypted data shard across decentralized storage nodes;

memorializing an event associated with the entity by:

recording granular event details comprising a timestamp, a comprehensive log documenting specific data changes, and an origin identifier of the event; and appending the granular event details into the hierarchical source chain structure stored within the decentralized data storage system;

verifying integrity of the hierarchical source chain structure by validating cryptographic links between event records; and providing authorized access through an authenticated interface to reconstruct data from encrypted shards stored in the decentralized data storage system, wherein reconstructing the data from the encrypted shards comprises:

retrieving encrypted shards referenced by the metadata from the decentralized storage nodes;

decrypting the encrypted shards using one or more decryption keys derived from the DID;

reconstructing a data object by assembling at least a subset of the decrypted shards; and presenting the reconstructed data object to authorized entities.

\* \* \* \* \*